US012726745B2

(12) United States Patent
Kim et al.

(10) Patent No.: US 12,726,745 B2
(45) Date of Patent: Sep. 1, 2026

(54) SOUND APPARATUS AND VEHICULAR APPARATUS INCLUDING THE SAME

(71) Applicant: LG Display Co., Ltd., Seoul (KR)

(72) Inventors: Daewon Kim, Paju-si (KR); YeongRak Choi, Paju-si (KR); Daeho Kim, Paju-si (KR); DoHyeong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 176 days.

(21) Appl. No.: 18/745,905

(22) Filed: Jun. 17, 2024

(65) Prior Publication Data

US 2024/0422459 A1 Dec. 19, 2024

(30) Foreign Application Priority Data

Jun. 19, 2023 (KR) ........................ 10-2023-0078517

(51) Int. Cl.
*H04R 1/02* (2006.01)

(52) U.S. Cl.
CPC ........... *H04R 1/02* (2013.01); *H04R 2499/13* (2013.01)

(58) Field of Classification Search
CPC ........ H04R 1/02; H04R 2499/13; H04R 7/02; H04R 17/00; H04R 17/02; H04R 7/26; H04R 9/06; H04R 2307/00
See application file for complete search history.

(56) References Cited

U.S. PATENT DOCUMENTS

| | | | | |
|---|---|---|---|---|
| 2005/0129258 A1* | 6/2005 | Fincham | H04R 1/345 381/337 |
| 2020/0359128 A1* | 11/2020 | Sato | H04R 1/288 |
| 2024/0422471 A1* | 12/2024 | Kim | H04R 17/00 |
| 2024/0422472 A1* | 12/2024 | Kim | H04R 1/023 |
| 2024/0422473 A1* | 12/2024 | Kim | H04R 1/2826 |

* cited by examiner

*Primary Examiner* — David L Ton
(74) *Attorney, Agent, or Firm* — Birch, Stewart, Kolasch & Birch, LLP

(57) ABSTRACT

A sound apparatus in one example can include a sound generating module having a vibration member and a vibration apparatus configured at the vibration member, an enclosure connected to the vibration member with an internal space therebetween, and a connection member connected to the enclosure. The connection member can include a first portion and a second portion, where the first and second portions have different thicknesses from each other.

35 Claims, 59 Drawing Sheets

130: 130C, 130I, 130L 130L: 130L1, 130L2 30-1: 31C 30-2: 31I, 31L 230: 230B

130: 130C, 130E, 130N
130E: 130E2, 130E3
30-1: 31C, 31E
30-3: 31N
230B: 230B3, 230B4
230: 230B

SOUND APPARATUS AND VEHICULAR APPARATUS INCLUDING THE SAME

CROSS-REFERENCE TO RELATED APPLICATIONS

This application claims priority to Korean Patent Application No. 10-2023-0078517 filed in the Republic of Korea on Jun. 19, 2023, the entire contents of which is hereby expressly incorporated by reference into the present application.

BACKGROUND

Technical Field

The present disclosure relates to a sound apparatus and a vehicular apparatus including the same.

Discussion of the Related Art

Vehicles include a sound apparatus which outputs a sound based on an audio signal output from a multimedia device, and such sound apparatus can include a car audio device. For example, the sound apparatus applied to vehicles can include a front speaker and a rear speaker, which are configured as a coil type device.

SUMMARY OF THE DISCLOSURE

However, a sound apparatus in the vehicles can be limited when outputting a realistic sound or stereo sound of a multichannel through the front speaker and the rear speaker to limitations of the coil type device. Further, in the sound apparatus in vehicles, when the number of speakers are increased, a stereo sound can be output, but due to a size of the speakers based on the coil type device and a limitation of a space in vehicles, there is a limitation in increasing the number of speakers so that a realistic sound or stereo sound cannot be provided using the coil type device that are compact and aesthetically pleasing.

The inventors of the present disclosure have recognized the problems and disadvantages of the related art and have performed extensive research and experiments for enhancing a sound characteristic and/or a sound pressure level characteristic of a sound apparatus for vehicles. Based on the extensive research and experiments, the inventors have invented a sound apparatus and a vehicular apparatus including the same, which can enhance a sound characteristic and/or a sound pressure level characteristic.

One or more aspects of the present disclosure are directed to providing a sound apparatus and a vehicular apparatus including the same, which can enhance a sound characteristic and/or a sound pressure level characteristic.

Additional features, advantages, and aspects will be set forth in the description that follows, and in part will be apparent from the description, or can be learned by practice of the inventive concepts provided herein. Other features, advantages, and aspects of the present disclosure can be realized and attained by the structure particularly pointed out in the written description, or derivable therefrom, and the claims hereof as well as the appended drawings.

To achieve these and other advantages and aspects of the present disclosure, as embodied and broadly described herein, in one or more aspects, a sound apparatus can include a sound generating module including a vibration member and a vibration apparatus configured at the vibration member, an enclosure connected to the vibration member with an internal space therebetween, and a connection member connected to the enclosure. The connection member can include a first portion and a second portion. The first and second portions of the connection member can have different thicknesses from each other.

In one or more aspects, a vehicular apparatus can comprise an interior material exposed at an interior space, and at least one or more sound generating apparatuses disposed at the interior material to output a sound to the interior space. The at least one or more sound generating apparatuses can comprise a sound generating module including a vibration member and a vibration apparatus configured at the vibration member, an enclosure connected to the vibration member with an internal space therebetween, and a connection member connected to the enclosure. The connection member can include a first portion and a second portion. The first and second portions of the connection member can have different thicknesses from each other.

In a sound apparatus and a vehicular apparatus including the same according to one or more embodiments of the present disclosure, a sound characteristic and/or a sound pressure level characteristic can be enhanced.

In a sound apparatus and a vehicular apparatus including the same according to one or more embodiments of the present disclosure, a sound characteristic and/or a sound pressure level characteristic can be enhanced in a sound band including a sound of a low-pitched sound band.

In a sound apparatus and a vehicular apparatus including the same according to one or more embodiments of the present disclosure, a vibration member including at least one or more holes can be configured, and thus, a sound characteristic and/or a sound pressure level characteristic can be enhanced in a sound band including a sound of a low-pitched sound band.

In a sound apparatus and a vehicular apparatus including the same according to one or more embodiments of the present disclosure, a signal supply member and a vibration generating part can be configured as one part (or one component), thereby realizing an effect of uni-materialization.

In a sound apparatus and a vehicular apparatus including the same according to one or more embodiments of the present disclosure, a protrusion part and a coupling part can be configured as one part (or one component), thereby realizing an effect of uni-materialization.

In a sound apparatus and a vehicular apparatus including the same according to one or more embodiments of the present disclosure, because a protection member is configured in the sound apparatus, a sound characteristic and/or a sound pressure level characteristic can be further enhanced, a sound reproduction band can expand, and the sound apparatus can be protected.

In a sound apparatus and a vehicular apparatus including the same according to one or more embodiments of the present disclosure, because a connection member is configured between a vehicle interior material and an enclosure, a sound characteristic and/or a sound pressure level characteristic can be enhanced in a sound band including a sound of a low-pitched sound band.

In a sound apparatus and a vehicular apparatus including the same according to one or more embodiments of the present disclosure, because a coupling part having a non-rectangular shape is configured, a sound characteristic and/or a sound pressure level characteristic can be enhanced in a pitched sound band including a sound of a low-pitched sound band, and peak and/or dip in a high-pitched sound band can be improved, thereby enhancing a balance characteristic of a sound pressure level and/or a flatness characteristic of a sound pressure level.

In a sound apparatus and a vehicular apparatus including the same according to one or more embodiments of the present disclosure, because a width and/or a length of a coupling part is set and configured, a sound characteristic and/or a sound pressure level characteristic can be enhanced in a pitched sound band including a sound of a low-pitched sound band, and peak and/or dip in a high-pitched sound band can be improved, thereby enhancing a balance characteristic of a sound pressure level and/or a flatness characteristic of a sound pressure level.

In a sound apparatus and a vehicular apparatus including the same according to one or more embodiments of the present disclosure, because a connection member having different thicknesses is configured, a sound characteristic and/or a sound pressure level characteristic can be further enhanced in a low-pitched sound band.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, and incorporated in and constitute a part of this disclosure, illustrate aspects and embodiments of the disclosure and together with the description serve to explain principles of the disclosure.

Figure 1:
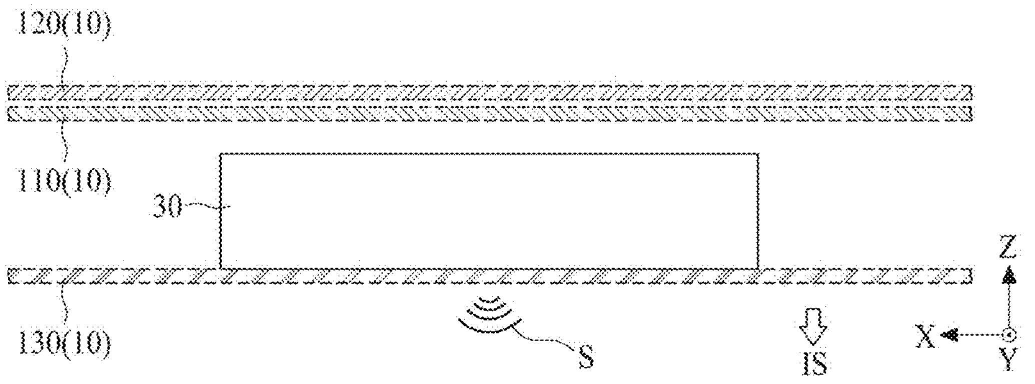
FIG. 1 illustrates a sound apparatus for vehicles according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION OF THE DISCLOSURE

Reference is now made in detail to aspects of the present disclosure, examples of which can be illustrated in the accompanying drawings. In the following description, when a detailed description of well-known methods, functions, structures or configurations can unnecessarily obscure aspects of the present disclosure, a detailed description of such known functions or configurations can have been omitted for brevity. Further, repetitive descriptions can be omitted for brevity. The progression of processing steps and/or operations described is a non-limiting example.

The sequence of steps and/or operations is not limited to that set forth herein and can be changed to occur in an order that is different from an order described herein, with the exception of steps and/or operations necessarily occurring in a particular order. In one or more examples, two operations in succession can be performed substantially concurrently, or the two operations can be performed in a reverse order or in a different order depending on a function or operation involved.

Unless stated otherwise, like reference numerals can refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings can have the same or substantially the same functions and properties unless stated otherwise. Names of the respective elements used in the following explanations are selected only for convenience and can be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure can be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements can be added unless a term such as "only" or the like is used. The terms used in the present disclosure are merely used in order to describe particular example aspects, and are not intended to limit the scope of the present disclosure. The terms of a singular form can include plural forms unless the context clearly indicates otherwise.

The word "exemplary" is used to mean serving as an example or illustration, unless otherwise specified. Embodiments are example embodiments. Aspects are example aspects. Here, in one or more implementations, "embodiments," "aspects," "examples," and the like should not be construed to be preferred or advantageous over other implementations. An aspect, an example, an example aspect, or the like can refer to one or more aspects, one or more examples, one or more example aspects, or the like, unless stated otherwise. Further, the term "can" encompasses all the meanings and coverages of the term "may."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events can occur therebetween, unless a more limiting term, such as "just," "immediate(ly)," or "direct(ly)," is used.

The terms, such as "below," "lower," "above," "upper" and the like, can be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, members, parts, regions, areas, portions, steps, operations, and/or the like), these elements should not be limited by these terms, for example, to any particular order, sequence, precedence, or number of elements. These terms are used only to distinguish one element from another. For example, a first element can denote a second element, and, similarly, a second element can denote a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element can include one or more first elements. Similarly, a second element or the like can include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, sequence, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided," "disposed," "connected," "coupled," or the like in, on, with or to another element can be understood, for example, as that at least a portion of the element is provided, disposed, connected, coupled, or the like in, on, with or to at least a portion of another element, or that the entirety of the element is provided, disposed, connected, coupled, or the like in, on, with or to another element. The phrase that an element (e.g., layer, film, region, component, section, or the like) "contacts," "overlaps," or the like with another element can be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms can mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and can be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item", can represent (i) a combination of items provided by one or more of the first item, the second item, and the third item or (ii) only one of the first item, the second item, and the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); some combinations of A, B, and C (e.g., A and B; A and C; or B and C); and all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element can be the only element between the at least two elements, or one or more intervening elements can also be present.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" can mean "a," "b," or "a and b." For example, "a, b or c" can mean "a," "b," "c," "a and b," "b and c," "a and c," or "a, b and c."

Features of various aspects of the present disclosure can be partially or entirely coupled to or combined with each other, can be technically associated with each other, and can be operated, linked, or driven together in various ways. Aspects of the present disclosure can be implemented or carried out independently from each other, or can be implemented or carried out together in a co-dependent or related relationship. In one or more aspects, the components of each apparatus according to various aspects of the present disclosure can be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there can be other terms depending on the development and/or change of technology, convention, preference of technicians, and so on. Therefore, the terms used herein should not be understood as limiting technical ideas, but should be understood as examples of the terms for describing example aspects.

Further, in a specific case, a term can be arbitrarily selected by an applicant, and in this case, the detailed meaning thereof is described herein. Therefore, the terms used herein should be understood based on not only the name of the terms, but also the meaning of the terms and the content hereof.

Furthermore, "X-axis direction," "Y-axis direction," and "Z-axis direction," should not be construed by a geometric relation only of a mutual vertical relation and can have broader directionality within the range that elements of the present disclosure can act functionally.

In the following description, various example aspects of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements can be denoted by the same reference numerals even though they are depicted in different drawings.

In addition, for convenience of description, a scale, dimension, size, and thickness of each of the elements illustrated in the accompanying drawings can be different from an actual scale, dimension, size, and thickness, and thus, aspects of the present disclosure are not limited to a scale, dimension, size, and thickness illustrated in the drawings.

FIG. 1 illustrates a sound apparatus for vehicles according to an embodiment of the present disclosure. All components of each sound apparatus according to all embodiments of the present disclosure are operatively coupled and configured.

With reference to FIG. 1, the sound apparatus for vehicles according to an embodiment of the present disclosure can include a sound apparatus 30. The sound apparatus 30 can be disposed or equipped at an inner portion of a vehicle 10 to output a sound S toward an interior space (or an indoor space) IS of the vehicle (or a vehicular apparatus) 10.

The vehicle (or the vehicular apparatus) 10 can be a vehicular apparatus which includes one or more seats and one or more windows (or windows). For example, the vehicle (or the vehicular apparatus) 10 can include a vehicle, an automobile, a train, a ship, or an aircraft, or the like, but embodiments of the present disclosure are not limited thereto, and can represent any element to which the sound elements can be applied. The vehicle or the vehicular apparatus can be any other entity or element in which the sound apparatus of the present application can be applied or used.

The vehicle (or the vehicular apparatus) 10 according to an embodiment of the present disclosure can include a main structure 110.

The main structure 110 of the vehicle 10 can include a main frame, a sub-frame, a side frame, a door frame, an under-frame, and a seat frame, or the like, but embodiments of the present disclosure are not limited thereto. For example, the main structure 110 can be a vehicle body, a vehicle structure, or a frame structure, or the like, but embodiments of the present disclosure are not limited thereto.

The vehicle (or the vehicular apparatus) 10 according to an embodiment of the present disclosure can further include an exterior material 120.

The exterior material 120 of the vehicle 10 can be configured to cover the main structure 110. For example, the exterior material 120 of the vehicle 10 can be configured to cover an outer portion of the main structure 110. In the following description, the exterior material 120 can be a vehicle exterior material 120, and can be used interchangeably.

The exterior material (or vehicle exterior material) 120 of the vehicle 10 can include a hood panel, a front fender panel, a dash panel, a pillar panel, a trunk panel, a roof panel (or ceiling), a floor panel, a door inner panel, and a door outer panel, or the like, but embodiments of the present disclosure are not limited thereto.

The exterior material 120 according to an embodiment of the present disclosure can include at least one or more of a planar portion (or a flat portion) and a curved portion (or a flexural portion or an uneven portion). For example, the exterior material 120 can have a structure corresponding to a structure of a corresponding main structure 110, or can have a structure which differs from a structure of a corresponding main structure 110.

The vehicle (or the vehicular apparatus) 10 according to an embodiment of the present disclosure can further include a vehicle interior material 130. In the following description, the vehicle interior material 130 can be an interior material 130, and can be used interchangeably.

The vehicle interior material 130 can include all elements (or components) configuring an inner portion of the vehicle 10, or can include all elements (or components) disposed at the interior space IS of the vehicle 10. For example, the vehicle interior material 130 can be an interior member or an interior finish material of the vehicle 10, but embodiments of the present disclosure are not limited thereto.

The vehicle interior material 130 according to an embodiment of the present disclosure can be configured to cover one or more of main structure 110 and the exterior material 120 in the interior space (or an inner portion) IS of the vehicle 10. For example, the vehicle interior material 130 can cover one or more of main structure 110 and the exterior material 120 in the interior space IS of the vehicle 10 and can be configured to be exposed at the interior space IS of the vehicle 10.

The vehicle interior material 130 according to an embodiment of the present disclosure can be configured to be exposed at the inner portion and/or the interior space IS of the vehicle 10 in the inner portion and/or the interior space IS of the vehicle 10. For example, the vehicle interior material 130 can be configured to cover one or more surfaces (or an interior surfaces) of at least one or more of a main frame (or a vehicle body), a side frame (or a side body), a door frame (or a door body), a handle frame (or a steering hub), and a seat frame, which are exposed at the interior space IS of the vehicle 10.

The vehicle interior material 130 according to an embodiment of the present disclosure can include a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an illumination interior material), a rear view mirror, a glove box, and a sun visor, or the like, but embodiments of the present disclosure are not limited thereto.

The vehicle interior material 130 according to an embodiment of the present disclosure can include one or more materials of metal, wood, rubber, plastic, glass, fiber, cloth, paper, a mirror, leather, and carbon, but embodiments of the present disclosure are not limited thereto. The vehicle interior material 130 including a plastic material can be an injection material which is implemented by an injection process using a thermoplastic resin or a thermosetting resin, but embodiments of the present disclosure are not limited thereto. The vehicle interior material 130 including a fiber material can include at least one or more of a plastic composite fiber, a carbon fiber (or an aramid fiber), and a natural fiber, but embodiments of the present disclosure are not limited thereto. The vehicle interior material 130 including the fiber material can include a textile sheet, a knit sheet, or a nonwoven fabric, or the like, but embodiments of the present disclosure are not limited thereto. For example, the paper can be cone paper for speakers. For example, the cone paper can be pulp or foamed plastic, or the like, but embodiments of the present disclosure are not limited thereto. The vehicle interior material 130 including a leather material can include natural leather or artificial leather, but embodiments of the present disclosure are not limited thereto.

The vehicle interior material 130 according to an embodiment of the present disclosure can include at least one or more of a planar portion (or a flat portion) and a curved portion (or a flexural portion or an uneven portion). For example, the vehicle interior material 130 can have a structure corresponding to a structure (or an inner surface structure) of a corresponding main structure 110, or can have a structure which differs from a structure of a corresponding main structure 110.

According to an embodiment of the present disclosure, the sound apparatus 30 can be disposed at the vehicle interior material 130. The sound apparatus 30 can vibrate the vehicle interior material 130 to generate a sound S based on a vibration of the vehicle interior material 130. For example, the sound apparatus 30 can directly vibrate the vehicle interior material 130 to generate the sound S based on a vibration of the vehicle interior material 130. For example, the sound apparatus 30 can be configured to vibrate the vehicle interior material 130 to output the sound S toward the inner portion or the interior space IS of the vehicle 10. Thus, the sound apparatus 30 can use the vehicle interior material 130 as a sound vibration plate, a sound diaphragm, or an acoustic diaphragm. The vehicle interior material 130 can be a vibration plate, a sound vibration plate, or a sound generating plate for outputting the sound S. For example, the vehicle interior material 130 can have a size which is greater than the sound apparatus 30, but embodiments of the present disclosure are not limited thereto.

According to an embodiment of the present disclosure, the sound apparatus 30 can be disposed at at least one or more of a dashboard, a pillar interior material, a floor interior material, a roof interior material, a door interior material, a handle interior material, and a seat interior material, or can be connected (or coupled) to at least one or more of a rear package interior material, an overhead console, a rear view mirror, a glove box, and a sun visor.

The vehicle 10 or the sound apparatus 30 according to an embodiment of the present disclosure can include at least one or more sound apparatuses. The sound apparatus 30 can vibrate a corresponding vehicle interior material 130 by at least one or more of at least one or more sound apparatuses 30 disposed at the vehicle interior material 130 to output a realistic sound S and/or stereo sound including a multichannel toward the interior space IS of the vehicle 10.

According to an embodiment of the present disclosure, the sound apparatus 30 can be configured at a region between the vehicle interior material 130 and the main structure 110, or a region between the vehicle interior material 130 and the exterior material 120. The sound apparatus 30 can be disposed at a region between the vehicle interior material 130 and the main structure 110, or a region between the vehicle interior material 130 and the exterior material 120, and can indirectly or directly vibrate one or more of the region between the vehicle interior material 130 and the main structure 110 and the region between the vehicle interior material 130 and the exterior material 120 to output sound.

According to an embodiment of the present disclosure, the sound apparatus 30 can be disposed at one or more of a region between the main structure 110 and the exterior material 120, a region between the main structure 110 and the vehicle interior material 130, the exterior material 120, and the vehicle interior material 130. For example, the sound apparatus 30 can be disposed at one or more of a region between the main structure 110 and the exterior material 120, a region between the main structure 110 and the vehicle interior material 130, the exterior material 120, and the vehicle interior material 130, and can be configured to output a sound. For example, the sound apparatus 30 can be disposed at one or more of a region between the main structure 110 and the exterior material 120, a region between the main structure 110 and the vehicle interior material 130, the exterior material 120, and the vehicle interior material 130, and can indirectly or directly vibrate one or more of a region between the main structure 110 and the exterior material 120, a region between the main structure 110 and the vehicle interior material 130, the exterior material 120, and the vehicle interior material 130 to output sound. For example, the sound apparatus 30 can be disposed at the region between the exterior material 120 and the vehicle interior material 130, and can indirectly or directly vibrate one or more of the exterior material 120 and the vehicle interior material 130 to output sound. For example, the sound apparatus 30 can be disposed at at least one or more of the exterior material 120, the vehicle interior material 130, and a region between the exterior material 120 and the vehicle interior material 130. According to an embodiment of the present disclosure, the at least one or more of the exterior material 120, the vehicle interior material 130, and a region between the exterior material 120 and vehicle the interior material 130 can output a sound based on a vibration of the sound apparatus 30.

The sound apparatuses 30 according to an embodiment of the present disclosure can output a sound in a region between the exterior material 120 and the vehicle interior material 130 of the vehicle 10. For example, the sound apparatuses 30 can be connected or coupled to one or more of the exterior material 120 and the vehicle interior material 130 in a region between the exterior material 120 and the vehicle interior material 130, and can indirectly or directly vibrate one or more of the exterior material 120 and the vehicle interior material 130 to output sound.

One or more of the exterior material 120 and the vehicle interior material 130 of the vehicle 10 can be a vibration plate, a sound vibration plate, or a sound generating plate, or the like configured to output a sound. For example, each of the exterior material 120 and the vehicle interior material 130 configured to output the sound can have a size which is greater than that of the sound apparatus 30, and thus, can perform a function of a large-area vibration plate, a large-area sound vibration plate, or a large-area sound generating plate, thereby enhancing a sound characteristic and/or a sound pressure level characteristic of a sound band including a low-pitched sound band generated by the sound apparatus 30. For example, a frequency of a sound of the low-pitched sound band can be 300 Hz or less, 400 Hz or less, or 500 Hz or less, but embodiments of the present disclosure are not limited thereto.

Figure 2:
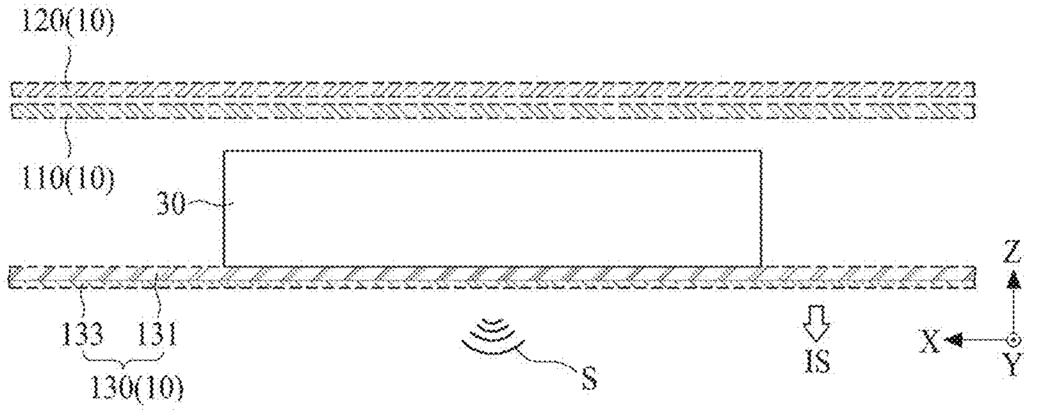
FIG. 2 illustrates a sound apparatus for vehicles according to another embodiment of the present disclosure.

FIG. 2 illustrates a sound apparatus for vehicles according to another embodiment of the present disclosure. Particularly, FIG. 2 illustrates an embodiment implemented by modifying the vehicle interior material on which the sound apparatus described above with reference to FIG. 1 is disposed. Therefore, in the following description, repetitive descriptions of elements other than a vehicle interior material are omitted or will be briefly given.

With reference to FIG. 2, the sound apparatus 30 according to another embodiment of the present disclosure can vibrate a vehicle interior material 130 including one or more materials of metal, wood, rubber, plastic, carbon, glass, fiber, cloth, paper, a mirror, and leather to output a sound S. But embodiments of the present disclosure are not limited thereto.

The vehicle interior material 130 according to another embodiment of the present disclosure can include a base member 131 and an outer member (or a surface member) 133. For example, the base member 131 can be an injection material, a first interior material, an inner interior material, or a rear interior material, but embodiments of the present disclosure are not limited thereto. The outer member 133 can be a second interior material, an outer interior material, a front interior material, an outer surface member, a reinforcement member, or a decoration member, but embodiments of the present disclosure are not limited thereto.

The base member 131 can include a plastic material. The base member 131 according to an embodiment of the present disclosure can include an injection material. For example, the base member 131 can be an injection material which is implemented by an injection process using a thermoplastic resin or a thermosetting resin, but embodiments of the present disclosure are not limited thereto. The vehicle interior material 130 or the base member 131 can be configured to cover an inner portion of a vehicle 10. For example, the vehicle interior material 130 or the base member 131 can be configured to cover one or more of the main structure 110 and the exterior material 120 in an interior space IS of the vehicle 10. For example, the vehicle interior material 130 or the base member 131 can be configured to cover one surface (or an inner surface) of at least one or more of a main frame, a side frame, a door frame, and a handle frame, which are exposed at the interior space IS of the vehicle 10.

The base member 131 can include at least one or more of a planar portion and a curved portion. For example, the base member 131 can have a structure corresponding to a structure (or a rear structure) of a corresponding main structure 110, or can have a structure which differs from a structure of a corresponding main structure 110.

The outer member 133 can be disposed on the base member 131. For example, the outer member 133 can be disposed to cover the base member 131. The outer member 133 can cover the base member 131 at the inner portion or the interior space IS of the vehicle 10 and can be configured to be exposed at the inner portion or the interior space IS of the vehicle 10. For example, the outer member 133 can be disposed at or coupled to a front surface (or an interior surface) of the base member 131 exposed at the interior space IS of the vehicle 10.

The vehicle interior material 130 or the outer member 133 according to an embodiment of the present disclosure can include any one or more materials of plastic, glass, fiber, leather, cloth, rubber, a mirror, wood, paper, carbon, and metal, but embodiments of the present disclosure are not limited thereto. For example, the outer member 133 can be a fiber material. For example, the outer member 133 including the fiber material can include at least one or more of a synthetic fiber, a carbon fiber (or an aramid fiber), and a natural fiber, but embodiments of the present disclosure are not limited thereto. For example, the outer member 133 including the fiber material can be a textile sheet, a knit sheet, or a nonwoven fabric, but embodiments of the present disclosure are not limited thereto. For example, the outer member 133 including the fiber material can be a fabric member, but embodiments of the present disclosure are not limited thereto.

The synthetic fiber can be a thermoplastic resin and can include a polyolefin-based fiber which is an eco-friendly material which does not relatively release a harmful substance. For example, the polyolefin-based fiber can include a polyethylene fiber, a polypropylene fiber, or a polyethylene terephthalate fiber, but embodiments of the present disclosure are not limited thereto. The polyolefin-based fiber can be a fiber of a single resin or a fiber of a core-shell structure, but embodiments of the present disclosure are not limited thereto. The natural fiber can be a composite fiber of one or two or more of a jute fiber, a kenaf fiber, an abaca fiber, a coconut fiber, and a wood fiber, but embodiments of the present disclosure are not limited thereto.

The sound apparatus 30 can be covered by the vehicle interior material 130. The sound apparatus 30 can be configured to vibrate the vehicle interior material 130 including the base member 131 and the outer member 133 to output a sound S toward the inner portion and/or the interior space IS of the vehicle 10.

The sound apparatus 30 according to another embodiment of the present disclosure can output the sound S toward the interior space IS of the vehicle 10 using the vehicle interior material 130 as a vibration plate or a sound vibration plate and can output a realistic sound S or stereo sound including a multichannel toward the interior space IS of the vehicle 10.

According to another embodiment of the present disclosure, the sound apparatus 30 can be configured to be surrounded by an enclosure. A space can be provided between the sound apparatus 30 and the enclosure, and a sound (or a sound pressure level) can be output based on a vibration of the vehicle interior material 130 based on air between the sound apparatus 30 and the enclosure. However, there can be a problem where a sound of the low-pitched sound band is not output, and there can be a problem where the flatness of a sound pressure level is reduced because the number of peaks and dips occurring in a reproduction frequency band of a sound (or a sound pressure level) generated based on a vibration of the vehicle interior material 130 increases and each of a highest sound pressure level and a lowest sound pressure level occurring in a reproduction frequency band of a sound (or a sound pressure level) generated based on a vibration of the vehicle interior material 130 increases. The peak can be a phenomenon where a sound pressure level bounces in a specific frequency, and the dip can be a phenomenon where a low sound pressure level is generated as the occurrence of a sound having a specific frequency is reduced. The flatness of a sound characteristic can be a level of a deviation between a highest sound pressure and a lowest sound pressure.

The inventors of the present disclosure have performed extensive research and experiments for implementing a sound apparatus and a vehicular apparatus including the same, in which a sound characteristic of the low-pitched sound band can be improved and a flatness characteristic of a sound pressure level can be enhanced. Based on the extensive research and experiments, the inventors of the present disclosure have invented a sound apparatus and a vehicular apparatus including the same, which can output a sound including a high-pitched sound band to the low-pitched sound band and can enhance a balance characteristic of a sound pressure level or the flatness characteristic of a sound pressure level. This will be described below in detail.

Figure 3:
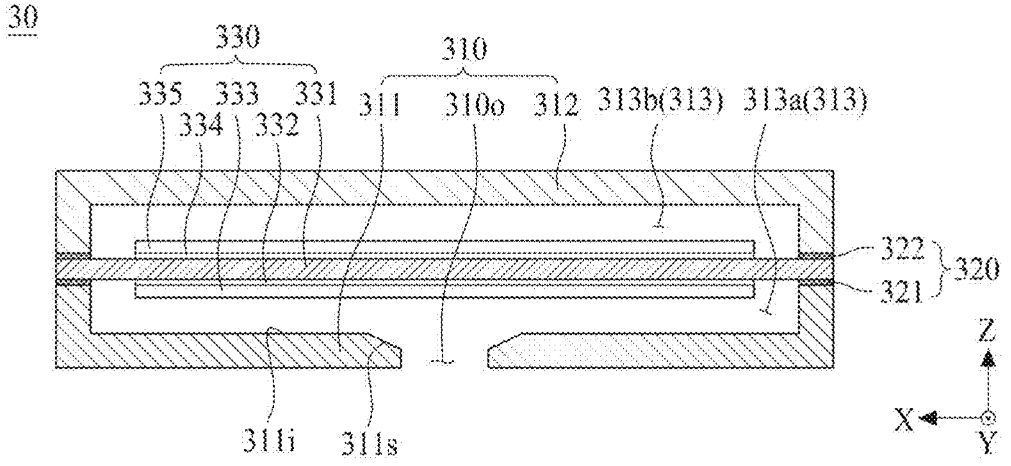
FIG. 3 illustrates a sound apparatus according to an embodiment of the present disclosure.
Figure 4:
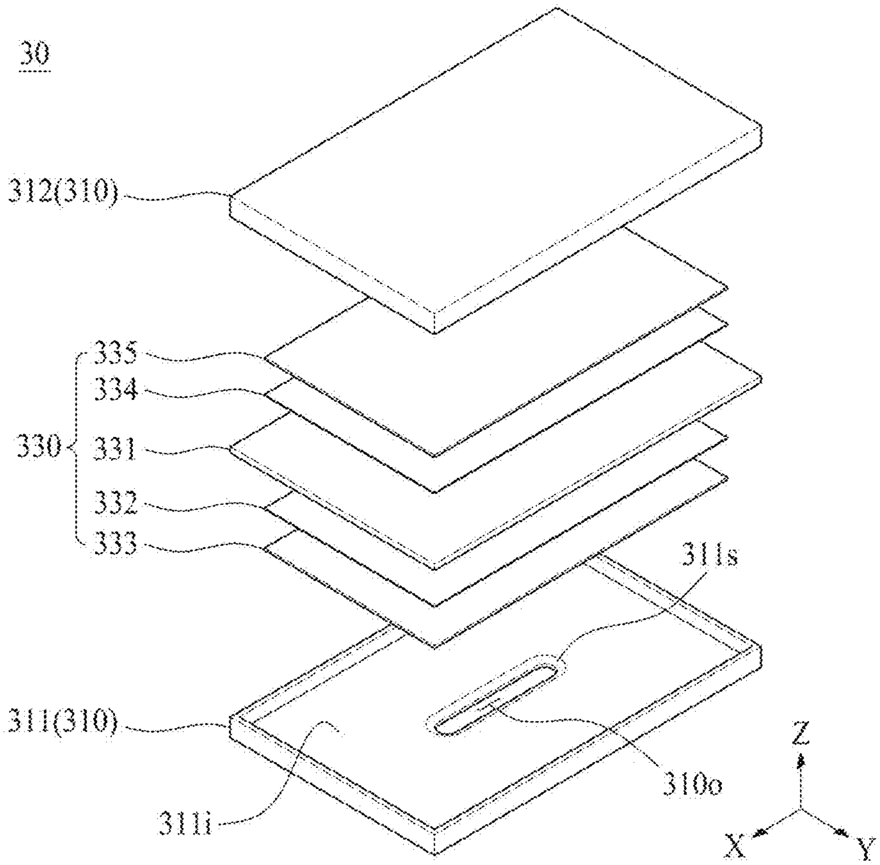
FIG. 4 is an exploded perspective view of a sound apparatus illustrated in FIG. 3 according to an embodiment of the present disclosure.

FIG. 3 illustrates a sound apparatus according to an embodiment of the present disclosure. FIG. 4 is an exploded perspective view of FIG. 3 according to an embodiment of the present disclosure.

With reference to FIGS. 3 and 4, the sound apparatus 30 according to an embodiment of the present disclosure can include an enclosure 310 and a sound generating module 330. The sound apparatus 30 can be configured to vibrate a vehicle interior material 130. For example, the sound apparatus 30 can be a sound generating apparatus, a sound output apparatus, a speaker apparatus, a car audio device, or an audio apparatus, but embodiments of the present disclosure are not limited thereto.

The sound apparatus 30 can be configured to be connected (or coupled) to a vehicle structure. For example, the sound apparatus 30 can vibrate a portion of any one of the main structure 110, the exterior material 120, and the interior material 130 illustrated in FIG. 1 or 2 to generate a sound.

With reference to FIGS. 1, 3, and 4, the sound generating module 330 can vibrate a vehicle interior material 130. Therefore, the sound generating module 330 can generate a sound based on a vibration of the vehicle interior material 130. For example, the sound generating module 330 can be configured to indirectly vibrate the vehicle interior material 130. The sound generating module 330 can generate or output a sound or a vibration based on driving (or vibration or displacement) of the vehicle interior material 130. For example, the sound generating module 330 can be configured to vibrate the enclosure 310 to vibrate the vehicle interior material 130. For example, the sound generating module 330 can be a sound generating unit, a sound generating member, a sound reproduction module, a sound reproduction unit, a car audio module, a car audio unit, a speaker module, or a speaker unit, but embodiments of the present disclosure are not limited thereto.

The sound generating module 330 according to an embodiment of the present disclosure can include a vibration member 331 and a vibration apparatus.

The vibration apparatus according to an embodiment of the present disclosure can be configured to vibrate the vibration member 331. For example, the vibration apparatus can be disposed or configured at the vibration member 331. The vibration apparatus can vibrate (or displace or drive) based on a driving signal (or a vibration driving signal or a voice signal) applied thereto to vibrate (or displace or drive) the vibration member 331. The vibration apparatus can be disposed with the vibration member 331 therebetween. The vibration apparatus can include one or more vibration apparatuses. For example, one or more vibration apparatuses can be configured at the vibration member 331.

The vibration apparatus according to an embodiment of the present disclosure can include a first vibration apparatus 333 and a second vibration apparatus 335. The first vibration apparatus 333 and the second vibration apparatus 335 can be configured at the vibration member 331. The vibration member 331 can generate a vibration or can output a sound (or a sound wave), based on the displacements (or driving) of the first vibration apparatus 333 and the second vibration apparatus 335. For example, the vibration member 331 can be a plate, a vibration plate, a vibration substrate, a vibration object, a vibration panel, a sound plate, a sound panel, a passive vibration plate, a passive vibration member, a passive vibration panel, a sound output plate, or a sound vibration plate, but embodiments of the present disclosure are not limited thereto. For example, the vibration member 331 can include a metal material, or can include a single nonmetal material or a composite nonmetal material of one or more of wood, rubber, plastic, carbon, glass, fiber, cloth, paper, mirror, and leather, but embodiments of the present disclosure are not limited thereto. For example, the paper can be cone paper for speakers. For example, the cone paper can be pulp or foamed plastic, or the like, but embodiments of the present disclosure are not limited thereto.

According to an embodiment of the present disclosure, the metal material of the vibration member 331 can include one or more materials of stainless steel, aluminum (Al), an Al alloy, a magnesium (Mg), a Mg alloy, and a magnesium-lithium (Mg—Li) alloy, but embodiments of the present disclosure are not limited thereto. For example, the vibration member 331 can be configured in a metal material such as aluminum (Al) material, or configured in a plastic material such as plastic or styrene material, but embodiments of the present disclosure are not limited thereto. For example, the styrene material can be an ABS material. The ABS material can be acrylonitrile, butadiene, and styrene. For example, the vibration member 331 can be carbon fiber reinforced plastic (CFRP), polypropylene, or polycarbonate, or the like, but embodiments of the present disclosure are not limited thereto.

The vibration member 331 can include a first surface and a second surface different from (or opposite to) the first surface. The first vibration apparatus 333 can be disposed at the first surface (or a rear surface) of the vibration member 331. The second vibration apparatus 335 can be disposed at the second surface (or a front surface) of the vibration member 331.

According to an embodiment of the present disclosure, the vibration member 331 can include a tetragonal shape (or a square shape), but embodiments of the present disclosure are not limited thereto. For example, the vibration member 331 can have a rectangular shape including a long side and a short side. The vibration apparatus can correspond to the vibration member 331, or have a same shape as that of the vibration member 331, but embodiments of the present disclosure are not limited thereto. For example, each of a first vibration apparatus 333 and a second vibration apparatus 335 of the vibration apparatus can be the same shape as that of the vibration member 331. According to an embodiment of the present disclosure, each of the first vibration apparatus 333 and the second vibration apparatus 335 can have a rectangular shape which is smaller than the vibration member 331.

According to an embodiment of the present disclosure, a long side of each of the first vibration apparatus 333 and the second vibration apparatus 335 can be parallel to the long side of the vibration member 331 and can be spaced apart from the long side of the vibration member 331 to have a first distance (or a first shortest distance). A short side of each of the first vibration apparatus 333 and the second vibration apparatus 335 can be parallel to the short side of the vibration member 331 and can be spaced apart from the short side of the vibration member 331 to have a second distance (or a second shortest distance). For example, the first distance can differ from the second distance. For example, the first distance can be smaller than the second distance.

The first vibration apparatus 333 and the second vibration apparatus 335 can be disposed with the vibration member 331 therebetween. The first vibration apparatus 333 and the second vibration apparatus 335 can vibrate (or displace or drive) based on driving signals (or a vibration driving signal or a voice signal) applied thereto to vibrate (or displace or drive) the vibration member 331. For example, the driving signals (or the vibration driving signal or the voice signal) applied to the first vibration apparatus 333 and the second vibration apparatus 335 can be a same or different. For example, the driving signals applied to the first vibration apparatus 333 and the second vibration apparatus 335 can have a same phase or different phases. For example, the first vibration apparatus 333 and the second vibration apparatus 335 can have a bimorph structure where the first and second vibration apparatuses 333 and 335 are disposed with the vibration member 331 therebetween. Each of the first vibration apparatus 333 and the second vibration apparatus 335 can independently vibrate the vibration member 331, and thus, an influence thereof on a sound characteristic based on a material and a characteristic of the vibration member 331 can be reduced. Accordingly, a sound characteristic and/or a sound pressure level characteristic of the sound apparatus 30 can be enhanced.

According to another embodiment of the present disclosure, the first vibration apparatus 333 and the second vibration apparatus 335 can be configured at any one of the first surface and the second surface of the vibration member 331. For example, the first vibration apparatus 333 can be configured at any one of the first surface and the second surface of the vibration member 331. For example, the first vibration apparatus 333 can be connected to or configured at the first surface of the vibration member 331. For example, the second vibration apparatus 335 can be connected to or configured at the second surface different from the first surface. For example, the second vibration apparatus 335 can be connected to or configured at the first vibration apparatus 333. For example, the second vibration apparatus 335 can be stacked on the first vibration apparatus 333.

The sound apparatus 30 according to an embodiment of the present disclosure can further include an adhesive member. The adhesive member can include a first adhesive member 332 and a second adhesive member 334.

According to an embodiment of the present disclosure, the first adhesive member 332 can be disposed between the vibration member 331 and the first vibration apparatus 333. The first vibration apparatus 333 can be connected or coupled to the vibration member 331 by the first adhesive member 332. For example, the first vibration apparatus 333 can be connected or coupled to the first surface of the vibration member 331 by the first adhesive member 332.

According to an embodiment of the present disclosure, the second adhesive member 334 can be disposed between the vibration member 331 and the second vibration apparatus 335. The second vibration apparatus 335 can be connected or coupled to the vibration member 331 by the second adhesive member 334. For example, the second vibration apparatus 335 can be connected or coupled to the second surface of the vibration member 331 by the second adhesive member 334.

The first adhesive member 332 and the second adhesive member 334 can include an adhesive layer (or a tacky layer) which is good in adhesive force or attaching force. For example, the first adhesive member 332 and the second adhesive member 334 can include a same or different adhesive layers (or tacky layers). For example, the first adhesive member 332 and the second adhesive member 334 can include an adhesive, a double-sided adhesive, a double-sided tape, a double-sided adhesive tape, a double-sided adhesive foam tape, a double-sided pad, a double-sided foam pad, a double-sided adhesive foam pad, a double-sided cushion tape, or a tacky sheet, but embodiments of the present disclosure are not limited thereto.

According to an embodiment of the present disclosure, the enclosure 310 can be adjacent to the sound generation module 330. For example, the enclosure 310 can include at least one or more enclosures (or enclosure members). The at least one or more enclosures can include a first enclosure (or a first enclosure member) 311 and a second enclosure (or a second enclosure member) 312. For example, the second enclosure 312 can be connected to the first enclosure 311. For example, the enclosure 310 can be a housing, a case, an outer case, a case member, a housing member, a cabinet, a sealing member, a sealing cap, a sealing box, a sound box, or the like, but embodiments of the present disclosure are not limited thereto.

The enclosure 310 according to an embodiment of the present disclosure can include one or more of a metal material and a nonmetal material (or a composite nonmetal material), but embodiments of the present disclosure are not limited thereto. For example, the enclosure 310 can include one or more materials of a metal material, plastic, fiber, carbon, and wood, but embodiments of the present disclosure are not limited thereto. For example, the enclosure 310 can be configured in a metal material such as aluminum (Al) material, or configured in a plastic material such as plastic or styrene material, but embodiments of the present disclosure are not limited thereto. For example, the styrene material can be an ABS material. The ABS material can be acrylonitrile, butadiene, and styrene.

The enclosure 310 can be configured to be connected (or coupled) to the vehicle interior material 130. The enclosure 310 can be configured to support or accommodate (or receive) the sound generating module 330. The enclosure 310 can be configured to vibrate based on driving (or vibration or displacement) of the sound generating module 330. For example, the enclosure 310 can be configured to vibrate the vehicle interior material 130 based on driving (or vibration or displacement) of the sound generating module 330.

The enclosure 310 can include an internal space (or an inner space) 313. The enclosure 310 can be at the sound generating module 330 with the internal space 313 therebetween. For example, the enclosure 310 can be at a rear surface of the sound generating module 330 with the internal space 313 therebetween. For example, the enclosure 310 can be connected to the sound generating module 330 with the internal space 313 therebetween. For example, the enclosure 310 can be configured to cover the sound generating module 330 with the internal space 313 therebetween. For example, the enclosure 310 can be configured to cover a first surface (or rear surface or lower surface) of the sound generating module 330 and a second surface (or front surface or upper surface) which is opposite to the first surface of the sound generating module 330. The enclosure 310 can be configured to support the sound generating module 330 with the internal space 313 therebetween. For example, the enclosure 310 can be configured to support or cover each of the first surface (or rear surface or lower surface) and the second surface (or front surface or upper surface) of the sound generating module 330.

According to an embodiment of the present disclosure, the internal space 313 of the enclosure 310 can be between the sound generating module 330 and the enclosure 310. The internal space 313 can be between the first enclosure 311 and the second enclosure 312. For example, the sound generating module 330 can be configured at the internal space 313 of the enclosure 310. For example, the sound generating module 330 can be configured at the internal space 313 between the first enclosure 311 and the second enclosure 312. The vibration apparatus of the sound generating module 330 can be at the internal space 313 of the enclosure 310. For example, the first vibration apparatus 333 and the second vibration apparatus 335 can be at the internal space 313 of the enclosure 310. For example, the first vibration apparatus 333 can be between the first enclosure 311 and the vibration member 331. For example, the second vibration apparatus 335 can be between the second enclosure 312 and the vibration member 331. For example, the internal space 313 can be an accommodation space, a receiving space, a gap space, an air space, a vibration space, a sound space, a sound box, or a sealing space, or the like, but embodiments of the present disclosure are not limited thereto.

The first enclosure 311 can be at the sound generating module 330 with the internal space 313 therebetween. The first enclosure 311 can be connected to the sound generating module 330 with the internal space 313 therebetween. The first enclosure 311 can be disposed at or connected to a first surface side (or rear surface side or lower surface side) of the sound generating module 330 with the internal space 313 therebetween. For example, the first enclosure 311 can be connected (or coupled) to a periphery portion of the first surface of the sound generating module 330 with the internal space 313 therebetween. The first enclosure 311 can support the first surface of the sound generating module 330 with the internal space 313 therebetween. The first enclosure 311 can be disposed (or configured) at a region between the vehicle interior material 130 and the sound generating module 330. For example, the first enclosure 311 can be configured to surround the first surface of the sound generating module 330. The first enclosure 311 can be configured to cover the first surface of the sound generating module 330.

The first enclosure 311 can be connected (or coupled) to the vehicle interior material 130. For example, the first enclosure 311 can be connected (or coupled) to a first surface of the vehicle interior material 130. A rear surface (or lower surface) of the first enclosure 311 can be connected (or coupled) to the first surface of the vehicle interior material 130.

The first enclosure 311 can vibrate based on driving (or vibration or displacement) of the sound generating module 330, and the vehicle interior material 130 can vibrate based on a vibration of the first enclosure 311 to generate or output a sound. Accordingly, according to an embodiment of the present disclosure, a sound can be generated based on a vibration of the vehicle interior material 130 having a size which is greater than that of the sound apparatus 30, thereby enhancing a sound characteristic and/or a sound pressure level characteristic of a sound band including a low-pitched sound band generated by driving (or vibration or displacement) of the sound apparatus 30.

The second enclosure 312 can be at the sound generating module 330 with the internal space 313 therebetween. The second enclosure 312 can be connected to the sound generating module 330 with the internal space 313 therebetween. The second enclosure 312 can be disposed at or connected to a second surface side (or front surface side or upper surface side) which is opposite to the first surface side of the sound generating module 330 with the internal space 313 therebetween. For example, the second enclosure 312 can be connected (or coupled) to a periphery portion of the second surface of the sound generating module 330 with the internal space 313 therebetween. The second enclosure 312 can support the second surface of the sound generating module 330 with the internal space 313 therebetween. The second enclosure 312 can be configured to surround the second surface of the sound generating module 330. The second enclosure 312 can be configured to cover the second surface of the sound generating module 330.

According to an embodiment of the present disclosure, the second enclosure 312 can be configured to have a shape opposite to that of the first enclosure 311. For example, the first enclosure 311 and the second enclosure 312 can be configured to have a symmetric shape or have a symmetric structure with the sound generating module 330 therebetween.

Each of the first vibration apparatus 333 and the second vibration apparatus 335 can vibrate the vibration member 331 to generate a sound (or sound pressure level or sound wave) in the internal space 313 of the enclosure 310, the enclosure 310 can vibrate based on the sound (or sound pressure level or sound wave) in the internal space 313 of the enclosure 310, and the vehicle interior material 130 can vibrate based on a vibration of the enclosure 310 to generate (or output) a sound. For example, the vehicle interior material 130 can vibrate by a vibration of the first enclosure 311 based on the sound (or sound pressure level or sound wave) generated in the internal space 313 of the enclosure 310 to generate (or output) a sound.

According to an embodiment of the present disclosure, the internal space 313 of the enclosure 310 can include a first space **313*a* and a second space 313*b***.

The vibration member 331 can be disposed at the internal space 313 of the enclosure 310. The vibration member 331 can be disposed at the internal space 313 of the enclosure 310 and can be connected to the vibration apparatus. For example, the vibration member 331 can be disposed at the internal space 313 of the enclosure 310 and can be connected to one or more of the first vibration apparatus 333 and the second vibration apparatus 335. For example, the first vibration apparatus 333 and the second vibration apparatus 335 can be disposed with the vibration member 331 therebetween.

The vibration member 331 can be disposed or configured at a region between the first enclosure 311 and the second enclosure 312 of the enclosure 310. The vibration member 331 can be configured to divide the internal space 313 of the enclosure 310 into the first space **313*a* and the second space 313*b*. For example, the internal space 313 of the enclosure 310 can be divided into the first space 313*a* and the second space 313*b* by the vibration member 331. For example, the first space 313*a* of the internal space 313 can be provided at a region between the first enclosure 311 of the enclosure 310 and the vibration member 331 and can be covered by the vibration member 331. The second space 313*b* of the internal space 313 can be provided at a region between the second enclosure 312 of the enclosure 310 and the vibration member 331 and can be covered by the vibration member 331**.

According to an embodiment of the present disclosure, the first vibration apparatus 333 and the second vibration apparatus 335 can be at different spaces in the internal space 313 of the enclosure 310. For example, the first vibration apparatus 333 can be at the first space **313*a*. For example, the second vibration apparatus 335 can be at the second space 313*b***.

The first space **313*a* can be between the sound generating module 330 and the first enclosure 311. For example, the first space 313***a* can be between the first surface of the sound generating module 330 and the first enclosure 311. The first space 313*a* can be between the first vibration apparatus 333 and the first enclosure 311. The second space 313*b* can be between the sound generating module 330 and the second enclosure 312. For example, the second space 313*b* can be between the second surface which is different from (or opposite to) the first surface of the sound generating module 330 and the second enclosure 312. The second space 313*b* can be between the second vibration apparatus 335 and the second enclosure 312. For example, the internal space 313 can be a gap space, an air space, a vibration space, a sound space, a sound box, or a sealing space, or the like, but embodiments of the present disclosure are not limited thereto.

The sound generating module 330 can generate a sound pressure level (or sound or sound wave) in the internal space 313 of the enclosure 310 to vibrate the enclosure 310 and can vibrate the vehicle interior material 130 based on a vibration of the enclosure 310. For example, the sound generating module 330 can be configured to vibrate the first enclosure 311 of the enclosure 310 to vibrate the vehicle interior material 130. For example, the sound generating module 330 can generate the sound pressure level (or sound or sound wave) in the internal space 313 of the enclosure 310 to vibrate the first enclosure 311 and can vibrate the vehicle interior material 130 based on a vibration of the first enclosure 311.

According to an embodiment of the present disclosure, the first enclosure 311 can include an opening part 3100.

The opening part 3100 can be configured to pass through (or vertically pass through) the first enclosure 311 along a thickness direction Z (or a vertical direction) of the enclosure 310. The opening part 3100 can be connected to (or communicate with) the internal space 313. For example, the opening part 3100 can be connected to (or communicate with) the first space 313*a*. For example, the opening part 3100 can be configured to decrease an air pressure of the internal space 313 of the enclosure 310. For example, the opening part 3100 can be configured to decrease an air pressure of the first space 313*a*. The opening part 3100 can be configured to decrease an air pressure of the first space 313*a* of the first enclosure 311 or an air pressure of the first space 313*a* provided between the vibration member 331 and the first enclosure 311. Therefore, a band of the low-pitched sound band can expand, and thus, a sound characteristic of the low-pitched sound band can be improved. For example, because a pressure (or air pressure) of the first space 313*a* is reduced by the opening part 3100, the amount of displacement (or a bending force) of the first vibration apparatus 333 disposed between the vibration member 331 and the first enclosure 311 can increase, and thus, a band of the low-pitched sound band can expand, thereby enhancing a sound characteristic and/or a sound pressure level characteristic of the low-pitched sound band. Accordingly, a sound characteristic (or a sound pressure level) of the low-pitched sound band generated based on a vibration of the first vibration apparatus 333 and/or the second vibration apparatus 335 can be improved.

According to an embodiment of the present disclosure, the opening part 3100 can be disposed to correspond to a center portion of the sound generating module 330. For example, the opening part 3100 can be disposed to correspond to the vibration apparatus 333 and 335. For example, the opening part 3100 can be disposed to correspond to a center portion of the first vibration apparatus 333 and the second vibration apparatus 335. For example, the opening part 3100 can be disposed to correspond to a center portion of each of the first vibration apparatus 333 and the second vibration apparatus 335. For example, the internal space 313 of the enclosure 310 can include a space connected to the opening part 3100. For example, the internal space 313 of the enclosure 310 can include the first space 313*a* connected to the opening part 3100.

According to an embodiment of the present disclosure, the opening part 3100 can have a size which is smaller than the first vibration apparatus 333. For example, the opening part 3100 can have a size which is smaller than the first vibration apparatus 333 disposed at the vibration member 331. For example, the opening part 3100 can include a line shape having a size (or a length) which is smaller than the first vibration apparatus 333 disposed at the vibration member 331. For example, the opening part 3100 can be a hole, a slot, or a slit, but embodiments of the present disclosure are not limited thereto. For example, the opening part 3100 can be a sound emission portion, a first sound emission port, a sound output part, a sound output port, a sound output hole, or a vent hole, but embodiments of the present disclosure are not limited thereto.

The opening part 3100 can be a space where a sound wave generated based on a vibration of the sound generating module 330 is propagated (or transferred) to the interior space IS of the vehicle 10. For example, a vibration of the sound generating module 330 can be transferred to the interior space IS of the vehicle 10 through the opening part 3100. For example, a sound wave (or sound) based on the vibration of the sound generating module 330 can be transferred (or output or emitted) to the interior space IS of the vehicle 10 through the opening part 3100. Accordingly, a vibration width (or a displacement width) of the vibration member 331 based on the vibration of the sound generating module 330 can increase, and thus, a sound characteristic and/or a sound pressure level characteristic generated based on a vibration of the vibration member 331 can be enhanced.

The first enclosure 311 including the opening part 3100 can be disposed closer to the vehicle interior material 130 than the second enclosure 312. For example, the first enclosure 311 including the opening part 3100 can be disposed closer to the vehicle interior material 130 than the second enclosure 312. Accordingly, a sound generated based on vibrations of one or more of the first vibration apparatus 333 and the second vibration apparatus 335 can be output to the interior space IS of the vehicle 10, and thus, a sound including the low-pitched sound band can be output to the interior space IS of the vehicle 10.

The first enclosure 311 can include a slope surface (or an inclined surface) 311*s* and an inner lateral surface 311*i*. The slope surface 311*s* can be configured to be inclined between the opening part 3100 and the inner lateral surface 311*i* of the first enclosure 311. The slope surface 311*s* can be configured to guide a sound, generated based on a vibration of the sound generating module 330, to the interior space IS of the vehicle 10. Accordingly, the sound generated based on the vibration of the sound generating module 330 can be output to the interior space IS of the vehicle 10, and a sound characteristic and/or a sound pressure level characteristic of a sound including the low-pitched sound band can be further enhanced. For example, the slope surface 311*s* can be a guide surface or a sound guide surface, but embodiments of the present disclosure are not limited thereto.

The vibration member 331 can be disposed or configured to be spaced apart from the opening part 3100. The vibration member 331 can be configured at the internal space 313 to be spaced apart from the opening part 3100. For example, the vibration member 331 can be disposed at the internal space 313 and can be configured between the first enclosure 311 and the second enclosure 312. For example, the vibration member 331 can be disposed at the internal space 313 and can be supported by at least one or more of the first enclosure 311 and the second enclosure 312. For example, the vibration member 331 can be disposed to cover the internal space 313 and can be supported by at least one or more of the first enclosure 311 and the second enclosure 312. For example, the vibration member 331 can be disposed to cover the internal space 313 of the enclosure 310. For example, the vibration member 331 can be supported by the first enclosure 311 and the second enclosure 312.

According to an embodiment of the present disclosure, the first enclosure 311 of the enclosure 310 can be disposed or configured at the first surface (or rear surface) of the vibration member 331. The first enclosure 311 of the enclosure 310 can be connected (or coupled) to the first surface of the vibration member 331. For example, the first enclosure 311 can be connected (or coupled) to a periphery portion (or an edge portion) of the first surface of the vibration member 331. The first enclosure 311 can be configured to support the periphery portion (or the edge portion) of the first surface of the vibration member 331. For example, the first enclosure 311 can be configured to cover the first surface of the sound generating module 330. For example, the first enclosure 311 can be configured to surround the first surface of the sound generating module 330. According to an embodiment of the present disclosure, the second enclosure 312 can be disposed or configured at the second surface (or front surface) which is different from (or opposite to) the first surface of the vibration member 331. The second enclosure 312 can be configured to support a periphery portion (or the edge portion) of the second surface of the vibration member 331. For example, the second enclosure 312 can be connected (or coupled) to the second surface of the vibration member 331. For example, the second enclosure 312 can be connected (or coupled) to the periphery portion (or the edge portion) of the second surface of the vibration member 331. For example, the second enclosure 312 can be configured to cover the second surface of the sound generating module 330. For example, the second enclosure 312 can be configured to surround the second surface of the sound generating module 330.

The sound apparatus 30 according to an embodiment of the present disclosure can further include a coupling member 320. The coupling member 320 can be configured to connect or couple the vibration member 331 and the enclosure 310 to each other. For example, the coupling member 320 can be between the periphery portion (or the edge portion) of the vibration member 331 and the enclosure 310. The coupling member 320 can include a first coupling member 321 and a second coupling member 322.

The first coupling member 321 can be between the vibration member 331 and the first enclosure 311. The first coupling member 321 can be between the periphery portion of the vibration member 331 and a periphery portion of the first enclosure 311. For example, the periphery portion of the first enclosure 311 can be connected or coupled to the first surface of the vibration member 331 by the first coupling member 321. For example, the periphery portion of the first enclosure 311 can be connected or coupled to the periphery portion of the first surface of the vibration member 331 by the first coupling member 321.

The second coupling member 322 can be between the vibration member 331 and the second enclosure 312. The second coupling member 322 can be between the periphery portion of the vibration member 331 and a periphery portion of the second enclosure 312. For example, the periphery portion of the second enclosure 312 can be connected or coupled to the second surface of the vibration member 331 by the second coupling member 322. For example, the periphery portion of the second enclosure 312 can be connected or coupled to the periphery portion of the second surface of the vibration member 331 by the second coupling member 322.

According to an embodiment of the present disclosure, the coupling member 320 can be configured to minimize or prevent the transfer of a vibration of the vibration member 331 to the enclosure 310. The coupling member 320 can include a material characteristic suitable for blocking or isolating or reducing a vibration. For example, the coupling member 320 can include a material having elasticity. For example, the coupling member 320 can include a material having elasticity for vibration absorption (or impact absorption). The coupling member 320 according to an embodiment of the present disclosure can be configured as (or comprise) polyurethane materials and/or polyolefin materials, but embodiments of the present disclosure are not limited thereto. For example, the coupling member 320 can include one or more of an adhesive, a double-sided adhesive, a double-sided tape, a double-sided adhesive tape, a double-sided foam tape, a double-sided adhesive foam tape, a double-sided pad, a double-sided foam pad, a double-sided adhesive foam pad, and a double-sided cushion tape, but embodiments of the present disclosure are not limited thereto.

The coupling member 320 according to another embodiment of the present disclosure can be configured to minimize or prevent the transfer of a vibration of the vibration member 331 to the enclosure 310 and to decrease the reflection of an incident sound wave which is generated based on a vibration of the vibration member 331.

The sound apparatus 30 according to an embodiment of the present disclosure can include the sound generating module 330 having the bimorph structure, and thus, a sound characteristic and/or a sound pressure level characteristic of a sound including the low-pitched sound band can be enhanced. Because the sound apparatus 30 according to an embodiment of the present disclosure includes the enclosure 310 including the opening part 3100, an air pressure of the internal space 313 of the enclosure 310 can be reduced, and thus, a sound band of the low-pitched sound band can expand, thereby improving a sound characteristic and/or a sound pressure level characteristic of the low-pitched sound band.

In various embodiments of the present disclosure, a plurality of sound apparatuses 30 can be provided and arranged in various configurations. For example, two or more of the sound apparatuses can be stacked one on the other, or can be arranged side-by-side. When stacked, a hole of one sound generating module 330 can be aligned with a hole of another sound generating module 330.

Additionally, each of the enclosure 310 can include a plurality of sound generating modules 330. For example, two or more sound generating modules 330 can be provided in each enclosure 310 and can be stacked one on the other with a spacer therebetween. On the other hand, the two or more sound generating modules 330 can be arranged side by side. When side by side, each sound generating module 330 can share a common vibration member 331 or each sound generating module 330 can include a vibration member individually.

In various embodiments of the present disclosure, the first enclosure 311 and the second enclosure 312 can be formed or include the same material or different materials. But embodiments of the present disclosure are not limited thereto.

Figure 5:
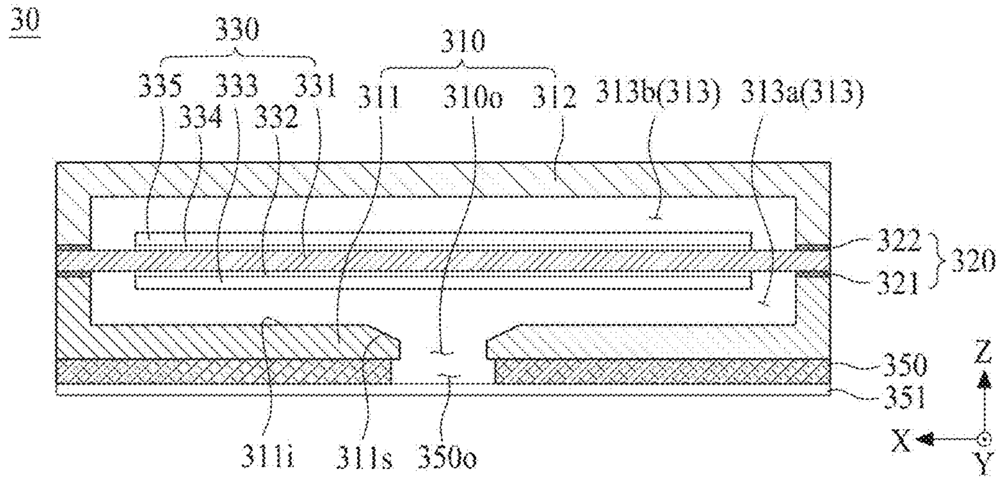
FIG. 5 illustrates a sound apparatus according to another embodiment of the present disclosure.

FIG. 5 illustrates a sound apparatus according to another embodiment of the present disclosure.

With reference to FIGS. 1 and 5, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 and 4, and thus, like reference numerals refer to like elements and repeated descriptions are omitted or will be briefly given.

The sound apparatus 30 according to another embodiment of the present disclosure can further include a connection member 350.

The connection member 350 can be provided or configured between a vehicle interior material (or a mount object) 130 and the sound generating module 330. The connection member 350 can be configured at the enclosure 310. For example, the connection member 350 can be connected to the enclosure 310. The connection member 350 can be disposed at a rear surface of the enclosure 310. For example, the connection member 350 can be disposed at the rear surface of the first enclosure 311. For example, the connection member 350 can be connected to the rear surface of the first enclosure 311. The connection member 350 can be disposed between the enclosure 310 and the vehicle interior material 130. For example, the connection member 350 can be disposed between the first enclosure 311 and the vehicle interior material 130. For example, the mount object can be a structure with the sound apparatus 30 or the enclosure 310 mounted thereon. For example, the connection member 350 can be a coupling member, an intermediate member, or a buffer member, but embodiments of the present disclosure are not limited thereto.

The connection member 350 can be configured to transfer a vibration of the first enclosure 311 based on a vibration of the sound generating apparatus 330 to the vehicle interior material 130. Accordingly, the vehicle interior material 130 can vibrate based on a vibration transferred through the connection member 350 to generate (or output) a sound.

According to another embodiment of the present disclosure, the first enclosure 311 can include an inner surface 311*i* and an outer surface. The inner surface 311*i* of the first enclosure 311 can face a vibration member 331. The outer surface of the first enclosure 311 can be a surface which is opposite to the inner surface 311*i* of the first enclosure 311. The connection member 350 can be connected to a periphery of an opening part 3100 of the outer surface of the first enclosure 311. For example, the connection member 350 can be connected between the vehicle interior material 130 and the periphery among an opening part 3100 of the outer surface of the first enclosure 311.

According to another embodiment of the present disclosure, the connection member 350 can be configured as a stiff material (or a hard material). The connection member 350 can have high elasticity (or a Young's modulus) and can include a material which is high in tensile strength. For example, the connection member 350 can include rubber, but embodiments of the present disclosure are not limited thereto. For example, the rubber can be ethylene propylene rubber or urethane rubber, but embodiments of the present disclosure are not limited thereto. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto.

According to an embodiment of the present disclosure, the connection member 350 can further include a hole 3500 (or a first hole or an opening hole). For example, the connection member 350 can further include a hole 3500 which is connected to the opening part 3100 in the enclosure 310 or the first enclosure 311. The hole 3500 can be disposed to correspond to (or overlap) the opening part 3100. Accordingly, a sound based on a vibration of the sound generating module 330 can be output to an interior space IS of a vehicle 10 by (or through) the opening part 3100 and the hole 3500. The hole 3500 can have a same shape as the opening part 3100, but embodiments of the present disclosure are not limited thereto. For example, the hole 3500 can be an opening part, an opening hole, a slit, a slot, a connection hole, or an intermediate hole, but embodiments of the present disclosure are not limited thereto According to an embodiment of the present disclosure, the connection member 350 can be protected by a release film (or a protection film) 351. The release film 351 can be attached to an adhesive surface of the connection member 350. In a case where the sound apparatus 30 including the connection member 350 is mounted on the vehicle interior material (or the mount object) 130, the release film 351 can be released (or removed) from the connection member 350.

The connection member 350 according to an embodiment of the present disclosure can prevent an undesired vibration of the sound generating module 330 from being transferred to the interior space of the vehicle, and thus, can improve a sound characteristic and/or a sound pressure level characteristic of the sound apparatus 30. Further, the connection member 350 can decrease heat which occurs when the sound generating module 330 is vibrating.

Figure 6:
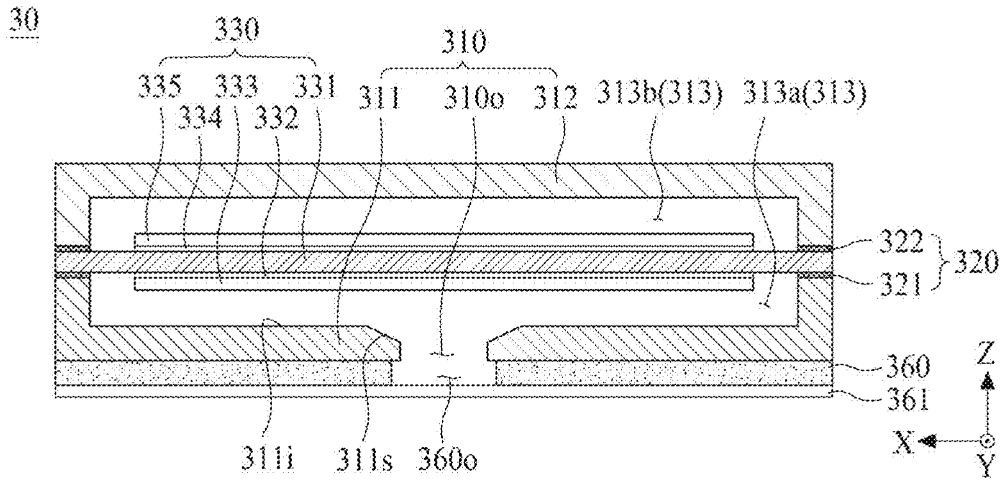
FIG. 6 illustrates a sound apparatus according to another embodiment of the present disclosure.

FIG. 6 illustrates a sound apparatus according to another embodiment of the present disclosure.

With reference to FIGS. 1 and 6, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 and 4, and thus, like reference numerals refer to like elements and repeated descriptions are omitted or will be briefly given.

The sound apparatus 30 according to another embodiment of the present disclosure can further include a soft member (or a ductile member) 360.

The soft member 360 can be provided or configured between a vehicle interior material (or a mount object) 130 and the sound generating module 330. The soft member 360 can be disposed at the enclosure 310. For example, the soft member 360 can be connected to the enclosure 310. The soft member 360 can be disposed at a rear surface of the enclosure 310. For example, the soft member 360 can be disposed at a rear surface of the first enclosure 311. For example, the soft member 360 can be connected to the first enclosure 311. The soft member 360 can be disposed between the enclosure 310 and the vehicle interior material 130. For example, the soft member 360 can be disposed between the first enclosure 311 and the vehicle interior material 130. For example, the soft member 360 can be a coupling member, an intermediate member, or a buffer member, but embodiments of the present disclosure are not limited thereto.

According to another embodiment of the present disclosure, the first enclosure 311 can include an inner surface 311*i* and an outer surface. The inner surface 311*i* of the first enclosure 311 can face a vibration member 331. The outer surface of the first enclosure 311 can be a surface which is opposite to the inner surface 311*i* of the first enclosure 311. The soft member 360 can be connected to a periphery of an opening part 3100 of the outer surface of the first enclosure 311. For example, the soft member 360 can be connected between the vehicle interior material 130 and the periphery among an opening part 3100 of the outer surface of the first enclosure 311.

According to an embodiment of the present disclosure, the soft member 360 can be configured as a material which differs from a connection member 350. An elasticity (or a Young's modulus) of the soft member 360 can be configured as a material which differs from an elasticity (or a Young's modulus) of the connection member 350. For example, the soft member 360 can be configured as a material having low elasticity. The soft member 360 can be configured as a soft material. For example, the soft member 360 can be ethylene propylene rubber or urethane rubber, but embodiments of the present disclosure are not limited thereto. For example, the ethylene propylene rubber can be ethylene propylene diene monomer (EPDM), and as a foaming rate is changed in EPDM, the ethylene propylene rubber can be configured as EPDM having low elasticity, but embodiments of the present disclosure are not limited thereto. For example, the soft member 360 can include a single-sided tape, a single-sided sponge tape, a single-sided porous tape, a single-sided cushion tape, a double-sided tape, a double-sided sponge tape, a double-sided porous tape, or a double-sided cushion tape, or the like, but embodiments of the present disclosure are not limited thereto.

According to an embodiment of the present disclosure, the soft member 360 can further include a hole 3600 (or a second hole or an opening hole). For example, the soft member 360 can further include a hole 3600 which is connected to the opening part 3100. The hole 3600 can be disposed to correspond to the opening part 3100. Accordingly, a sound based on a vibration of the sound generating module 330 can be output to an interior space IS of a vehicle 10 by (or through) the opening part 3100 and the hole 3600. The hole 3600 can have a same shape as the opening part 3100, but embodiments of the present disclosure are not limited thereto. For example, the hole 3600 can be an opening part, an opening hole, a slit, a slot, a connection hole, or an intermediate hole, but embodiments of the present disclosure are not limited thereto. The soft member 360 according to an embodiment of the present disclosure can absorb an external impact, and thus, can protect the sound apparatus 30 from the external impact. For example, the soft member 360 can be a porous member, a buffer member, or a protection member, or the like, but embodiments of the present disclosure are not limited thereto.

In various embodiments of the present disclosure, holes in elements can vary in size or can be the same. For example, the hole 3100 of the first enclosure 311 can be of a same or a similar size as the hole 3600 of the soft member 360, but embodiments of the present disclosure are not limited thereto. For example, the hole 3100 can be different in size from that of the hole 3600. In various embodiments of the present disclosure, the hole 3600 of the soft member 360 can be greater or larger than the hole 3100 of the first enclosure. When greater, the hole 3600 can allow sound to be better emitted from the enclosure 310, but when smaller, the hole 3600 can modulate the amount of sound that is emitted. In various embodiments of the present disclosure, at least one of the sizes of the holes 3100 and 3600 can vary at will to increase or decrease in size in real time, such as by use of a cover that can close or open, or vary the size of each of the holes 3100 and 3600 to modulate the sound being emitted from the enclosure 310. Further, the holes 3100 and 3600 need not be aligned or overlapping but can be partially overlapping or can be offset from each other. When offset from each other, there can be a communication hole that extends from the hole 3100 to the hole 3600 to enable sound to be emitted from the enclosure 310.

In various embodiments of the present disclosure, a shape of the hole 3100 and a shape of the hole 3600 can correspond as discussed below, but embodiments of the present disclosure are not limited thereto. For example, the shapes of the holes 3100 and 3600 can be different from each other in various embodiments. Further, the shapes of the holes 3100 and 3600 can vary in real time by use of a cover such as an iris diaphragm or a rotating diaphragm.

According to an embodiment of the present disclosure, the soft member 360 can be protected by a release film (or a protection film) 361. The release film 361 can be attached to an adhesive surface of the soft member 360. In a case where the sound apparatus 30 including the soft member 360 is mounted on the vehicle interior material (or the mount object) 130, the release film 361 can be released (or removed) from the soft member 360.

The soft member 360 according to an embodiment of the present disclosure can absorb an external impact, and thus, can prevent the damage of the sound generating module 330. Accordingly, the durability and reliability of the sound apparatus 30 can be enhanced.

According to another embodiment of the present disclosure, the soft member 360 can be configured at the enclosure 310 instead of the connection member 350 described above with reference to FIG. 5, or can be stacked on the connection member 350. For example, the connection member 350 and the soft member 360 can be disposed between the first enclosure 311 and the vehicle interior material (or the mount object) 130. For example, the connection member 350 can be connected to the first enclosure 311, and the soft member 360 can be disposed between the connection member 350 and the vehicle interior material (or the mount object) 130.

Figure 7:
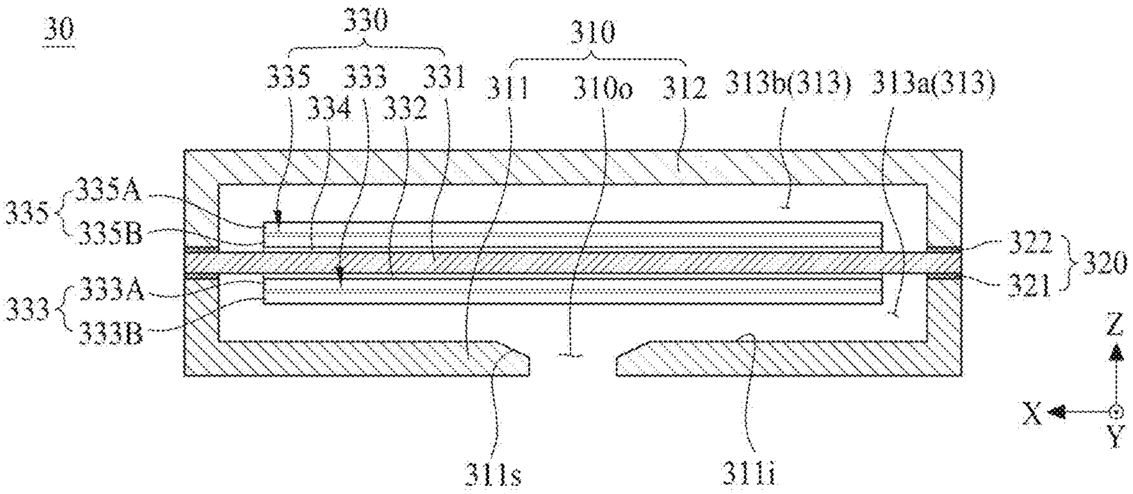
FIG. 7 illustrates a sound apparatus according to another embodiment of the present disclosure.

FIG. 7 illustrates a sound apparatus according to another embodiment of the present disclosure.

With reference to FIG. 7, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 and 4, and thus, like reference numerals refer to like elements and repeated descriptions are omitted or will be briefly given below.

The sound apparatus 30 according to another embodiment of the present disclosure can include vibration apparatuses 333 and 335 including one or more vibration generators. For example, the vibration apparatuses 333 and 335 can include one or more vibration generators 333A, 333B, 335A, and 335B.

A first vibration apparatus 333 of the vibration apparatuses 333 and 335 can include one or more vibration generators 333A and 333B. The first vibration apparatus 333 can include a first vibration generator 333A and a second vibration generator 333B. For example, the first vibration generator 333A can be stacked on the second vibration generator 333B.

A second vibration apparatus 335 of the vibration apparatuses 333 and 335 can include one or more vibration generators 335A and 335B. The second vibration apparatus 335 can include a first vibration generator 335A and a second vibration generator 335B. For example, the first vibration generator 335A can be stacked on the second vibration generator 335B. The vibration apparatuses 333 and 335 each including the one or more vibration generators will be described below with reference to FIG. 54.

According to another embodiment of the present disclosure, the vibration apparatuses 333 and 335 each including the one or more vibration generators can be configured at a first surface or a second surface of a vibration member 331. For example, one of the first and second vibration apparatuses 333 and 335 each including the one or more vibration generators can be configured at only the first surface of the vibration member 331. For example, one of the first and second vibration apparatuses 333 and 335 each including the one or more vibration generators can be configured at a first space 313*a*. For example, the first vibration apparatus 333 including the one or more vibration generators 333A and 333B can be configured at the first surface of the vibration member 331, and the second vibration apparatus 335 including the one or more vibration generators 335A and 335B can be omitted.

According to another embodiment of the present disclosure, one of the first and second vibration apparatuses 333 and 335 each including the one or more vibration generators can be configured at only the second surface of the vibration member 331. For example, one of the first and second vibration apparatuses 333 and 335 each including the one or more vibration generators can be configured at a second space 313*b*. For example, the second vibration apparatus 335 including the one or more vibration generators 335A and 335B can be configured at the second surface of the vibration member 331, and the first vibration apparatus 333 including the one or more vibration generators 333A and 333B can be omitted.

The vibration apparatuses 333 and 335 according to another embodiment of the present disclosure can each include the one or more vibration generators which are stacked (or piled or overlap) to vibrate in a same direction, and thus, the amount of displacement or an amplitude displacement can be maximized or increase, thereby maximizing or increasing the amount of displacement (or a bending force or a driving force) or an amplitude displacement of the vibration member 331.

Figure 8:
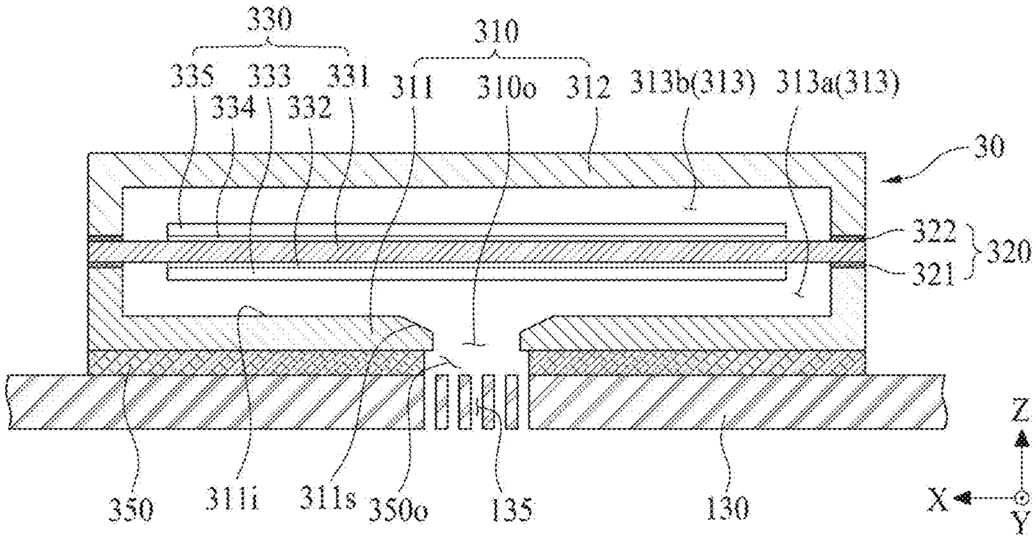
FIG. 8 illustrates a sound apparatus according to another embodiment of the present disclosure.
Figure 9:
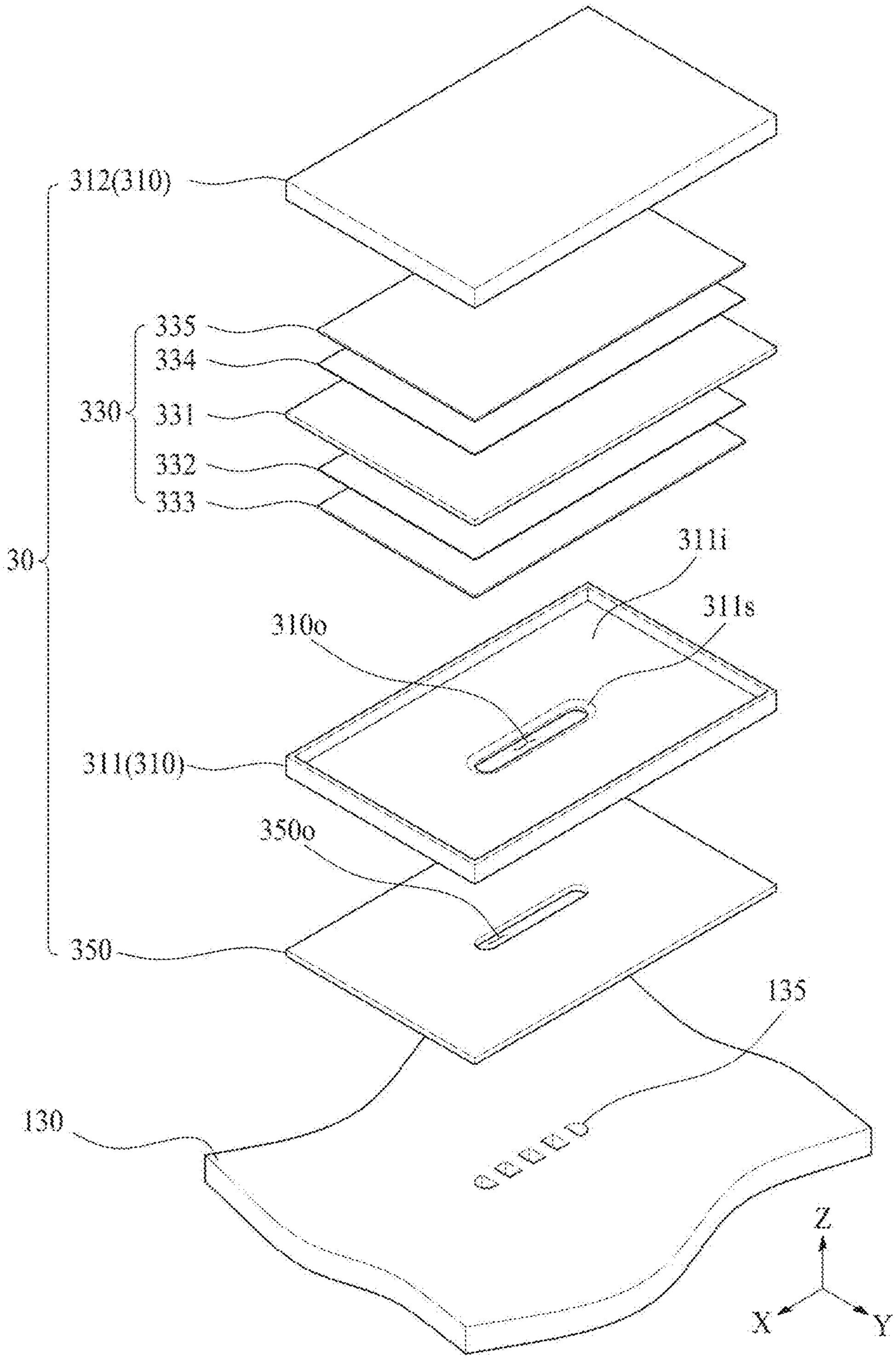
FIG. 9 is an exploded perspective view of a sound apparatus illustrated in FIG. 8 according to another embodiment of the present disclosure.

FIG. 8 illustrates a sound apparatus according to another embodiment of the present disclosure. FIG. 9 is an exploded perspective view illustrated in FIG. 8 according to another embodiment of the present disclosure.

With reference to FIGS. 8 and 9, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 to 5, and thus, like reference numerals refer to like elements and repeated descriptions are omitted or will be briefly given below.

The sound apparatus 30 according to another embodiment of the present disclosure can further include a connection member 350. A description of the connection member 350 can be substantially a same as the description of FIG. 5, and thus, repeated descriptions are omitted or will be briefly given below.

The connection member 350 according to another embodiment of the present disclosure can be disposed at a rear surface of the enclosure 310. A vehicle interior material 130 can be connected or coupled to the enclosure 310 by the connection member 350. For example, the connection member 350 can be disposed at a rear surface of the first enclosure 311. For example, the connection member 350 can be connected or coupled to the rear surface of the first enclosure 311. The connection member 350 can be disposed between the enclosure 310 and the vehicle interior material 130. For example, the connection member 350 can be disposed between the first enclosure 311 and the vehicle interior material 130.

According to an embodiment of the present disclosure, the connection member 350 can include a relatively stiff material (or a hard material), and thus, can transfer a vibration of a first enclosure 311, based on a vibration of a vibration apparatus, to a vehicle interior material 130. Accordingly, the vehicle interior material 130 can vibrate based on a vibration transferred through the connection member 350 to generate a sound. For example, when the connection member 350 includes the relatively stiff material (or the hard material), the vehicle interior material 130 connected to the connection member 350 can be a vibration plate for generating (or outputting) a sound. For example, when the connection member 350 includes the relatively stiff material (or the hard material), a vibration of the first enclosure 311 can be transmitted to the vehicle interior material 130 more efficiently.

According to an embodiment of the present disclosure, the connection member 350 can further include a first hole 3500 (or a hole). For example, the connection member 350 can further include the first hole 3500 which is connected to an opening part 3100 in the enclosure 310. The first hole 3500 can be disposed to correspond to the opening part 3100. The first hole 3500 can have a same shape as the opening part 3100, but embodiments of the present disclosure are not limited thereto. For example, the first hole 3500 can be an opening part, a slit, a slot, a connection hole, or an intermediate hole, but embodiments of the present disclosure are not limited thereto.

According to an embodiment of the present disclosure, the vehicle interior material 130 can further include a second hole 135 (or a hole, or an opening hole, or a through hole). The second hole 135 (or the hole) can include one hole or a plurality of holes. For example, the second hole 135, which is one hole, can correspond to (or overlap) the opening part 3100 and the first hole 3500. For example, the second hole 135, which is one hole, can correspond to (or overlap) the opening part 3100 and the first hole 3500, have a size which is greater than or equal to the opening part 3100, and have a same size as the first hole 3500. For example, the plurality of holes can be disposed at equal or different intervals (or distances). The second hole 135 can be disposed to correspond to (or overlap) the opening part 3100 and/or the first hole 3500. For example, the second hole 135 can be accommodated in (or within) the opening part 3100 and/or the first hole 3500. For example, the second hole 135 can be a through hole, an opening part, an opening hole, a slit, a slot, a sound hole, a sound emission hole, or a sound output hole, but embodiments of the present disclosure are not limited thereto.

According to an embodiment of the present disclosure, a sound generated based on a vibration of the sound generating module 330 can be output to an interior space of a vehicle through the opening part 3100, the first hole 3500, and the second hole 135. Further, the sound apparatus 30 or the enclosure 310 can be connected or coupled to the vehicle interior material 130 by the connection member 350.

Figure 10:
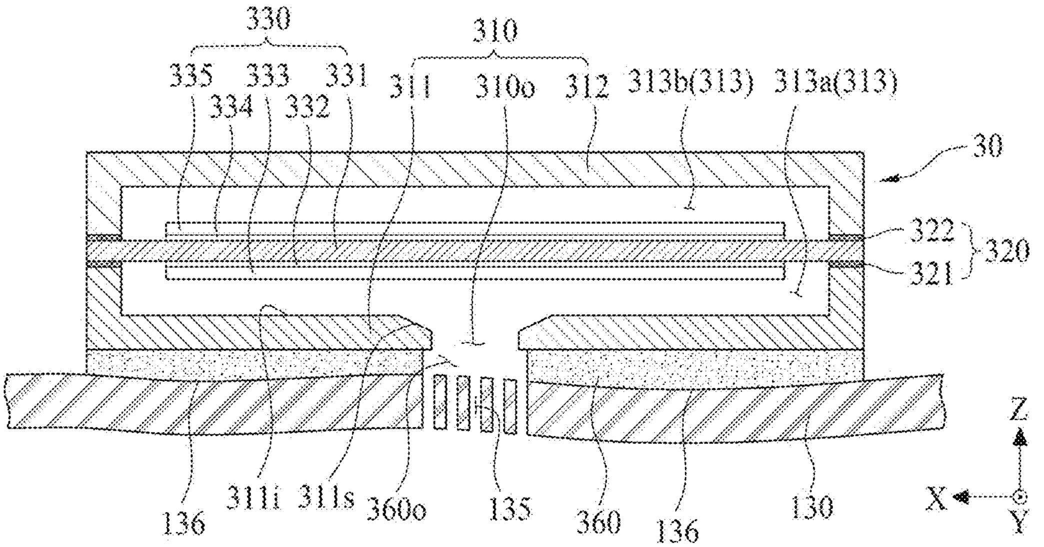
FIG. 10 illustrates a sound apparatus according to another embodiment of the present disclosure.

FIG. 10 illustrates a sound apparatus according to another embodiment of the present disclosure.

With reference to FIG. 10, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 to 5, and thus, like reference numerals refer to like elements and repeated descriptions are omitted or will be briefly given below.

The sound apparatus 30 according to another embodiment of the present disclosure can further include a soft member 360. A description of the soft member 360 can be substantially a same as the description of FIG. 6, and thus, repeated descriptions are omitted or will be briefly given below.

The vehicle interior material 130 according to another embodiment of the present disclosure can include at least one or more curved portions 136. The soft member 360 can be configured to correspond to the at least one or more curved portions 136. The soft member 360 can contact with the at least one or more curved portions 136. For example, the vehicle interior material 130 can include at least one or more curved portions 136 which contacts the soft member 360. The soft member 360 can contact an entire vibration region of the vehicle interior material 130. The soft member 360 can directly contact an entire vibration region of the vehicle interior material 130. The soft member 360 can directly contact the at least one or more curved portions 136. For example, the soft member 360 can directly contact the at least one or more curved portions 136 without a medium or an intermediate member. For example, the soft member 360 can directly contact the entire vibration region of the vehicle interior material 130 without a medium or an intermediate member. A vibration generated by the sound generating module 330 can be transferred, by the soft member 360, to the entire vibration region of the vehicle interior material 130 including the at least one or more curved portions 136 and a planar portion. Accordingly, a sound can be generated (or output) based on a vibration of the entire vibration region of the vehicle interior material 130, thereby enhancing a sound characteristic and/or a sound pressure level characteristic of a sound band including a low-pitched sound band generated by the sound generating module 330.

According to an embodiment of the present disclosure, the soft member 360 can include a relatively tender material (or a soft material or a smooth material), for a connection (or coupling) with the vehicle interior material 130 including the at least one or more curved portions 136 and the planar portion. For example, when the at least one or more curved portions (or at least one or more flexural portions) 136 includes the vibration region of the vehicle interior material 130, the soft member 360 can include the relatively soft material. For example, the connection member 350 according to another embodiment of the present disclosure including the relatively soft material can be a ductile member or a soft member.

According to an embodiment of the present disclosure, the soft member 360 which is configured the relatively soft material can be configured as a single-sided tape, a single-sided sponge tape, a single-sided porous tape, a single-sided cushion tape, a double-sided tape, a double-sided sponge tape, a double-sided porous tape, or a double-sided cushion tape, or the like, but embodiments of the present disclosure are not limited thereto. The soft member 360 can be filled in the at least one or more curved portions 136 of the vehicle interior material 130, or can be configured to cover or completely cover the at least one or more curved portions 136 of the vehicle interior material 130.

According to an embodiment of the present disclosure, the soft member 360 can be disposed between the enclosure 310 and the at least one or more curved portions 136 of the vehicle interior material 130. The soft member 360 can be disposed between the first enclosure 311 and the at least one or more curved portions 136 of the vehicle interior material 130. For example, the sound apparatus 30 or the first enclosure 311 can be connected or coupled to the at least one or more curved portions 136 of the vehicle interior material 130 by the soft member 360. Accordingly, the soft member 360 can be filled in the at least one or more curved portions 136 of the vehicle interior material 130 or can cover the at least one or more curved portions 136 of the vehicle interior material 130 and can absorb an external impact, thereby protecting the sound apparatus 30.

According to an embodiment of the present disclosure, the soft member 360 can further include a first hole 3600 (or a hole). For example, the soft member 360 can further include the first hole 3600 which is connected to the opening part 3100 in the enclosure 310 or the first enclosure 311. The first hole 3600 can be disposed to correspond to the opening part 3100. The first hole 3600 can have a same shape as the opening part 3100, but embodiments of the present disclosure are not limited thereto. For example, the first hole 3600 can be an opening part, a slit, a slot, a connection hole, or an intermediate hole, but embodiments of the present disclosure are not limited thereto.

According to an embodiment of the present disclosure, the vehicle interior material 130 can further include a second hole 135 (or a hole). The second hole 135 (or the hole) can include one hole or a plurality of holes. For example, the second hole 135, which is one hole, can correspond to (or overlap) the opening part 3100 and the first hole 3600. For example, the second hole 135, which is one hole, can have a size which is greater than or equal to the opening part 3100, and have a same size as the first hole 3600. The second hole 135 can be disposed to correspond to (or overlap) the opening part 3100 and/or the first hole 3600. For example, the second hole 135 (or the hole) can be accommodated in (or within) the opening part 3100 and/or the first hole 3600. For example, the second hole 135 can be an opening part, an opening hole, a slit, or a slot, but embodiments of the present disclosure are not limited thereto.

According to an embodiment of the present disclosure, a sound generated based on a vibration of the sound generating module 330 can be output to an interior space of a vehicle through the opening part 3100, the first hole 3600, and the second hole 135. Further, the sound generating module 330 can be connected or coupled to the at least one or more curved portions (or flexural portions) 136 of the vehicle interior material 130 by the soft member 360. Moreover, the soft member 360 can absorb an external impact, and thus, can protect the sound apparatus 30 from the external impact.

Figure 11:
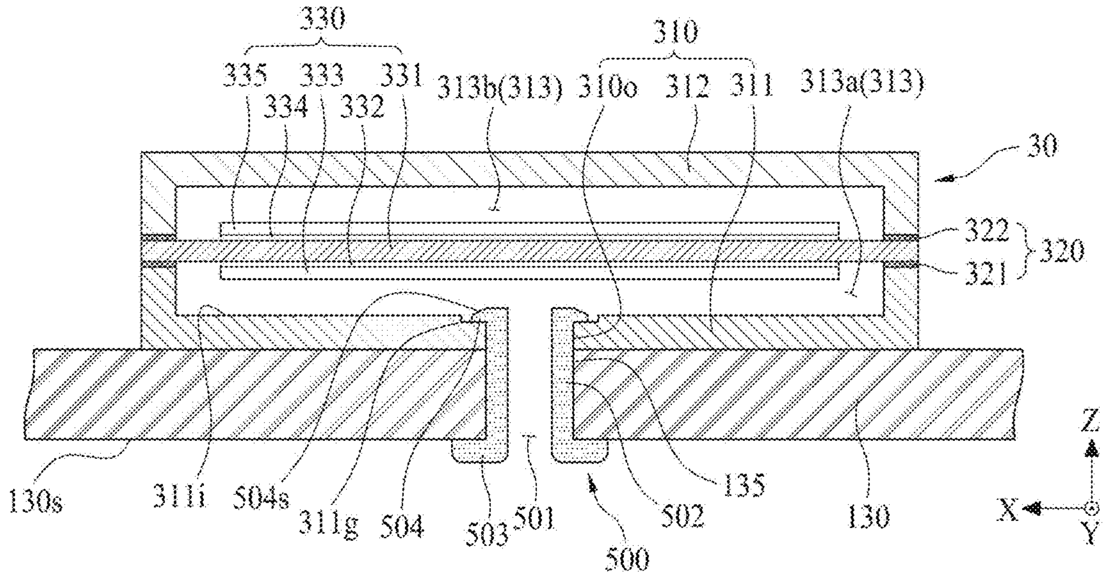
FIG. 11 illustrates a sound apparatus according to another embodiment of the present disclosure.

FIG. 11 illustrates a sound apparatus according to another embodiment of the present disclosure.

With reference to FIG. 11, a sound apparatus 30 according to another embodiment of the present disclosure can include an enclosure 310, a sound generating module 330, and a coupling member 320. Descriptions of the enclosure 310, the sound generating module 330, and the coupling member 320 can be substantially a same as the descriptions of FIGS. 3 to 10, and thus, like reference numerals refer to like elements and repeated descriptions are omitted or will be briefly given below.

In a case where a sound apparatus 30 is connected to a vehicle interior material 130, the sound apparatus 30 can be connected to the vehicle interior material 130 by an adhesive. In a case where the sound apparatus 30 is connected to the vehicle interior material 130 by the adhesive, there can be a problem where it is difficult to perform a rework or replacement when a defect or a breakdown of the sound apparatus 30 occurs, and there can be a problem where the damage of the sound apparatus 30 occurs in performing a rework or replacement. Accordingly, the inventors of the present disclosure have performed extensive research and experiments for facilitating the rework or replacement of the sound apparatus 30 connected to the vehicle interior material 130 and preventing the damage of the sound apparatus 30. Based on the extensive research and experiments, the inventors of the present disclosure have invented a sound apparatus where the rework or replacement of the sound apparatus 30 connected to the vehicle interior material 130 is easily performed, and the damage of the sound apparatus 30 does not occur in performing a rework or replacement. This will be described below.

The sound apparatus 30 according to another embodiment of the present disclosure can further include a coupling part 500.

The coupling part 500 can be provided or configured between the vehicle interior material (or a mount object) 130 and the sound generating module 330. The coupling part 500 can be at a rear surface of an enclosure 310. The coupling part 500 can be between the rear surface of the enclosure 310 and the vehicle interior material 130. For example, the coupling part 500 can be configured to couple the enclosure 310 and the vehicle interior material 130 (or a mount object). The coupling part 500 can be configured to couple the enclosure 310 to the vehicle interior material 130 (or the mount object) with the enclosure 310 mounted thereon. For example, the coupling part 500 can be configured to couple a first enclosure 311 to the vehicle interior material 130 (or the mount object) with the first enclosure 311 mounted thereon. The coupling part 500 can be configured to connect or couple the enclosure 310 to the vehicle interior material 130. For example, the sound apparatus 30 or the enclosure 310 can be connected or coupled to the vehicle interior material 130 by the coupling part 500. A sound based on a vibration of the sound generating module 330 can be output to an interior space of a vehicle through the coupling part 500. For example, the coupling part 500 can be a coupling means, a coupling structure, a sound guide member, a waveguide, or a sound emission member, or the like, but embodiments of the present disclosure are not limited thereto.

According to an embodiment of the present disclosure, the coupling part 500 can be accommodated or inserted into an opening part 3100 of the enclosure 310. The coupling part 500 can be accommodated or inserted into an opening part 3100 of the first enclosure 311. The coupling part 500 can be accommodated or inserted into a hole 135 of the vehicle interior material 130. The coupling part 500 can be accommodated or inserted into the opening part 3100 and the hole 135 of the first enclosure 311. For example, the hole 135 (or an opening hole) of the vehicle interior material 130 can be connected to the opening part 3100. For example, the coupling part 500 can be configured to be coupled to the first enclosure 311 through the hole 135 (or an opening hole) of the vehicle interior material 130 and the opening part 3100.

According to an embodiment of the present disclosure, the enclosure 310 can surround both sides of the sound generating module 330 (or a vertical direction (or up-and-down direction) with respect to a horizontal direction), and thus, an internal space 313 can be minimized. For example, the first enclosure 311 and a second enclosure 312 can surround the both sides of the sound generating module 330 (or the vertical direction (or up-and-down direction) with respect to the horizontal direction), and thus, a first space (or a first internal space) **313*a* and a second space (or a second internal space) 313*b* can be minimized. Accordingly, a thickness of the sound generating module 330 can be reduced, and thus, a thickness of the sound apparatus 30** can be reduced.

The coupling part 500 according to an embodiment of the present disclosure can further include a hollow part 501. For example, the hollow part 501 can be connected to the internal space 313. For example, the hollow part 501 can be connected to the internal space 313 through the opening part 3100 of the enclosure 310. For example, the hollow part 501 can be connected to the internal space 313 through the opening part 3100 of the first enclosure 311 of the enclosure 310. For example, the hollow part 501 can be connected to the first space **313*a* through the opening part 3100 of the first enclosure 311. A sound based on a vibration of the sound generating module 330 can be output to an interior space of a vehicle through the hollow part 501. For example, the hollow part 501** can be a sound emission port or a sound output port, but embodiments of the present disclosure are not limited thereto.

The coupling part 500 according to an embodiment of the present disclosure can further include a latch member 503.

The latch member 503 can be configured to be connected or coupled to the vehicle interior material 130 (or a mount object). For example, the latch member 503 can be configured to be connected or coupled to the vehicle interior material 130 (or a mount object) equipped with the enclosure 310. The latch member 503 can be connected or coupled to a periphery of the hole 135 of the vehicle interior material 130. The latch member 503 can be connected or coupled to a rear surface (or an interior surface) **130*s* of the vehicle interior material 130 at a periphery of the hole 135 (or a through hole) of the vehicle interior material 130. For example, the latch member 503** can be a latch or the like, but embodiments of the present disclosure are not limited thereto.

The coupling part 500 according to an embodiment of the present disclosure can further include a hook member 504.

The first enclosure 311 can include an inner surface **311*i* and an outer surface. The inner surface 311*i* of the first enclosure 311 can face a vibration member 331. The outer surface of the first enclosure 311 can be a surface which is opposite to the inner surface 311*i* of the first enclosure 311. The hook member 504 can be coupled to the inner surface 311*i* of the first enclosure 311 facing the vibration member 331. The hook member 504 can be coupled to the inner surface 311*i* or a slope surface 311*s* of the enclosure 310 in the internal space 313 of the enclosure 310. The hook member 504 can be accommodated or inserted into the opening part 3100 of the first enclosure 311. For example, the hook member 504 can pass through the vehicle interior material 130 or the mount object and can be accommodated or inserted into the opening part 3100 of the first enclosure 311**.

The enclosure 310 or the first enclosure 311 can further include a groove portion 311*g*. For example, the groove portion 311*g* can be configured at the inner surface 311*i* in the internal space 313. For example, the groove portion 311*g* can be configured at a periphery of the opening part 3100 of an inner surface 311*i* in the internal space 313.

The hook member 504 can include a slope surface 504*s*. For example, the hook member 504 can include the slope surface 504*s* based on a shape of the latch member 503. The slope surface 504*s* can be configured to correspond to a shape of the latch member 503. The hook member 504 can be configured to correspond to the groove portion 311*g* of the first enclosure 311 or the enclosure 310. For example, the hook member 504 can be connected or coupled to the groove portion 311*g* of the first enclosure 311 or the enclosure 310. For example, the hook member 504 can be connected or coupled to the groove portion 311*g* of the first enclosure 311 or the enclosure 310 and the rear surface (or an indoor surface) 130*s* of the vehicle interior material 130. For example, the hook member 504 can be accommodated (or inserted) into the opening part 3100 through the vehicle interior material 130 and can be connected or coupled to the groove portion 311*g*. For example, the hook member 504 can be accommodated (or inserted) into the opening part 3100 through the vehicle interior material 130 and can be connected or coupled to the groove portion 311*g* by a hook coupling scheme. For example, the groove portion 311*g* and the slope surface 504*s* can each be a fastening guide surface with the coupling part 500. For example, the hook member 504 can be a protrusion or a protrusion part, but embodiments of the present disclosure are not limited thereto. For example, the groove portion 311*g* can be a projection, but embodiments of the present disclosure are not limited thereto.

According to an embodiment of the present disclosure, the sound apparatus 30 can be connected or coupled to the vehicle interior material 130 by the coupling part 500, and thus, the rework or replacement of the sound apparatus 30 connected with the vehicle interior material 130 can be easily performed, thereby preventing the damage of the sound generating module 330 in performing the rework or replacement. According to an embodiment of the present disclosure, because the coupling part 500 is provided, the sound apparatus 30 can be easily attached or mounted on a narrow area (or space) between the vehicle interior material 130 and a vehicular structure. According to an embodiment of the present disclosure, because the sound apparatus 30 is coupled to or mounted on the vehicle interior material 130 by the coupling part 500, a shaking sound (or a trilling sound) may not occur between the sound apparatus 30 and the vehicle interior material 130, and thus, a sound characteristic and/or a sound pressure level characteristic of the sound apparatus 30 can be improved.

Figure 12:
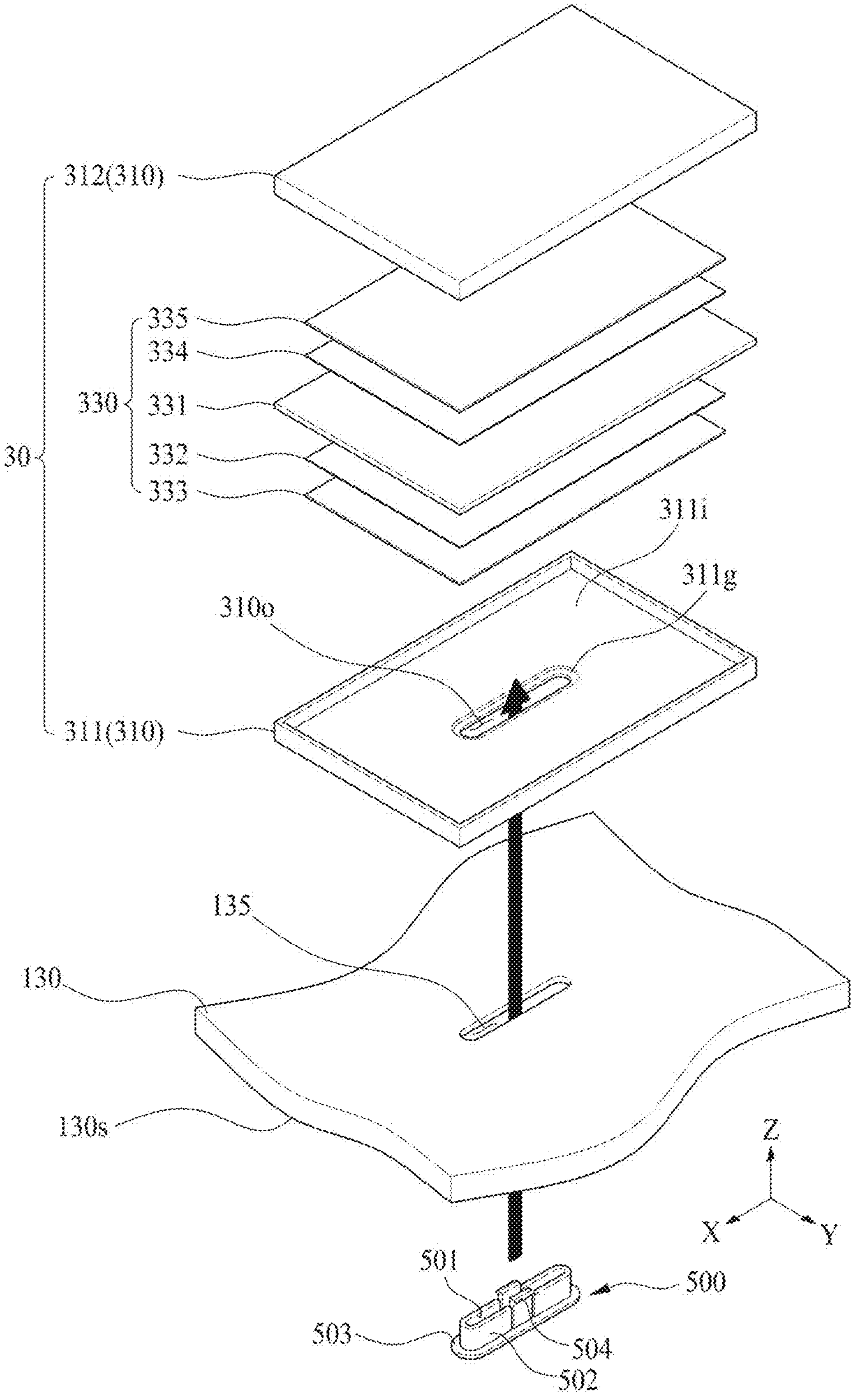
FIG. 12 illustrates a sound apparatus according to another embodiment of the present disclosure.
Figure 13A:
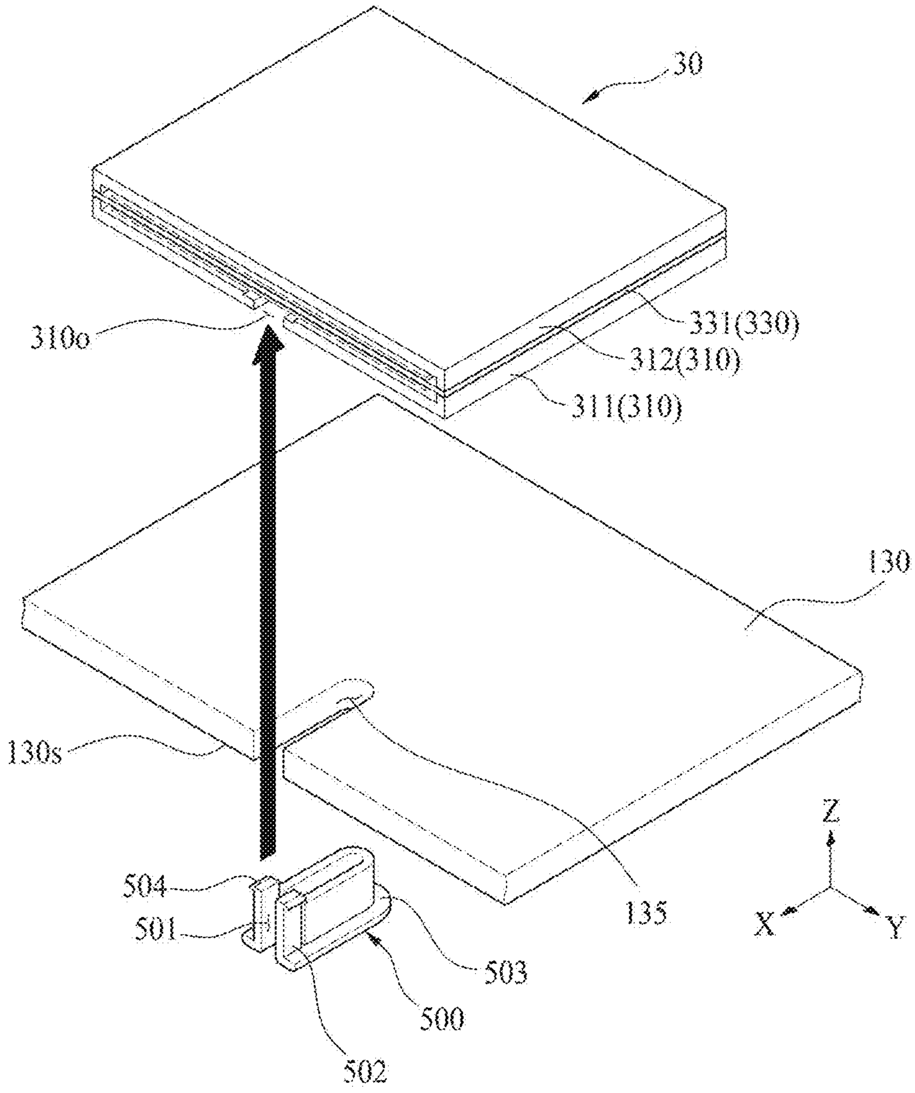
FIG. 13A illustrates a method of connecting a sound apparatus to a coupling part illustrated in FIG. 12 according to another embodiment of the present disclosure.
Figure 13B:
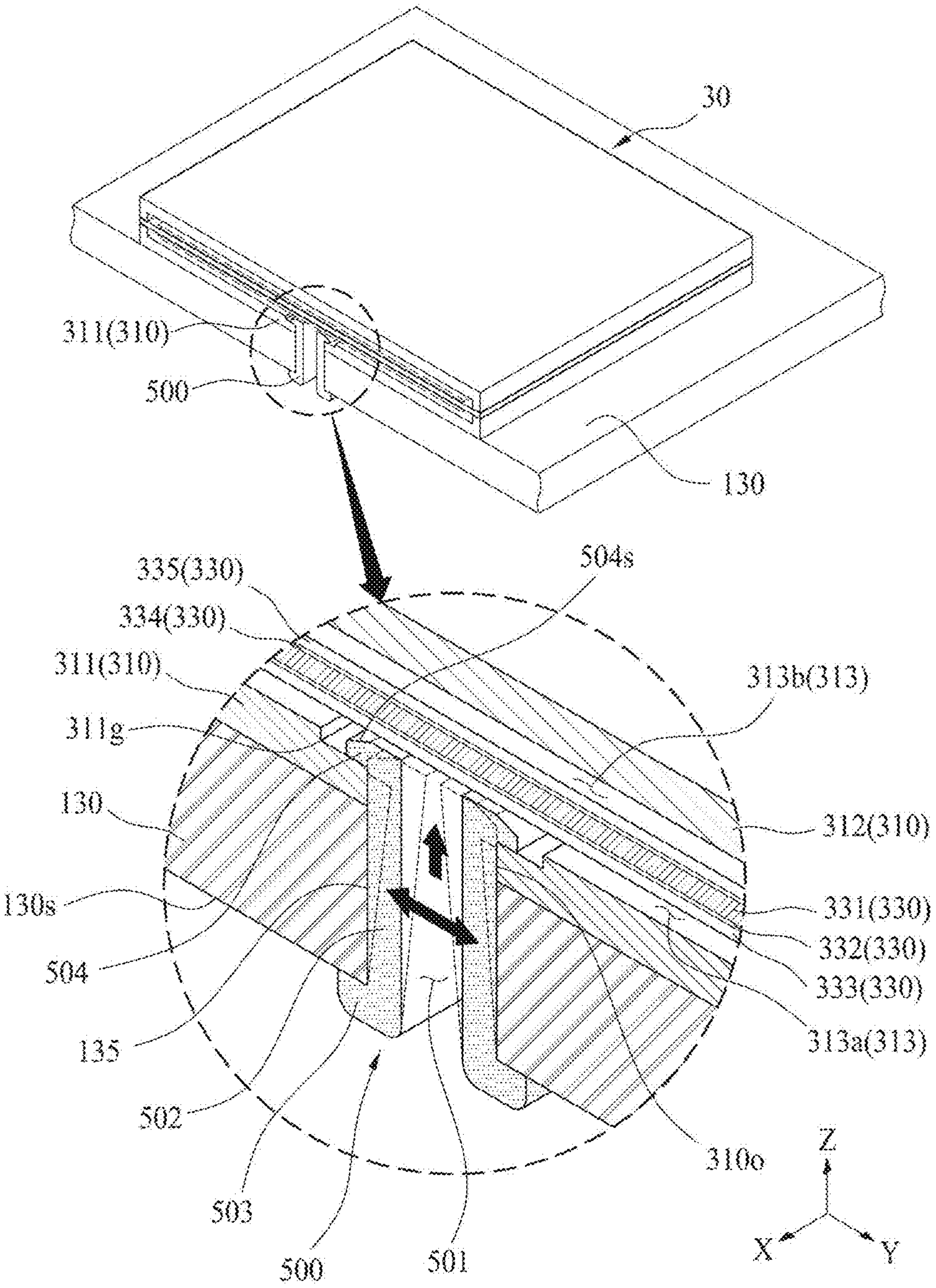
FIG. 13B illustrates a method of connecting a sound apparatus to a coupling part illustrated in FIG. 12 according to another embodiment of the present disclosure.

FIG. 12 illustrates a sound apparatus according to another embodiment of the present disclosure. FIGS. 13A and 13B illustrate a method of connecting a sound apparatus to a coupling part illustrated in FIG. 12 according to another embodiment of the present disclosure.

With reference to FIGS. 12 to 13B, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

According to another embodiment of the present disclosure, the sound apparatus 30 can include a coupling part 500 connected to a vehicle interior material 130. The coupling part 500 can include a hollow part 501. Descriptions of the coupling part 500 and the hollow part 501 can be substantially a same as the description of FIG. 11, and thus, like reference numerals refer to like elements and repeated descriptions are omitted or will be briefly given below.

The coupling part 500 according to an embodiment of the present disclosure can further include a hollow member 502 and a latch member 503.

The hollow member 502 can include the hollow part 501. The hollow part 501 can be connected or coupled to a hole (or a first hole) 135 of the vehicle interior material 130. The hollow member 502 can be connected or coupled to the hole 135 of the vehicle interior material 130 and an opening part 3100 of the enclosure 310. For example, the hollow member 502 can be connected or coupled to the hole 135 of the vehicle interior material 130 and the opening part 3100 of a first enclosure 311. For example, the hollow member 502 can pass through the hole 135 of the vehicle interior material 130 and can be accommodated or inserted into the opening part 3100 of the first enclosure 311 through (or via or by) the hole of the vehicle interior material 130. For example, the coupling part 500 can pass through the hole 135 of the vehicle interior material 130 and can be connected or coupled to the enclosure 310 or the first enclosure 311 through (or via or by) the hole of the vehicle interior material 130.

The latch member 503 can be configured to be connected or coupled to the vehicle interior material 130 (or a mount object) equipped (or mounted) with the enclosure 310. The latch member 503 can be connected or coupled to a periphery of the hole 135 (or a through hole) of the vehicle interior material 130. The latch member 503 can be connected or coupled to a rear surface (or an interior surface) 130*s* of the vehicle interior material 130 at a periphery of the hole 135 of the vehicle interior material 130. For example, the latch member 503 can be a latch or the like, but embodiments of the present disclosure are not limited thereto.

With reference to FIGS. 11 and 12, the coupling part 500 according to an embodiment of the present disclosure can further include a hook member 504. The hook member 504 can be connected to a first side of the hollow member 502. The hook member 504 can be coupled to the inner surface 311*i* of the enclosure 310 facing the vibration member 331 in the sound generating module 330 or the sound apparatus 30. The hook member 504 can be coupled to the inner surface 311*i* of the enclosure 310 in the inner space 313 of the enclosure 310. For example, the latch member 503 can be connected to a second side of the hollow member 502. The latch member 503 can be coupled to the rear surface (or the interior surface) 130*s* of the vehicle interior material 130 exposed at an interior space of a vehicle. For example, the latch member 503 can be coupled to one surface (or the interior surface or the rear surface) 130*s* of the vehicle interior material 130 exposed at the interior space of the vehicle.

With reference to FIG. 12, the coupling part 500 can be connected or coupled to the enclosure 310 or the sound apparatus 30 through the hole 135 of the vehicle interior material 130 and an opening part 3100 of the enclosure 310. For example, the coupling part 500 can be connected or coupled to the enclosure 310 or the sound apparatus 30 through the hole 135 of the vehicle interior material 130 and an opening part 3100 of a first enclosure 311 (an arrow direction). With reference to FIG. 13A, the coupling part 500 can be connected or coupled to the enclosure 310 or the sound apparatus 30 through the hole 135 of the vehicle interior material 130 (an arrow direction), in the interior space of the vehicle. For example, the coupling part 500 can be accommodated or inserted into the opening part 3100 of the first enclosure 311 through the hole 135 of the vehicle interior material 130, in the interior space of the vehicle. For example, the hook member 504 of the coupling part 500 can be connected or coupled to the opening part 3100 of the first enclosure 311. For example, the hook member 504 of the coupling part 500 can be inserted (or accommodated) into the opening part 3100 of the first enclosure 311 and can be connected or coupled to a groove portion 311*g* of the first enclosure 311.

FIG. 13B is an enlarged view of a portion where the sound apparatus 30 or the enclosure is connected or coupled to the vehicle interior material 130.

With reference to FIG. 13B, the hook member 504 of the coupling part 500 can be connected or coupled to the opening part 3100 of the first enclosure 311. For example, the hollow member 502 of the coupling part 500 is inserted (or accommodated) into the opening part 3100 of the first enclosure 311 (a vertical arrow direction), and thus, the hook member 504 of the coupling part 500 is pushed (or compressed) to a center (or inner side) (a dotted-line direction) of the hollow part 501 by an elastic force (a horizontal arrow direction) and can then be elastically restored onto the groove portion 311*g* of the first enclosure 311 by an elastic restoring force and can be connected or coupled to the opening part 3100 of the first enclosure 311. For example, when the coupling part 500 is inserted into the opening part 3100 of the first enclosure 311, the slope surface 504*s* of the hook member 504 can facilitate the insertion of the coupling part 500 and the compression of the hook member 504. For example, the hook member 504 can be connected or coupled to the groove portion 311*g* of the first enclosure 311. For example, the hook member 504 can be coupled to the groove portion 311*g* of the first enclosure 311 by a hook coupling scheme. According to an embodiment of the present disclosure, the sound apparatus 30 can be connected or coupled to the vehicle interior material 130 by the coupling part 500. According to an embodiment of the present disclosure, the sound apparatus 30 can be easily connected or coupled to the vehicle interior material 130 by the latch member 503 and the hook member 504 of the coupling part 500.

Figure 14:
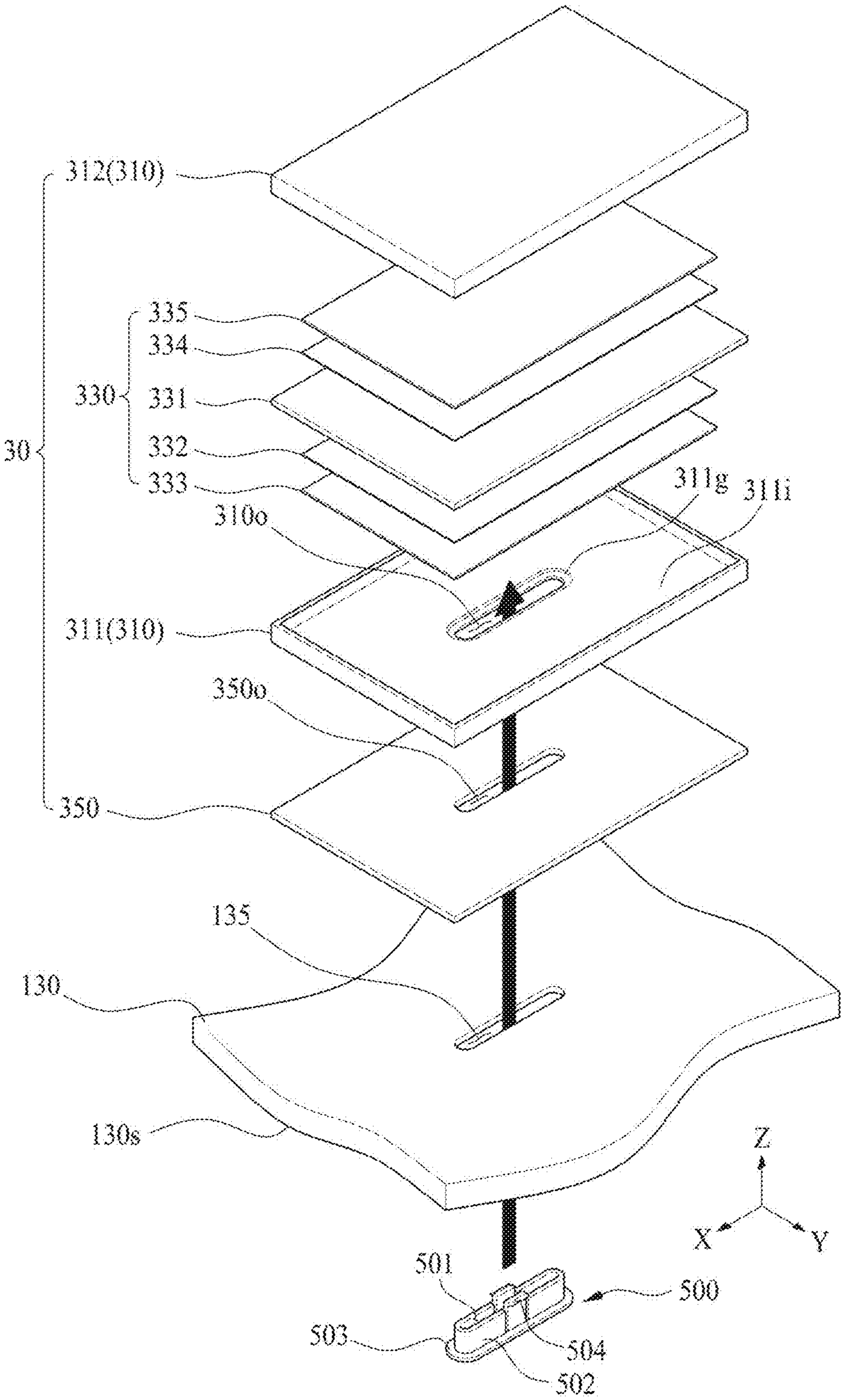
FIG. 14 illustrates a sound apparatus according to another embodiment of the present disclosure.
Figure 15A:
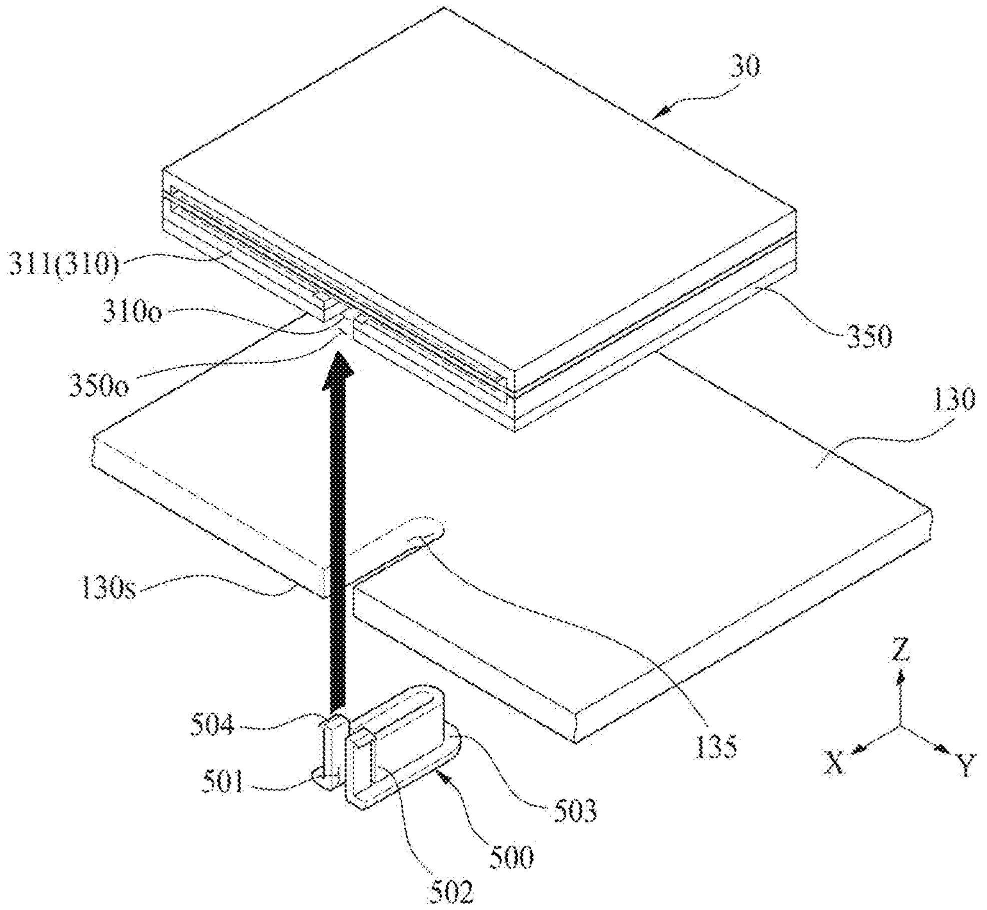
FIG. 15A illustrates a method of connecting a sound apparatus to a coupling part illustrated in FIG. 14 according to another embodiment of the present disclosure.
Figure 15B:
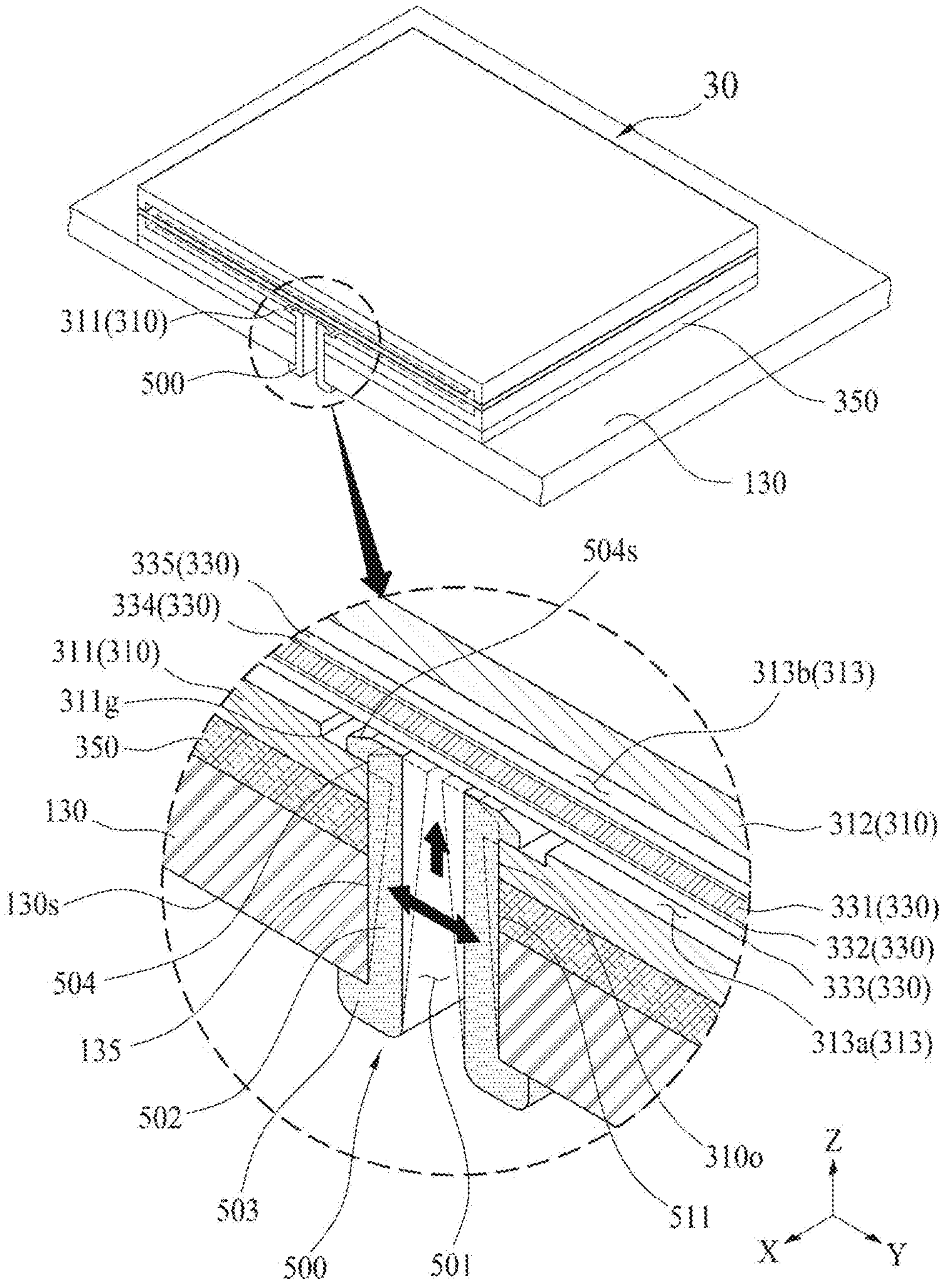
FIG. 15B illustrates a method of connecting a sound apparatus to a coupling part illustrated in FIG. 14 according to another embodiment of the present disclosure.

FIG. 14 illustrates a sound apparatus according to another embodiment of the present disclosure. FIGS. 15A and 15B illustrate a method of connecting a sound apparatus to a coupling part illustrated in FIG. 14 according to another embodiment of the present disclosure.

With reference to FIGS. 14 to 15B, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

Particularly, FIG. 14 illustrates an embodiment where a connection member is additionally configured in the sound apparatus described above with reference to FIGS. 12 to 13B.

According to another embodiment of the present disclosure, the sound apparatus 30 can further include a connection member 350.

The connection member 350 can be between the vehicle interior material 130 and the enclosure 310. The connection member 350 can be between the vehicle interior material 130 and a first enclosure 311. The connection member 350 can further include a second hole (or a hole) 3500. For example, the second hole 3500 can be between the first hole 135 of the vehicle interior material 130 and an opening part 3100 of the enclosure 310. For example, the second hole 3500 can be between the first hole 135 of the vehicle interior material 130 and the opening part 3100 of the first enclosure 311. The second hole 3500 can be connected to the opening part 3100 of the enclosure 310. For example, the second hole 3500 can be connected to the opening part 3100 of the first enclosure 311. The second hole 3500 can be disposed to correspond to the opening part 3100.

With reference to FIG. 14, the coupling part 500 can be connected or coupled to the sound apparatus 30 through the first hole 135 of the vehicle interior material 130, the second hole 3500 of the connection member 350, and an opening part 3100 of the enclosure 310 (an arrow direction). The coupling part 500 can be connected or coupled to the enclosure 310 through the first hole 135 of the vehicle interior material 130, the second hole 3500 of the connection member 350, and an opening part 3100 of the enclosure 310. For example, the coupling part 500 can be connected or coupled to the opening part 3100 of the first enclosure 311 through the first hole 135 of the vehicle interior material 130 and the second hole 3500 of the connection member 350, in the interior space of the vehicle.

With reference to FIG. 15A, the coupling part 500 can be connected or coupled to the enclosure 310 or the sound apparatus 30 through the first hole 135 of the vehicle interior material 130 (an arrow direction), in the interior space of the vehicle. For example, the hollow member 502 can be accommodated or inserted into the opening part 3100 of the enclosure 310 through the first hole 135 of the vehicle interior material 130 and the second hole 3500 of the connection member 350. For example, the coupling part 500 can be accommodated or inserted into the opening part 3100 of the first enclosure 311 through the first hole 135 of the vehicle interior material 130 and the second hole 3500 of the connection member 350, in the interior space of the vehicle. For example, the hook member 504 of the coupling part 500 can be connected or coupled to the opening part 3100 of the first enclosure 311. For example, the hook member 504 of the coupling part 500 can be inserted (or accommodated) into the opening part 3100 of the first enclosure 311 and can be connected or coupled to a groove portion 311*g* of the first enclosure 311.

FIG. 15B is an enlarged view of a portion where the sound apparatus 30 or the enclosure 310 is connected or coupled to the vehicle interior material 130.

With reference to FIG. 15B, the hook member 504 of the coupling part 500 can be connected or coupled to the opening part 3100 of the first enclosure 311. For example, the hollow member 502 of the coupling part 500 can be inserted (or accommodated) into the opening part 3100 of the first enclosure 311 (a vertical arrow direction), and thus, the hook member 504 of the coupling part 500 is pushed (or compressed) to a center (or an inner side or an inner portion)

(a dotted-line direction) of the hollow part 501 by an elastic force (a horizontal arrow direction) and can then be elastically restored 511 onto the groove portion 311*g* of the first enclosure 311 by an elastic restoring force and can be connected or coupled to the opening part 3100 of the first enclosure 311. For example, the hook member 504 can be connected or coupled to the groove portion 311*g* of the first enclosure 311. For example, the hook member 504 can be coupled to the groove portion 311*g* of the first enclosure 311 by a hook coupling scheme.

According to an embodiment of the present disclosure, the sound apparatus 30 can be connected or coupled to the vehicle interior material 130 by the coupling part 500. According to an embodiment of the present disclosure, the sound apparatus 30 can be easily connected or coupled to the vehicle interior material 130 by the latch member 503 and the hook member 504 of the coupling part 500.

Figure 16:
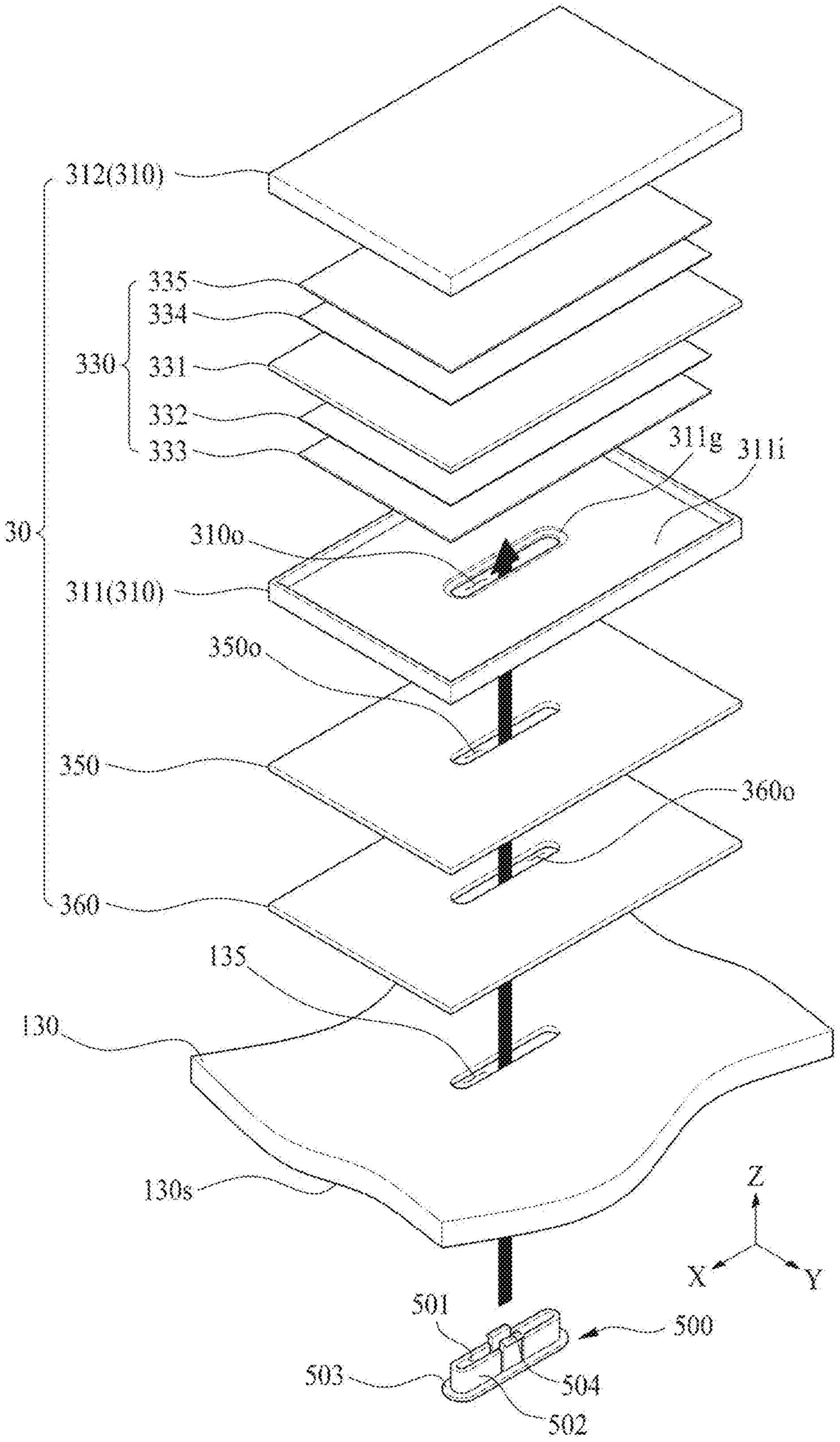
FIG. 16 illustrates a sound apparatus according to another embodiment of the present disclosure.

FIG. 16 illustrates a sound apparatus according to another embodiment of the present disclosure.

With reference to FIG. 16, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

The sound apparatus 30 according to an embodiment of the present disclosure can further include a connection member 350. A description of the connection member 350 can be substantially a same as the description of FIGS. 8, 9, and 14 to 15B, and thus, like reference numerals refer to like elements and repeated descriptions are omitted or will be briefly given below.

Particularly, FIG. 16 illustrates another embodiment of the present disclosure where a soft member 360 is additionally configured in the sound apparatus described above with reference to FIGS. 14 to 15B.

According to another embodiment of the present disclosure, the sound apparatus 30 can further include a soft member 360.

The soft member 360 can be between the vehicle interior material 130 and the connection member 350. The soft member 360 can further include a third hole (or a hole) 3600. For example, the third hole 3600 can be disposed to correspond to the second hole 3500. The third hole 3600 can be disposed to correspond to the opening part 3100. For example, third hole 3600 can be between the first hole 135 of the vehicle interior material 130 and the second hole 3500 of the connection member 350. The third hole 3600 can be connected to the second hole 3500 of the connection member 350. For example, the second hole 3500 can be connected to the opening part 3100 of the first enclosure 311.

With reference to FIG. 16, the coupling part 500 can be connected or coupled to the sound apparatus 30 through the first hole 135 of the vehicle interior material 130, the second hole 3500 of the connection member 350, the third hole 3600 of the soft member 360, and the opening part 3100 of the enclosure 310 (an arrow direction). For example, hollow member 502 can be accommodated into the opening part 3100 through the first hole 135 of the vehicle interior material 130, the second hole 3500 of the connection member 350, and the third hole 3600 of the soft member 360. For example, the coupling part 500 can be connected or coupled to the enclosure 310 through the first hole 135 of the vehicle interior material 130, the third hole 3600 of the soft member 360, and the opening part 3100 of the enclosure 310. For example, the coupling part 500 can be connected or coupled to the sound apparatus 30 through the first hole 135 of the vehicle interior material 130, the second hole 3500 of the connection member 350, the third hole 3600 of the soft member 360, and the opening part 3100 of the first enclosure 311 (an arrow direction).

The method of connecting the vehicle interior material 130 and the sound apparatus 30 involves adding the soft member 360 to the descriptions in FIGS. 15A and 15B, and thus, the repeated descriptions are omitted or will be briefly given below.

According to an embodiment of the present disclosure, the sound apparatus 30 can be connected or coupled to the vehicle interior material 130 by the coupling part 500.

Figure 17:
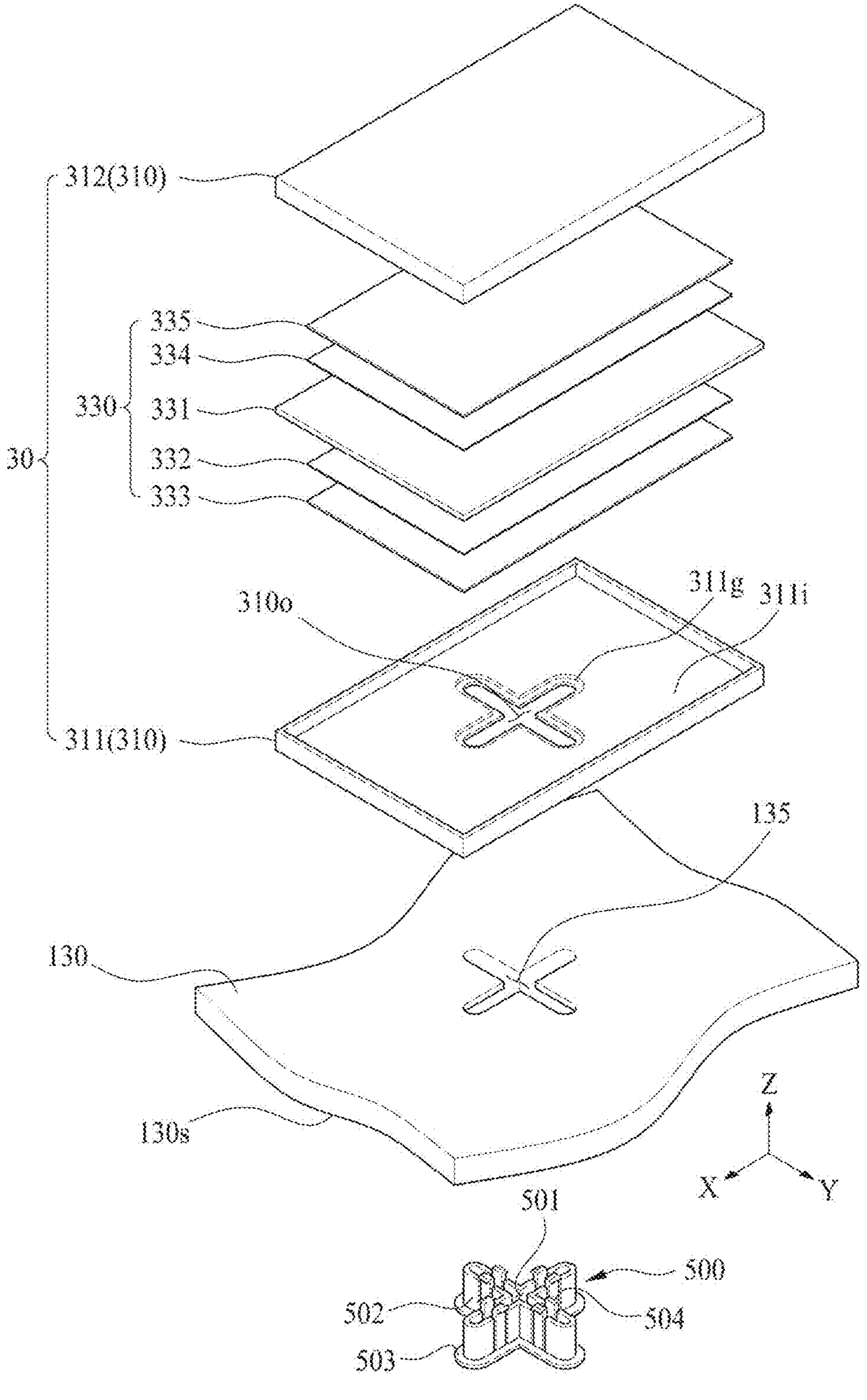
FIG. 17 illustrates a sound apparatus and an interior material according to an embodiment of the present disclosure.
Figure 18:
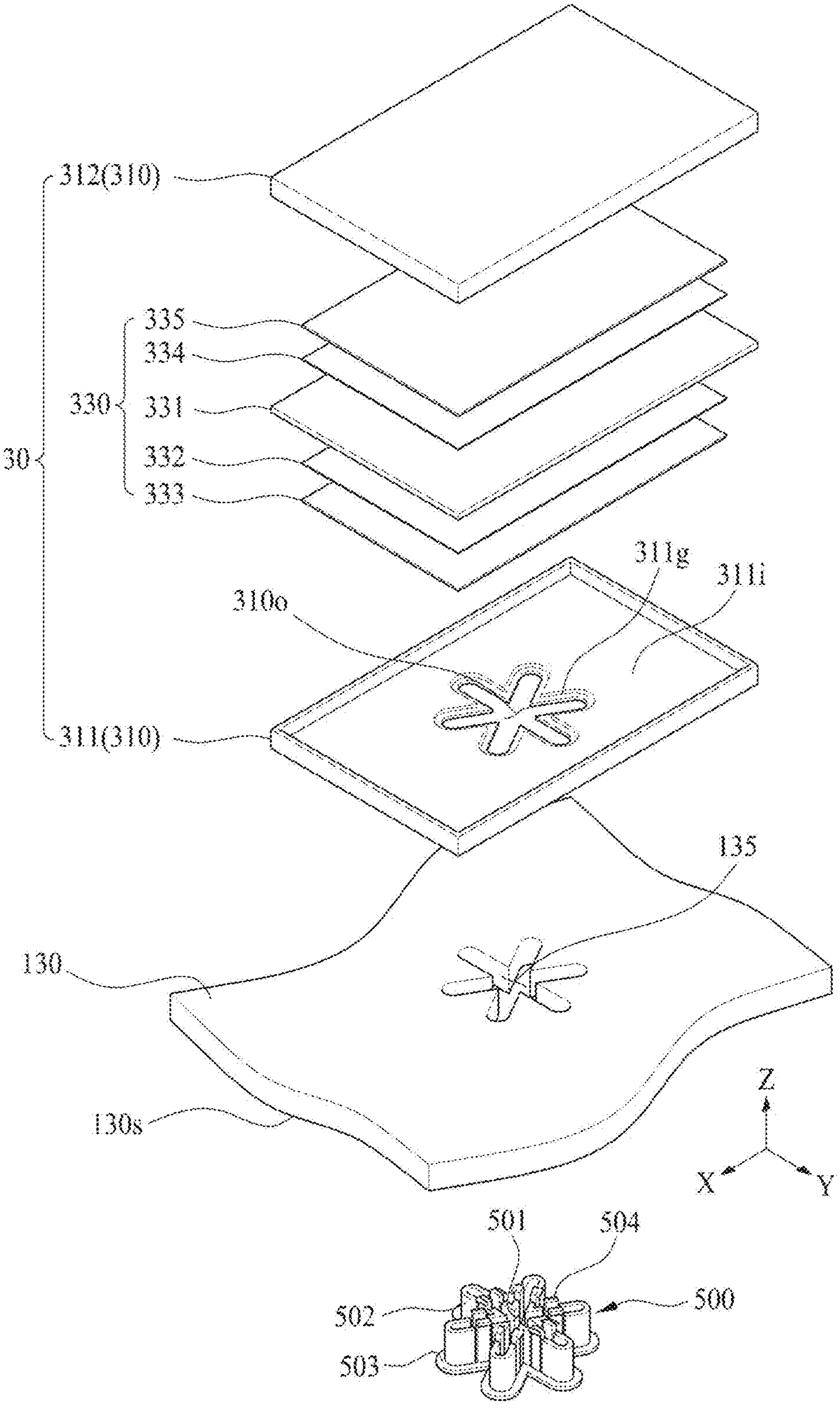
FIG. 18 illustrates a sound apparatus and an interior material according to another embodiment of the present disclosure.

FIG. 17 illustrates a sound apparatus according to another embodiment of the present disclosure. FIG. 18 illustrates a sound apparatus according to another embodiment of the present disclosure.

With reference to FIGS. 17 and 18, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

With reference to FIG. 17, the enclosure 310 can include an opening part 3100. For example, a first enclosure 311 can include the opening part 3100. The opening part 3100 of the enclosure 310 or the first enclosure 311 can include two (or a pair of) opening lines (or line holes) intersecting with each other. The opening part 3100 of the enclosure 310 or the first enclosure 311 can include a "+"-shape. A vehicle interior material 130 can include a hole 135. The hole 135 can be disposed to correspond to the opening part 3100. For example, the hole 135 can be disposed to correspond to a shape of the opening part 3100. For example, a shape of the hole 135 can be a same as the shape of the opening part 3100, but embodiments of the present disclosure are not limited thereto. For example, the shape of the hole 135 can be a "+"-shape.

The coupling part 500 can include a hollow part 501. The hollow part 501 can be disposed to correspond to the opening part 3100. For example, the hollow part 501 can be disposed to correspond to a shape of the opening part 3100. A shape of the hollow part 501 can be a same as the shape of the opening part 3100, but embodiments of the present disclosure are not limited thereto. For example, the shape of the hollow part 501 can be a "+"-shape. A hook member 504 of the coupling part 500 can be changed based on a shape of the hollow part 501. For example, the hook member 504 can include a plurality of hook members or latches, based on a "+"-shape of the hollow part 501.

With reference to FIG. 18, the opening part 3100 of the enclosure 310 or the first enclosure 311 can include three opening lines (or line holes) intersecting with each other. The opening part 3100 of the enclosure 310 or the first enclosure 311 can include a "*"-shape (an asterisk shape), the vehicle interior material 130 can include a hole 135. The hole 135 can be disposed to correspond to the opening part 3100. For example, the hole 135 can be disposed to correspond to a shape of the opening part 3100. For example, a shape of the hole 135 can be a same as the shape of the opening part 3100, but embodiments of the present disclosure are not limited thereto. For example, the shape of the hole 135 can be a "*"-shape.

The hollow part 501 can be disposed to correspond to the opening part 3100. For example, the hollow part 501 can be disposed to correspond to a shape of the opening part 3100. A shape of the hollow part 501 can be a same as the shape of the opening part 3100, but embodiments of the present disclosure are not limited thereto. For example, the shape of the hollow part 501 can be a "*"-shape. The hook member 504 can be changed based on a shape of the hollow part 501. For example, the hook member 504 can include a plurality of hook members or latches, based on a "*"-shape of the hollow part 501.

According to an embodiment of the present disclosure, because the opening part 3100 is configured in a "+"-shape or a "*"-shape, the amount of emitted sound in the sound apparatus 30 can increase, and a sense of beauty of an external appearance can be enhanced. Further, the hook member 504 can cover the hole 135 of the vehicle interior material 130, and thus, can minimize the penetration of dusts or foreign materials from the outside, thereby protecting the sound apparatus 30. But embodiments of the present disclosure are not limited thereto.

In FIGS. 17 and 18, the sound apparatus 30 according to another embodiment of the present disclosure can further include a connection member 350 described in FIGS. 14 to 15B. For example, a shape of a hole 3500 of the connection member 350 can be disposed to correspond to a shape of the opening part 3100 of the enclosure 310. For example, the shape of the hole 3500 of the connection member 350 can be a "+"-shape or a "*"-shape.

In FIGS. 17 and 18, the sound apparatus 30 according to another embodiment of the present disclosure can further include a connection member 350 described in FIGS. 14 to 15B and a soft member 360 described in FIG. 16. For example, a shape of a hole 3500 of the connection member 350 can be disposed to correspond to a shape of the opening part 3100 of the enclosure 310. For example, the shape of the hole 3500 of the connection member 350 can be a "+"-shape or a "*"-shape. For example, a shape of a hole 3600 of the soft member 360 can be disposed to correspond to a shape of the opening part 3100 of the enclosure 310. For example, the shape of the hole 3600 of the soft member 360 can be a "+"-shape or a "*"-shape.

In FIGS. 17 and 18, the sound apparatus 30 according to another embodiment of the present disclosure can further include at least one of a connection member 350 described in FIGS. 14 to 15B and a soft member 360 described in FIG. 16. For example, the at least one of a hole 3500 of the connection member 350 and a hole 3600 of the soft member 360 can be disposed to correspond to a shape of the opening part 3100 of the enclosure 310. For example, the at least one of a hole 3500 of the connection member 350 and a hole 3600 of the soft member 360 can be disposed to correspond to a shape of the opening part 3100 of the first enclosure 311. For example, the at least one of the hole 3500 of the connection member 350 and the hole 3600 of the soft member 360 can be a "+"-shape or a "*"-shape.

Figure 19:
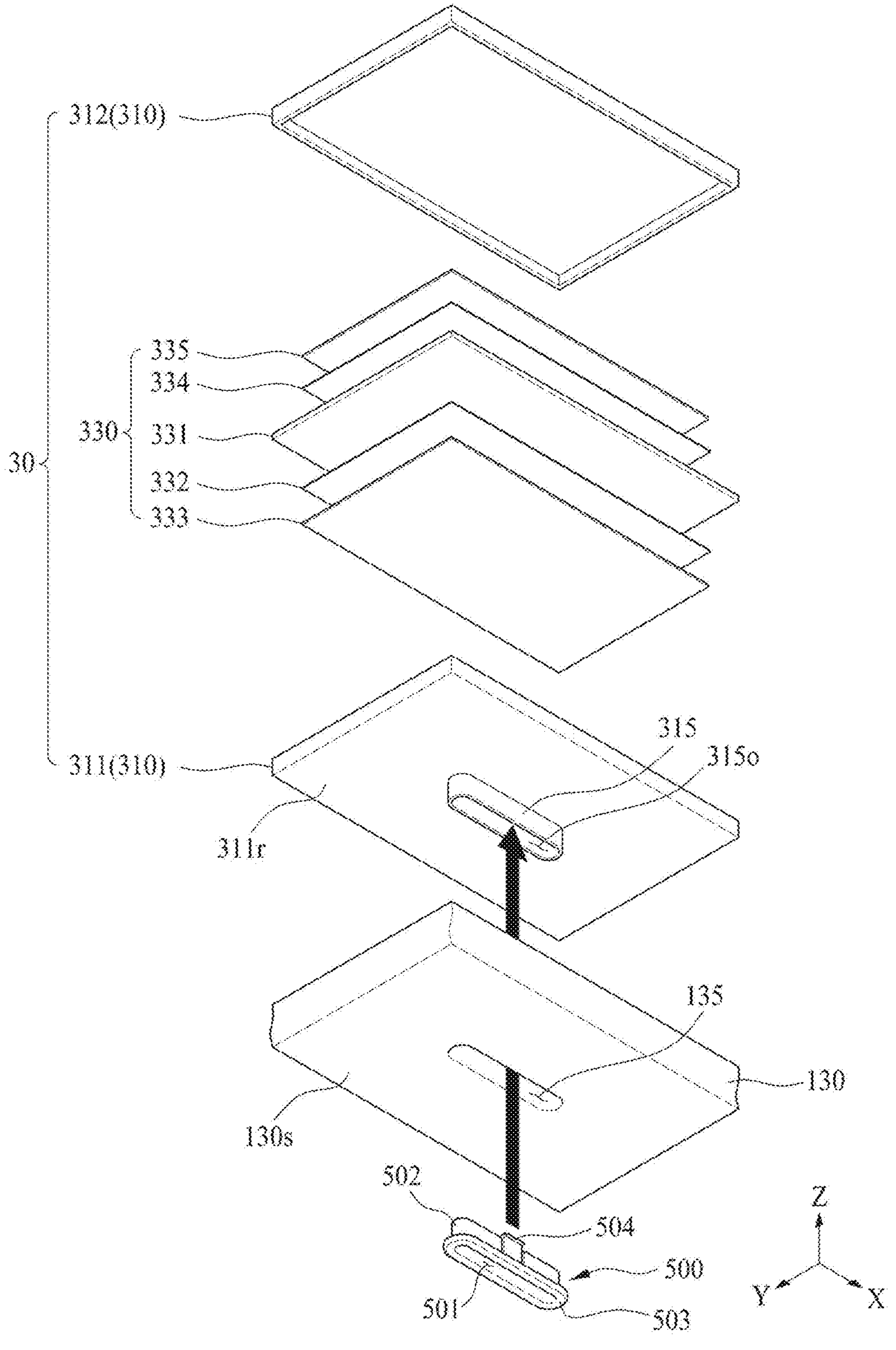
FIG. 19 illustrates a sound apparatus according to another embodiment of the present disclosure.
Figure 20:
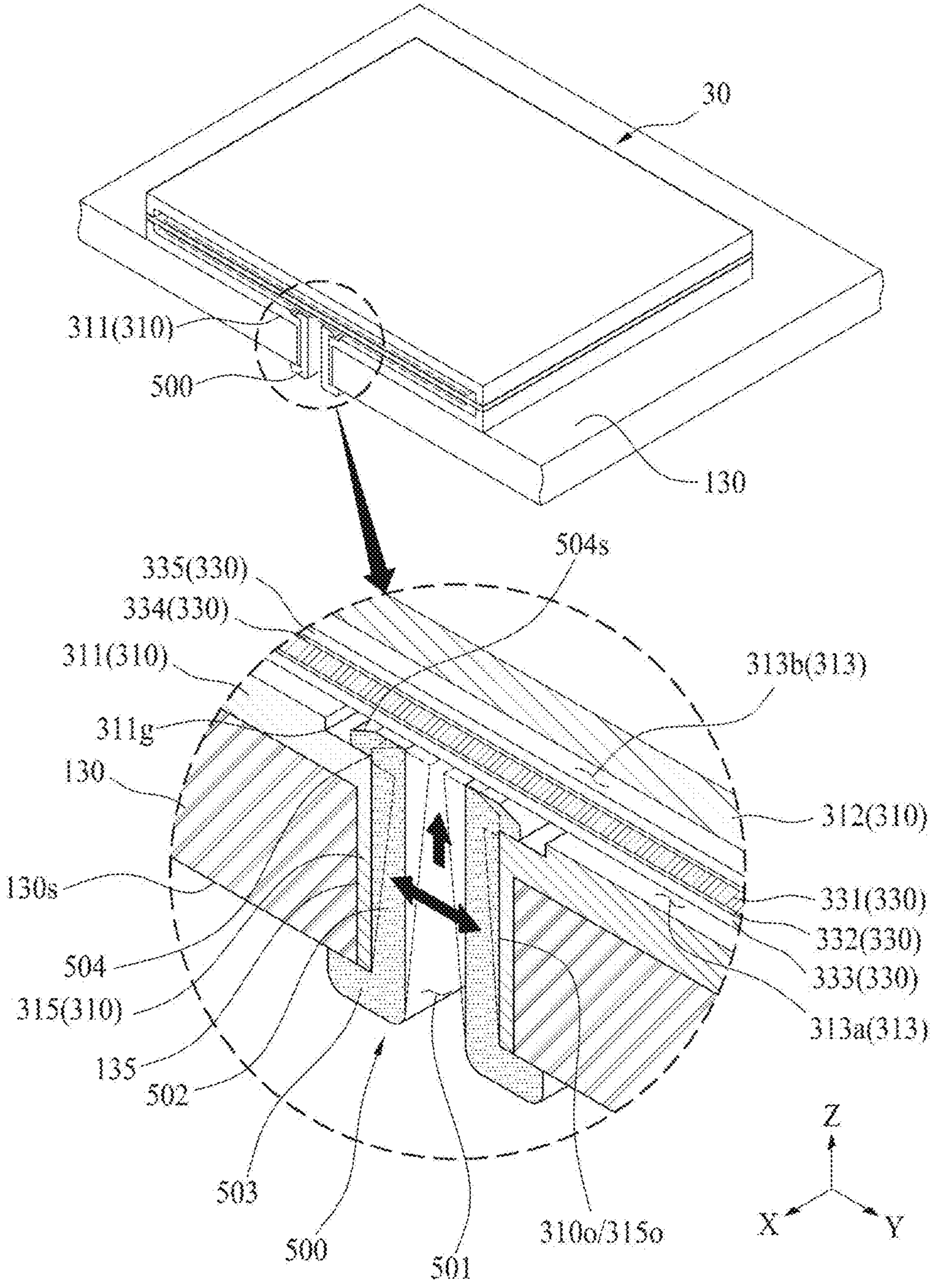
FIG. 20 illustrates a method of connecting a sound apparatus to a coupling part illustrated in FIG. 19 according to another embodiment of the present disclosure.

FIG. 19 illustrates a sound apparatus according to another embodiment of the present disclosure. FIG. 20 illustrates a method of connecting a sound apparatus to a coupling part according to another embodiment of the present disclosure.

With reference to FIGS. 19 and 20, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

According to another embodiment of the present disclosure, the enclosure 310 can include a protrusion part 315. A first enclosure 311 can include the protrusion part 315. The protrusion part 315 can protrude from the first enclosure 311. The protrusion part 315 can protrude from a rear surface (or an outer surface) 311*r* of the first enclosure 311. For example, the protrusion part 315 can protrude from the enclosure 310 or the first enclosure 311 to surround the opening part 3100. For example, the protrusion part 315 can protrude from the rear surface (or outer surface) 311*r* of the first enclosure 311 or the enclosure 310 to surround the opening part 3100. Therefore, the protrusion part 315 can include a hollow hole (or a hole or an opening hole) 3150 connected to the opening part 3100. The hollow part 501 can be accommodated into the hollow hole 3150 of the protrusion part 315 and can connected (or coupled) to the internal space 313 through the hollow hole 3150 and the opening part 3100. The protrusion part 315 can be configured to be accommodated into the hole 135 in the vehicle interior material 130. For example, the coupling part 500 can be accommodated or inserted into the hole 135, the hollow hole 3150, and the opening part 3100. For example, the hook member 504 can be accommodated or inserted into the opening part 3100 of the first enclosure 311 or the enclosure 310 through the vehicle interior material 130 (or mount object) and the protrusion part 315. The hook member 504 can be connected or coupled to an inner surface 311*i* of the first enclosure 311 or the enclosure 310. For example, the hook member 504 can be connected or coupled to the groove portion 311g of the enclosure 310 in the internal space 313 of the enclosure 310. For example, the hook member 504 can be coupled (or connected) to the groove portion 311*g* of the enclosure 310 by a hook coupling scheme in the internal space 313 of the enclosure 310.

According to an embodiment of the present disclosure, the first enclosure 311 can include an inner surface 311*i* and an outer surface 311*r*. The inner surface 311*i* of the first enclosure 311 can face a vibration member 331. The outer surface 311*r* of the first enclosure 311 can be a surface which is opposite to the inner surface 311*i* of the first enclosure 311. For example, the protrusion part 315 can protrude from the outer surface 311*r* of the first enclosure 311. The protrusion part 315 can protrude from the outer surface 311*r* of the first enclosure 311 to include the hollow hole (or hole or opening hole) 3150 connected to (or overlapping) the opening part 3100.

According to another embodiment of the present disclosure, the sound apparatus 30 can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

With reference to FIGS. 11 and 19, the coupling part 500 can include a hollow part 501. The hollow part 501 can be connected or coupled to the protrusion part 315. The protrusion part 315 can surround an opening part 3100 of the enclosure 310. For example, the protrusion part 315 can surround the opening part 3100 of the first enclosure 311. The protrusion part 315 can include a hollow hole 3150 corresponding (or connected) to the opening part 3100 of the first enclosure 311. For example, the hollow part 501 can be connected to an internal space 313 of the enclosure 310 through the opening hole of the protrusion part 315. For example, the hollow part 501 can be connected to the internal space 313 of the enclosure 310 through the hollow hole 3150 of the protrusion part 315 and the opening part 3100. For example, the coupling part 500 can be accommodated into and coupled to the protrusion part 315 and can be coupled to one surface of the vehicle interior material 130 exposed at an interior space. For example, the coupling part 500 can be coupled to the protrusion part 315 and can be connected to the internal space 313 of the enclosure 310 through the opening part 3100. For example, the coupling part 500 can be connected or coupled to the enclosure 310 in the internal space 313 of the enclosure 310 through the protrusion part 315 and the opening part 3100.

According to an embodiment of the present disclosure, the coupling part 500 can include a hollow member 502 and a latch member 503.

The hollow member 502 can include the hollow part 501. The hollow member 502 can be inserted (or accommodated) into the protrusion part 315. The hollow member 502 can be inserted (or accommodated) into the hollow hole 3150 of the protrusion part 315. The hollow member 502 can be inserted (or accommodated) into the protrusion part 315 and can be connected or coupled to the opening part 3100 of the enclosure 310 or the first enclosure 311.

The latch member 503 can be connected to the hollow member 502. The latch member 503 can be configured to be coupled to the vehicle interior material 130 (or the mount object). For example, the latch member 503 can be configured to be coupled to the vehicle interior material 130 (or the mount object) equipped with the enclosure 310. For example, the latch member 503 can be configured to be coupled the vehicle interior material 130 (or the mount object) equipped with the first enclosure 311.

According to an embodiment of the present disclosure, the vehicle interior material 130 (or the mount object) can include a first surface and a second surface different from (or opposite to) the first surface. The first surface can be a surface facing the enclosure 310. A hole 135 can be configured at the first surface and the second surface. For example, the hole 135 can be configured to pass through the first surface and the second surface. For example, the latch member 503 can be configured to pass through the hole 135 and can be configured to be coupled to the second surface (or an interior surface or a rear surface) 130*s* of the vehicle interior material 130 (or the mount object).

According to an embodiment of the present disclosure, the coupling part 500 can include a hook member 504.

The hook member 504 can pass through the vehicle interior material 130 (or the mount object) and the protrusion part 315 and can be accommodated or inserted into the opening part 3100 of the first enclosure 311. The hook member 504 can be connected or coupled to the inner surface 311*i* of the first enclosure 311. The hook member 504 can be connected or coupled to the inner surface 311*i* of the enclosure 310 in the internal space 313 of the enclosure 310. For example, the hook member 504 can be connected or coupled to the inner surface 311*i* of the first enclosure 311 facing the vibration member 331 in the sound generating module 330. For example, the hook member 504 can be connected or coupled to a groove portion 311*g* of the first enclosure 311. For example, the hook member 504 can be connected or coupled to the groove portion 311*g* of the first enclosure 311 by a hook coupling scheme.

With reference to FIGS. 11 and 19, the hook member 504 can be connected to a first side of the hollow member 502. The hook member 504 can be coupled to the inner surface 311*i* or the groove portion 311*g* of the enclosure 310 facing the vibration member 331 in the sound generating module 330. The hook member 504 can be coupled to the inner surface 311*i* or the groove portion 311*g* of the enclosure 310 in the internal space 313 of the enclosure 310. For example, the latch member 503 can be connected to a second side of the hollow member 502. The latch member 503 can be coupled to one surface (or an interior surface or rear surface) 130*s* of the vehicle interior material 130 exposed at an interior space of a vehicle.

With reference to FIG. 19, the coupling part 500 can be connected or coupled to the protrusion part 315 of the enclosure 310 through the first hole 135 of the vehicle interior material 130 (an arrow direction). For example, the coupling part 500 can be connected or coupled to the protrusion part 315 of the first enclosure 311 through the first hole 135 of the vehicle interior material 130.

FIG. 20 is an enlarged view of a portion where the sound apparatus 30 or the enclosure is connected or coupled to the vehicle interior material 130.

With reference to FIG. 20, the hook member 504 of the coupling part 500 can be connected or coupled to the protrusion part 315 of the first enclosure 311. For example, the hollow member 502 of the coupling part 500 can be inserted (or accommodated) into the hollow part 501 of the protrusion part 315 of the first enclosure 311 (a vertical arrow direction), and thus, the hook member 504 of the coupling part 500 is pushed (or compressed) to a center (or an inner side) (a dotted-line direction) of the hollow part 501 by an elastic force (a horizontal arrow direction) and can then be elastically restored onto the groove portion 311*g* of the first enclosure 311 by an elastic restoring force and can be connected or coupled to the protrusion part 315 of the first enclosure 311. For example, when the coupling part 500 is inserted into the hollow part 501 of the protrusion part 315 of the first enclosure 311, the slope surface 504*s* of the hook member 504 can facilitate the insertion of the coupling part 500 and the compression of the hook member 504. For example, the hook member 504 can be connected or coupled to the groove portion 311*g* of the first enclosure 311. For example, the hook member 504 can be coupled to the groove portion 311*g* of the first enclosure 311 by a hook coupling scheme.

According to an embodiment of the present disclosure, the sound apparatus 30 can be connected or coupled to the vehicle interior material 130 by the coupling part 500. According to an embodiment of the present disclosure, the enclosure 310 can include the protrusion part 315, and thus, the coupling part 500 can be easily connected or coupled to the protrusion part 315. Accordingly, a connection process or a coupling process between the vehicle interior material 130 and the sound apparatus 30 can be simplified.

Figure 21:
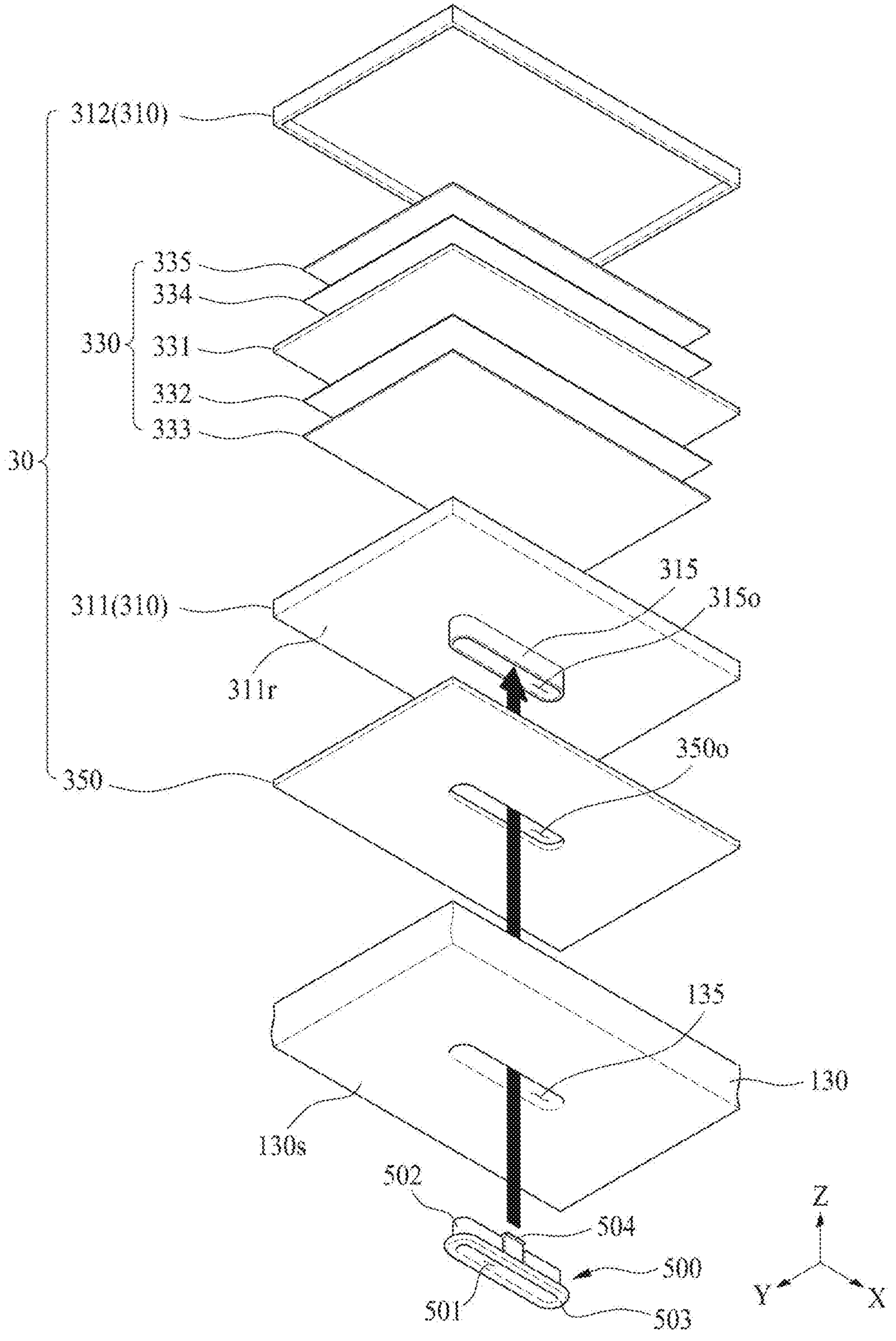
FIG. 21 illustrates a sound apparatus according to another embodiment of the present disclosure.

FIG. 21 illustrates a sound apparatus according to another embodiment of the present disclosure.

With reference to FIG. 21, a sound apparatus 30 according to another embodiment of the present disclosure can include an enclosure 310 and a sound generating module 330.

Descriptions of the enclosure 310 and the sound generating module 330 can be substantially a same as the descriptions of FIGS. 3 to 10, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the description of FIGS. 19 and 20, and thus, like reference numerals refer to like elements and repeated descriptions are omitted or will be briefly given below.

According to an embodiment of the present disclosure, the enclosure 310 can include a protrusion part 315. A description of the protrusion part 315 can be substantially a same as the description of FIGS. 19 and 20, and thus, like reference numerals refer to like elements and repeated descriptions are omitted or will be briefly given below.

Particularly, FIG. 21 illustrates another embodiment of the present disclosure where a connection member is additionally configured in the sound apparatus described above with reference to FIGS. 19 and 20.

According to another embodiment of the present disclosure, the sound apparatus 30 can further include a connection member 350.

The connection member 350 can be between the vehicle interior material 130 and the enclosure 310. The connection member 350 can be between the vehicle interior material 130 and a first enclosure 311. The connection member 350 can further include a second hole (or a hole) 3500. For example, the second hole 3500 can be between the first hole 135 of the vehicle interior material 130 and the protrusion part 315 of the enclosure 310. For example, the second hole 3500 can be between the first hole 135 of the vehicle interior material 130 and the protrusion part 315 of the first enclosure 311. The second hole 3500 can be connected to the protrusion part 315 of the enclosure 310. For example, the second hole 3500 can be connected to the protrusion part 315 of the first enclosure 311. The second hole 3500 can be disposed to correspond to the protrusion part 315.

With reference to FIG. 21, the coupling part 500 can be connected or coupled to the sound apparatus 30 through the first hole 135 of the vehicle interior material 130, the second hole 3500 of the connection member, and a hollow hole 3150 of the protrusion part 315 of the enclosure 310 (an arrow direction). For example, the coupling part 500 can be connected or coupled to the enclosure 310 of the sound apparatus 30 through the first hole 135 of the vehicle interior material 130, the second hole 3500 of the connection member 350, and the hollow hole 3150 of the protrusion part 315 (an arrow direction).

According to an embodiment of the present disclosure, the sound apparatus 30 can be connected or coupled to the vehicle interior material 130 by the coupling part 500. According to an embodiment of the present disclosure, the enclosure 310 can include the protrusion part 315, and thus, the coupling part 500 can be easily connected or coupled to the protrusion part 315. Accordingly, a connection process or a coupling process between the vehicle interior material 130 and the sound apparatus 30 can be simplified.

In FIG. 21, the sound apparatus 30 according to another embodiment of the present disclosure can further include a soft member 360 described in FIG. 16. The soft member 360 can be between the vehicle interior material 130 and the connection member 350. The soft member 360 can include a third hole (or a hole) 3600. For example, third hole 3600 can be between the first hole 135 of the vehicle interior material 130 and the second hole 3500 of the connection member 350. The third hole 3500 can be connected to the protrusion part 315 of the enclosure 310 through the second hole 3500 of the connection member 350. For example, the third hole 3500 can be connected to the protrusion part 315 of the first enclosure 311 through the second hole 3500 of the connection member 350. For example, the third hole 3600 can be disposed to correspond to the protrusion part 315 of the first enclosure 311. For example, the coupling part 500 can be connected or coupled to the sound apparatus 30 through the first hole 135 of the vehicle interior material 130, the second hole 3500 of the connection member 350, the third hole 3600 of the soft member 360, and the hollow hole 3150 of the protrusion part 315 of the enclosure 310. For example, the coupling part 500 can be connected or coupled to the enclosure 310 of the sound apparatus 30 through the first hole 135 of the vehicle interior material 130, the second hole 3500 of the connection member 350, the third hole 3600 of the soft member 360, and the hollow hole 3150 of the protrusion part 315.

In FIG. 21, the sound apparatus 30 according to another embodiment of the present disclosure can further include at least one of a connection member 350 described in FIGS. 14 to 15B and a soft member 360 described in FIG. 16. For example, the at least one of a second hole 3500 of the connection member 350 and a third hole 3600 of the soft member 360 can be disposed to correspond to the hollow hole 3150 of the protrusion part 315 of the enclosure 310. For example, the at least one of a second hole 3500 of the connection member 350 and a third hole 3600 of the soft member 360 can be disposed to correspond to the hollow hole 3150 of the protrusion part 315.

Figure 22:
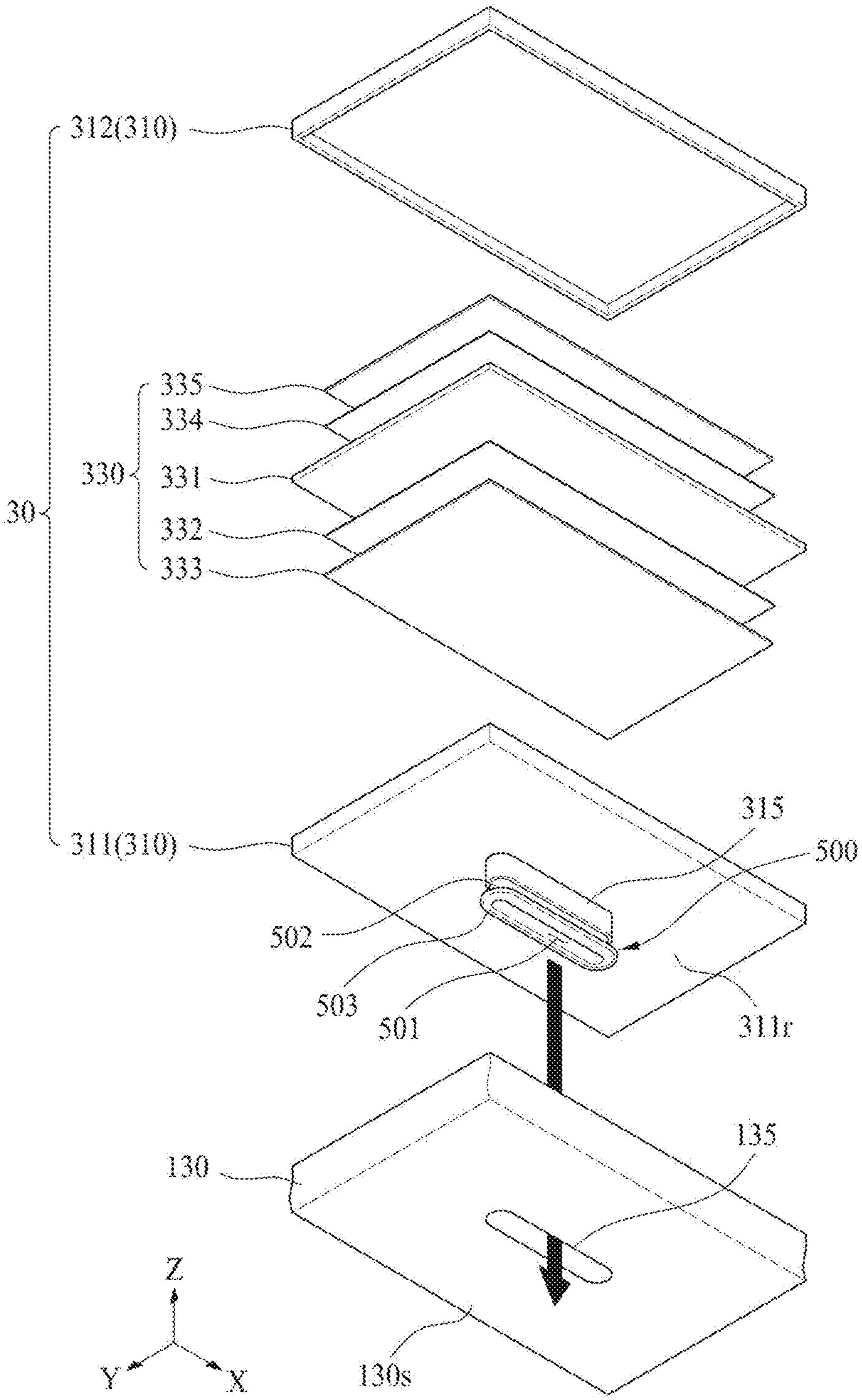
FIG. 22 illustrates a sound apparatus according to another embodiment of the present disclosure.
Figure 23A:
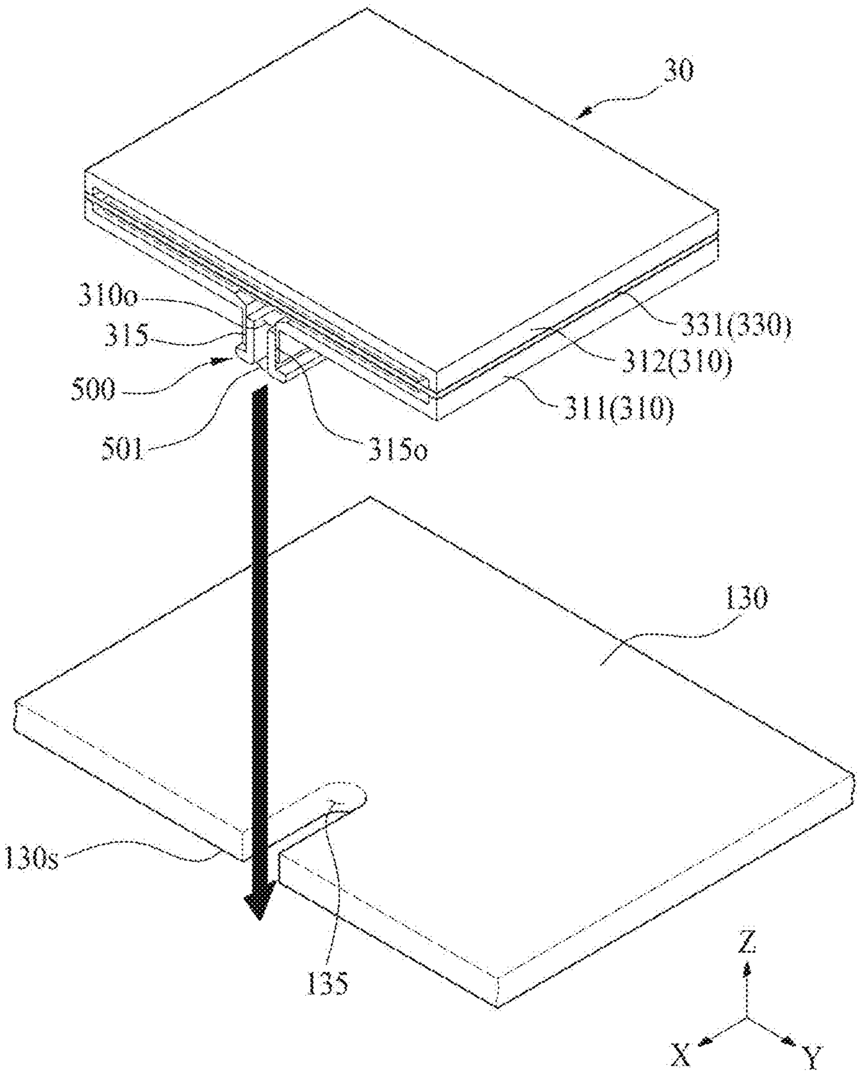
FIG. 23A illustrates a method of connecting a sound apparatus to a coupling part illustrated in FIG. 22 according to another embodiment of the present disclosure.
Figure 23B:
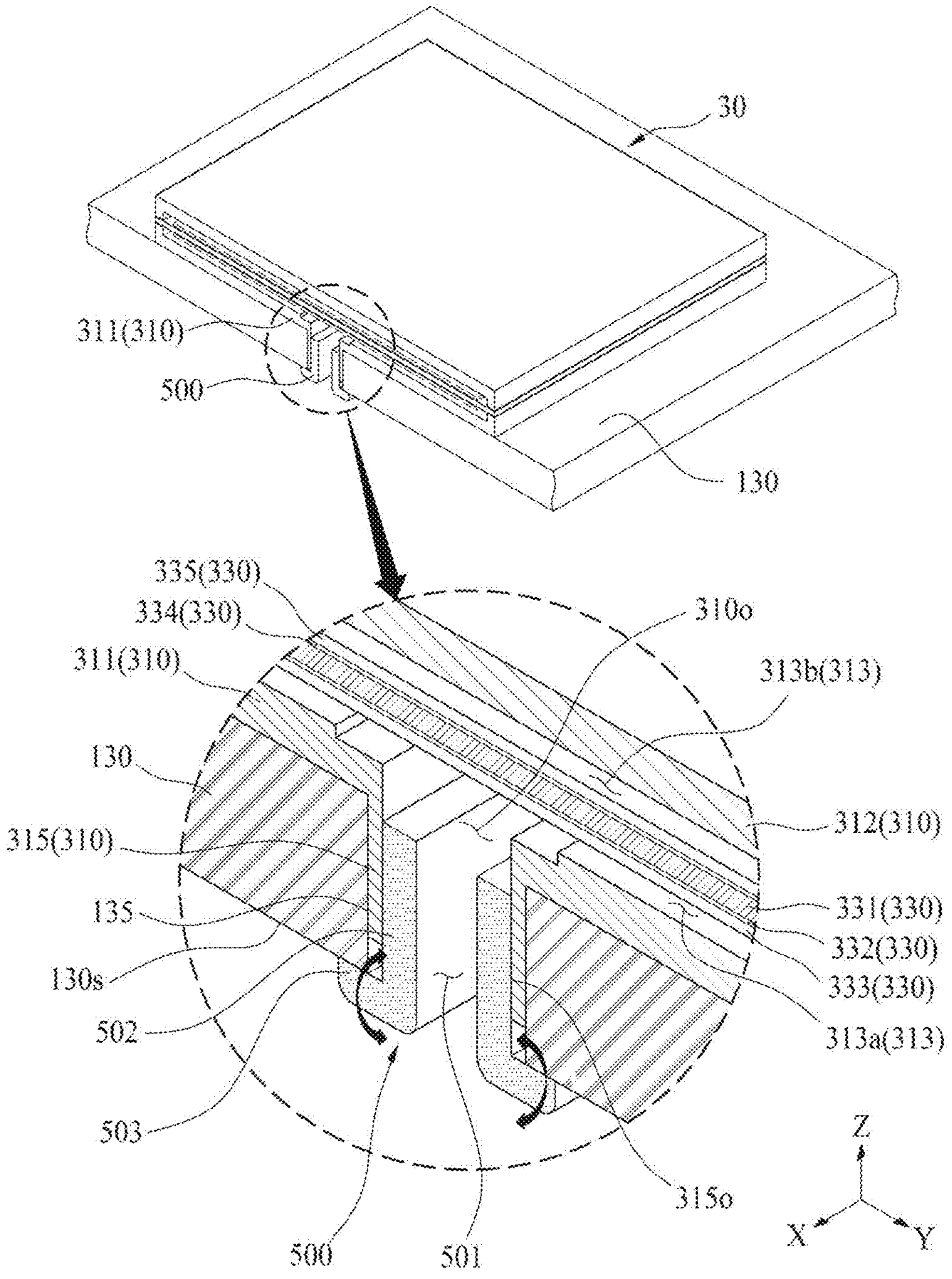
FIG. 23B illustrates a method of connecting a sound apparatus to a coupling part illustrated in FIG. 22 according to another embodiment of the present disclosure.

FIG. 22 illustrates a sound apparatus according to another embodiment of the present disclosure. FIGS. 23A and 23B illustrate a method of connecting a sound apparatus to a coupling part illustrated in FIG. 22 according to another embodiment of the present disclosure. FIG. 23B is an enlarged view of a portion where the sound apparatus 30 or the enclosure is connected or coupled to the vehicle interior material 130.

With reference to FIGS. 22 to 23B, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

According to another embodiment of the present disclosure, the enclosure 310 can include a protrusion part 315. A first enclosure 311 can include the protrusion part 315. The protrusion part 315 can protrude from a rear surface (or an outer surface) 311*r* of the first enclosure 311.

The first enclosure 311 can include an inner surface and an outer surface 311*r*. The inner surface of the first enclosure 311 can face a vibration member 331. The outer surface 311*r* of the first enclosure 311 can be a surface which is opposite to the inner surface of the first enclosure 311. For example, the protrusion part 315 can protrude from the outer surface 311*r* of the first enclosure 311.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

With reference to FIGS. 11 and 22, the coupling part 500 can include a hollow part 501. The hollow part 501 can be connected or coupled to the protrusion part 315. The protrusion part 315 can surround an opening part 3100 of the enclosure 310. For example, the protrusion part 315 can surround the opening part 3100 of the first enclosure 311. The protrusion part 315 can include an opening hole (or a hollow hole) 3150 corresponding (or connected) to the opening part 3100 of the first enclosure 311. For example, the hollow part 501 can be connected to an internal space 313 of the enclosure 310 through the opening hole 3150 of the protrusion part 315 and the opening part 3100. For example, the hollow part 501 can be connected to the internal space 313 of the first enclosure 311 through the opening hole 3150 of the protrusion part 315. For example, the hollow part 501 can be connected to the internal space 313 of the enclosure 310 through the opening part 3100 of the enclosure 310. For example, the coupling part 500 can be configured to be connected to the enclosure 310 through the first hole 135 (or the opening hole) of the vehicle interior material 130, the opening hole 3150 of the protrusion part 315, and the opening part 3100 of the enclosure 310. The first hole 135 (or the opening hole) of the vehicle interior material 130 can be connected to the opening part 3100.

According to an embodiment of the present disclosure, the coupling part 500 can include a hollow member 502 and a latch member 503.

The hollow member 502 can include the hollow part 501. The hollow member 502 can be inserted (or accommodated) into the protrusion part 315. The hollow member 502 can be inserted (or accommodated) into the opening hole 3150 of the protrusion part 315. The hollow member 502 can be inserted (or accommodated) into the opening hole 3150 of the protrusion part 315 and can be connected or coupled to the opening part 3100 of the enclosure 310 or the first enclosure 311.

The latch member 503 can be connected to the hollow member 502. The latch member 503 can be configured to be coupled to the vehicle interior material 130 (or a mount object). For example, the latch member 503 can be configured to be coupled to the vehicle interior material 130 (or a mount object) equipped with the enclosure 310. For example, the latch member 503 can be configured to be coupled the vehicle interior material 130 (or the mount object) equipped with the first enclosure 311.

The vehicle interior material 130 (or the mount object) can include a first surface and a second surface different from (or opposite to) the first surface. The first surface can be a surface facing the enclosure 310. A hole 135 can be configured at the first surface and the second surface. For example, the hole 135 can be configured to pass through the first surface and the second surface. For example, the latch member 503 can be configured to pass through the hole (or through hole) 135 and can be configured to be coupled to the second surface (or an interior surface or a rear surface) 130*s* of the vehicle interior material 130 (or the mount object).

The latch member 503 can be configured as a flexible material, but embodiments of the present disclosure are not limited thereto. For example, the latch member 503 can be configured as rubber, but embodiments of the present disclosure are not limited thereto.

With reference to FIG. 22, the coupling part 500 can be connected or coupled to the protrusion part 315. Thus, the coupling part 500 can be configured (or integrated) as one body with the protrusion part 315. For example, the coupling part 500 and the protrusion part 315 can be configured by a double injection molding process using different materials, but embodiments of the present disclosure are not limited thereto. According to an embodiment of the present disclosure, the coupling part 500 and the protrusion part 315 can be configured as one part (or one component), thereby realizing an effect of uni-materialization.

The coupling part 500 and the protrusion part 315 can be connected or coupled to the vehicle interior material 130 through the hollow part 501 (an arrow direction).

With reference to FIG. 23A, the coupling part 500 and the protrusion part 315 can be connected or coupled to the first hole 135 of the vehicle interior material 130 through the hollow part 501 (an arrow direction).

With reference to FIG. 23B, the coupling part 500 and the protrusion part 315 can be connected or coupled to the first hole 135 of the vehicle interior material 130. The latch member 503 can be configured as the flexible material, and thus, a sound generating module 330 or the sound apparatus 30 can be connected or coupled to the first hole 135 of the vehicle interior material 130 by the movement (an arrow direction) of the latch member 503.

According to an embodiment of the present disclosure, the sound apparatus 30 can be connected or coupled to the vehicle interior material 130 by the coupling part 500. According to an embodiment of the present disclosure, in the enclosure 310, the protrusion part 315 can be configured as one body with the coupling part 500, and thus, a connection process or a coupling process between the vehicle interior material 130 and the sound apparatus 30 can be simplified. According to an embodiment of the present disclosure, the protrusion part 315 and the coupling part 500 can be configured as one part, thereby realizing an effect of uni-materialization.

Figure 24:
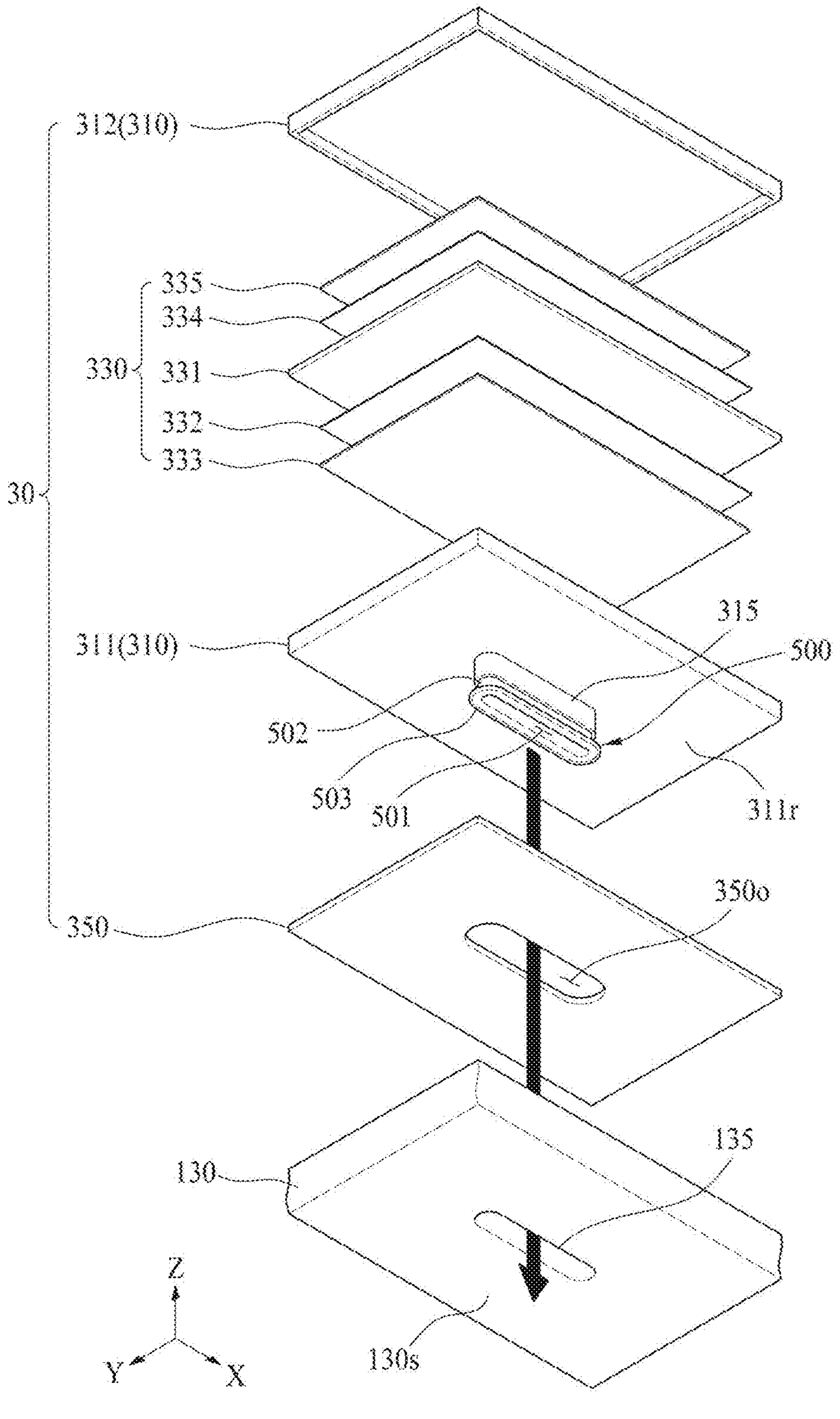
FIG. 24 illustrates a sound apparatus according to another embodiment of the present disclosure.

FIG. 24 illustrates a sound apparatus according to another embodiment of the present disclosure. Particularly, FIG. 24 illustrates another embodiment of the present disclosure where a connection member is additionally configured in the sound apparatus described above with reference to FIGS. 22 to 23B.

With reference to FIG. 24, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the description of FIGS. 11 to 13B, and thus, like reference numerals refer to like elements and repeated descriptions are omitted or will be briefly given below.

According to another embodiment of the present disclosure, the sound apparatus 30 can further include a connection member 350.

The connection member 350 can be between the vehicle interior material 130 and the enclosure 310. The connection member 350 can be between the vehicle interior material 130 and a first enclosure 311. The connection member 350 can further include a second hole (or a hole) 3500. For example, the second hole 3500 can be between the first hole 135 of the vehicle interior material 130 and the protrusion part 315 of the enclosure 310. For example, the second hole 3500 can be between the first hole 135 of the vehicle interior material 130 and the protrusion part 315 of the first enclosure 311. For example, the second hole 3500 can be between the first hole 135 of the vehicle interior material 130 and the coupling part 500. The second hole 3500 can be connected to the coupling part 500. For example, the second hole 3500 can be connected to the protrusion part 315 of the first enclosure 311 and the coupling part 500.

The coupling part 500 and the protrusion part 315 can be connected or coupled to the first hole 135 of the vehicle interior material 130 through the second hole 3500 of the connection member 350 and the hollow part 501 (an arrow direction).

According to an embodiment of the present disclosure, the sound apparatus 30 can be connected or coupled to the vehicle interior material 130 by the coupling part 500. According to an embodiment of the present disclosure, the enclosure 310 and the protrusion part 315 can be configured as one body with the coupling part 500, and thus, a connection process or a coupling process between the vehicle interior material 130 and the sound apparatus 30 can be simplified. According to an embodiment of the present disclosure, the protrusion part 315 and the coupling part 500 can be configured as one part (or one component), thereby realizing an effect of uni-materialization.

In FIG. 24, the sound apparatus 30 according to another embodiment of the present disclosure can further include a soft member 360 described in FIG. 16. The soft member 360 can be between the vehicle interior material 130 and the connection member 350. The soft member 360 can include a third hole (or a hole) 3600. For example, third hole 3600 can be between the first hole 135 of the vehicle interior material 130 and the second hole 3500 of the connection member 350. The third hole 3600 can be disposed to correspond to an opening hole of the protrusion part 315 of the enclosure 310. For example, the third hole 3600 of the soft member 360 can be disposed to correspond to the opening hole of the protrusion part 315 of the first enclosure 311. The third hole 3500 can be connected to the opening hole of the protrusion part 315 of the enclosure 310 through the second hole 3500 of the connection member 350. For example, the third hole 3500 can be connected to the opening hole of the protrusion part 315 of the first enclosure 311 through the second hole 3500 of the connection member 350. For example, the third hole 3500 can be connected to the opening hole of the protrusion part 315 of the first enclosure 311 and the coupling part 500 through the second hole 3500 of the connection member 350. For example, the coupling part 500 and the protrusion part 315 can be connected or coupled to the first hole 135 of the vehicle interior material 130 through the second hole 3500 of the connection member 350, the third hole 3600 of the soft member 360, and the hollow part 501.

In FIG. 24, the sound apparatus 30 according to another embodiment of the present disclosure can further include at least one of a connection member 350 described in FIGS. 14 to 15B and a soft member 360 described in FIG. 16. For example, the at least one of a second hole 3500 of the connection member 350 and a third hole 3600 of the soft member 360 can be disposed to correspond to the opening hole of the protrusion part 315 of the enclosure 310. For example, the at least one of a second hole 3500 of the connection member 350 and a third hole 3600 of the soft member 360 can be disposed to correspond to the opening hole of the protrusion part 315 of the first enclosure 311. For example, the at least one of a second hole 3500 of the connection member 350 and a third hole 3600 of the soft member 360 can be connected to the opening hole of the protrusion part 315 of the first enclosure 311. For example, the at least one of a second hole 3500 of the connection member 350 and a third hole 3600 of the soft member 360 can be connected to the opening hole of the protrusion part 315 of the first enclosure 311 and the hollow part 501 of the coupling part 500. For example, the coupling part 500 and the protrusion part 315 can be connected or coupled to the first hole 135 of the vehicle interior material 130 through the hollow part 501 and at least one of the second hole 3500 of the connection member 350 and the third hole 3600 of the soft member 360.

Figure 25A:
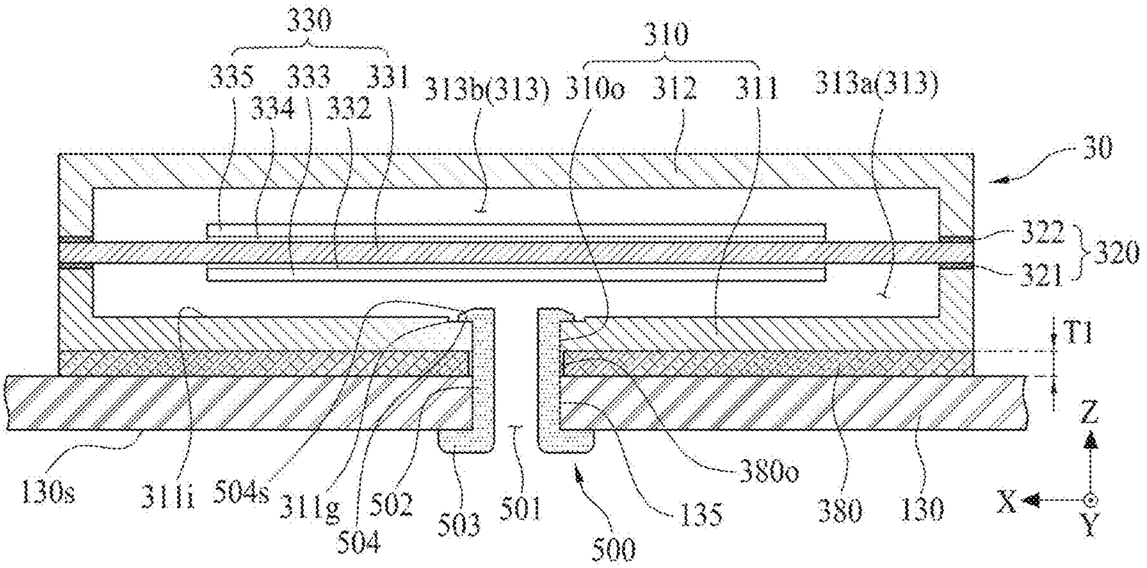
FIG. 25A illustrates a sound apparatus according to another embodiment of the present disclosure.
Figure 25B:
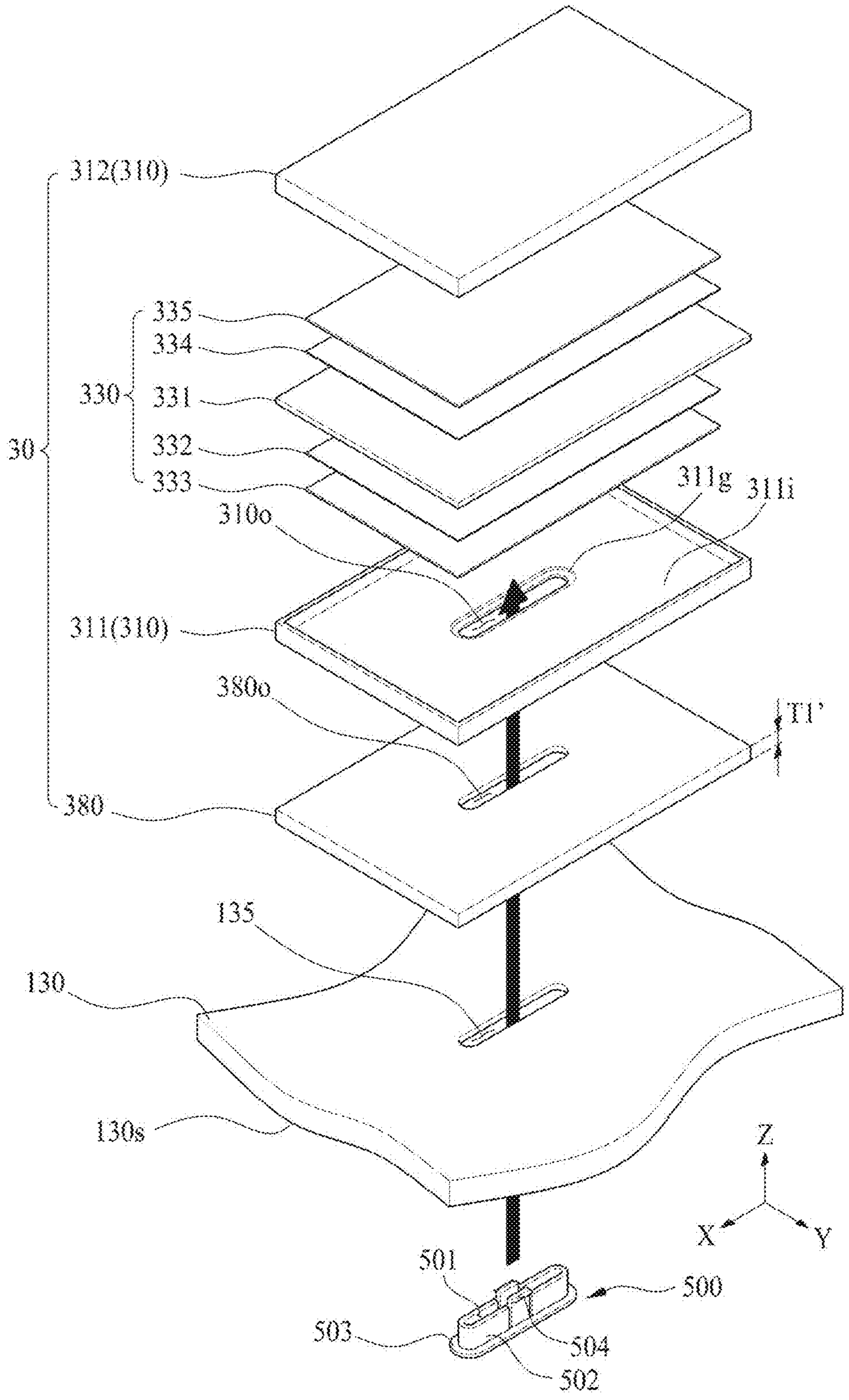
FIG. 25B is an exploded perspective view of a sound apparatus illustrated in FIG. 25A according to another embodiment of the present disclosure.

FIG. 25A illustrates a sound apparatus according to another embodiment of the present disclosure. FIG. 25B is an exploded perspective view of a sound apparatus illustrated in FIG. 25A according to another embodiment of the present disclosure.

With reference to FIG. 25A, a sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 5, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the description of FIGS. 11 to 24, and thus, like reference numerals refer to like elements and repeated descriptions are omitted or will be briefly given below.

The sound apparatus 30 according to another embodiment of the present disclosure can further include a coupling member 320. The coupling member 320 can include a first coupling member 321 and a second coupling member 322. A description of the coupling member 320 can be substantially a same as the description of FIGS. 3 and 4, and thus, like reference numerals refer to like elements and repeated descriptions are omitted or will be briefly given below.

According to another embodiment of the present disclosure, the sound apparatus 30 can further include a connection member 380.

The connection member 380 according to another embodiment of the present disclosure can be provided or configured between the vehicle interior material 130 and the sound generating module 330. The connection member 380 can be configured between the first enclosure 311 and the vehicle interior material 130. For example, the first enclosure 311 can include an inner surface 311*i* and an outer surface. The inner surface 311*i* of the first enclosure 311 can face a vibration member 331. The outer surface of the first enclosure 311 can be a surface which is opposite to the inner surface 311*i* of the first enclosure 311. For example, the connection member 380 can be connected to the outer surface of the first enclosure 311. The connection member 380 can be connected to the outer surface of the first enclosure 311. The connection member 380 can be a coupling member, an intermediate member, a buffer member, or a pad member, but embodiments of the present disclosure are not limited thereto.

The connection member 380 can include a material which differs from that of the first coupling member 321. For example, the connection member 380 can include a material having an adhesive force which differs from that of the first coupling member 321. Because the connection member 380 includes a material having an adhesive force which differs from that of the first coupling member 321, a separation or detachment process (or rework) of the connection member 380 from the vehicle interior material 130 can be easily performed in a separation or detachment process (or rework) of the sound apparatus 30 attached on the vehicle interior material 130. Accordingly, a process of attaching or mounting the sound apparatus 30 on the vehicle interior material 130 or a process of separating or attaching/detaching the sound apparatus 30 from the vehicle interior material 130 can be easily performed.

The connection member 380 can be coupled (or attached) to the rear surface of the enclosure 310 and can contact (or surface-contact) a first surface 130*s*1 of the vehicle interior material 130, but embodiments of the present disclosure are not limited thereto. For example, in a case where the connection member 380 is coupled (or attached) to the rear surface of the enclosure 310 and simply contacts (or surface-contacts) the first surface 130*s*1 of the vehicle interior material 130, a process of separating or detaching (or rework) the connection member 380 from the vehicle interior material 130 without damage of the sound apparatus 30 or the vehicle interior material 130 can be easily performed in a process of separating and detaching (or rework) the sound apparatus 30 from the vehicle interior material 130.

According to another embodiment of the present disclosure, the connection member 380 can include a single-sided tape, a single-sided adhesive foam tape, a single-sided foam tape, a single-sided adhesive foam tape, a single-sided pad, a single-sided foam pad, a single-sided adhesive foam pad, a single-sided pad member, a single-sided cushion member, a single-sided cushion pad, or a single-sided cushion tape, or the like, but embodiments of the present disclosure are not limited thereto. For example, the connection member 380 can include rubber, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto. For example, the connection member 380 can include high-elasticity rubber, but embodiments of the present disclosure are not limited thereto.

According to an embodiment of the present disclosure, because the connection member 380 includes rubber or the like, when a vibration of the enclosure 310 or the first enclosure 311 is transferred to the interior material 130, the loss of the vibration can be prevented or minimized, and thus, a sound characteristic and/or a sound pressure level characteristic of a low-pitched sound band can be further improved.

According to an embodiment of the present disclosure, the first coupling member 321 and the second coupling member 322 of the coupling member 320 can include an adhesive, a double-sided tape, a double-sided adhesive tape, a double-sided foam tape, a double-sided adhesive foam tape, a double-sided pad, a double-sided foam pad, a double-sided adhesive foam pad, a double-sided pad member, a double-sided cushion member, a double-sided cushion pad, or a double-sided cushion tape, or the like, but embodiments of the present disclosure are not limited thereto.

According to an embodiment of the present disclosure, the connection member 380 can include a material which differs from that of at least one of the first adhesive member 332 and the second adhesive member 334. For example, at least one of the first adhesive member 332 and the second adhesive member 334 can include an adhesive, a double-sided adhesive, a double-sided tape, a double-sided adhesive tape, a double-sided adhesive foam tape, a double-sided pad, a double-sided foam pad, a double-sided adhesive foam pad, a double-sided cushion tape, or a tacky sheet, but embodiments of the present disclosure are not limited thereto.

According to an embodiment of the present disclosure, the connection member 380 can further include a hole 3800 (or a fourth hole or an opening hole). For example, the connection member 380 can further include a hole 3800 which is connected to the opening part 3100 in the enclosure 310 or the first enclosure 311.

The hole 3800 can be disposed to correspond to (or overlap) the opening part 3100. The hole 3800 can have a same shape as the opening part 3100, but embodiments of the present disclosure are not limited thereto. For example, the hole 3800 can have a same shape as that of the opening part 3100 and can have a size which is greater than that of the opening part 3100. Accordingly, a sound based on a vibration of the sound generating module 330 can be output to an interior space IS of a vehicle by (or through) the opening part 3100 and the hole 3800. For example, the hole 3800 can be an opening part, an opening hole, a slit, a slot, a connection hole, or an intermediate hole, but embodiments of the present disclosure are not limited thereto.

According to an embodiment of the present disclosure, the hole 3800 can correspond to (or overlap) the hole 135 of the vehicle interior material 130. The hole 3800 can be between the hole 135 of the vehicle interior material 130 and the opening part 3100 of the enclosure 310. For example, the hole 3800 can be between the hole 135 of the vehicle interior material 130 and the opening part 3100 of the first enclosure 311. The hole 3800 can be connected to the opening part 3100 of the enclosure 310. For example, the hole 3800 can be connected to the opening part 3100 of the first enclosure 311. The hole 3800 can be disposed to correspond to the opening part 3100. The hole 3800 of the connection member 380 can have a same size as that of each of the opening part 3100 and the hole 135, or can have a size which is greater than that of each of the opening part 3100 and the hole 135. Accordingly, a sound based on a vibration of the sound generating module 330 can be output to an interior space IS of a vehicle by (or through) the opening part 3100, the hole 3800, and the hole 135.

With reference to FIGS. 25A and 25B, a thickness T1 of the connection member 380 can differ from that of at least one of the first coupling member 321 and the second coupling member 322. For example, the thickness T1 of the connection member 380 can be thicker than that of at least one of the first coupling member 321 and the second coupling member 322. The thickness T1 of the connection member 380 can be 0.5 mm or more, but embodiments of the present disclosure are not limited thereto. For example, the thickness T1 of the connection member 380 can be 0.5 mm to 3 mm, but embodiments of the present disclosure are not limited thereto.

According to another embodiment of the present disclosure, the connection member 380 can have a compressive force (or a contractive force) and an elastic restoring force and can be contracted or compressed by coupling between the coupling part 500 and the first enclosure 311. A length (or a thickness) of the connection member 380 can be smaller than or equal to a length (or a thickness) of the vehicle interior material 130. For example, the length (or the thickness) of the connection member 380 can be smaller than or equal to a length (or a thickness) of the first enclosure 311.

The connection member 380, as illustrated in FIG. 25B, can have the initial thickness T1' before compression (or contraction) and can be compressed (or contracted) to have a deformed thickness (or a compression thickness) T1 illustrated in FIG. 25A, based on pressure applied from the enclosure 310 by coupling (or connection) between the coupling part 500 and the enclosure 310. For example, when the sound apparatus 30 is connected to the vehicle interior material 130 by the coupling part 500 or assembly and/or rework are/is completed, a thickness of the connection member 380 can be compressed from the initial thickness T1' to the compression thickness T1, and thus, a vibration of the enclosure 310 can be efficiently transferred to the vehicle interior material 130. For example, when the sound apparatus 30 is separated (or detached) from the vehicle interior material 130 by the detachment of the coupling part 500, the connection member 380 can be restored from the deformed thickness (or the compression thickness) T1 to the initial thickness T1' by an elastic restoring force.

With reference to FIGS. 25A and 25B, the coupling part 500 can be connected or coupled to the sound apparatus 30 through the second hole 135 of the vehicle interior material 130, the hole 3800 of the connection member 380, and the opening part 3100 of the first enclosure 311 (an arrow direction). For example, the coupling part 500 can be connected or coupled to the opening part 3100 of the first enclosure 311 through the second hole 135 of the vehicle interior material 130 and the hole 3800 of the connection member 380, in the interior space of the vehicle. According to an embodiment of the present disclosure, the coupling part 500 can be connected or coupled to the sound apparatus 30 or the enclosure 310 through the hole 135 of the vehicle interior material 130 (an arrow direction), in the interior space of the vehicle. For example, the coupling part 500 can be accommodated or inserted into the hole 3800 of the connection member 380 and the opening part 3100 of the first enclosure 311 through the hole 135 of the vehicle interior material 130, in the interior space of the vehicle. For example, the hook member 504 of the coupling part 500 can be connected or coupled to the opening part 3100 of the first enclosure 311. For example, the hook member 504 of the coupling part 500 can be inserted (or accommodated) into the opening part 3100 of the first enclosure 311 and can be connected or coupled to a groove portion 311*g* of the first enclosure 311 by a hook coupling scheme.

Figure 25C:
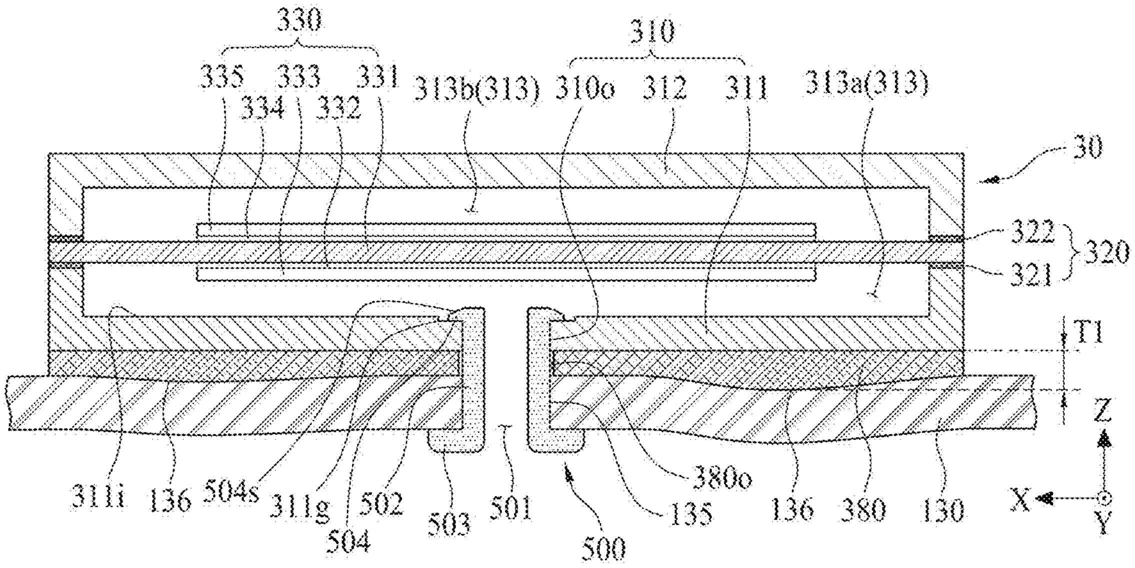
FIG. 25C illustrates a sound apparatus according to another embodiment of the present disclosure.

FIG. 25C illustrates a sound apparatus according to another embodiment of the present disclosure.

With reference to FIG. 25C, the vehicle interior material 130 according to another embodiment of the present disclosure can include at least one or more curved portions (or flexural portions) 136. The connection member 380 can be configured to correspond to the at least one or more curved portions 136. The connection member 380 can contact with the at least one or more curved portions 136. The connection member 380 can directly contact with the at least one or more curved portions 136. For example, the connection member 380 can directly contact the at least one or more curved portions 136 without a medium or an intermediate member.

The sound apparatus 30 or the enclosure 310 can be connected or coupled to the at least one or more curved portions 136 of the vehicle interior material 130 by the connection member 380. For example, the connection member 380 can be disposed between the enclosure 310 and the at least one or more curved portions 136 of the vehicle interior material 130. For example, the connection member 380 can be disposed between the first enclosure 311 and the at least one or more curved portions 136 of the vehicle interior material 130. For example, the first enclosure 311 can be connected or coupled to the at least one or more curved portions 136 of the vehicle interior material 130 by the connection member 380.

With reference to FIG. 25C, a thickness T1 of the connection member 380 can differ from that of at least one of the first coupling member 321 and the second coupling member 322. For example, the thickness T1 of the connection member 380 can be thicker than that of at least one of the first coupling member 321 and the second coupling member 322. The thickness T1 of the connection member 380 can be 0.5 mm or more, but embodiments of the present disclosure are not limited thereto. For example, the thickness T1 of the connection member 380 can be 0.5 mm to 3 mm, but embodiments of the present disclosure are not limited thereto. For example, the connection member 380 can have the thickness T1 which is compressed (or contracted) from an initial thickness T1' illustrated in FIG. 25B by a coupling force between the coupling part 500 and the first enclosure 311. Accordingly, the connection member 380 can surface-contact the vehicle interior material 130 including at least one or more curved portions 136, based on the coupling force between the coupling part 500 and the first enclosure 311.

According to an embodiment of the present disclosure, a sound based on a vibration of the sound generating module 330 can be output to an interior space of a vehicle by (or through) the opening part 3100, the hole 3800, and the second hole 135. In addition, a vibration of the enclosure 310 or the first enclosure 311 based on a sound (or sound pressure level or sound wave) based on a vibration of the sound generating module 330 can be efficiently transferred to the vehicle interior material 130 including the at least one or more curved portions 136 through the connection member 380 without loss of vibration, and the vehicle interior material 130 including the at least one or more curved portions 136 can vibrate based on the vibration of the enclosure 310 or the first enclosure 311 transferred through the connection member 380 to output to an interior space of a vehicle, and thus, a sound characteristic and/or a sound pressure level characteristic of a low-pitched sound band can be further improved.

The sound apparatus 30 according to another embodiment of the present disclosure can include the enclosure 310 and the connection member 380. Accordingly, a sound characteristic and/or a sound pressure level characteristic of a low-pitched sound band can be further improved, and an attachment or detachment process of the sound generating module 330 attached on the vehicle interior material 130 by the connection member 380 including a rubber material can be easily performed.

Figure 26:
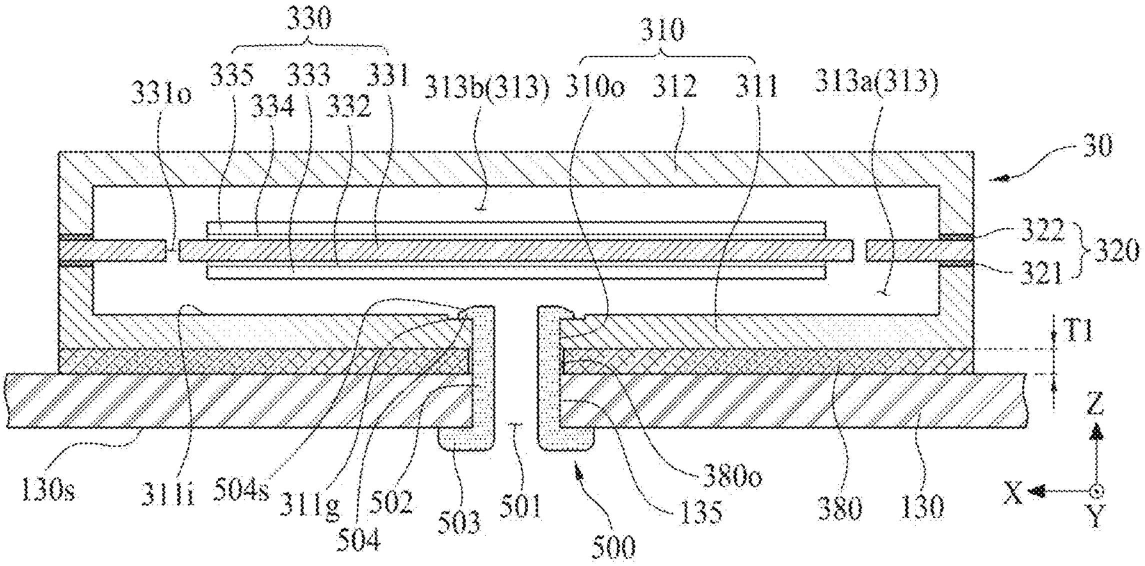
FIG. 26 illustrates a sound apparatus according to another embodiment of the present disclosure.

FIG. 26 illustrates a sound apparatus according to another embodiment of the present disclosure. FIGS. 27 to 30 illustrate an internal of a sound apparatus according to another embodiment of the present disclosure. FIGS. 26 to 30 illustrate an embodiment where at least one hole is additionally configured in the sound apparatus 30 described above with reference to FIGS. 1 to 25C. In the following description, therefore, at least one hole will be described in detail, the other elements can be substantially a same as that of descriptions described above with reference to FIGS. 1 to 25C, and thus, like reference numerals refer to like elements and repeated descriptions can be omitted or will be briefly given below.

With reference to FIG. 26, a sound apparatus 30 according to another embodiment of the present disclosure can further include at least one or more holes 331*o*.

The at least one or more holes 331*o* can be configured at a vibration member 331. The at least one or more holes 331*o* can be configured to pass through the vibration member 331. The at least one or more holes 331*o* can be configured to pass through the vibration member 331 in a thickness direction Z of the vibration member 331. For example, the at least one or more holes 331*o* can be formed to vertically pass through the vibration member 331 in a thickness direction Z of the vibration member 331.

A sound generating module 330 according to an embodiment of the present disclosure can include the vibration member 331 including the at least one or more holes 331*o* and vibration apparatuses 333 and 335 configured at the vibration member 331.

The at least one or more holes 331*o* can be configured to adjust a flow of air in an internal space 313 of the enclosure 310. For example, the at least one or more holes 331*o* can perform control so that air flows in the internal spaces 313 of the enclosure 310 spatially separated from each other by the vibration member 331. For example, the at least one or more holes 331*o* can be configured to adjust air flow between a first space 313*a* and a second space 313*b* spatially separated from each other by the vibration member 331 in the internal space 313 of the enclosure 310. For example, the at least one or more holes 331*o* can be a first hole, a vent hole, an air flow hole, a ventilation hole, a duct hole, a first connection hole, a first communication hole, or a first space connection part, but embodiments of the present disclosure are not limited thereto.

The at least one or more holes 331*o* according to an embodiment of the present disclosure can be configured in a polygonal shape such as a circular shape, an oval shape, or a tetragonal shape, but embodiments of the present disclosure are not limited thereto.

The at least one or more holes 331*o* can be configured to decrease an air pressure of the internal space 313 of the enclosure 310. For example, the at least one or more holes 331*o* can be configured to connect, with each other, the first space 313*a* and the second space 313*b* spatially separated from each other by the vibration member 331, in the internal space 313 of the enclosure 310. For example, the first space 313*a* and the second space 313*b* of the internal space 313 in the enclosure 310 can be connected to (or connect with) each other through the at least one or more holes 331*o*. For example, the at least one or more holes 331*o* can be configured to decrease an air pressure of the first space 313*a* of the first enclosure 311 or the first space 313*a* provided between the vibration member 331 and the first enclosure 311. Accordingly, a band (reproduction band) of a low-pitched sound band can expand, and thus, a sound characteristic and/or a sound pressure level characteristic of the low-pitched sound band can be improved. Further, the sound generating module 330 can be more stably vibrated by the at least one or more holes 331*o* in the vibration member 331, and thus, a sound characteristic and/or a sound pressure level characteristic can be further improved.

According to an embodiment of the present disclosure, the internal space 313 can be between a first surface of the sound generating module 330 and the first enclosure 311 and can be connected to the opening part 3100. The internal space 313 can be connected to (or connect with) each other through the at least one or more holes 331*o*. The enclosure 311 can include the second space 313*b* between the second enclosure 312 and a second surface, which is opposite to the first surface, of the sound generating module 330. The internal space 313 and the second space 313*b* can be connected to (or connect with) each other through the at least one or more holes 331*o*.

According to an embodiment of the present disclosure, the at least one or more holes 331*o* can be disposed adjacent to vibration apparatuses 333 and 335. For example, the at least one or more holes 331*o* can be disposed at a periphery of each of the vibration apparatuses 333 and 335. For example, the at least one or more holes 331*o* can be disposed adjacent to a lateral surface of each of the vibration apparatuses 333 and 335. For example, a distance between the at least one or more holes 331*o* and each of the vibration apparatuses 333 and 335 can be smaller than a distance between the at least one or more holes 331*o* and a sidewall (or lateral surface) of the enclosure 310. For example, when the at least one or more holes 331*o* is disposed at a position farther away from each of the vibration apparatuses 333 and 335, a sound characteristic and/or a sound pressure level characteristic of a low-pitched sound band can be further improved.

According to an embodiment of the present disclosure, the at least one or more holes 331*o* can be configured at the vibration member 331 adjacent to the vibration apparatuses 333 and 335 with the vibration apparatuses 333 and 335 therebetween. For example, the vibration member 331 can include a first periphery region adjacent a first lateral surface of each of the vibration apparatuses 333 and 335 and a second periphery region, which is opposite to a second side opposite to a first side, of each of the vibration apparatuses 333 and 335. For example, with respect to a first direction X, the vibration member 331 can include the first periphery region, a vibration region, and the second periphery region. For example, in the vibration member 331, each of the first and second periphery regions can be a hole region or a non-arrangement region of each of the vibration apparatuses 333 and 335, and the vibration region can be an arrangement (or a disposition) region of the vibration apparatuses 333 and 335. For example, the at least one or more holes 331*o* can be configured in each of the first periphery region and the second periphery region of the vibration member 331 to have a symmetric structure (or a horizontal symmetric structure or a left-right symmetric structure) or an asymmetric structure (or horizontal asymmetric structure or a left-right asymmetric structure), with respect to the vibration apparatuses 333 and 335.

According to an embodiment of the present disclosure, the vibration apparatuses 333 and 335 can each include a long side and a short side. A distance (or separation distance or shortest distance) between the at least one or more holes 331*o* and the short side of the vibration apparatuses 333 and 335 can represent a ratio of a short-side length of the vibration apparatuses 333 and 335. According to an embodiment of the present disclosure, a distance between the at least one or more holes 331*o* and the vibration apparatuses 333 and 335 can be 60% or less of the short-side length of the vibration apparatuses 333 and 335.

Figure 27:
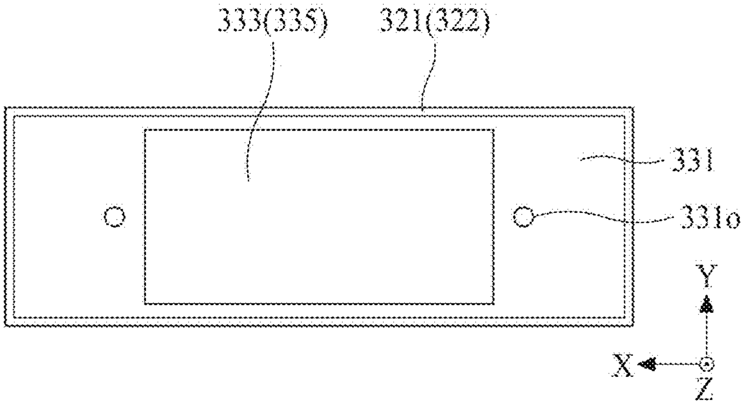
FIG. 27 illustrates an internal of a sound apparatus according to another embodiment of the present disclosure.

With reference to FIGS. 26 and 27, the at least one or more holes 331*o* can be disposed closer to the vibration apparatuses 333 and 335 than a coupling member 320. The coupling member 320 can include a first coupling member 321 and a second coupling member 322. For example, the at least one or more holes 331*o* can be disposed closer to the vibration apparatuses 333 and 335 than the first coupling member 321 and the second coupling member 322. Accordingly, a sound characteristic and/or a sound pressure level characteristic of a low-pitched sound band can be enhanced.

A sound output characteristic based on a distance between the vibration apparatuses 333 and 335 and the at least one or more holes 331*o* will be described below with reference to FIGS. 62A and 62B.

According to an embodiment of the present disclosure, the at least one or more holes 331*o* may not overlap an opening part 3100. For example, the at least one or more holes 331*o* can be disposed to be spaced apart from the opening part 3100. Accordingly, a sound generated based on a vibration (or driving) of each of the vibration apparatuses 333 and 335 in the second space 313*b* can be output to the first space 313*a* through the at least one or more holes 331*o*, and a sound characteristic and/or a sound pressure level characteristic of a low-pitched sound band can be enhanced.

Figure 28:
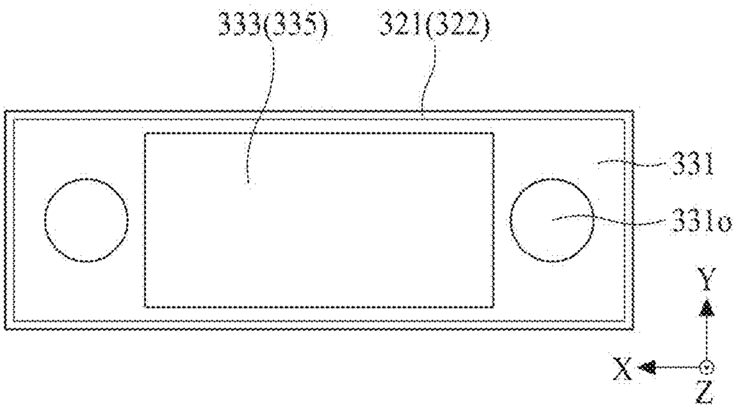
FIG. 28 illustrates an internal of a sound apparatus according to another embodiment of the present disclosure.

With reference to FIGS. 26 and 28, a size of the at least one or more holes 331*o* can differ from that of the at least one or more holes 331*o* illustrated in FIG. 27. As a size of the at least one or more holes 331*o* increases, a sound characteristic and/or a sound pressure level characteristic of a low-pitched sound band can increase. For example, a distance between the at least one or more holes 331*o* and the vibration apparatuses 333 and 335 can be less than a distance between the at least one or more holes 331*o* and a sidewall (or lateral surface) of the enclosure 310. For example, as a size of the at least one or more holes 331*o* increases, a sound pressure level characteristic of a low-pitched sound band of 400 Hz or less can be further enhanced. A sound output characteristic based on a size of the at least one or more holes 331*o* will be described below with reference to FIGS. 61A, 61B, and 63.

Figure 29:
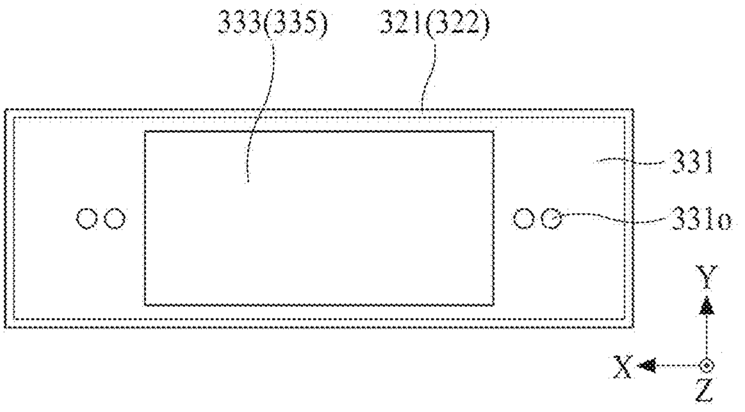
FIG. 29 illustrates an internal of a sound apparatus according to another embodiment of the present disclosure.

With reference to FIGS. 26 and 29, the at least one or more holes 331*o* can be configured with two holes 331*o*. For example, the sound apparatus 30 according to an embodiment of the present disclosure can further include two holes 331*o*. The two holes 331*o* can be configured adjacent to each other. For example, the two holes 331*o* can be configured adjacent to the vibration apparatuses 333 and 335. For example, distances between each of the two holes 331*o* and the vibration apparatuses 333 and 335 can differ. For example, the two holes 331*o* can be configured in parallel in a first direction X so as to be adjacent to the vibration apparatuses 333 and 335. For example, distances between each of the two holes 331*o* and the vibration apparatuses 333 and 335 can be equal to each other. For example, each of the two holes 331*o* can be configured adjacent to the vibration apparatuses 333 and 335. For example, the two holes 331*o* can be configured in parallel in a second direction Y so as to be adjacent to the vibration apparatuses 333 and 335.

Each of the two holes 331*o* according to an embodiment of the present disclosure can be configured in a polygonal shape such as a circular shape, an oval shape, or a tetragonal shape, but embodiments of the present disclosure are not limited thereto.

Figure 30:
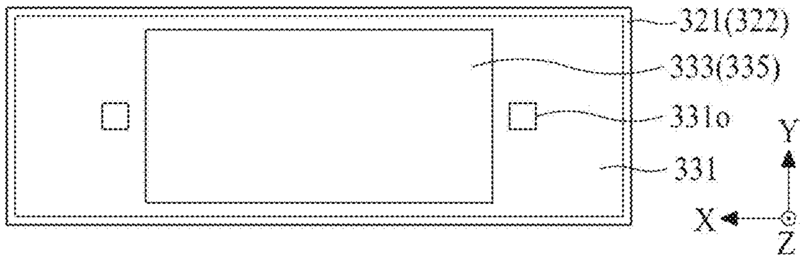
FIG. 30 illustrates an internal of a sound apparatus according to another embodiment of the present disclosure.

With reference to FIGS. 26 and 30, the at least one or more holes 331*o* can be configured in a tetragonal shape. For example, the at least one or more holes 331*o* can be configured adjacent to the vibration apparatuses 333 and 335. A sound output characteristic based on a shape of the at least one or more holes 331*o* will be described below with reference to FIG. 64.

With reference to FIGS. 27-30, one or more of holes 331*o* can have hole wall that is straight or vertical so that any of the polygonal shape have a constant cross sectional shape. For example, when the one or more holes 331*o* is the circular shape, the one or more holes 331*o* can be a cylindrical shape in cross section, but embodiments of the present disclosure are not limited thereto. For example, the hole wall can have a shape that varies in going from a top (or first) opening to a bottom (or second) opening of the one or more holes. In various embodiments of the present disclosure, the top opening can refer to an opening of the hole 331*o* that faces the second enclosure 312 and the bottom opening can refer to an opening of the hole 331*o* that faces the first enclosure 311.

In embodiments of the present disclosure, shapes of the hole wall can become narrower in going from the top opening to the bottom opening or in going from the bottom opening to the top opening. In various embodiments of the present disclosure a size or area of the top opening and the bottom opening can be different from each other, but can also be the same. When different, the top opening can be smaller than the bottom opening or vise-versa.

In various embodiments of the present disclosure, the shapes (or width or diameter) of the hole wall can be widest at the top and bottom openings and gradually become smaller towards the middle of the hole 331*o*, or can be the widest at the middle and gradually become smaller towards the top and bottom openings. The change in the width of the hole wall need not be gradual, and one or more steps, or curves can be present in the hole wall within the hole 331*o*. In various embodiments of the present disclosure, the cross sectional shape of the hole wall can be triangular waves or curved waves, concave shapes or convex shape, or various combination thereof, but are not limited thereto. Further, when a plurality of holes 331*o* are present, the cross sectional shape of the hole walls can be the same or different from each other.

Additionally, the second enclosure 312 can include a hole similar to that of the opening portion 3100 of the first enclosure 311.

According to an embodiment of the present disclosure, the at least one or more holes 331*o* can output a sound (or rear sound), which is generated based on a vibration of each of the vibration apparatuses 333 and 335 and is discharged to a rear surface (or rearward direction) of the vibration member 331, through the opening part 3100 of the first enclosure 311. Therefore, a sound generated based on a vibration (or driving) of each of the vibration apparatuses 333 and 335 at a rear surface of the vibration member 331 or the second space 313*b* of the enclosure 310 can be output to the first space 313*a* through the at least one or more holes 331*o* and can output (or radiated) through the opening part 3100 of the first enclosure 311 and a hollow part 501 of a coupling part 500, and thus, a sound characteristic and/or a sound pressure level characteristic of a low-pitched sound band can be further enhanced. According to an embodiment of the present disclosure, a sound characteristic and/or a sound pressure level characteristic of a low-pitched sound band, for example, 400 Hz or less can be further enhanced.

Figure 31:
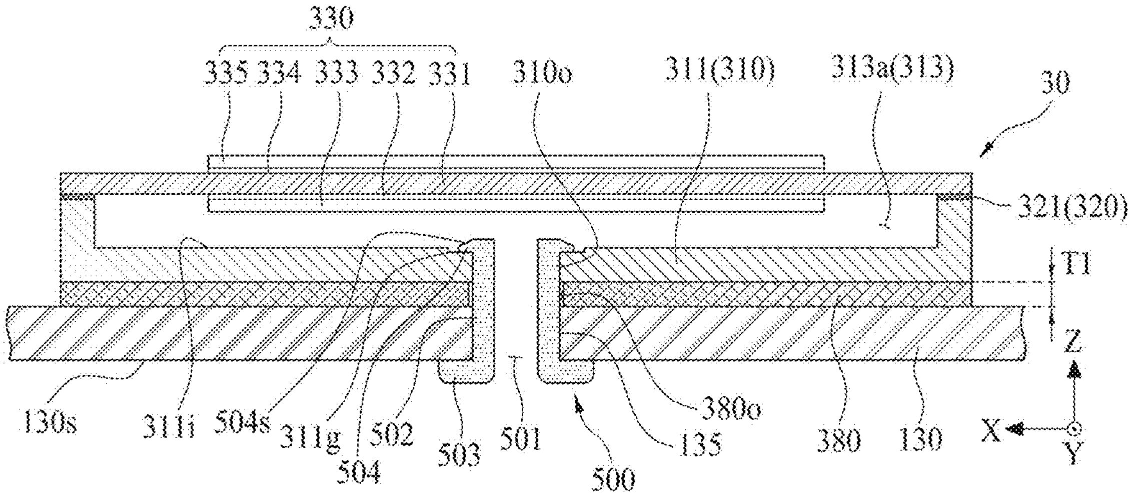
FIG. 31 illustrates a sound apparatus according to another embodiment of the present disclosure.

FIG. 31 illustrates a sound apparatus according to another embodiment of the present disclosure. Particularly, FIG. 31 illustrates an embodiment implemented by modifying the enclosure of the sound apparatus 30 described above with reference to FIGS. 1 to 30. In the following description, therefore, the enclosure will be described in detail, the other elements can be substantially a same as that of descriptions described above with reference to FIGS. 1 to 30, and thus, like reference numerals refer to like elements and repeated descriptions can be omitted or will be briefly given below.

With reference to FIG. 31, in the sound apparatus according to another embodiment of the present disclosure, the enclosure 310 can include a first enclosure 311. For example, the second enclosure 312 can be removed (or omitted) in the enclosure 310 described above with reference to FIGS. 1 to 26, and thus, the enclosure 310 can be configured with only the first enclosure 311.

The enclosure 310 or the first enclosure 311 can be connected to a sound generating module 330 with an internal space 313 therebetween. The enclosure 310 or the first enclosure 311 can be connected to a rear periphery portion of a vibration member 331 with the internal space 313 therebetween.

According to another embodiment of the present disclosure, the vibration member 331 can be configured to cover the internal space 313 of the first enclosure 311. For example, the vibration member 331 can be configured to cover a portion of the internal space 313 of the first enclosure 311. The vibration member 331 can be configured to cover the first space 313*a* of the first enclosure 311. For example, the vibration member 331 can be configured to cover a portion of the first space 313*a* of the first enclosure 311.

In a case where the enclosure 310 is configured with the first enclosure 311, a sound characteristic and/or a sound pressure level characteristic of a sound apparatus 30 can be further enhanced than a case where the enclosure 310 is configured with the first enclosure 311 and the second enclosure 312. For example, in a case where the enclosure 310 is configured with the first enclosure 311, a sound characteristic and/or a sound pressure level characteristic of a middle-low-pitched sound band, for example, 2 kHz or less can be further enhanced, and a sound reproduction band can further expand.

According to another embodiment of the present disclosure, the sound apparatus 30 can further include a connection member 380.

The connection member 380 according to another embodiment of the present disclosure can be configured between the first enclosure 311 and the vehicle interior material 130. For example, the first enclosure 311 can include an inner surface 311*i* and an outer surface. The inner surface 311*i* of the first enclosure 311 can face a vibration member 331. The outer surface of the first enclosure 311 can be a surface which is opposite to the inner surface 311*i* of the first enclosure 311. For example, the connection member 380 can be connected to the outer surface of the first enclosure 311.

According to another embodiment of the present disclosure, a vibration of the first enclosure 311 can be lost by the connection member 380 when being transferred to the interior material 130. Therefore, the connection member 380 can include a material for transferring a vibration of the sound generating module 330 and/or the first enclosure 311 to the interior material 130 without the loss of a vibration. The connection member 380 can include a material which can contract based on a shape of the interior material 130. For example, the connection member 380 can include a material such as rubber or the like. The connection member 380 can include high-elastic rubber or the like, but embodiments of the present disclosure are not limited thereto. For example, the connection member 380 can include a rubber material, or can include ethylene propylene diene rubber (or ethylene propylene diene M-class rubber), ethylene propylene rubber, or urethane rubber, but embodiments of the present disclosure are not limited thereto.

The sound apparatus 30 according to another embodiment of the present disclosure can further include the coupling member 320 or the first coupling member 321. The first coupling member 321 can be between the vibration member 331 and the first enclosure 311. A description of the first coupling member 321 can be substantially a same as the description of FIGS. 3 and 4, and thus, like reference numerals refer to like elements and repeated descriptions are omitted or will be briefly given below.

The connection member 380 can include a material which differs from that of the first coupling member 321. For example, the connection member 380 can include a material having elasticity (or a Young's modulus) which is higher than that of the first coupling member 321. For example, the connection member 380 can include a material having an adhesive force which differs from that of the first coupling member 321. For example, the connection member 380 can include a single-sided adhesive, a single-sided tape, a single-sided adhesive tape, a single-sided foam tape, a single-sided adhesive foam tape, a single-sided pad, a single-sided foam pad, a single-sided adhesive foam pad, or a single-sided cushion member, or the like, but embodiments of the present disclosure are not limited thereto. For example, the first coupling member 321 can include an adhesive, a double-sided adhesive, a double-sided tape, a double-sided adhesive tape, a double-sided foam tape, a double-sided adhesive foam tape, a double-sided pad, a double-sided foam pad, a double-sided adhesive foam pad, or a double-sided cushion member, or the like, but embodiments of the present disclosure are not limited thereto.

According to another embodiment of the present disclosure, because the connection member 380 includes a material having an adhesive force which differs from that of the first coupling member 321, a separation or detachment process (or rework) of the connection member 380 from the vehicle interior material 130 can be easily performed in a separation or detachment process (or rework) of the sound apparatus 30 attached on the vehicle interior material 130. Accordingly, a process of attaching or mounting the sound apparatus 30 on the vehicle interior material 130 or a process of separating or attaching/detaching the sound apparatus 30 from the vehicle interior material 130 can be easily performed.

According to another embodiment of the present disclosure, each of the connection member 380 and the first coupling member 321 can be substantially a same as the above descriptions of FIGS. 25A to 25C, and thus, like reference numerals refer to like elements and repeated descriptions are omitted or will be briefly given.

According to another embodiment of the present disclosure, a thickness T1 of the connection member 380 can differ from that of a thickness of the first coupling member 321. For example, the thickness T1 of the connection member 380 can be thicker than that of the thickness of the first coupling member 321. The thickness T1 of the connection member 380 can be 0.5 mm or more, but embodiments of the present disclosure are not limited thereto. For example, the thickness T1 of the connection member 380 can be 0.5 mm to 3 mm, but embodiments of the present disclosure are not limited thereto. A sound output characteristic based on the thickness T1 of the connection member 380 will be described below with reference to FIG. 67.

According to another embodiment of the present disclosure, because the sound apparatus 30 includes the first enclosure 311 and the connection member 380, a sound characteristic and/or a sound pressure level characteristic of each of a low-pitched sound band and a middle-pitched sound band can be further enhanced, a sound reproduction band can expand, and an attachment or detachment process of the sound generating module 330 attached on the vehicle interior material 130 can be easily performed.

According to another embodiment of the present disclosure, the connection member 380 can be configured in a material such as rubber between the vehicle interior material 130 and the enclosure (or the first enclosure) 311, and thus, a vibration of the sound generating module 330 and/or the enclosure (or the first enclosure) 311 can be transferred to the vehicle interior material 130 without being lost, thereby further enhancing a sound characteristic and/or a sound pressure level characteristic of the sound apparatus 30.

Figure 32:
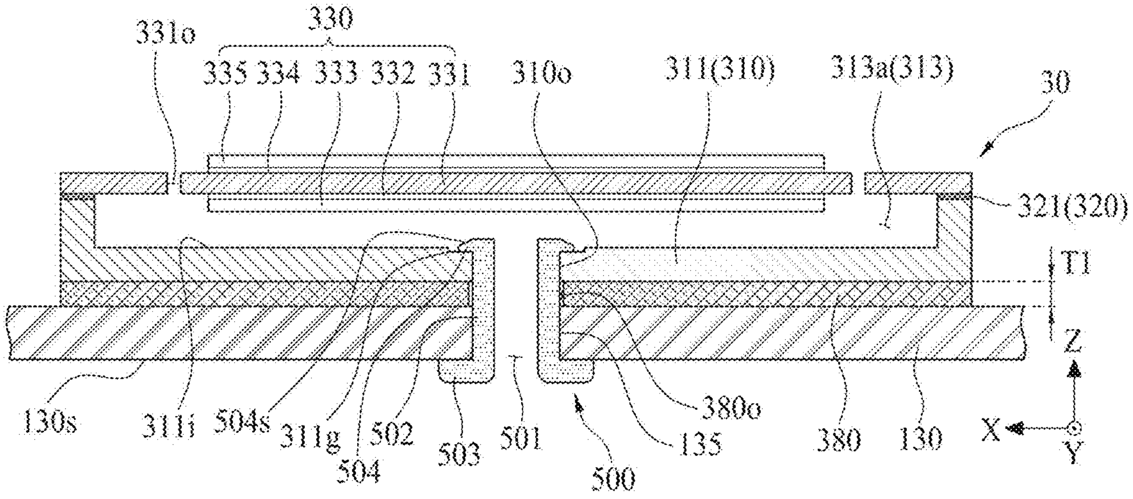
FIG. 32 illustrates a sound apparatus according to another embodiment of the present disclosure.

FIG. 32 illustrates a sound apparatus according to another embodiment of the present disclosure. FIG. 32 illustrates an embodiment where at least one or more holes are additionally configured in the sound apparatus 30 described above with reference to FIG. 31. In the following description, therefore, the at least one or more holes will be described in detail, the other elements can be substantially a same as that of descriptions described above with reference to FIGS. 1 to 31, and thus, like reference numerals refer to like elements and repeated descriptions can be omitted or will be briefly given below.

With reference to FIG. 32, a sound apparatus 30 according to another embodiment of the present disclosure can further include at least one or more holes 331*o*. The at least one or more holes 331*o* can be configured at a vibration member 331. A description of the at least one or more holes 331*o* can be substantially a same as the description of FIGS. 26 and 30, and thus, like reference numerals refer to like elements and repeated descriptions are omitted or will be briefly given below.

According to another embodiment of the present disclosure, the sound apparatus 30 can include a first enclosure 311 and the at least one or more holes 331*o*, or can include the first enclosure 311. When the sound apparatus 30 includes the first enclosure 311 and the at least one or more holes 331*o*, a sound characteristic and/or a sound pressure level characteristic of each of a low-pitched sound band and a middle-pitched sound band can be further enhanced, and a sound reproduction band can expand. When the sound apparatus 30 includes the first enclosure 311, a sound characteristic and/or a sound pressure level characteristic of a middle-low-pitched sound band can be further enhanced, and a sound reproduction band can expand.

The sound apparatus 30 according to another embodiment of the present disclosure can further include the coupling member 320 or the first coupling member 321. The first coupling member 321 can be between the vibration member 331 and the first enclosure 311. A description of the first coupling member 321 can be substantially a same as the description of FIGS. 3 and 4, and thus, like reference numerals refer to like elements and repeated descriptions are omitted or will be briefly given below.

According to another embodiment of the present disclosure, the sound apparatus 30 can further include a connection member 380.

The connection member 380 according to another embodiment of the present disclosure can be configured between the first enclosure 311 and the vehicle interior material 130. For example, the connection member 380 can include a material which differs from that of the first coupling member 321. For example, the connection member 380 can include a material having high elasticity (or a Young's modulus). For example, the connection member 380 can include a material having an adhesive force which differs from that of the first coupling member 321. Because the connection member 380 includes a material having an adhesive force which differs from that of the first coupling member 321, a separation or detachment process (or rework) of the connection member 380 from the vehicle interior material 130 can be easily performed in a separation or detachment process (or rework) of the sound apparatus 30 attached on the vehicle interior material 130. Accordingly, a process of attaching or mounting the sound apparatus 30 on the vehicle interior material 130 or a process of separating or attaching/detaching the sound apparatus 30 from the vehicle interior material 130 can be easily performed.

According to another embodiment of the present disclosure, each of the connection member 380 and the first coupling member 321 can be substantially a same as the above descriptions of FIGS. 25A to 25C, and thus, like reference numerals refer to like elements and repeated descriptions are omitted or will be briefly given.

According to another embodiment of the present disclosure, a thickness T1 of the connection member 380 can differ from that of a thickness of the first coupling member 321. For example, the thickness T1 of the connection member 380 can be thicker than that of the thickness of the first coupling member 321. The thickness T1 of the connection member 380 can be 0.5 mm or more, but embodiments of the present disclosure are not limited thereto. For example, the thickness T1 of the connection member 380 can be 0.5 mm to 3 mm, but embodiments of the present disclosure are not limited thereto.

According to another embodiment of the present disclosure, because the sound apparatus 30 includes the first enclosure 311 and the connection member 380, a sound characteristic and/or a sound pressure level characteristic of each of a low-pitched sound band and a middle-pitched sound band can be further enhanced, a sound reproduction band can expand, and an attachment or detachment process of the sound generating module 330 attached on the vehicle interior material 130 can be easily performed.

According to another embodiment of the present disclosure, because the sound apparatus 30 includes at least one or more of the first enclosure 311, the at least one or more holes 331*o*, and the connection member 380, a sound characteristic and/or a sound pressure level characteristic of each of a low-pitched sound band and a middle-pitched sound band can be further enhanced, a sound reproduction band can expand, and an attachment or detachment process of the sound generating module 330 attached on the vehicle interior material 130 can be easily performed.

According to another embodiment of the present disclosure, the connection member 380 can be configured in a material such as rubber between the vehicle interior material 130 and the enclosure (or the first enclosure) 311, and thus, a vibration of the sound generating module 330 and/or the enclosure (or the first enclosure) 311 can be transferred to the vehicle interior material 130 without being lost, thereby further enhancing a sound characteristic and/or a sound pressure level characteristic of the sound apparatus 30.

With reference to FIGS. 31 and 32, in various embodiments of the present disclosure, the sound apparatus can have a partial second enclosure 312. For example, the partial second enclosure 312 can include a vertical side wall but can be without a horizontal top so that the vertical sidewall of the partial second enclosure 312 protrudes from the sound generating module 330. In other embodiments of the present disclosure, the partial second enclosure 312 can have the vertical sidewall and a horizontal extension connected to the vertical sidewall so that the partial second enclosure 312 partially exposes the sound generating module 330. The presence of the partial second enclosure 312 can protect the sound generating module 330 while still exposing the sound generating module 330. In various embodiment of the present disclosure, the partial second enclosure 312 can include a hole similar to that of the opening portion 3100 of the first enclosure 311. The location of the hole of the partial second 312 can be at the horizontal extension or the vertical side wall.

Figure 33:
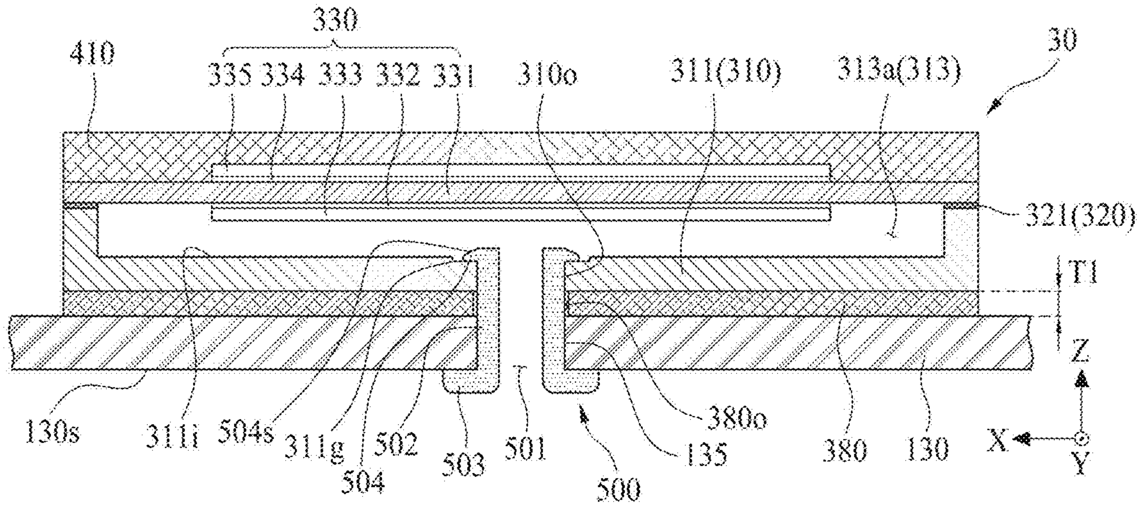
FIG. 33 illustrates a sound apparatus according to another embodiment of the present disclosure.

FIG. 33 illustrates a sound apparatus according to another embodiment of the present disclosure. FIG. 33 illustrates an embodiment where a protection member is additionally configured in the sound apparatus 30 described above with reference to FIG. 31. In the following description, therefore, the protection member will be described in detail, the other elements can be substantially a same as that of descriptions described above with reference to FIGS. 1 to 31, and thus, like reference numerals refer to like elements and repeated descriptions can be omitted or will be briefly given below.

With reference to FIG. 33, the sound apparatus 30 according to an embodiment of the present disclosure can further include a protection member 410.

The protection member 410 according to an embodiment of the present disclosure can be disposed at a sound generating module 330. For example, the protection member 410 can cover the at the sound generating module 330. For example, the protection member 410 can be disposed at a second vibration apparatus 335. For example, the protection member 410 can cover the second vibration apparatus 335.

According to an embodiment of the present disclosure, the protection member 410 can include rubber or sponge, or the like, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the protection member 410 can include rubber, or can be configured in ethylene propylene diene rubber, ethylene propylene rubber, or urethane rubber. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 $kg/cm^2$ to 200 $kg/cm^2$, but embodiments of the present disclosure are not limited thereto. For example, a minimum elongation rate of the EPDM can be 200%, but embodiments of the present disclosure are not limited thereto. For example, a use temperature of the EPDM can be −30° C. to 110° C., but embodiments of the present disclosure are not limited thereto. For example, the protection member 410 can be configured in high elastic rubber or low elastic rubber, but embodiments of the present disclosure are not limited thereto. For example, a thickness of the protection member 410 can be 0.5 mm to 2 mm, but embodiments of the present disclosure are not limited thereto.

According to an embodiment of the present disclosure, because the protection member 410 is configured at the sound generating module 330, a sound characteristic and/or a sound pressure level characteristic of a low-pitched sound band can be more complemented, and the sound apparatus 30 can be protected. For example, the protection member 410 can be a sealing member, an encapsulation member, a buffer member, or an impact absorption member, but embodiments of the present disclosure are not limited thereto.

According to an embodiment of the present disclosure, the protection member 410 can include a material which differs from that of the first coupling member 321. For example, the protection member 410 can include a material having an adhesive force which differs from that of the first coupling member 321. The protection member 410 can include a material having an adhesive force which differs from that of at least one of the first coupling member 321 and the second coupling member 322, and thus, the protection member 410 can protect the sound apparatus 30. For example, the protection member 410 can include rubber such as EPDM, and thus, can reinforce a sound pressure level of the low-pitched sound band and can protect the sound apparatus 30.

According to an embodiment of the present disclosure, the protection member 410 can be connected or coupled to the vibration member 331 and/or the vibration apparatus 330. The protection member 410 can be connected or coupled to the vibration member 331 and/or the second vibration apparatus 335. For example, the protection member 410 can be configured to protect or fix the vibration member 331 and/or the vibration apparatus 330. The protection member 410 can be fixed to the vibration member 331 and/or the second vibration apparatus 335 to protect the vibration member 331 and/or the second vibration apparatus 335.

The vibration member 331 can include a first surface and a second surface which differs from (or opposite to) the first surface. For example, the enclosure 310 can be connected or coupled to the first surface of the vibration member 331. The protection member 410 can contact the second surface of the vibration member 331 and the second vibration apparatus 335. For example, the protection member 410 can be configured to cover the second surface of the vibration member 331 and the second vibration apparatus 335.

The protection member 410 can have the same size as that of the vibration member 331, but embodiments of the present disclosure are not limited thereto. For example, the protection member 410 can have a size which is greater than that of the vibration apparatus 333 and 335 and is smaller than that of the vibration member 331, but embodiments of the present disclosure are not limited thereto.

According to another embodiment of the present disclosure, because the sound apparatus 30 includes at least one or more of the first enclosure 311, the connection member 380, and the protection member 410, a sound characteristic and/or a sound pressure level characteristic of each of the low-pitched sound band and a middle-pitched sound band can be further enhanced, a sound reproduction band can expand, and the sound apparatus 30 can be protected from an external impact.

Figure 34:
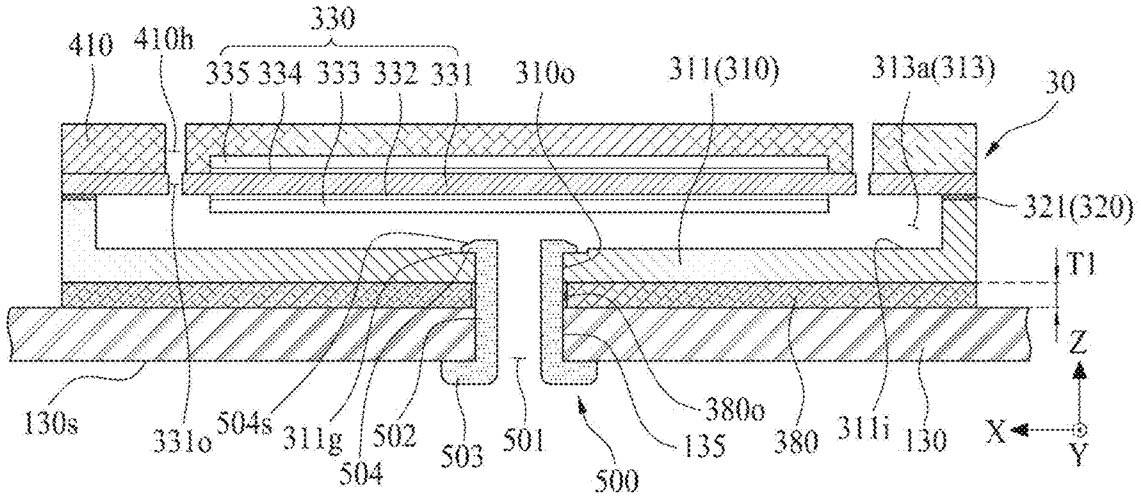
FIG. 34 illustrates a sound apparatus according to another embodiment of the present disclosure.

FIG. 34 illustrates a sound apparatus according to another embodiment of the present disclosure. Particularly, FIG. 34 illustrates an embodiment where at least one or more holes are additionally configured in the protection member 410 described above with reference to FIG. 33. In the following description, therefore, the at least one or more holes will be described in detail, the other elements can be substantially a same as that of descriptions described above with reference to FIGS. 1 to 33, and thus, like reference numerals refer to like elements and repeated descriptions can be omitted or will be briefly given below.

With reference to FIG. 34, the sound apparatus 30 according to another embodiment of the present disclosure can further include at least one or more holes 331*o*. The at least one or more holes 331*o* can be configured at a vibration member 331. A description of the at least one or more holes 331*o* can be substantially a same as the description of FIGS. 26 and 30, and thus, like reference numerals refer to like elements and repeated descriptions are omitted or will be briefly given below.

The sound apparatus 30 according to another embodiment of the present disclosure can further include at least one hole (or connection hole) 410*h* at the protection member 410.

The at least one hole 410*h* of the protection member 410 can be configured to correspond to at least one or more holes 331*o* at the vibration member 331. For example, the at least one hole 410*h* of the protection member 410 can be connected to at least one or more holes 331*o* at the vibration member 331. For example, the at least one hole 410*h* can be a second hole, a vent hole, an air flow hole, a duct hole, a second connection hole, a second communication hole, or a second space connection portion, but embodiments of the present disclosure are not limited thereto.

According to another embodiment of the present disclosure, because the sound apparatus 30 includes at least one or more of a first enclosure 311, the at least one or more holes 331*o*, and the at least one hole 410*h* of the protection member 410, a sound characteristic and/or a sound pressure level characteristic of each of the low-pitched sound band and a middle-pitched sound band can be further enhanced, a sound reproduction band can expand.

The inventors have recognized that a sound characteristic is changed based on a structure of the coupling part 500. Therefore, the inventors have performed various research and experiments on the structure of the coupling part 500. Based on the extensive research and experiments, the inventors have invented a sound apparatus including the coupling part 500 for enhancing a sound characteristic and/or a sound pressure level characteristic and a vehicular apparatus including the sound apparatus. This will be described below.

Figure 35:
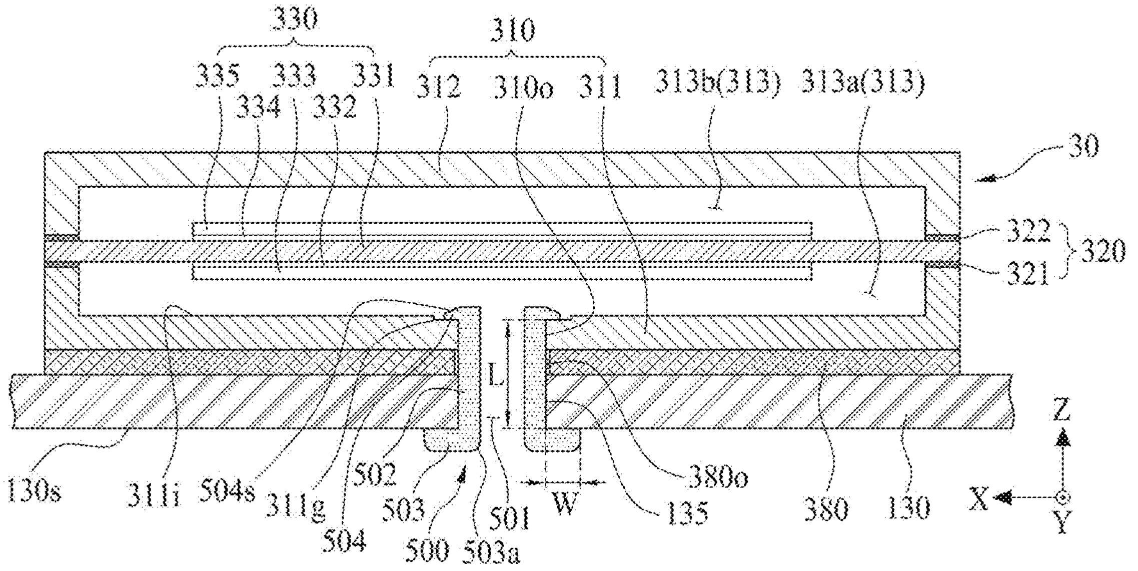
FIG. 35 illustrates a sound apparatus according to another embodiment of the present disclosure.
Figure 36:
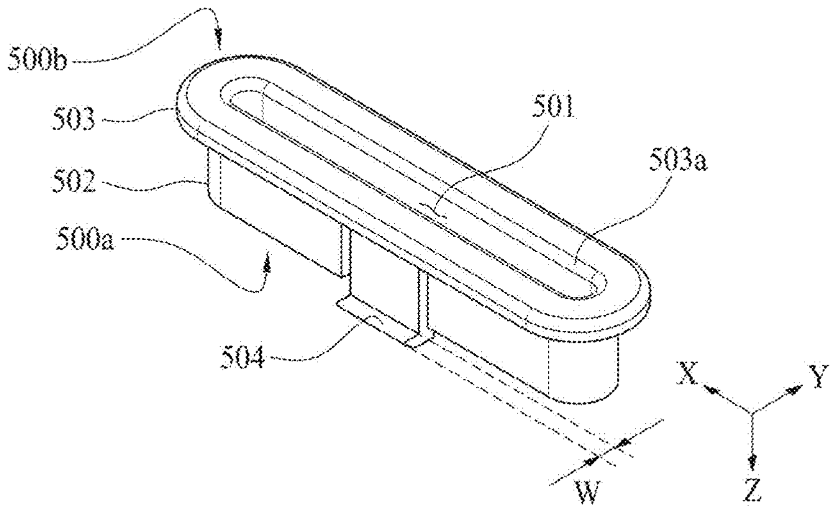
FIG. 36 illustrates a coupling part according to an embodiment of the present disclosure.

FIG. 35 illustrates a sound apparatus according to another embodiment of the present disclosure. FIG. 36 illustrates a coupling part according to another embodiment of the present disclosure.

With reference to FIG. 35, the sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the descriptions of FIGS. 11 to 24, and thus, like reference numerals refer to like elements and repeated descriptions are omitted or will be briefly given below.

The coupling part 500 can further include a chamfer portion 503*a*.

The coupling part 500 can include a hollow part 501 which is connected to an internal space 313 of an enclosure 310 and includes the chamfer portion 503*a*. The chamfer portion 503*a* can be configured at the hollow part 501. For example, the hollow part 501 can be connected to the internal space 313 of the enclosure 310 through an opening part 3100 of the enclosure 310.

The vehicle interior material 130 (or a mount object) can include a first surface and a second surface different from (or opposite to) the first surface. The first surface can be a surface facing the enclosure 310. The vehicle interior material 130 (or a mount object) can include a hole 135 configured at the first surface and the second surface. For example, the hole 135 of the vehicle interior material 130 can be configured to pass through the first surface and the second surface. For example, the latch member 503 can pass through the hole (or a through hole) 135 and can be coupled to the second surface (or an indoor surface or a rear surface) 130*s* of the vehicle interior material 130 (or the mount object). For example, the latch member 503 can include the chamfer portion 503*a*. For example, the latch member 503 can overlap the second surface 130*s* of the vehicle interior material 130 (or the mount object).

The chamfer portion 503*a* according to another embodiment of the present disclosure can include a non-rectangular shape (or a non-right-angled shape). For example, the chamfer portion 503*a* can include one or more of a curve shape (or a round shape) and a slope surface. For example, the chamfer portion 503*a* can have a curvature. A sound characteristic and/or a sound pressure level characteristic can be changed based on a curvature of the chamfer portion 503*a*. A sound output characteristic based on a curvature of the chamfer portion 503*a* will be described below with reference to FIGS. 68A to 68D. The chamfer portion 503*a* can be configured by a chamfer process, but embodiments of the present disclosure are not limited thereto.

With reference to FIG. 36, the coupling part 500 can include a first lateral portion (or a lower surface) 500*a* and a second lateral portion (or an upper surface) 500*b*. The second lateral portion 500*b* can be opposite to the first lateral portion 500*a*. For example, the chamfer portion 503*a* can be configured in a region between the second lateral portion 500*b* and the hollow part 501. For example, the chamfer portion 503*a* can be configured in a non-rectangular shape in a region between an inner surface (or an internal surface) of a hollow member 502 and an upper surface of the hook member 503. For example, the hollow part 501 can be connected to the internal space 313 through the opening part 3100 of the enclosure 310.

According to another embodiment of the present disclosure, the hollow part 501 can have a "1"-shape, but embodiments of the present disclosure are not limited thereto. The hollow part 501 can have a "1"-shape parallel to a short-side direction of the enclosure 310 or a second direction Y, but embodiments of the present disclosure are not limited thereto. For example, the hollow part 501 can have a slit shape including a short axis and a long axis, but embodiments of the present disclosure are not limited thereto. For example, the long axis of the hollow part 501 can be parallel to the short-side direction of the enclosure 310 or the second direction Y, but embodiments of the present disclosure are not limited thereto. For example, the short axis of the hollow part 501 can be parallel to a first direction X or a long-side direction of the enclosure 310, but embodiments of the present disclosure are not limited thereto. For example, the hollow part 501 can have a "*"-shape or a "+"-shape described above with reference to FIGS. 17 and 18, but embodiments of the present disclosure are not limited thereto. A shape of the chamfer portion 503*a* can be identically applied based on various shapes of the hollow part 501.

According to another embodiment of the present disclosure, the coupling part 500 can be configured to have a width W. For example, the coupling part 500 can include a latch member 503 having the width W. For example, the latch member 503 can be configured to have the width W. For example, the width W of the latch member 503 can be a length which extends from an outer surface (an outer circumference surface) of the hollow part 501 in a direction (or a first direction X) parallel to an interior material 130. For example, the width W of the latch member 503 can be a length which extends from a lower outer surface of the hollow member 502 in the direction (or the first direction X)

parallel to the interior material 130. The latch member 503 having the width W can overlap at least one of the interior material 130, a connection member 380, and an enclosure 310. For example, the width W of the latch member 503 can be a same as a short-side length of the hollow part 501. The width W of the latch member 503 or the short-side length of the hollow part 501 can be 1 mm or more, but embodiments of the present disclosure are not limited thereto. For example, the width W of the latch member 503 or the short-side length of the hollow part 501 can be 1 mm to 5 mm, but embodiments of the present disclosure are not limited thereto. A sound output characteristic based on the width W of the latch member 503 or the coupling part 500 will be described below with reference to FIGS. 69A to 69D.

According to another embodiment of the present disclosure, the coupling part 500 can be configured to have a length L. The length L of the coupling part 500 can be a length which enables the sound apparatus 30 to be provided at the vehicle interior material 130. For example, the length L of the coupling part 500 can be smaller than a sum of thicknesses of the vehicle interior material 130, the connection member 380, and the enclosure 310. With respect a thickness direction Z of the vehicle interior material 130, the length L of the coupling part 500 can correspond to a length of the hollow part 501. The length L of the coupling part 500 can correspond to a length between the latch member 503 and the hook member 504. For example, the length L of the coupling part 500 can be a length between an upper surface of the latch member 503 contacting the interior material 130 and a lower surface of the hook member 504 contacting the enclosure 310. The length L of the coupling part 500 can be 10 mm or more, but embodiments of the present disclosure are not limited thereto. For example, the length L of the coupling part 500 can be 10 mm or more and less than 19 mm, but embodiments of the present disclosure are not limited thereto. A sound output characteristic based on the length L of the coupling part 500 will be described below with reference to FIGS. 70A to 70D.

With reference to FIGS. 19 and 20 together, the enclosure 310 can include a protrusion part 315. For example, the protrusion part 315 can protrude from the enclosure 310 or the first enclosure 311 to surround the opening part 3100. For example, the protrusion part 315 can protrude from the rear surface (or outer surface) 311*r* of the first enclosure 311 or the enclosure 310 to surround the opening part 3100. Therefore, the protrusion part 315 can include a hollow hole (or a hole or an opening hole) 3150 connected to (or overlapped with) the opening part 3100. The hollow part 501 can be accommodated into the hollow hole 3150 of the protrusion part 315 and can connected (or coupled) to the internal space 313 through the hollow hole 3150 and the opening part 3100. For example, the hook member 504 can be accommodated or inserted into the opening part 3100 of the first enclosure 311 or the enclosure 310 through the vehicle interior material 130 (or mount object) and the protrusion part 315. The hook member 504 can be connected or coupled to an inner surface 311*i* of the first enclosure 311 or the enclosure 310. For example, the hook member 504 can be coupled (or connected) to a groove portion 311*g* of the enclosure 310 by a hook coupling scheme in the internal space 313 of the enclosure 310.

According to another embodiment of the present disclosure, the sound apparatus 30 can be configured to include one or more of a shape of the coupling part 500, the width W of the coupling part 500, and the length L of the coupling part 500, thereby providing the sound apparatus 30 where a sound characteristic and/or a sound pressure level characteristic are further enhanced.

FIGS. 37A to 37E illustrate a sound apparatus according to another embodiment of the present disclosure. Particularly, FIGS. 37A to 37E illustrate a shape of a chamfer portion 503*a* according to an embodiment of the present disclosure.

With reference to FIGS. 37A to 37E, the sound apparatus 30 according to another embodiment of the present disclosure can include an enclosure 310 and a sound generating module 330. Descriptions of the enclosure 310 and the sound generating module 330 can be substantially a same as the descriptions of FIGS. 3 to 10, and thus, like reference numerals refer to like elements and repeated descriptions are omitted or will be briefly given below.

The sound apparatus 30 according to another embodiment of the present disclosure can include a coupling part 500 connected to a vehicle interior material 130. A description of the coupling part 500 can be substantially a same as the descriptions of FIGS. 11 to 24 or the descriptions of FIGS. 35 and 36, and thus, like reference numerals refer to like elements and repeated descriptions are omitted or will be briefly given below.

Figure 37A:
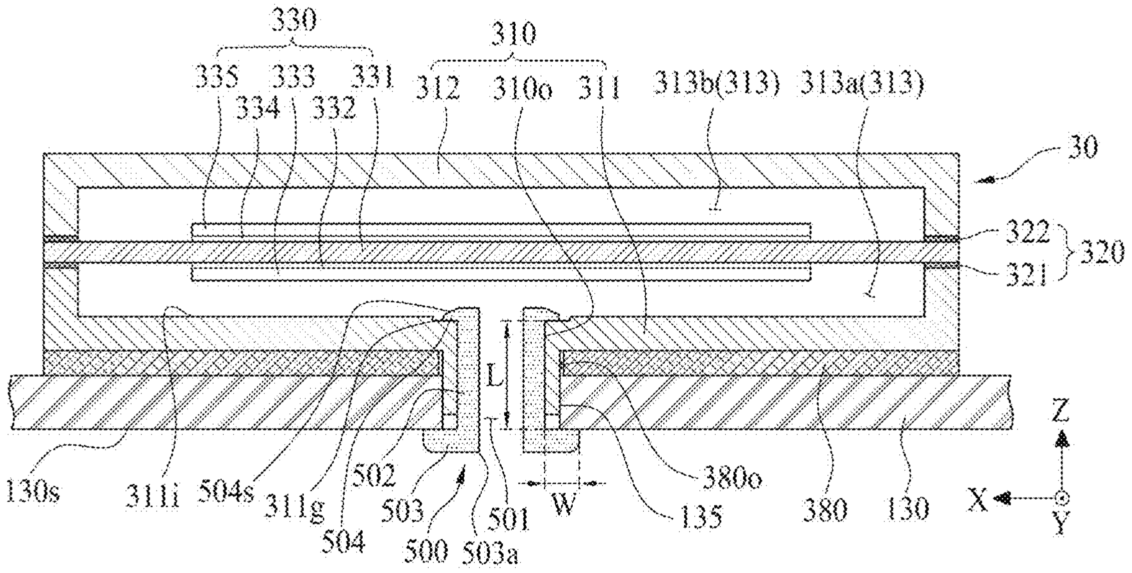
FIGS. 37A to 37E illustrate a sound apparatus according to another embodiment of the present disclosure.

With reference to FIG. 37A, the chamfer portion 503*a* according to an embodiment of the present disclosure can include a rectangular shape.

Figure 37B:
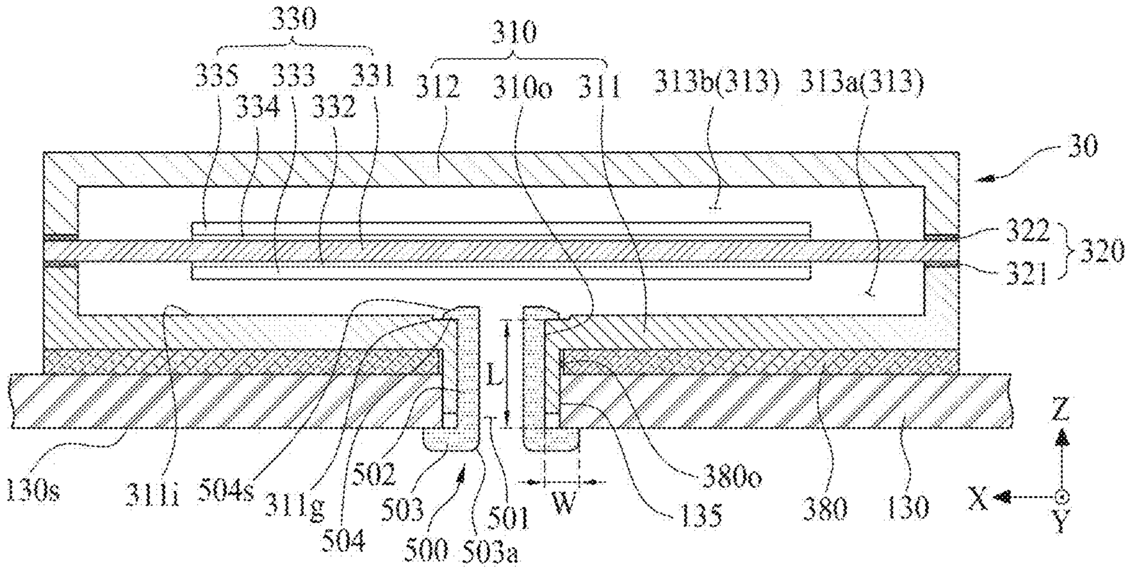
Figure 37C:
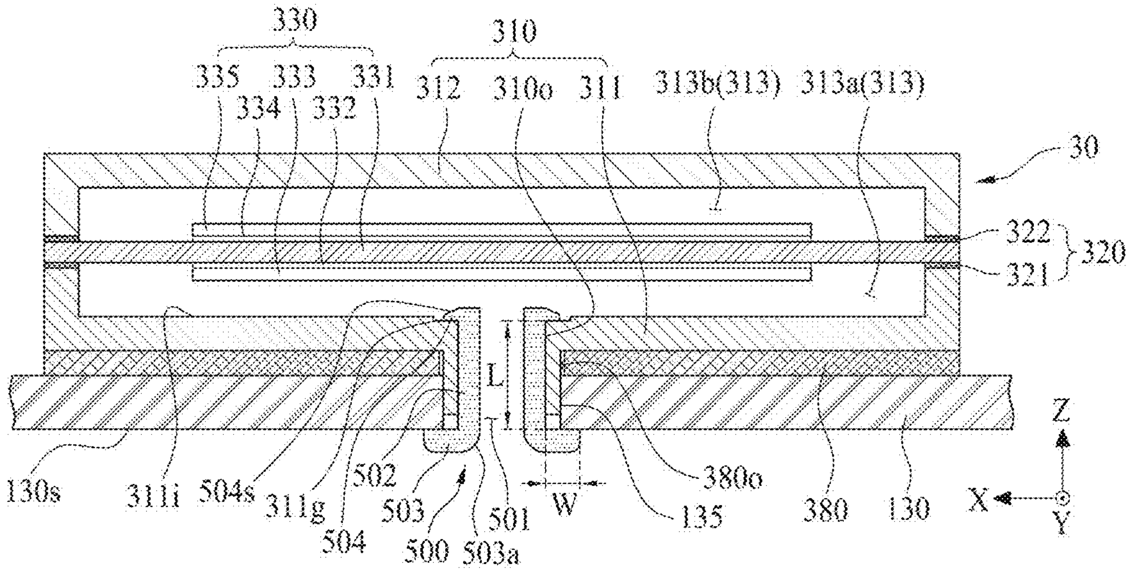
Figure 37D:
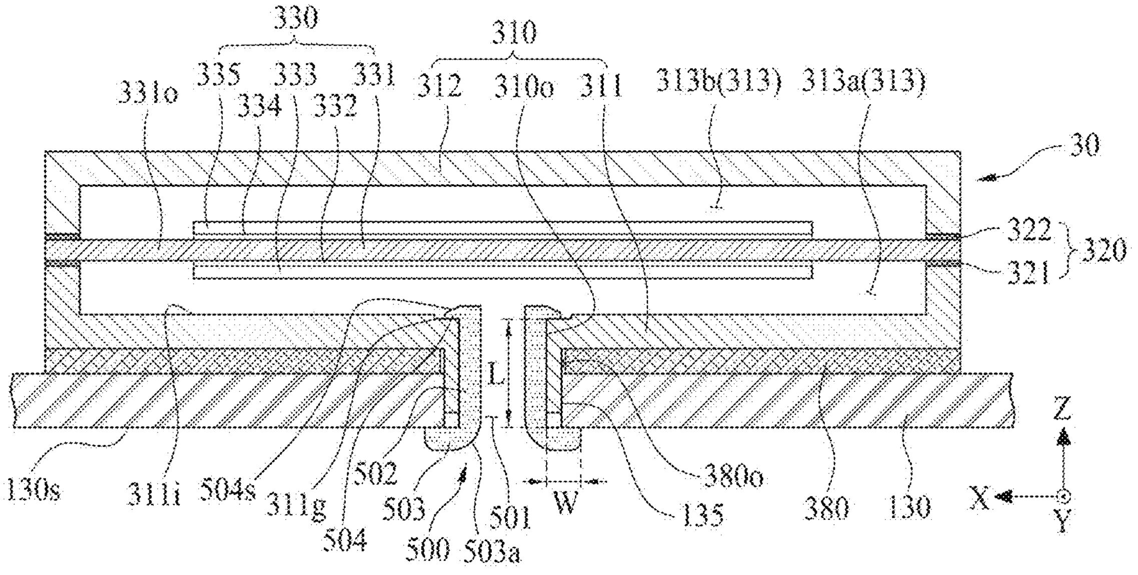
Figure 37E:
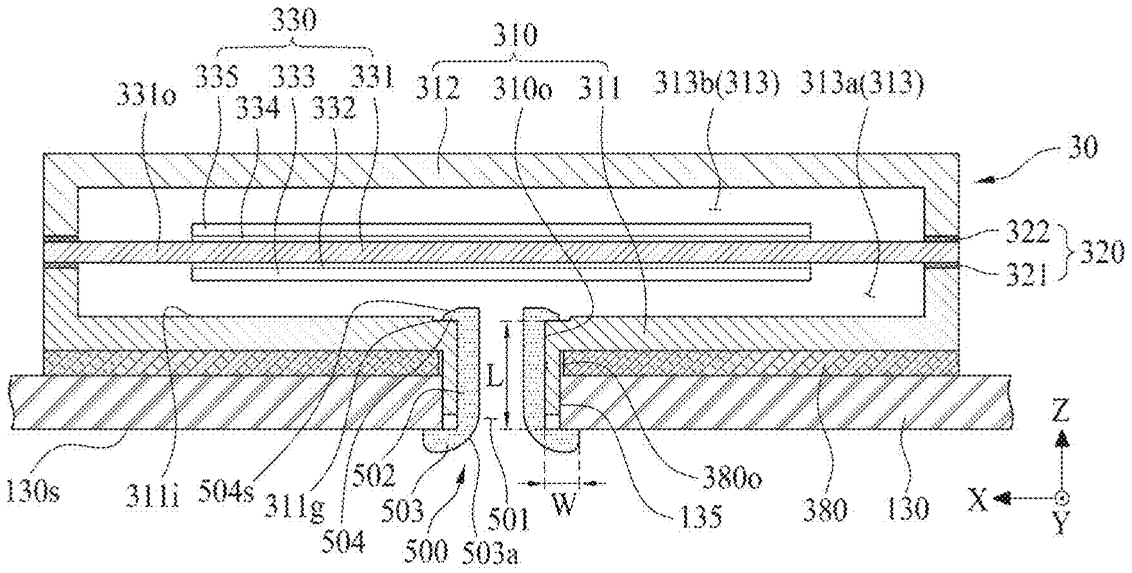

With reference to FIGS. 37B to 37E, the chamfer portion 503*a* according to an embodiment of the present disclosure can include a non-rectangular shape. For example, the chamfer portion 503*a* can include a round shape or a slope surface. In FIG. 37B, the chamfer portion 503*a* can have a curvature of 1R (or 1 mm). In FIG. 37C, the chamfer portion 503*a* can have a curvature of 2R (or 2 mm). In FIG. 37D, the chamfer portion 503*a* can have a curvature of 3R (or 3 mm). In FIG. 37E, the chamfer portion 503*a* can have a curvature of 4R (or 4 mm).

According to another embodiment of the present disclosure, because the coupling part 500 is configured to have a round shape or a slope surface, a sound apparatus 30 where a sound characteristic and/or a sound pressure level characteristic are further enhanced can be provided.

Figure 38:
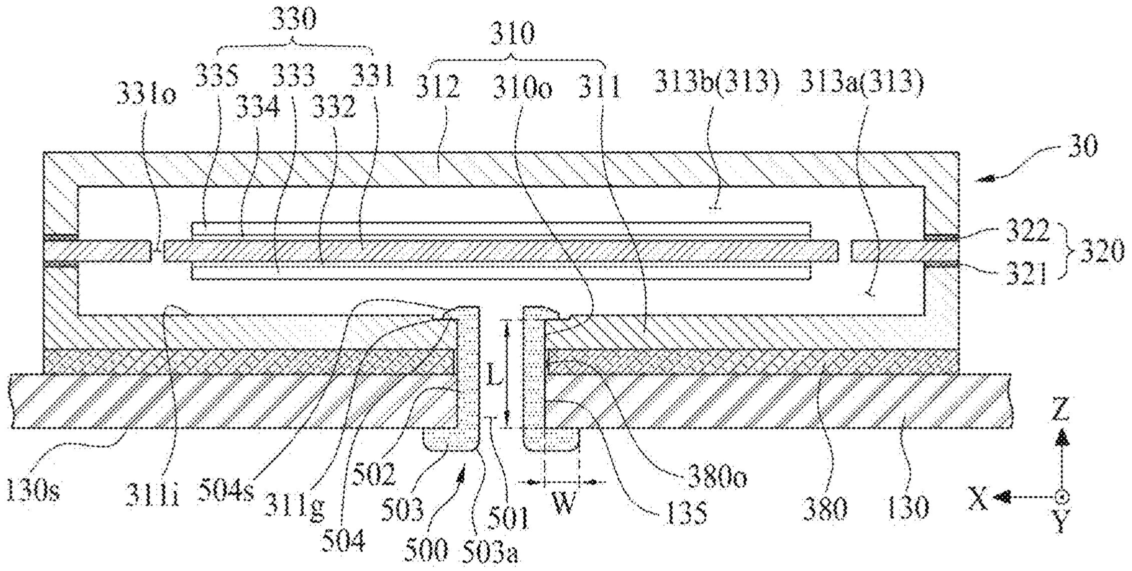
FIG. 38 illustrates a sound apparatus according to another embodiment of the present disclosure.

FIG. 38 illustrates a sound apparatus according to another embodiment of the present disclosure.

With reference to FIG. 38, the sound apparatus 30 according to another embodiment of the present disclosure can further include at least one or more holes 331*o*. For example, FIG. 38 illustrates an embodiment where at least one or more holes 331*o* is additionally configured in the sound apparatus 30 described above with reference to FIG. 35. A description of the at least one or more holes 331*o* can be substantially a same as the description of FIGS. 26 and 30, and thus, like reference numerals refer to like elements and repeated descriptions are omitted or will be briefly given below.

According to another embodiment of the present disclosure, the at least one or more holes 331*o* can be configured at a vibration member 331, and the sound apparatus 30 can be configured to include one or more of a shape of a coupling part 500, a width W of the coupling part 500, and a length L of the coupling part 500, a sound characteristic and/or a sound pressure level characteristic of a pitched sound band including a low-pitched sound band can be further enhanced.

Figure 39:
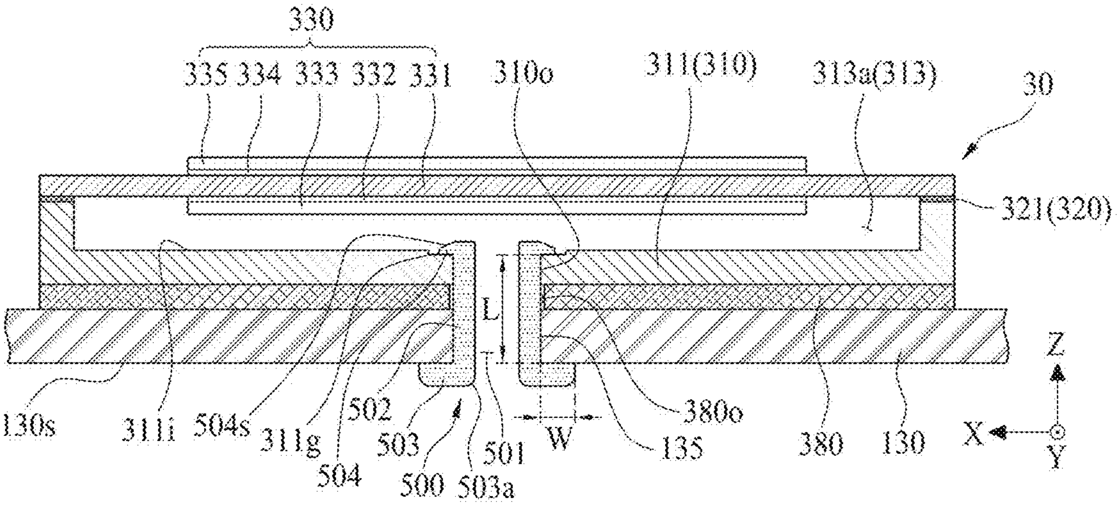
FIG. 39 illustrates a sound apparatus according to another embodiment of the present disclosure.

FIG. 39 illustrates a sound apparatus according to another embodiment of the present disclosure.

With reference to FIG. 39, the sound apparatus 30 according to another embodiment of the present disclosure can include a first enclosure 311.

For example, FIG. 39 illustrates an embodiment where the enclosure 310 is configured as a first enclosure 311 in the sound apparatus 30 described above with reference to FIG. 35. For example, the second enclosure 312 can be removed (or omitted) in the enclosure 310 described above with reference to FIG. 35, and thus, the enclosure 310 can be configured with only the first enclosure 311. For example, the enclosure 310 can be configured to be equal to the enclosure 310 described above with reference to FIG. 31. A description of the first enclosure 311 can be substantially a same as the description of FIG. 31, and thus, like reference numerals refer to like elements and repeated descriptions are omitted.

According to another embodiment of the present disclosure, the sound apparatus 30 can include the first enclosure 311 and can be configured to include one or more of a shape of a coupling part 500, a width W of the coupling part 500, and a length L of the coupling part 500, a sound characteristic and/or a sound pressure level characteristic of each of a low-pitched sound band and a middle-pitched sound band can be further enhanced, a sound reproduction band can further expand, and an attachment or detachment process of a sound generating module 330 attached on an interior material 130 can be easily performed.

Figure 40:
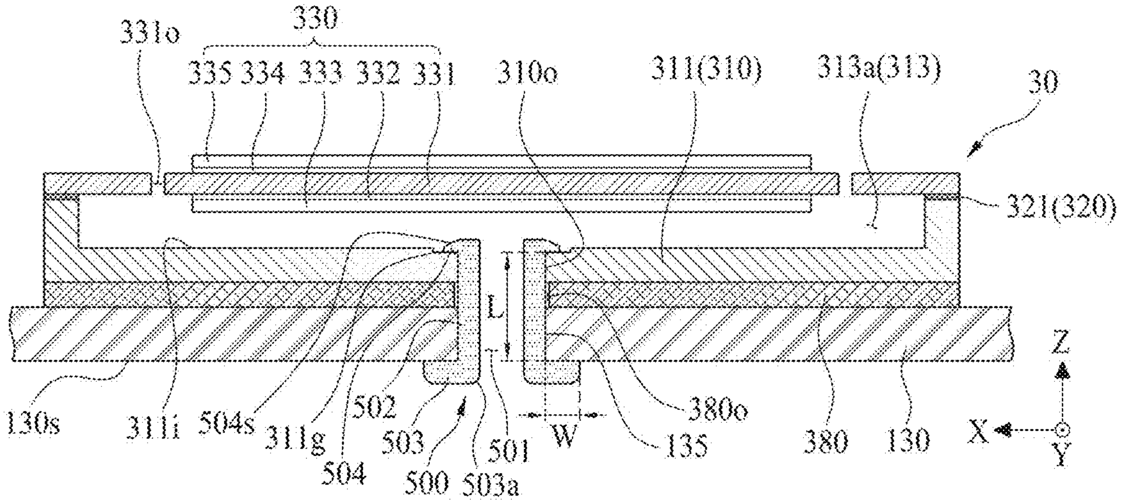
FIG. 40 illustrates a sound apparatus according to another embodiment of the present disclosure.

FIG. 40 illustrates a sound apparatus according to another embodiment of the present disclosure.

With reference to FIG. 40, the sound apparatus 30 according to another embodiment of the present disclosure can further include at least one or more holes 331*o*. For example, FIG. 38 illustrates an embodiment where at least one or more holes 331*o* is additionally configured in the sound apparatus 30 described above with reference to FIG. 35. A description of the at least one or more holes 331*o* can be substantially a same as the description of FIGS. 26 and 30, and thus, like reference numerals refer to like elements and repeated descriptions are omitted or will be briefly given below.

According to another embodiment of the present disclosure, the at least one or more holes 331*o* can be configured at a vibration member 331 and the sound apparatus 30 can include the first enclosure 311 and can be configured to include one or more of a shape of a coupling part 500, a width W of the coupling part 500, and a length L of the coupling part 500, a sound characteristic and/or a sound pressure level characteristic of each of a low-pitched sound band and a middle-pitched sound band can be further enhanced, a sound reproduction band can further expand, and an attachment or detachment process of a sound generating module 330 attached on an interior material 130 can be easily performed.

Figure 41:
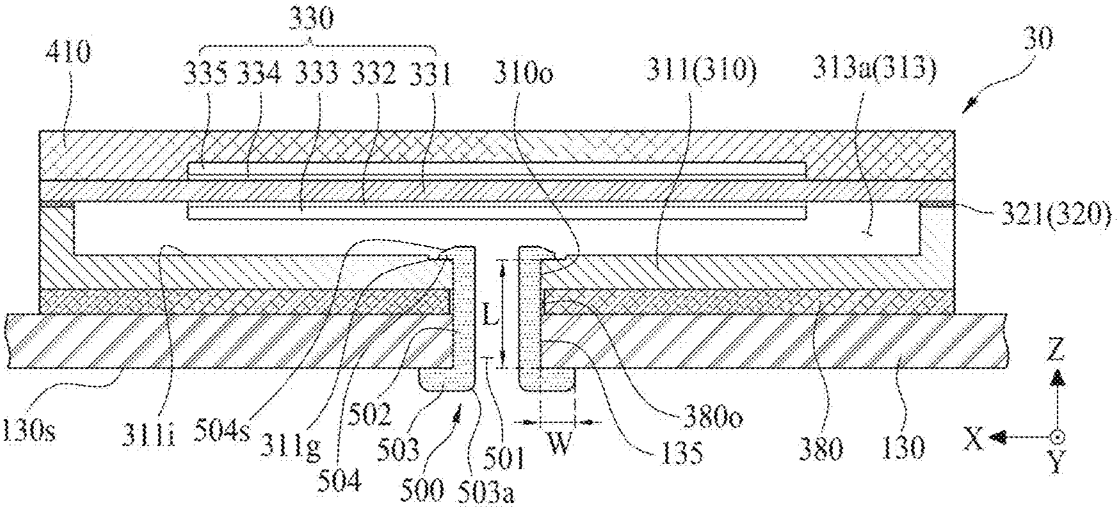
FIG. 41 illustrates a sound apparatus according to another embodiment of the present disclosure.

FIG. 41 illustrates a sound apparatus according to another embodiment of the present disclosure.

With reference to FIG. 41, the sound apparatus 30 according to another embodiment of the present disclosure can further include a protection member 410. For example, FIG. 41 illustrates an embodiment where the protection member 410 is additionally configured in the sound apparatus 30 described above with reference to FIG. 39. A description of the protection member 410 can be substantially a same as the description of FIG. 33, and thus, like reference numerals refer to like elements and repeated descriptions are omitted or will be briefly given below.

According to another embodiment of the present disclosure, the sound apparatus 30 can include at least one or more of the first enclosure 311 and the protection member 410 and can be configured to include one or more of a shape of a coupling part 500, a width W of the coupling part 500, and a length L of the coupling part 500, a sound characteristic and/or a sound pressure level characteristic of each of a low-pitched sound band and a middle-pitched sound band can be further enhanced, a sound reproduction band can further expand, and the sound apparatus 30 can be protected from an external impact.

Figure 42:
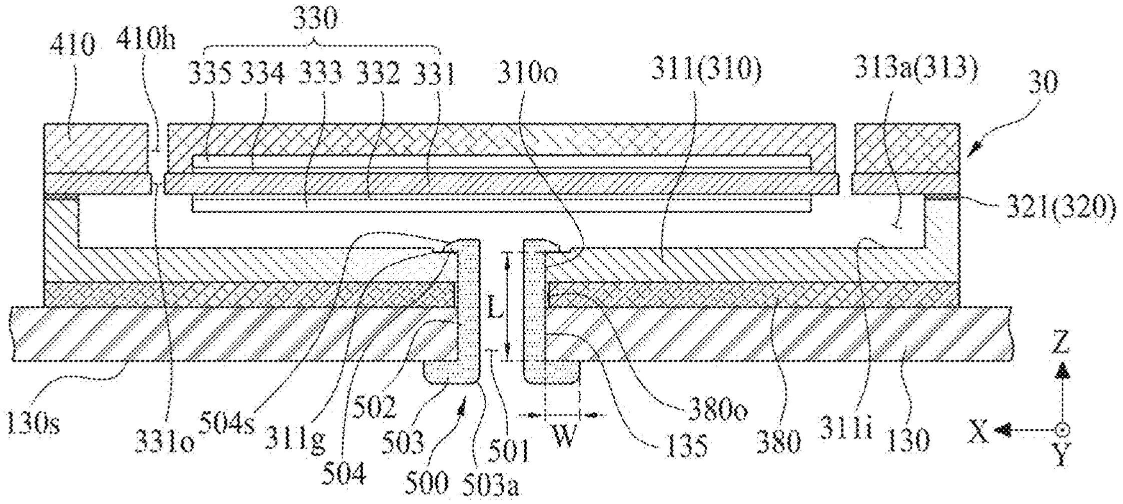
FIG. 42 illustrates a sound apparatus according to another embodiment of the present disclosure.

FIG. 42 illustrates a sound apparatus according to another embodiment of the present disclosure.

With reference to FIG. 42, the sound apparatus 30 according to another embodiment of the present disclosure can further include a hole 410*h* of a protection member 410. For example, FIG. 42 illustrates an embodiment where at least one hole 410*h* is additionally configured in protection member 410 of the sound apparatus 30 described above with reference to FIG. 41. A description of the hole 410*h* of the protection member 410 can be substantially a same as the description of FIG. 34, and thus, like reference numerals refer to like elements and repeated descriptions are omitted.

According to another embodiment of the present disclosure, the sound apparatus 30 can include at least one or more of the first enclosure 311, at least one or more holes 3310*o*, and at least one hole 410*h* of the protection member 410 and can be configured to include one or more of a shape of a coupling part 500, a width W of the coupling part 500, and a length L of the coupling part 500, a sound characteristic and/or a sound pressure level characteristic of each of a low-pitched sound band and a middle-pitched sound band can be further enhanced, a sound reproduction band can further expand.

Figure 43:
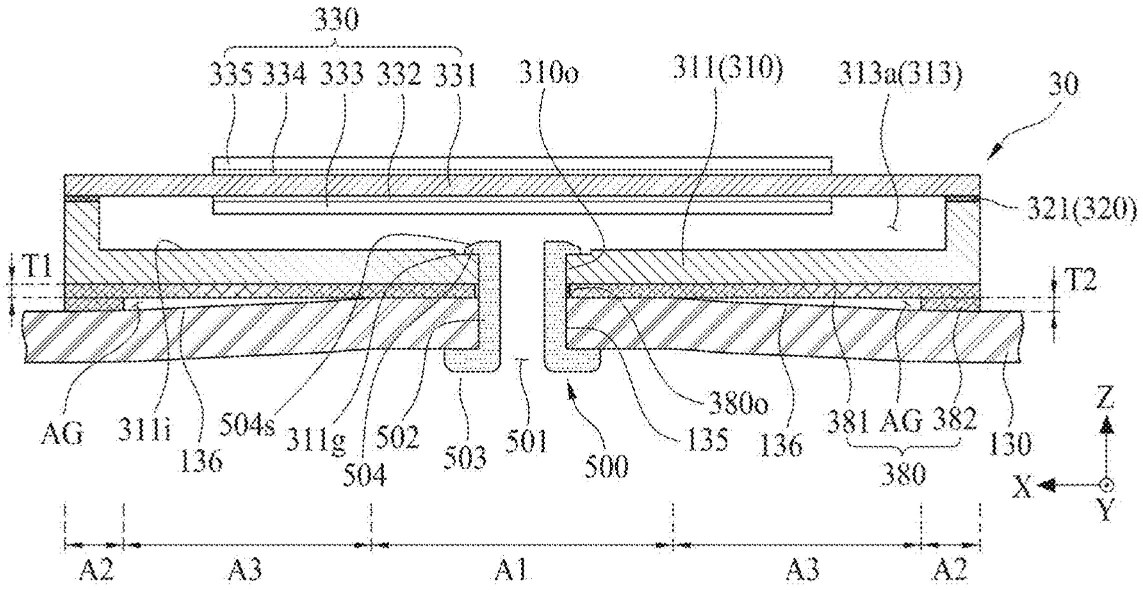
FIG. 43 illustrates a sound apparatus according to another embodiment of the present disclosure.

FIG. 43 illustrates a sound apparatus according to another embodiment of the present disclosure. Particularly, FIG. 43 illustrates another embodiment of the connection member 380 described above with reference to FIG. 25A. Therefore, in the following description, repeated descriptions of the other elements except the connection member 380 are omitted or will be briefly given below.

In a case where the connection member 380 of FIG. 25A is configured, the inventors of the present disclosure have recognized that a sound characteristic and/or a sound pressure level characteristic are/is reduced because a periphery portion of a connection member 380 is not connected to or does not contact a vehicle interior material 130. For example, the inventors of the present disclosure have recognized that the loss of a sound (or vibration transfer) occurs due to the periphery portion of the connection member 380 which is not connected to or does not contact the vehicle interior material 130. Therefore, the inventors of the present disclosure have recognized that a sound characteristic and/or a sound pressure level characteristic of a low-pitched sound band are/is reduced. Accordingly, the inventors have performed extensive research and experiments. Based on the extensive research and experiments, the inventors of the present disclosure have invented a sound apparatus and a vehicular apparatus including the same, which can further enhance a sound characteristic and/or a sound pressure level characteristic of the low-pitched sound band. This will be described below.

With reference to FIG. 43, a sound apparatus 30 according to another embodiment of the present disclosure can further include a connection member 380.

The connection member 380 can include a first portion and a second portion. The second portion can be a periphery portion of an enclosure 310. The second portion can be a portion (or a region) between the vehicle interior material 130 and the periphery portion of the enclosure 310. The first portion can be the other portion, except the periphery portion, of the enclosure 310. For example, the first portion can correspond to a center portion of the enclosure 310 surrounded by the second portion corresponding to the periphery portion of the enclosure 310.

According to an embodiment of the present disclosure, the first portion of the connection member 380 can include an opening hole 3800 connected to an internal space 313 of the enclosure 310. For example, the first portion of the connection member 380 can include an opening hole 3800 connected to an internal space 313 of a first enclosure 311.

According to an embodiment of the present disclosure, the enclosure 310 or the first enclosure 311 can include at least one or more regions. For example, the enclosure 310 or the first enclosure 311 can include a first region A1, a second region A2, and a third region A3.

The first region A1 can correspond to a center portion of the enclosure 310 or the first enclosure 311. The first region A1 can be at the center portion of the enclosure 310 or the first enclosure 311. The second region A2 can correspond to a periphery portion, surrounding the center portion, of the enclosure 310 or the first enclosure 311. The third region A3 can be between the first region A1 and the second region A2. For example, the first portion of the connection member 380 can be at the first region A1 and the third region A3. For example, the second portion of the connection member 380 can be at the second region A2.

According to an embodiment of the present disclosure, the first portion and the second portion of the connection member 380 can have different thicknesses. For example, the connection member 380 can include the first portion and the second portion having different thicknesses. In the connection member 380, a thickness T1 of the first portion can differ from a thickness "T1+T2" of the second portion. For example, in the connection member 380, the thickness "T1+T2" of the second portion can be thicker than the thickness T1 of the first portion. For example, the thickness T1 of the connection member 380 at the first region A1 can differ from the thickness "T1+T2" of the connection member 380 at the second region A2. At least one of thicknesses of the connection members 30 at each of the first and third regions A1 and A3 can differ from the thickness "T1+T2" of the connection member 380 at the second region A2. For example, the thickness "T1+T2" of the connection member 380 at the second region A2 can be thicker than the thickness T1 of the connection member 380 at the first region A1.

According to an embodiment of the present disclosure, the second portion of the connection member 380 can have a thickness "T1+T2" which is thicker than the first portion, and thus, the periphery portion of the connection member 380 can be connected to or contact the vehicle interior material 130 without being partially detached (or lifted). Therefore, the periphery portion of the connection member 380 can be prevented from being partially detached (or lifted) from the vehicle interior material 130, and a vibration at a periphery portion of the enclosure 310 can be transferred to the vehicle interior material 130 without the loss of a vibration (or vibration transfer) at the periphery portion of the enclosure 310. A vibration at the periphery portion of the enclosure 310 can increase a vibration region of the vehicle interior material 130, and thus, can further improve or reinforce a sound characteristic of a low-pitched sound band. Therefore, a sound generated from a vibration of the sound apparatus 30 can be transferred to the vehicle interior material 130 without being lost, and thus, a sound of the low-pitched sound band can be further enhanced. For example, a sound generated from a vibration of the sound apparatus 30 can be transferred to the vehicle interior material 130 through the opening part 3100 and the periphery portion of the enclosure 310, and thus, vibration efficiency transferred from the enclosure 310 to the vehicle interior material 130 can increase, thereby further enhancing a sound characteristic and/or a sound pressure level characteristic of the low-pitched sound band.

The connection member 380 according to an embodiment of the present disclosure can include a first connection member 381 and a second connection member 382.

The first connection member 381 can be at the first portion and the second portion. The first connection member 381 can be connected to the enclosure 310. The first connection member 381 can be connected to (or attached on) the first enclosure 311. The first connection member 381 can be connected to (or attached on) a rear surface of the first enclosure 311. The first connection member 381 can be connected to (or attached on) the first to third regions A1, A2, and A3 of the enclosure 310. For example, the first connection member 381 can be connected to (or attached on) the entire rear surface of the first enclosure 311.

According to an embodiment of the present disclosure, the first connection member 381 can include an opening hole 3800 which is at the first portion and is connected to an internal space 313 of the enclosure 310. For example, the first connection member 381 can include an opening hole 3800 which is at the first portion and is connected to the internal space 313 of the first enclosure 311.

The second connection member 382 can be at the second portion. The second connection member 382 can be connected to a portion of the first connection member 381. The second connection member 382 can be on the first connection member 381 at the second portion. For example, the first portion can include only the first connection member 381 of the first connection member 381 and the second connection member 382. The first connection member 381 and the second connection member 382 can be together at the second portion. For example, the second portion can include all of the first connection member 381 and the second connection member 382. For example, the first connection member 381 and the second connection member 382 can be together at the second region A2.

The first portion and the second portion of the connection member 380 can have different widths (or sizes). In the connection member 380, a width of the first portion can be smaller than that of the second portion. For example, widths of the connection member 380 at the first regions A1 and the third regions A3 can be smaller than a width of the connection member 380 at the second regions A2. Accordingly, the connection member 380 can include the first portion and the second portion having different sizes (or widths) and different thicknesses.

The second connection member 382 can be at a periphery of the first connection member 381. The second connection member 382 can be configured to be stacked on the first connection member 381, at the second portion. The second connection member 382 can be configured to be stacked on the first connection member 381, at the second region A2. Accordingly, the thickness "T1+T2" of the second portion of the connection member 380 can be thicker than the thickness T1 of the first portion, and thus, the periphery portion of the enclosure 310 can be connected to (or contact) the vehicle interior material 130 without being partially detached (or lifted). For example, the second connection member 382 can be a cushion member or a pad member, but embodiments of the present disclosure are not limited thereto.

The first connection member 381 can be substantially a same as the connection member 380 described above with reference to FIGS. 25A to 25C and 31 to 43. Accordingly, descriptions of the first connection member 381 can be substantially a same as the descriptions of FIGS. 25A to 25C and 31 to 43, and thus, like reference numerals refer to like elements and repeated descriptions are omitted or will be briefly given below.

The second connection member 382 can include a same material (or substance) as that of the first connection member 381, but embodiments of the present disclosure are not limited thereto. For example, one of the first connection member 381 and the second connection member 382 can include a material which is a relatively high elasticity (or Young's modulus). One of the first connection member 381 and the second connection member 382 can be configured in high elastic rubber, but embodiments of the present disclosure are not limited thereto. One of the first connection member 381 and the second connection member 382 can have a material which is a relatively high elasticity (or Young's modulus) and can include a material which is relatively high in tensile strength. For example, one of the first connection member 381 and the second connection member 382 can include a rubber material, or can include ethylene propylene diene rubber (or ethylene propylene diene M-class rubber), ethylene propylene rubber, or urethane rubber. For example, the ethylene propylene rubber can be ethylene propylene diene monomer (EPDM), but embodiments of the present disclosure are not limited thereto. For example, a hardness of the EPDM can be 40 to 90, but embodiments of the present disclosure are not limited thereto. For example, a tensile strength of the EPDM can be 50 kg/cm$^2$ to 200 kg/cm$^2$, but embodiments of the present disclosure are not limited thereto. For example, a minimum elongation rate of the EPDM can be 200%, but embodiments of the present disclosure are not limited thereto. For example, a use temperature of the EPDM can be −30° C. to 110° C., but embodiments of the present disclosure are not limited thereto.

According to an embodiment of the present disclosure, a coupling member 320 can include a material which differs from that of the connection member 380. For example, one of the first connection member 381 and the second connection member 382 can include a material having elasticity (or a Young's modulus) which is higher than that of the coupling member 320.

According to an embodiment of the present disclosure, a width of the connection member 380 at the second portion can be greater than that of a width of the coupling member 320. For example, the width of the connection member 380 at the second region A2 can be greater than that of the width of the coupling member 320.

According to an embodiment of the present disclosure, each of the first connection member 381 and the second connection member 382 of the connection member 380 can have a compressive force (or contractive force) and an elastic restoring force and can be contracted or compressed by coupling between the coupling part 500 and the first enclosure 311. For example, the first connection member 381 disposed (or interposed) between the first enclosure 311 and the vehicle interior material 130 can have a first thickness T1 obtained through compression by a pressing force of the first enclosure 311. The second connection member 382 disposed (or interposed) between the first enclosure 311 and the vehicle interior material 130 can have a second thickness T2 obtained through compression by a pressing force of the first enclosure 311.

The first thickness T1 of the first connection member 381 can be equal to or different from the second thickness T2 of the second connection member 382. The first thickness T1 of the first connection member 381 and the second thickness T2 of the second connection member 382 can each be 0.5 mm or more, but embodiments of the present disclosure are not limited thereto. For example, the first thickness T1 of the first connection member 381 and the second thickness T2 of the second connection member 382 can each be 0.5 mm to 3 mm, but embodiments of the present disclosure are not limited thereto.

The sound apparatus 30 according to another embodiment of the present disclosure can further include an air gap AG at a region between the enclosure 310 and the vehicle interior material 130. For example, the air gap AG can be at a region between the vehicle interior material 130 and the first portion of the connection member 380 or a region between the first portion and the second portion of the connection member 380. For example, the air gap AG can be at the third region A3 between the first region A1 and the second region A2 of the enclosure 310. For example, the air gap AG can be at a region between the third region A3 of the enclosure 310 and the vehicle interior material 130. For example, the air gap AG can be provided at the third region A3 between the first region A1 and the second region A2 of the enclosure 310, and thus, can minimize separation or interference between a vibration of the first region A1 and a vibration of the second region A2, thereby increasing a vibration force (or the amount of vibration) transferred from the second region A2 (for example, the periphery portion) of the enclosure 310 to the vehicle interior material 130. Accordingly, a band (a reproduction band) of a low-pitched sound band can expand, and thus, a sound characteristic and/or a sound pressure level characteristic of the low-pitched sound band can be further improved.

According to an embodiment of the present disclosure, the connection member 380 including the first and second portions having different thicknesses can be configured, thereby providing the sound apparatus 30 where a sound characteristic and/or a sound pressure level characteristic of the low-pitched sound band are/is further enhanced. According to an embodiment of the present disclosure, because the second connection member 382 is configured, a vibration area (or a vibration region) of a roof trim of a vehicular apparatus can be widened when coupling the sound apparatus 30 to the roof trim of the vehicular apparatus, and thus, a sound characteristic and/or a sound pressure level characteristic of the low-pitched sound band can be further enhanced.

Figure 44:
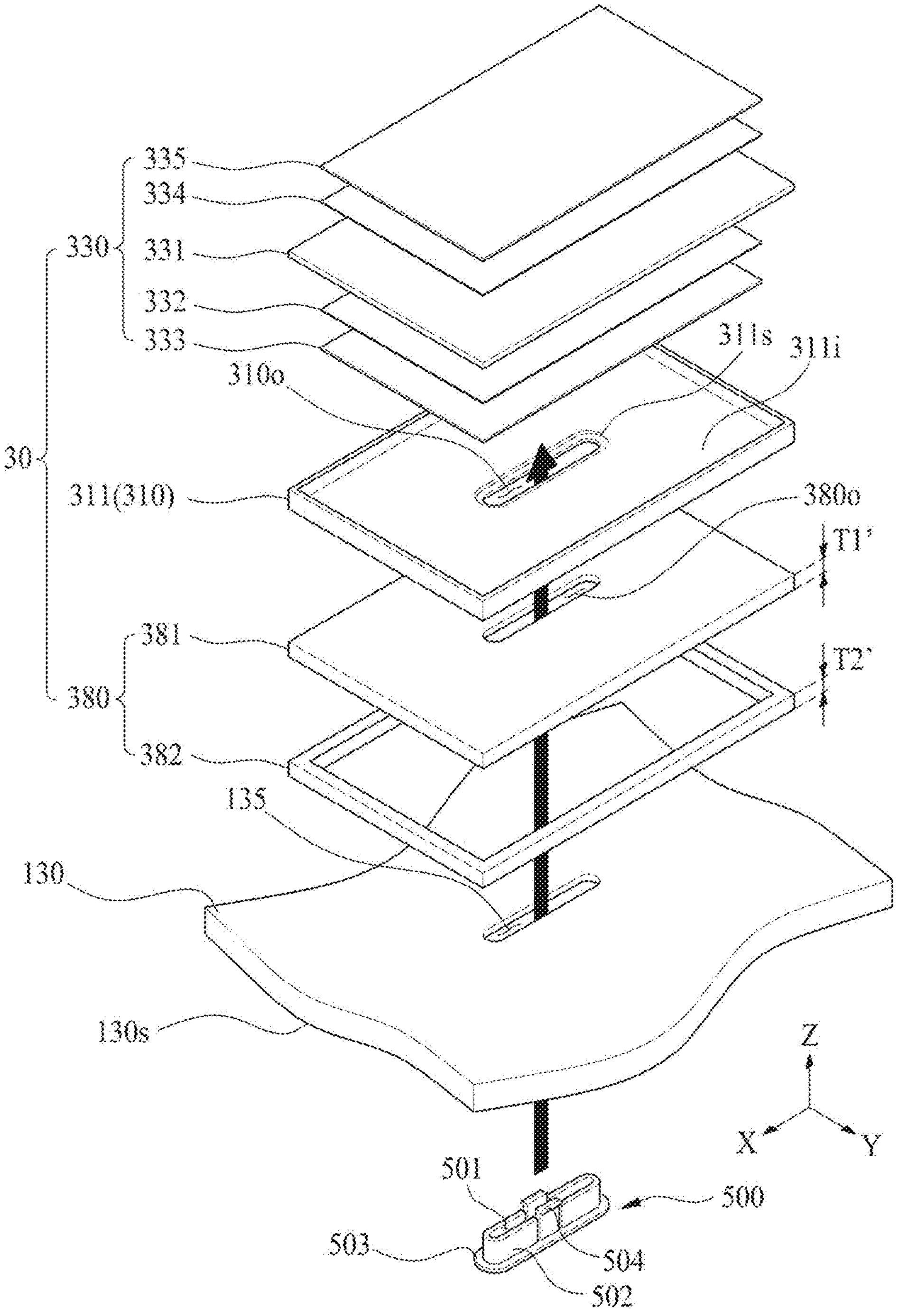
FIG. 44 illustrates a method of connecting a sound apparatus to a coupling part illustrated in FIG. 43 according to another embodiment of the present disclosure.

FIG. 44 illustrates a connection method between the sound apparatus and the coupling part illustrated in FIG. 43 according to another embodiment of the present disclosure.

With reference to FIGS. 43 and 44, according to an embodiment of the present disclosure, the first connection member 381 of the connection member 380 can be connected (or attached) to the rear surface (or the first portion and the second portion) of the enclosure 310 or the first enclosure 311 so that the hole 3800 overlaps (or is connected to) the enclosure 310 or the first enclosure 311, and the second connection member 382 of the connection member 380 can be connected (or attached) to the periphery portion (or the second portion) of the first connection member 381. The enclosure 310 or the first enclosure 311 can be disposed on the vehicle interior material 130 so that the opening part 3100 overlaps (or is connected to) the hole 135 of the vehicle interior material 130. The coupling part 500 can be connected or coupled to the sound apparatus 30 or the enclosure

310 through (an arrow direction) the hole 135 of the vehicle interior material 130 at an interior space (or an indoor space) of the vehicle. For example, the coupling part 500 can be connected or coupled to the sound apparatus 30 or the enclosure 310 through (an arrow direction) the second hole 135 of the vehicle interior material 130 and the hole 3800 of the first connection member 381 at the interior space of the vehicle. For example, the coupling part 500 can be accommodated or inserted into the hole 135 of the vehicle interior material 130, the hole 3800 of the first connection member 381, and the opening part 3100 of the first enclosure 311 at the interior space of the vehicle. For example, the hook member 504 of the coupling part 500 can be connected or coupled to the opening part 3100 of the first enclosure 311. For example, the hook member 504 of the coupling part 500 can be inserted (or accommodated) into the opening part 3100 of the first enclosure 311 and can be connected or coupled to the groove portion 311*g* of the first enclosure 311, based on a hook coupling scheme. Accordingly, the first enclosure 311 can be connected (or contact) the interior material 130 by the first connection member 381 and the second connection member 382 and coupling with the coupling part 500 and can vibrate the vehicle interior material 130 to output a sound based on a vibration of a vibration apparatus.

The first connection member 381 can have an initial thickness T1' before compression (or contraction) and can be compressed (or contracted) to have a deformed thickness (or a compression thickness) T1, based on pressure applied from the enclosure 310 by coupling (or connection) between the coupling part 500 and the enclosure 310. For example, when the coupling part 500 is coupled (or connected) to the enclosure 310, a thickness of the first connection member 381 can be compressed from the initial thickness T1' to the compression thickness T1, based on pressure applied from the enclosure 310, and thus, a vibration of the first region A1 in the first enclosure 311 can be efficiently transferred to the vehicle interior material 130 through the first portion of the first connection member 381. For example, when the sound apparatus 30 is separated (or detached) from the vehicle interior material 130 by the detachment of the coupling part 500, the first connection member 381 can be restored from the deformed thickness (or the compression thickness) T1 to the initial thickness T1' by an elastic restoring force.

The second connection member 382 can have an initial thickness T2' before compression (or contraction) and can be compressed (or contracted) to have a deformed thickness (or a compression thickness) T2, based on pressure applied from the enclosure 310 by coupling (or connection) between the coupling part 500 and the enclosure 310. For example, when the coupling part 500 is coupled (or connected) to the enclosure 310, a thickness of the second connection member 382 can be compressed from the initial thickness T1' to the compression thickness T1, based on pressure applied from the enclosure 310, and thus, a vibration of the second region A2 at the first enclosure 311 can be efficiently transferred to the vehicle interior material 130 through the first connection member 381 which is compressed (or contracted) and the first portion of the second connection member 381. For example, when the sound apparatus 30 is separated (or detached) from the vehicle interior material 130 by the detachment of the coupling part 500, the second connection member 382 can be restored from the deformed thickness (or the compression thickness) T2 to the initial thickness T2' by an elastic restoring force.

The vehicle interior material 130 connected to (or contacting) the enclosure 310 or the first enclosure 311 can be deformed to include a flexural portion or at least one curved portion, based on coupling (or connection) between the coupling part 500 and the enclosure 310, and thus, partial detachment occurring between the periphery portion of the enclosure 310 or the first enclosure 311 and the vehicle interior material 130 can be prevented by the second portion of the connection member 380 having a relatively thick thickness. Accordingly, a vibration at the periphery portion of the enclosure 310 or the first enclosure 311 can be transferred to the vehicle interior material 130 without the loss of a vibration (or vibration transfer) at the periphery portion of the first enclosure 311, and thus, vibration efficiency transferred from the enclosure 310 to the vehicle interior material 130 can increase, thereby further enhancing a sound characteristic and/or a sound pressure level characteristic of the low-pitched sound band.

Figure 45:
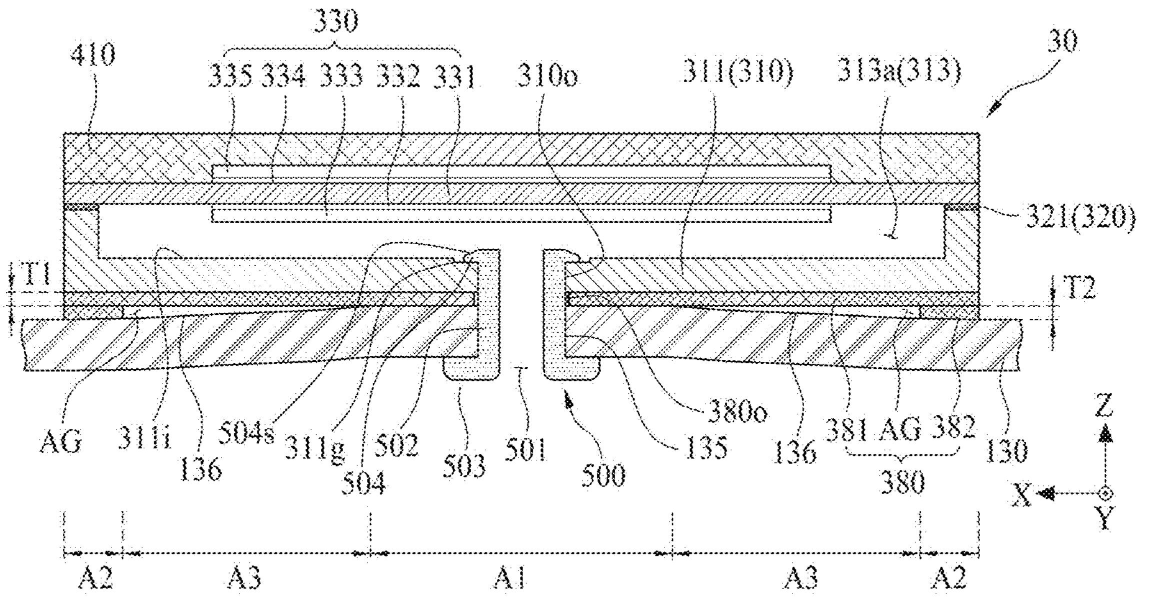
FIG. 45 illustrates a sound apparatus according to another embodiment of the present disclosure.

FIG. 45 illustrates a sound apparatus according to another embodiment of the present disclosure.

FIG. 45 illustrates an embodiment where a protection member is additionally configured at the sound apparatus 30 described above with reference to FIG. 43. In the following description, therefore, the protection member will be described in detail, the other elements can be substantially a same as that of descriptions described above with reference to FIGS. 1 to 34, and thus, like reference numerals refer to like elements and repeated descriptions can be omitted or will be briefly given below.

With reference to FIG. 45, the sound apparatus 30 according to another embodiment of the present disclosure can further include a protection member 410. The protection member 410 can be substantially a same as the protection member 410 described above with reference to FIG. 33, and thus, repeated descriptions are omitted or will be briefly given below.

The protection member 410 according to an embodiment of the present disclosure can be disposed at a sound generating module 330. For example, the protection member 410 can cover the sound generating module 330. For example, the protection member 410 can be disposed at a second vibration apparatus 335. For example, the protection member 410 can cover the second vibration apparatus 335.

According to an embodiment of the present disclosure, the protection member 410 can include rubber or sponge, or the like, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the protection member 410 can include rubber material, or can be configured in ethylene propylene diene rubber, ethylene propylene rubber, or urethane rubber.

According to an embodiment of the present disclosure, the protection member 410 can be configured in high elastic rubber, but embodiments of the present disclosure are not limited thereto. For example, a thickness of the protection member 410 can be 0.5 mm to 2 mm, but embodiments of the present disclosure are not limited thereto.

According to an embodiment of the present disclosure, because the connection member 380 having different thicknesses and the protection member 410 is configured at the sound generating module 330, a sound characteristic and/or a sound pressure level characteristic of a low-pitched sound band can be further complemented, and the sound apparatus 30 can be protected.

Figure 46:
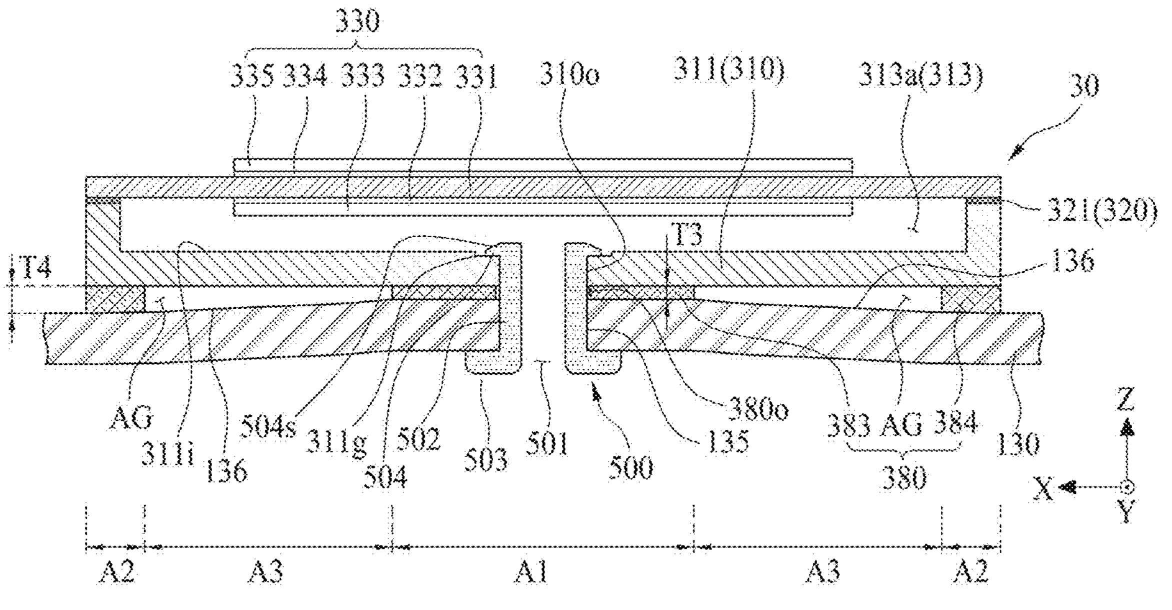
FIG. 46 illustrates a sound apparatus according to another embodiment of the present disclosure.

FIG. 46 illustrates a sound apparatus according to another embodiment of the present disclosure. Particularly, FIG. 46 illustrates another embodiment of the connection member 380 described above with reference to FIGS. 43 and 44. Therefore, in the following description, repeated descriptions of the other elements except the connection member 380 are omitted or can be briefly given below.

With reference to FIG. 46, a sound apparatus 30 according to another embodiment of the present disclosure can further include a connection member 380.

The connection member 380 can include a first portion and a second portion. The second portion can be a periphery portion of an enclosure 310. The second portion can be a portion (or a region) between the vehicle interior material 130 and the periphery portion of the enclosure 310. The first portion can be the other portion, except the periphery portion, of the enclosure 310. For example, the first portion can be located in a central portion or close or adjacent to the opening part 3100. For example, the first portion can correspond to a center portion of the enclosure 310 surrounded by the second portion corresponding to the periphery portion of the enclosure 310.

According to an embodiment of the present disclosure, the first portion of the connection member 380 can include an opening hole 3800 connected to an internal space 313 of the enclosure 310. For example, the first portion of the connection member 380 can include an opening hole 3800 connected to an internal space 313 of a first enclosure 311.

According to an embodiment of the present disclosure, the enclosure 310 or the first enclosure 311 can include at least one or more regions. For example, the enclosure 310 or the first enclosure 311 can include a first region A1, a second region A2, and a third region A3.

The first region A1 can correspond to a center portion of the enclosure 310 or the first enclosure 311. The first region A1 can be at the center portion of the enclosure 310 or the first enclosure 311. The second region A2 can correspond to a periphery portion, surrounding the center portion, of the enclosure 310 or the first enclosure 311. The third region A3 can be between the first region A1 and the second region A2. For example, the first portion of the connection member 380 can be at the first region A1. For example, the second portion of the connection member 380 can be spaced apart from the first portion and can be at the second region A2. For example, the second portion of the connection member 380 can be spaced apart from the first region A1 and can be at the second region A2. For example, the first portion of the connection member 380 can be at the center portion of the enclosure 310. For example, the second portion of the connection member 380 can be spaced apart from the first region A1 and can be at the periphery portion of the enclosure 310.

According to an embodiment of the present disclosure, the first portion and the second portion of the connection member 380 can have different thicknesses T3 and T4. For example, the connection member 380 can include the first portion and the second portion having different thicknesses T3 and T4. In the connection member 380, a thickness T3 of the first portion can differ from a thickness T4 of the second portion. For example, in the connection member 380, the thickness T4 of the second portion can be thicker than the thickness T3 of the first portion. For example, the thickness T3 of the connection member 380 at the first region A1 can differ from the thickness T4 of the connection member 380 at the second region A2. For example, the thickness T4 of the connection member 380 at the second region A2 can be thicker than the thickness T3 of the connection member 380 at the first region A1. For example, the connection member 380 may not be disposed at the third region A3 between the first region A1 and the second region A2 or at a portion between the first portion and the second portion.

According to an embodiment of the present disclosure, the second portion of the connection member 380 can have the thickness T4 which is thicker than the first portion, and thus, the periphery portion of the connection member 380 can be connected to or contact the vehicle interior material 130 without being partially detached (or lifted). Therefore, the periphery portion of the connection member 380 can be prevented from being partially detached (or lifted) from the vehicle interior material 130, and a vibration at a periphery portion of the enclosure 310 can be transferred to the vehicle interior material 130 without the loss of a vibration (or vibration transfer) at the periphery portion of the enclosure 310. A vibration at the periphery portion of the enclosure 310 can increase a vibration region of the vehicle interior material 130, and thus, can further improve or reinforce a sound characteristic of a low-pitched sound band. Therefore, a sound generated from a vibration of the sound apparatus 30 can be transferred to the vehicle interior material 130 without being lost, and thus, a sound of the low-pitched sound band can be further enhanced. For example, a sound generated from a vibration of the sound apparatus 30 can be transferred to the vehicle interior material 130 through the opening part 3100 and the periphery portion of the enclosure 310, and thus, vibration efficiency transferred from the enclosure 310 to the vehicle interior material 130 can increase, thereby further enhancing a sound characteristic and/or a sound pressure level characteristic of the low-pitched sound band.

According to an embodiment of the present disclosure, the connection member 380 can include a first connection member 383 and a second connection member 384.

The first connection member 383 can be connected to the enclosure 310. The first connection member 383 can be at the first portion. The first connection member 383 can be only at the first portion of the first portion and the second portion. The first connection member 383 can be connected to (or attached on) the first enclosure 311 of the enclosure 310. For example, the first connection member 383 can be connected to (or attached on) a rear surface of the first enclosure 311. The first connection member 383 can be connected to (or attached on) the rear surface of the first enclosure 311 corresponding to the first portion of the first portion and the second portion. For example, the first connection member 383 can be connected to (or attached on) a center portion (or a rear center portion) of the first enclosure 311. For example, the first connection member 383 can be connected to (or attached to) only the first region A1 of the first to third regions A1, A2, and A3 of the enclosure 310.

According to an embodiment of the present disclosure, the first connection member 383 can include an opening hole 3800 which is at the first portion and is connected to an internal space 313 of the enclosure 310. For example, the first connection member 383 can include an opening hole 3800 which is at the first portion and is connected to the internal space 313 of the first enclosure 311.

The second connection member 384 can be at the second portion. The second connection member 384 can be only at the second portion of the first portion and the second portion and can be spaced apart from the first connection member 383. The second connection member 384 can be at the second portion of the first portion and the second portion to surround the first connection member 383 with an air gap AG therebetween. The second connection member 384 can be connected to (or attached on) the second area A2 of the enclosure 310. For example, the second connection member 384 can be connected to (or attached to) the rear surface of the first enclosure 311 corresponding to the second portion of the first portion and the second portion. For example, the second connection member 384 can be connected to (or attached on) a periphery portion (or a rear periphery portion) of the first enclosure 311. For example, the second connection member 384 can be connected to (or attached to) only the second region A2 of the first to third regions A1, A2, and A3 of the enclosure 310.

The first portion and the second portion of the connection member 380 can have different widths (or sizes). A width of the first portion can be smaller than that of a width of the second portion. For example, a width of the first connection member 383 at the first regions A1 can be smaller than a width of the second connection member 384 at the second regions A2. Accordingly, the first connection member 383 and the second connection member 384 can include different sizes (or widths) and different thicknesses.

Each of the first connection member 383 and the second connection member 384 can be a cushion member or a pad member, but embodiments of the present disclosure are not limited thereto.

The first connection member 383 can include a same material (or substance) as that of the second connection member 384. Each of the first connection member 383 and the second connection member 384 can be a high elastic rubber or the like, but embodiments of the present disclosure are not limited thereto. For example, each of the first connection member 383 and the second connection member 384 can include a rubber material, or can include ethylene propylene diene rubber (or ethylene propylene diene M-class rubber), ethylene propylene rubber, or urethane rubber.

According to an embodiment of the present disclosure, a width of the connection member 380 at the second portion can be greater than that of a width of the coupling member 320. For example, a width of the second connection member 384 at the second portion can be greater than that of the width of the coupling member 320. For example, a width of the connection member 380 at the second region A2 can be greater than that of the width of the coupling member 320.

According to an embodiment of the present disclosure, each of the first connection member 383 and the second connection member 384 of the connection member 380 can have a compressive force (or contractive force) and an elastic restoring force and can be contracted or compressed by coupling between the coupling part 500 and the first enclosure 311. For example, the first connection member 383 disposed (or interposed) between the first enclosure 311 and the vehicle interior material 130 can have a first thickness (or a third thickness) T3 obtained through compression by a pressing force of the first enclosure 311. The second connection member 384 disposed (or interposed) between the first enclosure 311 and the vehicle interior material 130 can have a second thickness (or a fourth thickness) T4 obtained through compression by a pressing force of the first enclosure 311.

The first thickness T3 of the first connection member 383 can be different from the second thickness T4 of the second connection member 382. The first thickness T3 of the first connection member 383 and the second thickness T4 of the second connection member 384 can each be 0.5 mm or more, but embodiments of the present disclosure are not limited thereto. For example, the first thickness T3 of the first connection member 383 and the second thickness T4 of the second connection member 384 can each be 0.5 mm to 3 mm, but embodiments of the present disclosure are not limited thereto. For example, the first thickness T3 of the first connection member 383 and the second thickness T4 of the second connection member 384 can have different thicknesses within a range of 0.5 mm to 3 mm. For example, the second thickness T4 of the second connection member 384 can be thicker than the first thickness T3 of the first connection member 383 within a range of 0.5 mm to 3 mm.

The sound apparatus 30 according to another embodiment of the present disclosure can further include an air gap AG. For example, the air gap AG can be at a region between the vehicle interior material 130 and the first portion of the connection member 380 or a region between the first portion and the second portion of the connection member 380. For example, the air gap AG can be at the third region A3 between the first region A1 and the second region A2 of the enclosure 310. For example, the air gap AG can be at a region between the second region A2 of the enclosure 310 and the vehicle interior material 130. For example, the air gap AG can be provided at the third region A3 between the first region A1 and the second region A2 of the enclosure 310, and thus, can minimize separation or interference between a vibration of the first region A1 and a vibration of the second region A2, thereby increasing a vibration force (or the amount of vibration) transferred from the second region A2 (for example, the periphery portion) of the enclosure 310 to the vehicle interior material 130. Accordingly, a band (a reproduction band) of a low-pitched sound band can expand, and thus, a sound characteristic and/or a sound pressure level characteristic of the low-pitched sound band can be further improved.

According to an embodiment of the present disclosure, the connection member 380 including the first and second connection members 383 and 384 having different thicknesses T3 and T4 can be configured, thereby providing the sound apparatus 30 where a sound characteristic and/or a sound pressure level characteristic of the low-pitched sound band are/is further enhanced. According to an embodiment of the present disclosure, because the second connection member 384 is configured, a vibration area (or a vibration region) of a roof trim of a vehicular apparatus can be widened when coupling the sound apparatus 30 to the roof trim of the vehicular apparatus, and thus, a sound characteristic and/or a sound pressure level characteristic of the low-pitched sound band can be further enhanced.

Figure 47:
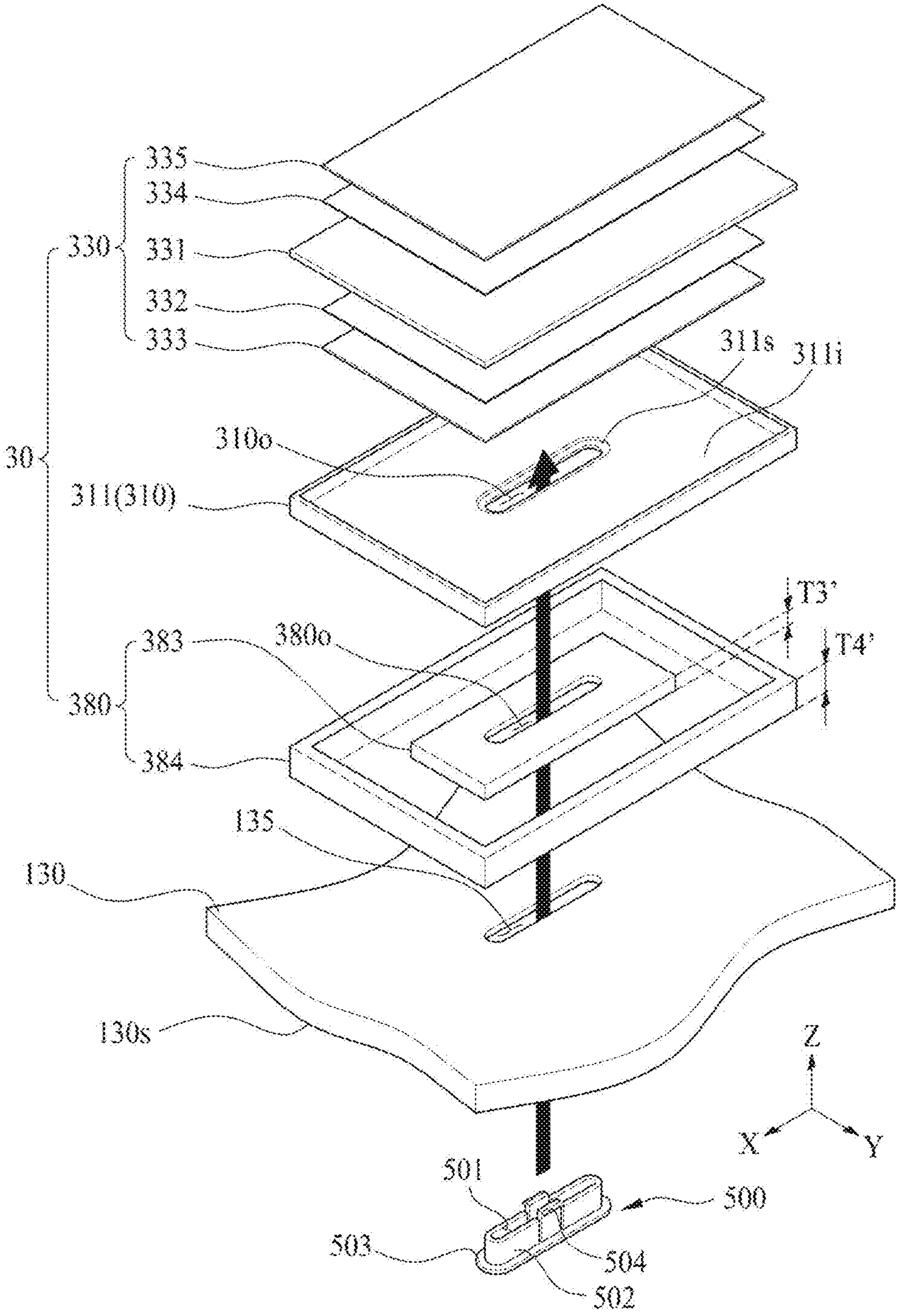
FIG. 47 illustrates a method of connecting a sound apparatus to a coupling part illustrated in FIG. 46 according to another embodiment of the present disclosure.

FIG. 47 illustrates a connection method between the sound apparatus and the coupling part illustrated in FIG. 46 according to another embodiment of the present disclosure.

With reference to FIGS. 46 and 47, according to an embodiment of the present disclosure, the first connection member 383 of the connection member 380 can be connected (or attached) to the center portion (or the first portion) of the enclosure 310 or the first enclosure 311 so that the hole 3800 overlaps (or is connected to) the enclosure 310 or the first enclosure 311, and the second connection member 384 of the connection member 380 can be connected (or attached) to the periphery portion (or the second portion) of the enclosure 310 or the first enclosure 311. The enclosure 310 or the first enclosure 311 can be disposed on the vehicle interior material 130 so that the opening part 3100 overlaps (or is connected to) the hole 135 of the vehicle interior material 130. The coupling part 500 can be connected or coupled to the sound apparatus 30 or the enclosure 310 through (an arrow direction) the hole 135 of the vehicle interior material 130 at an interior space (or an indoor space) of the vehicle. For example, the coupling part 500 can be connected or coupled to the sound apparatus 30 or the enclosure 310 through (an arrow direction) the second hole 135 of the vehicle interior material 130 and the hole 3800 of the first connection member 383 at the interior space of the vehicle. For example, the coupling part 500 can be accommodated or inserted into the hole 135 of the vehicle interior material 130, the hole 3800 of the first connection member 383, and the opening part 3100 of the first enclosure 311 at the interior space of the vehicle. For example, the hook member 504 of the coupling part 500 can be connected or coupled to the opening part 3100 of the first enclosure 311. For example, the hook member 504 of the coupling part 500 can be inserted (or accommodated) into the opening part 3100 of the first enclosure 311 and can be connected or coupled to the groove portion 311*g* of the first enclosure 311, based on a hook coupling scheme. Accordingly, the first enclosure 311 can be connected (or contact) the interior material 130 by the first connection member 383 and the second connection member 384 and coupling with the coupling part 500 and can vibrate the vehicle interior material 130 to output a sound based on a vibration of a vibration apparatus.

The first connection member 383 can have an initial thickness T3' before compression (or contraction) and can be compressed (or contracted) to have a deformed thickness (or a compression thickness) T3, based on pressure applied from the enclosure 310 by coupling (or connection) between the coupling part 500 and the enclosure 310. For example, when the coupling part 500 is coupled (or connected) to the enclosure 310, a thickness of the first connection member 383 can be compressed from the initial thickness T3' to the compression thickness T3, based on pressure applied from the enclosure 310, and thus, a vibration of the first region A1 in the first enclosure 311 can be efficiently transferred to the vehicle interior material 130 through the first connection member 381. For example, when the sound apparatus 30 is separated (or detached) from the vehicle interior material 130 by the detachment of the coupling part 500, the first connection member 383 can be restored from the deformed thickness (or the compression thickness) T3 to the initial thickness T3' by an elastic restoring force.

The second connection member 384 can have an initial thickness T4' before compression (or contraction) and can be compressed (or contracted) to have a deformed thickness (or a compression thickness) T4, based on pressure applied from the enclosure 310 by coupling (or connection) between the coupling part 500 and the enclosure 310. For example, when the coupling part 500 is coupled (or connected) to the enclosure 310, a thickness of the second connection member 384 can be compressed from the initial thickness T4' to the compression thickness T4, based on pressure applied from the enclosure 310, and thus, a vibration of the second region A2 at the first enclosure 311 can be efficiently transferred to the interior material 130 through the second connection member 384 which is compressed (or contracted). For example, when the sound apparatus 30 is separated (or detached) from the vehicle interior material 130 by the detachment of the coupling part 500, the second connection member 384 can be restored from the deformed thickness (or the compression thickness) T4 to the initial thickness T4' by an elastic restoring force.

The vehicle interior material 130 connected to (or contacting) the enclosure 310 or the first enclosure 311 can be deformed to include a flexural portion or at least one curved portion, based on coupling (or connection) between the coupling part 500 and the enclosure 310, and thus, partial detachment occurring between the periphery portion of the enclosure 310 or the first enclosure 311 and the vehicle interior material 130 can be prevented by the second connection member 384 having a relatively thick thickness. Accordingly, a vibration at the periphery portion of the enclosure 310 or the first enclosure 311 can be transferred to the vehicle interior material 130 without the loss of a vibration (or vibration transfer) at the periphery portion of the first enclosure 311, and thus, vibration efficiency transferred from the enclosure 310 to the vehicle interior material 130 can increase, thereby further enhancing a sound characteristic and/or a sound pressure level characteristic of the low-pitched sound band.

Figure 48:
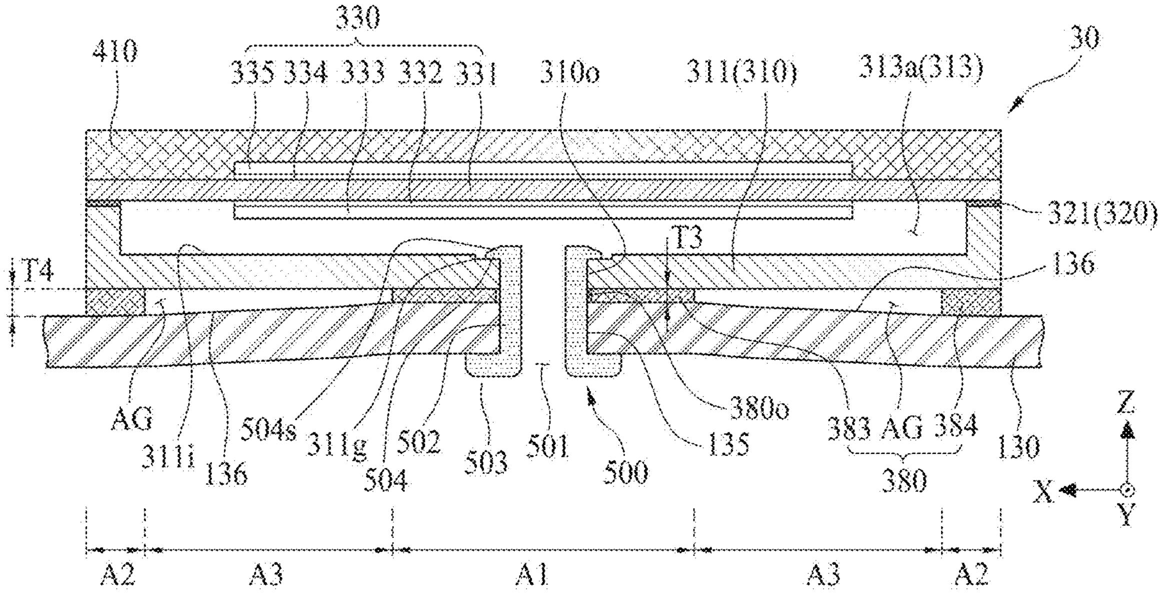
FIG. 48 illustrates a sound apparatus according to another embodiment of the present disclosure.

FIG. 48 illustrates a sound apparatus according to another embodiment of the present disclosure.

Particularly, FIG. 48 illustrates an embodiment where a protection member is additionally configured at the sound apparatus 30 described above with reference to FIG. 46. In the following description, therefore, the protection member will be described in detail, the other elements can be substantially a same as that of descriptions described above with reference to FIGS. 1 to 34, and thus, like reference numerals refer to like elements and repeated descriptions can be omitted or will be briefly given below.

With reference to FIG. 48, the sound apparatus 30 according to another embodiment of the present disclosure can further include a protection member 410. The protection member 410 can be substantially a same as the protection member 410 described above with reference to FIG. 33, and thus, repeated descriptions are omitted or will be briefly given below.

The protection member 410 according to an embodiment of the present disclosure can be disposed at a sound generating module 330. For example, the protection member 410 can cover the sound generating module 330. For example, the protection member 410 can be disposed at a second vibration apparatus 335. For example, the protection member 410 can cover the second vibration apparatus 335.

According to an embodiment of the present disclosure, the protection member 410 can include rubber or sponge, or the like, but embodiments of the present disclosure are not limited thereto. For example, the rubber can be ethylene propylene diene rubber (or ethylene propylene diene M-class rubber), ethylene propylene rubber, or urethane rubber, but embodiments of the present disclosure are not limited thereto. For example, the protection member 410 can include rubber material, or can be configured in ethylene propylene diene rubber, ethylene propylene rubber, or urethane rubber.

According to an embodiment of the present disclosure, the protection member 410 can be configured in high elastic rubber, but embodiments of the present disclosure are not limited thereto. For example, a thickness of the protection member 410 can be 0.5 mm to 2 mm, but embodiments of the present disclosure are not limited thereto.

According to an embodiment of the present disclosure, because the connection member 380 including the first and second connection member 383 and 384 having different thicknesses T3 and T4 and the protection member 410 is configured at the sound generating module 330, a sound characteristic and/or a sound pressure level characteristic of a low-pitched sound band can be more complemented, and the sound apparatus 30 can be protected.

Figure 49:
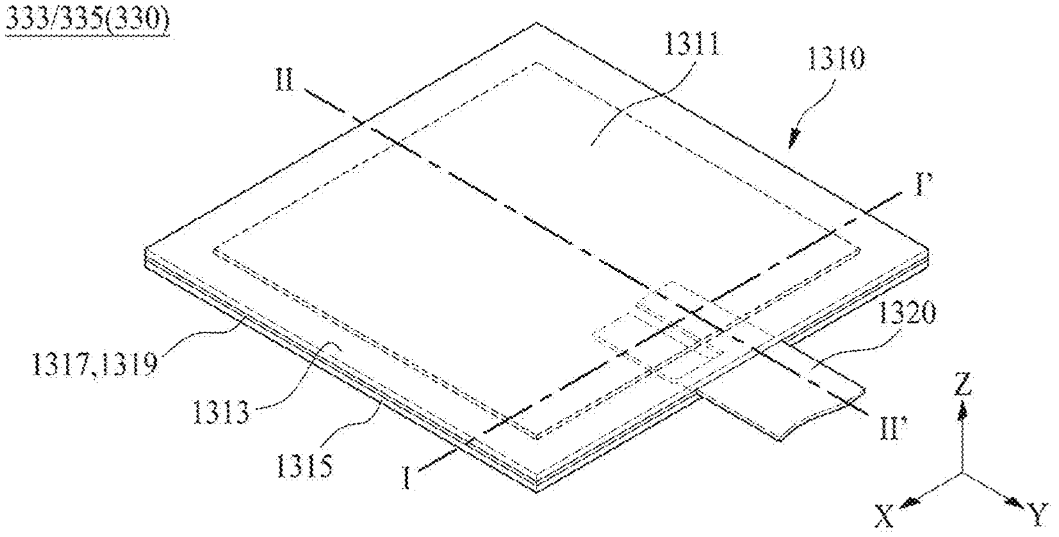
FIG. 49 illustrates a vibration apparatus according to an embodiment of the present disclosure.
Figure 50:
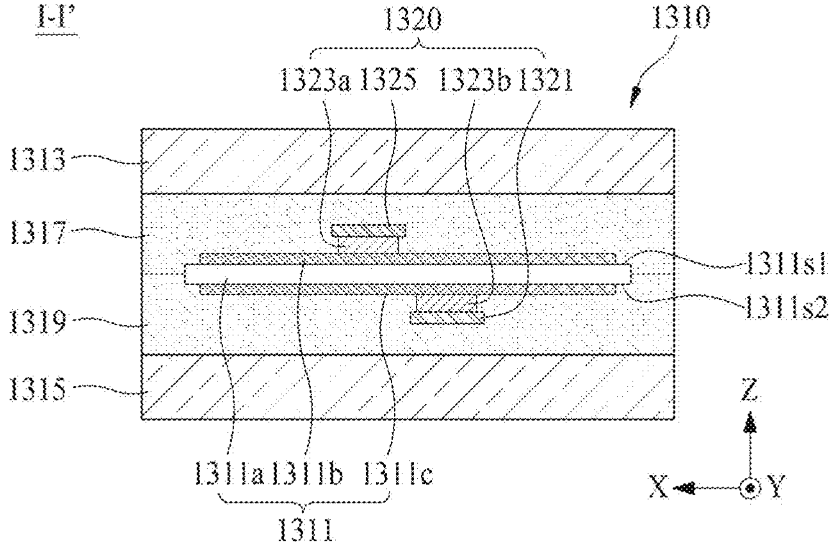
FIG. 50 is a cross-sectional view taken along line I-I' illustrated in FIG. 49 according to an embodiment of the present disclosure.

FIG. 49 illustrates a vibration apparatus according to an embodiment of the present disclosure. FIG. 50 is a cross-sectional view taken along line I-I' illustrated in FIG. 49 according to an embodiment of the present disclosure. FIG.

51 is a cross-sectional view taken along line II-II' illustrated in FIG. 49 according to an embodiment of the present disclosure.

Figure 51:
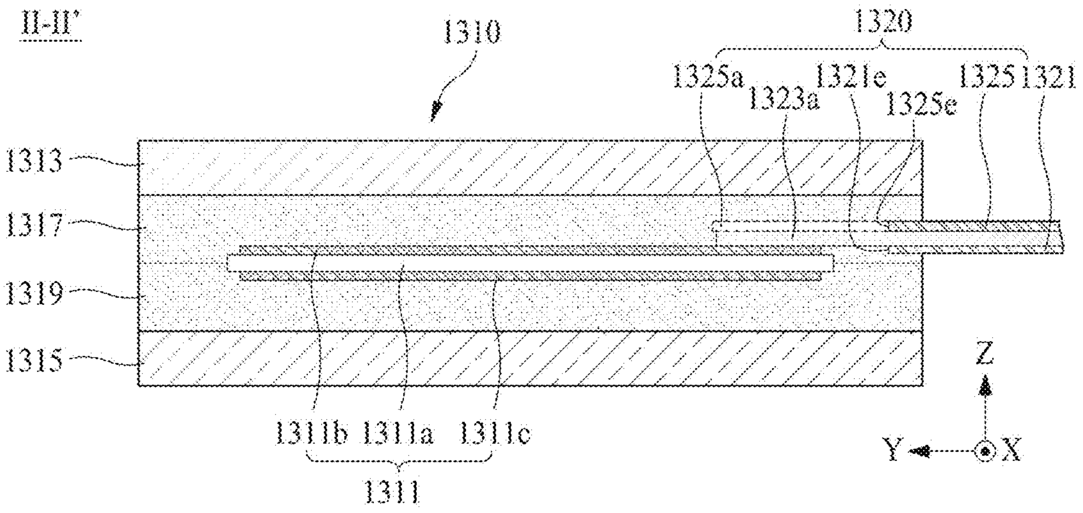
FIG. 51 is a cross-sectional view taken along line II-II' illustrated in FIG. 49 according to an embodiment of the present disclosure.

With reference to FIGS. 49 to 51, a sound generating module 330 according to an embodiment of the present disclosure can include a vibration apparatus 333 and 335. The vibration apparatus 333 and 335 can include one or more vibration generators 1310.

The vibration generator 1310 can include a piezoelectric material having a piezoelectric characteristic. The vibration generator 1310 can vibrate (or displace or drive) a vibration member (or a vehicle interior material) based on a vibration (or displacement or driving) of the piezoelectric material based on an electric signal (or a voice signal or a sound signal) applied to the piezoelectric material. For example, the vibration generator 1310 can alternately repeat contraction and/or expansion by a piezoelectric effect (or a piezoelectric characteristic) to vibrate (or displace or drive). For example, the vibration generator 1310 can vibrate (or displace or drive) in a vertical direction (or a thickness direction) Z as contraction and/or expansion are alternately repeated by an inverse piezoelectric effect. For example, in the vibration generator 1310, the piezoelectric material including a piezoelectric ceramic can vibrate or mechanically displace (or vibrate or drive) in response to an electrical signal applied from the outside.

The vibration generator 1310 can be configured as a ceramic-based piezoelectric material capable of implementing a relatively strong vibration, or can be configured as a piezoelectric ceramic having a perovskite-based crystal structure. For example, the vibration generator 1310 can be a vibration generating device, a vibration film, a vibration generating film, a vibrator, an active vibrator, an active vibration generator, an actuator, an exciter, a film actuator, a film exciter, an ultrasonic actuator, or an active vibration member, or the like, but embodiments of the present disclosure are not limited thereto.

The vibration generator 1310 according to an embodiment of the present disclosure can include a vibration generating part 1311.

The vibration generating part 1311 can be configured to vibrate by the piezoelectric effect based on a driving signal. For example, the vibration generating part 1311 can include a piezoelectric type vibration part or a piezoelectric vibration part. The vibration generating part 1311 can include at least one or more of a piezoelectric inorganic material and a piezoelectric organic material. For example, the vibration generating part 1311 can be a vibration device, a piezoelectric device, a piezoelectric device part, a piezoelectric device layer, a piezoelectric structure, a piezoelectric vibration part, or a piezoelectric vibration layer, or the like, but embodiments of the present disclosure are not limited thereto.

The vibration generating part 1311 according to an embodiment of the present disclosure can include a vibration part 1311*a*, a first electrode part 1311*b*, and a second electrode part 1311*c*.

The vibration part 1311*a* can include a piezoelectric material or an electroactive material which includes a piezoelectric effect. For example, the piezoelectric material can have a characteristic in which, when pressure or twisting phenomenon is applied to a crystalline structure by an external force, a potential difference occurs due to dielectric polarization caused by a relative position change of a positive (+) ion and a negative (−) ion, and thus a vibration is generated by an electric field based on a reverse voltage applied thereto. For example, the vibration part 1311*a* can be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto.

The vibration part 1311*a* can be configured as a ceramic-based material capable of implementing a relatively strong vibration, or can be configured as a piezoelectric ceramic having a perovskite-based crystalline structure. The perovskite-based crystalline structure can have a piezoelectric effect and/or an inverse piezoelectric effect and can be a plate-shaped structure having orientation or alignment. The perovskite-based crystalline structure can be represented by a chemical formula "$ABO_3$". In the chemical formula, "A" can include a divalent metal element, and "B" can include a tetravalent metal element. As an embodiment of the present disclosure, in the chemical formula "$ABO_3$", "A", and "B" can be cations, and "O" can be anions. For example, the vibration part 1311*a* can include at least one or more of lead titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

The piezoelectric ceramic can be configured as a single crystalline ceramic having a crystalline structure, or can be configured as a ceramic material having a polycrystalline structure or polycrystalline ceramic. A piezoelectric material including the single crystalline ceramic can include $\alpha$-$AlPO_4$, $\alpha$-$SiO_2$, $LiNbO_3$, $Tb_2(MoO_4)_3$, $Li_2B_4O_7$, or ZnO, but embodiments of the present disclosure are not limited thereto. A piezoelectric material including the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration part 1311*a* can include at least one or more of calcium titanate ($CaTiO_3$), $BaTiO_3$, and $SrTiO_3$, without lead (Pb), but embodiments of the present disclosure are not limited thereto.

The first electrode part 1311*b* can be disposed at a first surface (or an upper surface or a front surface) 1311*s*1 of the vibration part 1311*a*. The first electrode part 1311*b* can have a same size as the vibration part 1311*a*, or can have a size which is smaller than the vibration part 1311*a*.

The second electrode part 1311*c* can be disposed at a second surface (or a lower surface or a rear surface) 1311*s*2 which is opposite to or different from the first surface 1311*s*1 of the vibration part 1311*a*. The second electrode part 1311*c* can have a same size as the vibration part 1311*a*, or can have a size which is smaller than the vibration part 1311*a*. For example, the second electrode part 1311*c* can have a same shape as the vibration part 1311*a*, but embodiments of the present disclosure are not limited thereto.

According to an embodiment of the present disclosure, in order to prevent electrical short circuit between the first electrode part 1311*b* and the second electrode part 1311*c*, each of the first electrode part 1311*b* and the second electrode part 1311*c* can be formed at a remaining portion except a periphery portion of the vibration part 1311*a*. For example, the first electrode part 1311*b* can be formed at an entire remaining portion except a periphery portion of the first surface 1311*s*1 of the vibration part 1311*a*. For example, the second electrode part 1311*c* can be formed at an entire remaining portion except a periphery portion of the second surface 1311*s*2 of the vibration part 1311*a*. For example, a distance between a lateral surface (or a sidewall) of each of the first electrode part 1311*b* and the second electrode part 1311*c* and a lateral surface (or a sidewall) of the vibration part 1311*a* can be at least 0.5 mm or more. For example, the distance between the lateral surface of each of the first electrode part 1311*b* and the second electrode part 1311*c* and the lateral surface of the vibration part 1311*a* can be at least 1 mm or more, but embodiments of the present disclosure are not limited thereto.

One or more of the first electrode part 1311*b* and the second electrode part 1311*c* according to an embodiment of the present disclosure can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be made of an alloy thereof, but embodiments of the present disclosure are not limited thereto. For example, to enhance an electrical characteristic and/or a vibration characteristic of the vibration part 1311*a*, each of the first electrode part 1311*b* and the second electrode part 1311*c* can include silver (Ag) having a low resistivity. For example, the carbon can include one or more of carbon black, ketjen black, carbon nanotube, and a carbon material including graphite, but embodiments of the present disclosure are not limited thereto.

The vibration part 1311*a* can be polarized (or poling) by a certain voltage applied to the first electrode part 1311*b* and the second electrode part 1311*c* in a certain temperature atmosphere, or a temperature atmosphere that can be changed from a high temperature to a room temperature, but embodiments of the present disclosure are not limited thereto. For example, a polarization direction (or a poling direction) formed in the vibration part 1311*a* can be formed or aligned (or arranged) from the first electrode part 1311*b* to the second electrode part 1311*c*, but embodiments of the present disclosure are not limited thereto. For example, the polarization direction (or the poling direction) formed in the vibration part 1311*a* can be formed or aligned (or arranged) from the second electrode part 1311*c* to the first electrode part 1311*b*.

The vibration part 1311*a* can alternately and repeatedly contract and/or expand by an inverse piezoelectric effect based on a driving signal applied to the first electrode part 1311*b* and the second electrode part 1311*c* from the outside to vibrate. For example, the vibration part 1311*a* can vibrate in a vertical direction (or thickness direction) and in a planar direction by the signal applied to the first electrode part 1311*b* and the second electrode part 1311*c*. The vibration part 1311*a* can be displaced (or vibrated or driven) by contraction and/or expansion of the planar direction, thereby improving a vibration characteristic including a sound characteristic and/or a sound pressure level characteristic of the vibration generator 1310.

The vibration generator 1310 according to an embodiment of the present disclosure can further include a first cover member 1313 and a second cover member 1315.

The first cover member 1313 can be disposed at a first surface of the vibration generating part 1311. For example, the first cover member 1313 can be configured to cover the first electrode part 1311*b* of the vibration generating part 1311. For example, the first cover member 1313 can be at the first electrode part 1311*b*. For example, the first cover member 1313 can be configured to have a larger size than the vibration generating part 1311. The first cover member 1313 can be configured to protect the first surface of the vibration generating part 1311 and the first electrode part 1311*b*.

The second cover member 1315 can be disposed at a second surface of the vibration generating part 1311. For example, the second cover member 1315 can be configured to cover the second electrode part 1311*c* of the vibration generating part 1311. For example, the second cover member 1315 can be at the second electrode part 1311*c*. For example, the second cover member 1315 can be configured to have a larger size than the vibration generating part 1311 and can be configured to have a same size as the first cover member 1313. The second cover member 1315 can be configured to protect the second surface of the vibration generating part 1311 and the second electrode part 1311*c*.

The first cover member 1313 and the second cover member 1315 according to an embodiment of the present disclosure can include a same material or a different material. For example, each of the first cover member 1313 and the second cover member 1315 can be a polyimide (PI) film, a polyethylene terephthalate (PET) film, or a polyethylene naphthalate (PEN) film, but embodiments of the present disclosure are not limited thereto.

The first cover member 1313 can be connected or coupled to the first surface of the vibration generating part 1311 or the first electrode part 1311*b* by a first adhesive layer 1317. For example, the first cover member 1313 can be connected or coupled to the first surface of the vibration generating part 1311 or the first electrode part 1311*b* by a film laminating process using the first adhesive layer 1317.

The second cover member 1315 can be connected or coupled to the second surface of the vibration generating part 1311 or the second electrode part 1311*c* by a second adhesive layer 1319. For example, the second cover member 1315 can be connected or coupled to the second surface of the vibration generating part 1311 or the second electrode part 1311*c* by a film laminating process using the second adhesive layer 1319.

Each of the first adhesive layer 1317 and second adhesive layer 1319 according to an embodiment of the present disclosure can include an electrically insulating material which has adhesiveness and is capable of compression and decompression. For example, each of the first adhesive layer 1317 and the second adhesive layer 1319 can include an epoxy resin, an acrylic resin, a silicone resin, a urethane resin, an acrylic-based polymer, a silicone-based polymer, or a urethane-based polymer, but embodiments of the present disclosure are not limited thereto.

The first adhesive layer 1317 and second adhesive layer 1319 can be configured between the first cover member 1313 and the second cover member 1315 to surround the vibration generating part 1311. For example, one or more of the first adhesive layer 1317 and second adhesive layer 1319 can be configured to partially or completely surround the vibration generating part 1311.

Any one of the first cover member 1313 and the second cover member 1315 can be connected or coupled to the vibration member 331 by the adhesive member 332 and 334 illustrated in FIGS. 3 to 48.

The vibration generator 1310 according to an embodiment of the present disclosure can further include a signal supply member 1320.

The signal supply member 1320 can be configured to supply the driving signal supplied from a driving circuit part to the vibration generating part 1311. The signal supply member 1320 can be configured to be electrically connected to the vibration part 1311*a*. The signal supply member 1320 can be configured to be electrically connected to the first electrode part 1311*b* and the second electrode part 1311*c* of the vibration generating part 1311.

A portion of the signal supply member 1320 can be accommodated (or inserted) between the first cover member 1313 and the second cover member 1315. An end portion (or a distal end portion or one side) of the signal supply member 1320 can be disposed or inserted (or accommodated) between one edge portion (or one periphery portion) of the first cover member 1313 and one edge portion (or one periphery portion) of the second cover member 1315. The one edge portion of the first cover member 1313 and the one edge portion of the second cover member 1315 can accommodate or vertically (or up and down) cover the end portion (or the distal end portion or the one side) of the signal supply member 1320. Accordingly, the signal supply member 1320 can be integrated (or configured) as one body with the vibration generating part 1311. Accordingly, the sound generating module 330 or the vibration apparatus 333 and 335 can be implemented (or configured) in a film type integrated with the signal supply member 1320. For example, the signal supply member 1320 can be configured as one part (or one component) with the vibration generating part 1311, thereby realizing an effect of uni-materialization. For example, the signal supply member 1320 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 1320 according to an embodiment of the present disclosure can include a base member 1321 and a plurality of signal lines 1323*a* and 1323*b*. For example, the signal supply member 1320 can include a base member 1321, a first signal line 1323*a*, and a second signal line 1323*b*.

The base member 1321 can include a transparent or opaque plastic material, but embodiments of the present disclosure are not limited thereto. The base member 1321 can have a certain width along a first direction X and can be extended long along a second direction Y intersecting with the first direction X.

The first signal line 1323*a* and the second signal line 1323*b* can be disposed at the first surface of the base member 1321 in parallel with the second direction Y and can be spaced apart from each other or electrically separated from each other along the first direction X. The first signal line 1323*a* and the second signal line 1323*b* can be disposed in parallel to each other at the first surface of the base member 1321. For example, the first signal line 1323*a* and the second signal line 1323*b* can be implemented in a line shape by patterning of a metal layer (or a conductive layer) formed or deposited at the first surface of the base member 1321.

End portions (or distal end portions or one sides) of the first signal line 1323*a* and the second signal line 1323*b* can be separated from each other, and thus, can be individually curved or bent.

The end portion (or the distal end portion or the one side) of the first signal line 1323*a* can be electrically connected to the first electrode part 1311*b* of the vibration generating part 1311. For example, the end portion of the first signal line 1323*a* can be electrically connected to at least a portion of the first electrode part 1311*b* of the vibration generating part 1311 in the one edge portion of the first cover member 1313. For example, the end portion (or the distal end portion or the one side) of the first signal line 1323*a* can be electrically and directly connected to at least a portion of the first electrode part 1311*b* of the vibration generating part 1311. For example, the end portion (or the distal end portion or the one side) of the first signal line 1323*a* can be electrically connected to or directly contact the first electrode part 1311*b* of the vibration generating part 1311. For example, the end portion of the first signal line 1323*a* can be electrically connected to the first electrode part 1311*b* by a conductive double-sided tape. Accordingly, the first signal line 1323*a* can be configured to transfer a first driving signal, supplied from a driving circuit part (or a vibration driver), to the first electrode part 1311*b* of the vibration generating part 1311.

The end portion (or the distal end portion or the one side) of the second signal line 1323*b* can be electrically connected to the second electrode part 1311*c* of the vibration generating part 1311. For example, the end portion of the second signal line 1323*b* can be electrically connected to at least a portion of the second electrode part 1311*c* of the vibration generating part 1311 in the one edge portion of the second cover member 1315. For example, the end portion of the second signal line 1323*b* can be electrically and directly connected to at least a portion of the second electrode part 1311*c* of the vibration generating part 1311. For example, the end portion of the second signal line 1323*b* can be electrically connected to or directly contact the second electrode part 1311*c* of the vibration generating part 1311. For example, the end portion of the second signal line 1323*b* can be electrically connected to the second electrode part 1311*c* by a conductive double-sided tape. Accordingly, the second signal line 1323*b* can be configured to transfer a second driving signal, supplied from the driving circuit part (or vibration driver), to the second electrode part 1311*c* of the vibration generating part 1311.

The signal supply member 1320 according to an embodiment of the present disclosure can further include an insulation layer 1325.

The insulation layer 1325 can be disposed at the first surface of the base member 1321 to cover each of the first signal line 1323*a* and the second signal line 1323*b* other than the end portion (or one side) of the signal supply member 1320.

An end portion (or one side) of the signal supply member 1320 including an end portion (or one side) of the base member 1321 and an end portion (or one side) 1325*a* of the insulation layer 1325 can be inserted (or accommodated) between the first cover member 1313 and the second cover member 1315 and can be fixed between the first cover member 1313 and the second cover member 1315 by a first adhesive layer 1317 and the second adhesive layer 1319. Accordingly, the end portion (or one side) of the first signal line 1323*a* can be maintained with being electrically connected to the first electrode part 1311*b* of the vibration generating part 1311, and the end portion (or one side) of the second signal line 1323*b* can be maintained with being electrically connected to the second electrode part 1311*c* of the vibration generating part 1311. In addition, the end portion (or one side) of the signal supply member 1320 can be inserted (or accommodated) and fixed between the vibration generating part 1311 and the first cover member 1313, and thus, a contact defect between the vibration generator 1310 and the signal supply member 1320 caused by the movement of the signal supply member 1320 can be prevented.

In the signal supply member 1320 according to an embodiment of the present disclosure, each of the end portion (or one side) of the base member 1321 and the end portion (or one side) 1325*a* of the insulation layer 1325 can be removed. For example, each of the end portion of the first signal line 1323*a* and the end portion of the second signal line 1323*b* can be exposed at the outside without being supported or covered by each of the end portion (or one side) of the base member 1321 and the end portion (or one side) 1325*a* of the insulation layer 1325, respectively. For example, the end portion (or one side) of each of the first signal line 1323*a* and the second signal line 1323*b* can protrude (or extend) to have a certain length from an end 1321*e* of the base member 1321 or an end 1325*e* of the insulation layer 1325. Accordingly, each of the end portion (or the distal end portion or the one side) of each of the first signal line 1323*a* and the second signal line 1323*b* can be individually or independently bent.

The end portion (or one side) of the first signal line 1323*a*, which is not supported by the end portion (or one side) of the base member 1321 and the end portion 1325*a* of the insulation layer 1325, can be directly connected to or directly contact the first electrode part 1311*b* of the vibration generating part 1311. The end portion (or one side) of the second signal line 1323*b*, which is not supported by the end portion (or one side) of the base member 1321 and the end portion 1325*a* of the insulation layer 1325, can be directly connected to or directly contact the second electrode part 1311*c* of the vibration generating part 1311.

According to an embodiment of the present disclosure, a portion of the signal supply member 1320 or a portion of the base member 1321 can be disposed or inserted (or accommodated) between the first cover member 1313 and the second cover member 1315, and thus, the signal supply member 1320 can be integrated (or configured) as one body with the vibration generating part 1311. Accordingly, the vibration generating part 1311 and the signal supply member 1320 can be configured as one part (or one component), and thus, an effect of uni-materialization can be obtained.

According to an embodiment of the present disclosure, the first signal line 1323*a* and the second signal line 1323*b* of the signal supply member 1320 can be integrated (or configured) as one body with the vibration generator 1310, and thus, a soldering process for an electrical connection between the vibration generator 1310 and the signal supply member 1320 may not be needed. Accordingly, a manufacturing process and a structure of the vibration apparatus 333 and 335 can be simplified, and hazards associated with the soldering process can be reduced.

Figure 52:
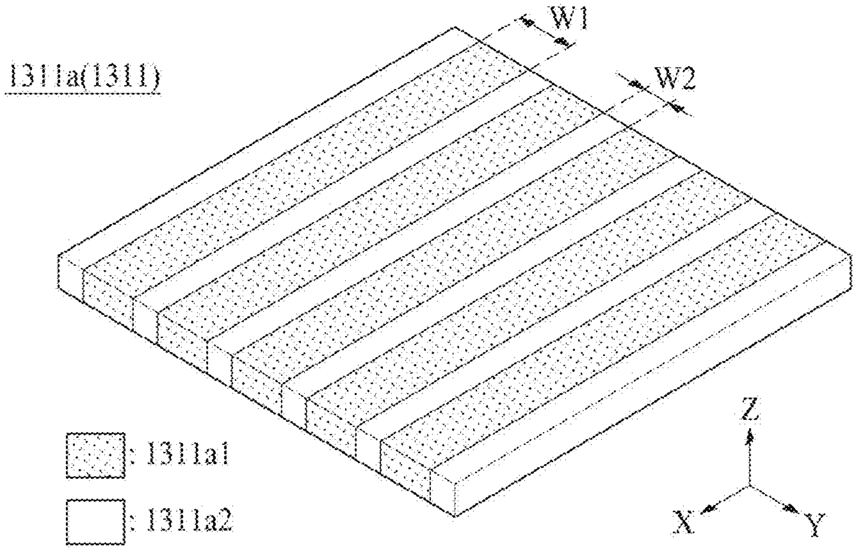
FIG. 52 illustrates a vibration part according to another embodiment of the present disclosure.

FIG. 52 illustrates a vibration part according to another embodiment of the present disclosure. Particularly, FIG. 52 illustrates another embodiment of the vibration part described above with reference to FIGS. 49 to 51.

With reference to FIGS. 50 and 52, the vibration part 1311*a* according to another embodiment of the present disclosure can include a plurality of first portions 1311*a*1 and a plurality of second portions 1311*a*2. For example, the plurality of first portions 1311*a*1 and the plurality of second portions 1311*a*2 can be alternately and repeatedly disposed along a second direction Y (or a first direction X).

Each of the plurality of first portions 1311*a*1 can include an inorganic material portion having a piezoelectric effect (or a piezoelectric characteristic). For example, each of the plurality of first portions 1311*a*1 can include at least one or more of a piezoelectric inorganic material and a piezoelectric organic material. For example, each of the plurality of first portions 1311*a*1 can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 1311*a*1 can have a first width W1 parallel to the second direction Y (or the first direction X) and can be extended along the first direction X (or the second direction Y). Each of the plurality of first portions 1311*a*1 can be substantially a same as a vibration part 1311*a* described above with reference to FIGS. 49 to 51, and thus, repeated descriptions are omitted or will be briefly given below.

Each of the plurality of second portions 1311*a*2 can be disposed between the plurality of first portions 1311*a*1. For example, each of the plurality of first portions 1311*a*1 can be disposed between two adjacent second portions 1311*a*2 of the plurality of second portions 1311*a*2. Each of the plurality of second portions 1311*a*2 can have a second width W2 parallel to the second direction Y (or the first direction X) and can be extended along the first direction X (or the second direction Y). The first width W1 can be a same as or different from the second width W2. For example, the first width W1 can be greater than the second width W2. For example, the first portion 1311*a*1 and the second portion 1311*a*2 can include a line shape or a stripe shape which has a same size or different sizes.

Each of the plurality of second portions 1311*a*2 can be configured to fill a gap between two adjacent first portions of the plurality of first portions 1311*a*1. Each of the plurality of second portions 1311*a*2 can be configured to fill a gap between two adjacent first portions of the plurality of first portions 1311*a*1, and thus, can be connected to or attached on lateral surfaces of the first portion 1311*a*1 adjacent thereto. According to an embodiment of the present disclosure, each of the plurality of first portions 1311*a*1 and the plurality of second portions 1311*a*2 can be disposed (or arranged) at a same plane (or a same layer) in parallel with each other. Therefore, the vibration part 1311*a* can be expanded to a desired size or length by a lateral coupling (or connection) of the first portions 1311*a*1 and the second portions 1311*a*2.

According to an embodiment of the present disclosure, each of the plurality of second portions 1311*a*2 can absorb an impact applied to the first portions 1311*a*1, and thus, can enhance the total durability of the first portions 1311*a*1 and provide flexibility to the vibration part 1311*a*. Each of the plurality of second portions 1311*a*2 can include an organic material having a ductile characteristic. For example, each of the plurality of second portions 1311*a*2 can include one or more of an epoxy-based polymer, an acrylic-based polymer, and a silicone-based polymer, but embodiments of the present disclosure are not limited thereto. For example, each of the plurality of second portions 1311*a*2 can be an organic portion, an organic material portion, an adhesive portion, a stretch portion, a bending portion, a damping portion, or a ductile portion, but embodiments of the present disclosure are not limited thereto.

A first surface of each of the plurality of first portions 1311*a*1 and the plurality of second portions 1311*a*2 can be connected to the first electrode part 1311*b* in common. A second surface of each of the plurality of first portions 1311*a*1 and the plurality of second portions 1311*a*2 can be connected to the second electrode part 1311*c* in common. For example, one or both of the first electrode part 1311*b* and the second electrode part 1311*c* can be formed as pattern-shaped electrodes to correspond only to the plurality of first portions 1311*a*1.

The plurality of first portions 1311*a*1 and the plurality of second portion 1311*a*2 can be disposed on (or connected to) the same plane, and thus, the vibration part 1311*a* according to another embodiment of the present disclosure can have a single thin film-type. Accordingly, the vibration generating part 1311 or the vibration generator 1310 including the vibration part 1311*a* according to another embodiment of the present disclosure can vibrate by the first portion 1311*a*1 having a vibration characteristic and can be bent in a curved shape by the second portion 1311*a*2 having flexibility.

Figure 53:
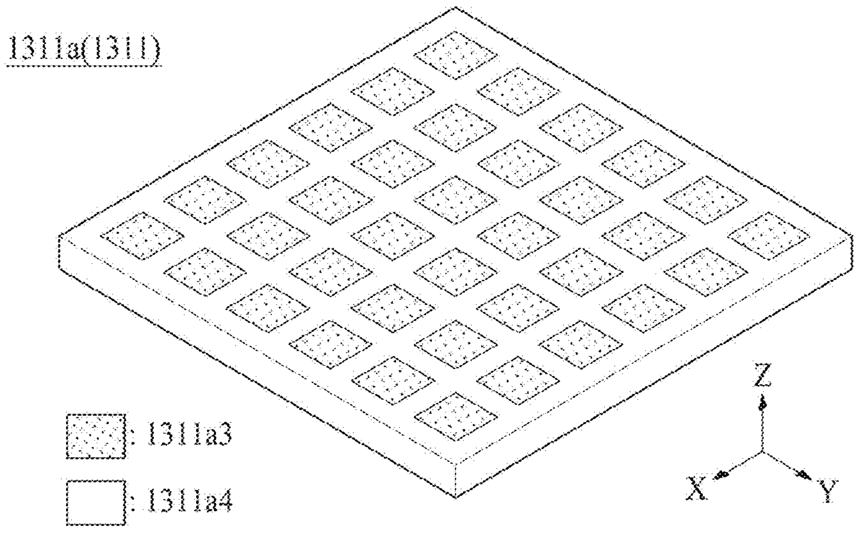
FIG. 53 illustrates a vibration part according to another embodiment of the present disclosure.

FIG. 53 illustrates a vibration part according to another embodiment of the present disclosure. Particularly, FIG. 53 illustrates another embodiment of the vibration part described above with reference to FIGS. 49 to 51.

With reference to FIGS. 50 and 53, the vibration part 1311*a* according to another embodiment of the present disclosure can include a plurality of first portions 1311*a*3 and a second portion 1311*a*4 disposed between the plurality of first portions 1311*a*3.

Each of the plurality of first portions 1311*a*3 can be disposed to be spaced apart from one another along each of the first direction X and the second direction Y. For example, each of the plurality of first portions 1311*a*3 can have a hexahedral shape having a same size and can be disposed in a lattice shape, but embodiments of the present disclosure are not limited thereto. For example, each of the plurality of first portions 1311*a*3 can have a circular shape plate, an oval shape plate, or a polygonal shape plate, which has a same size as each other, but embodiments of the present disclosure are not limited thereto.

Each of the plurality of first portions 1311*a*3 can be substantially a same as the first portion 1311*a*1 described above with reference to FIG. 52, and thus, repeated descriptions are omitted or will be briefly given below.

The second portion 1311*a*4 can be disposed between the plurality of first portions 1311*a*3 along each of the first direction X and the second direction Y. The second portion 1311*a*4 can be configured to fill a gap between two adjacent first portions 1311*a*3, or to be adjacent to each of the plurality of first portions 1311*a*3 or to surround each of the plurality of first portions 1311*a*3, and thus, the second portion 1311*a*4 can be connected to or attached on the first portion 1311*a*3 adjacent thereto. The second portion 1311*a*4 can be substantially a same as the second portion 1311*a*2 described above with reference to FIG. 52, and thus, repeated descriptions are omitted or will be briefly given below.

A first surface of each of the plurality of first portions 1311*a*3 and the second portions 1311*a*4 can be connected to the first electrode part 1311*b* in common. A second surface of each of the plurality of first portions 1311*a*3 and the second portions 1311*a*4 can be connected to the second electrode part 1311*c* in common. For example, one or both of the first electrode part 1311*b* and the second electrode part 1311*c* can be formed as pattern-shaped electrodes to correspond only to the plurality of first portions 1311*a*3.

The plurality of first portions 1311*a*3 and the second portion 1311*a*4 can be disposed on (or connected to) the same plane, and thus, the vibration part 1311*a* according to another embodiment of the present disclosure can have a single thin film-type. Accordingly, the vibration generating part 1311 or the vibration generator 1310 including the vibration part 1311*a* according to another embodiment of the present disclosure can vibrate by the first portion 1311*a*3 having a vibration characteristic and can be bent in a curved shape by the second portion 1311*a*4 having flexibility.

Figure 54:
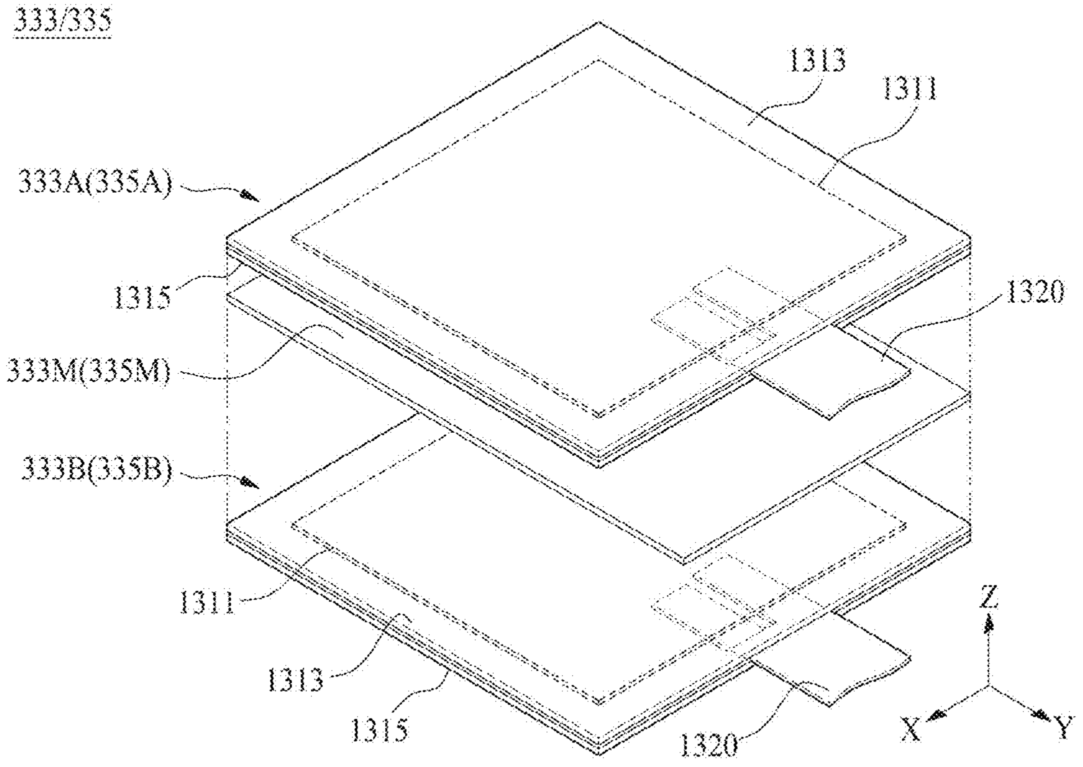
FIG. 54 illustrates a vibration apparatus according to another embodiment of the present disclosure.

FIG. 54 illustrates a vibration apparatus according to another embodiment of the present disclosure. Particularly, FIG. 54 illustrates a vibration apparatus including one or more vibration generators described above with reference to FIG. 7.

With reference to FIGS. 7 and 54, the vibration apparatus 333 and 335 according to another embodiment of the present disclosure can include two or more vibration generators 333A, 333B, 335A, and 335B. For example, the vibration apparatus 333 and 335 can include a first vibration generator 333A and 335A and a second vibration generator 333B and 335B.

The first vibration generator 333A and 335A and the second vibration generator 333B and 335B can overlap or be stacked with each other to be displaced (or driven or vibrated) in a same direction to maximize an amplitude displacement of the vibration apparatus 333 and 335 or an amplitude displacement of a vibration member 331. For example, the first vibration generator 333A and 335A and the second vibration generator 333B and 335B can have substantially a same size, but embodiments of the present disclosure are not limited thereto. For example, the first vibration generator 333A and 335A and the second vibration generator 333B and 335B can have substantially a same size within an error range of a manufacturing process, but embodiments of the present disclosure are not limited thereto. Therefore, the first vibration generator 333A and 335A and the second vibration generator 333B and 335B can maximize the amplitude displacement of the vibration apparatus 333 and 335 and/or the amplitude displacement of the vibration member 331.

According to an embodiment of the present disclosure, any one of the first vibration generator 333A and 335A and the second vibration generator 333B and 335B can be connected or coupled to the vibration member 331 by an adhesive member 332 and 334 illustrated in FIGS. 3 to 48. For example, the first vibration generator 333A and 335A can be connected or coupled to the vibration member 331 by the adhesive member 332 and 334.

Each of the first vibration generator 333A and 335A and the second vibration generator 333B and 335B can be a same as or substantially a same as the vibration generating part 1311 described above with reference to FIGS. 49 to 53, and thus, like reference numeral refer to like element and repeated descriptions are omitted or will be briefly given below.

The vibration apparatus 333 and 335 according to another embodiment of the present disclosure can further include an intermediate member 333M and 335M.

The intermediate member 333M and 335M can be disposed or connected between the first vibration generator 333A and 335A and the second vibration generator 333B and 335B. For example, the intermediate member 333M and 335M can be disposed or connected between the second cover member 1315 of the first vibration generator 333A and 335A and the first cover member 1313 of the second vibration generator 333B and 335B. For example, the intermediate member 333M and 335M can be an adhesive member or a connection member, but embodiments of the present disclosure are not limited thereto.

The intermediate member 333M and 335M according to an embodiment of the present disclosure can be configured in a material including an adhesive layer which is good in adhesive force or attaching force with respect to each of the first vibration generator 333A and 335A and the second vibration generator 333B and 335B. For example, the intermediate member 333M and 335M can include a foam pad, a double-sided tape, a double-sided foam tape, a double-sided pad, a double-sided foam pad, or an adhesive, or the like, but embodiments of the present disclosure are not limited thereto. For example, an adhesive layer of the intermediate member 333M and 335M can include epoxy, acrylic, silicone, or urethane, but embodiments of the present disclosure are not limited thereto. For example, the adhesive layer of the intermediate member 333M and 335M can include a urethane-based material (or substance) having relatively ductile characteristic. Accordingly, the vibration loss caused by displacement interference between the first vibration generator 333A and 335A and the second vibration generator 333B and 335B can be reduced or minimized, or each of the first vibration generator 333A and 335A and the second vibration generator 333B and 335B can be freely displaced (or vibrated or driven).

The vibration apparatus 333 and 335 according to another embodiment of the present disclosure can include the first vibration generator 333A and 335A and the second vibration generator 333B and 335B which are stacked (or piled or overlap) to vibrate (or displace or drive) in the same direction, and thus, the amount of displacement or an amplitude displacement can be maximized or increase. Accordingly, the amount of displacement (or a bending force or a driving force) or an amplitude of displacement of the vibration member 331 can be maximized or increased.

Figure 55:
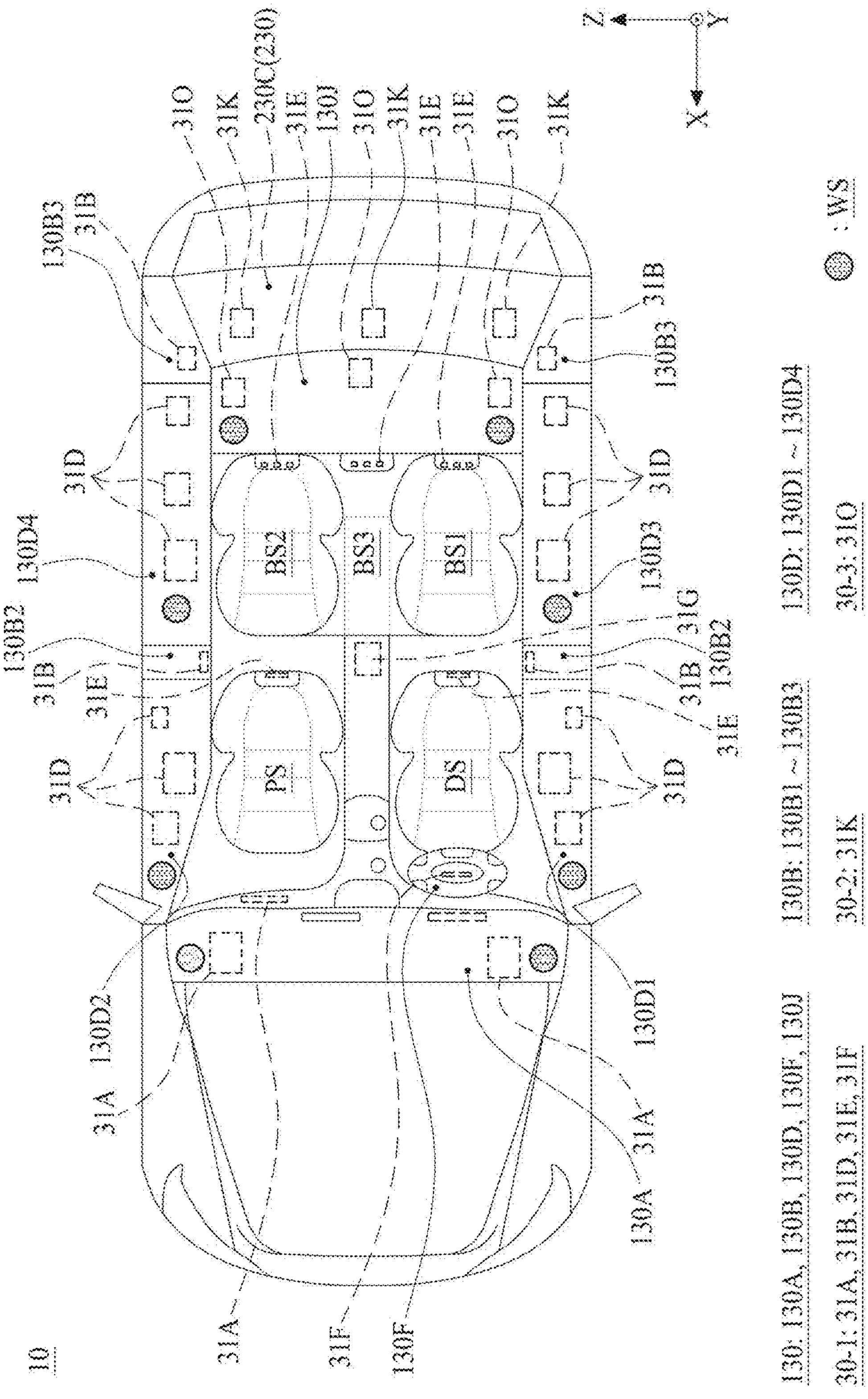
FIG. 55 illustrates a vehicular apparatus according to an embodiment of the present disclosure.
Figure 56:
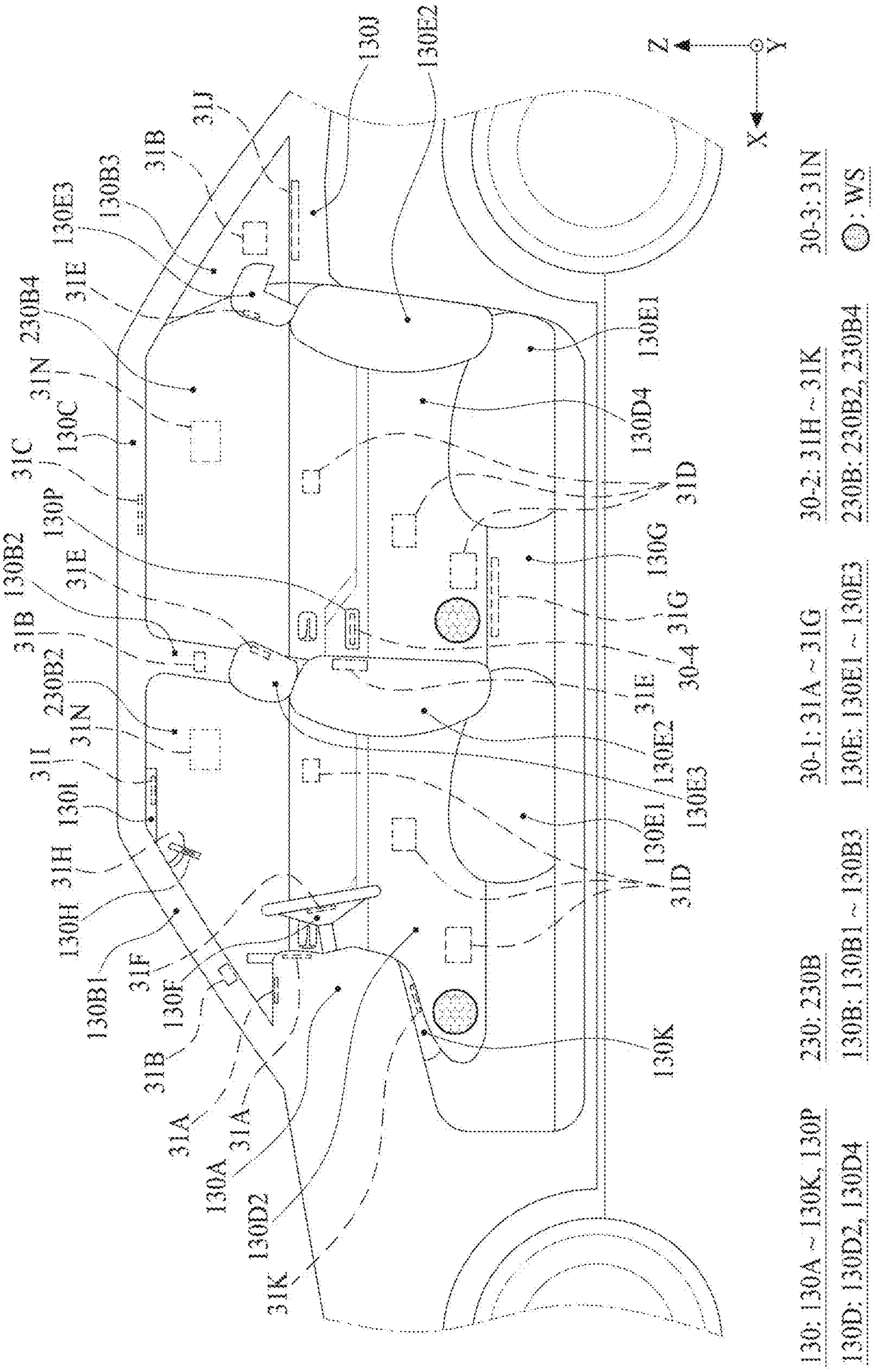
FIG. 56 illustrates a vehicular apparatus according to an embodiment of the present disclosure.
Figure 57:
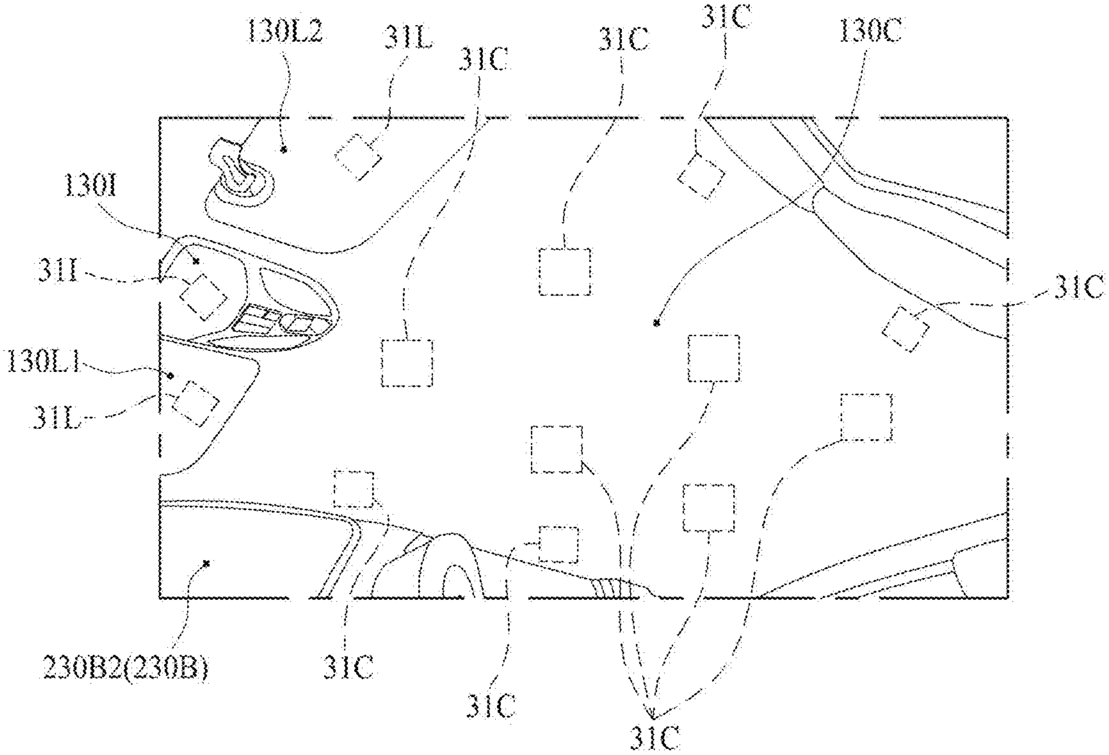
FIG. 57 illustrates a sound generating apparatus disposed at a roof of a vehicular apparatus illustrated in FIGS. 55 and 56 according to an embodiment of the present disclosure.
Figure 58:
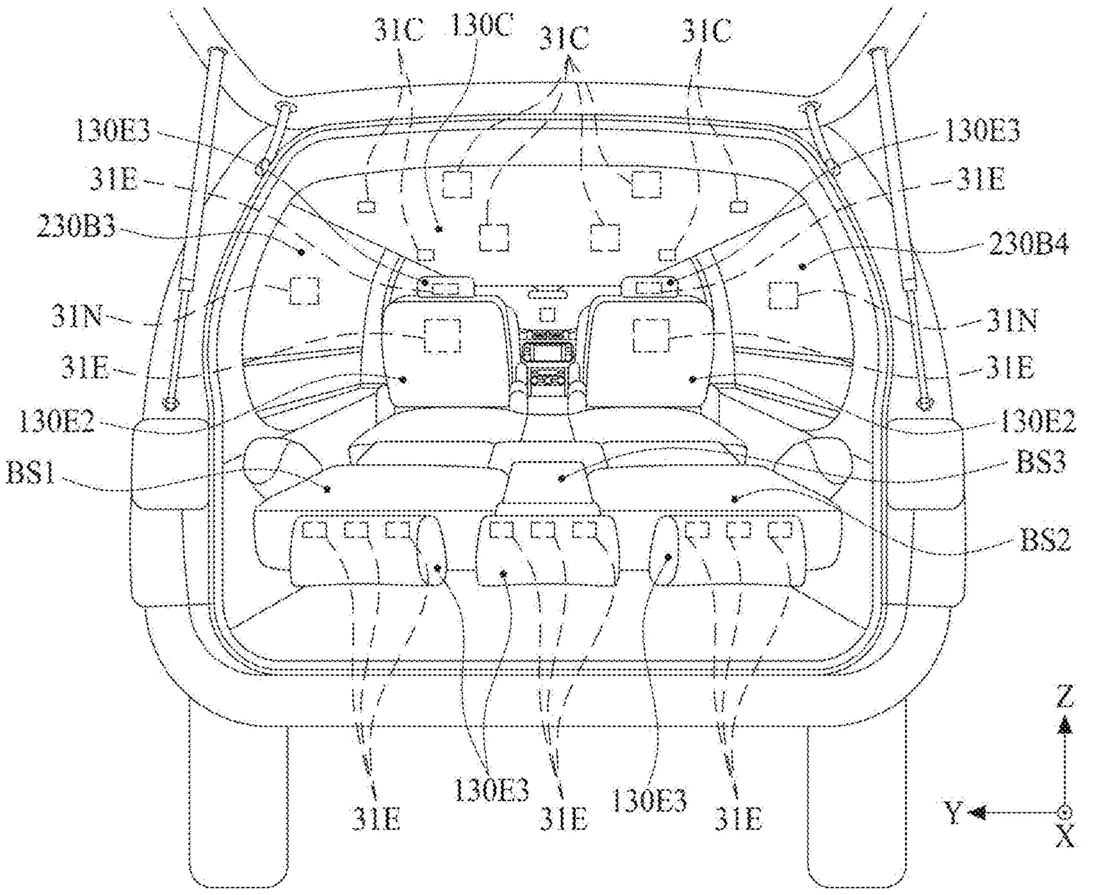
FIG. 58 illustrates a sound generating apparatus disposed at a roof and a seat of a vehicular apparatus illustrated in FIGS. 55 and 56 according to an embodiment of the present disclosure.

FIG. 55 illustrates a vehicular apparatus according to an embodiment of the present disclosure. FIG. 56 illustrates a vehicular apparatus according to an embodiment of the present disclosure. FIG. 57 illustrates a sound generating apparatus disposed at a roof of a vehicular apparatus illustrated in FIGS. 55 and 56 according to an embodiment of the present disclosure. FIG. 58 illustrates a sound generating apparatus disposed at a roof and a seat of a vehicular apparatus illustrated in FIGS. 55 and 56 according to an embodiment of the present disclosure. Descriptions of FIGS. 55 to 58 can be described with reference to FIGS. 1 and 2.

With reference to FIGS. 55 to 58, a vehicular apparatus 10 according to an embodiment of the present disclosure can include a vehicle interior material 130 and one or more sound generating apparatuses 30-1, 30-2, and 30-3.

According to an embodiment of the present disclosure, a vehicle interior material 130 can include at least one or more of a dashboard, a pillar interior material (or a pillar trim), a floor interior material (or a floor carpet), a roof interior material (or a headliner), a door interior material (or a door trim), a handle interior material (or a steering cover), a seat interior material, a rear package interior material (or a back seat shelf), an overhead console (or an indoor illumination interior material), a rear view mirror, a glove box, and a sun visor, or the like, but embodiments of the present disclosure are not limited thereto. The one or more sound generating apparatuses 30-1, 30-2, and 30-3 may vibrate at least one or more of the dashboard, the pillar interior material (or the pillar trim), the floor interior material (or the floor carpet), the roof interior material (or the headliner), the door interior material (or the door trim), the handle interior material (or the steering cover), the seat interior material, the rear package interior material (or the back seat shelf), the overhead console (or the indoor illumination interior material), the rear view mirror, the glove box, and the sun visor.

With reference to FIG. 55 in conjunction with FIGS. 1 and 2, the one or more sound generating apparatuses 30-1, 30-2, and 30-3 or a sound apparatus 30 can be configured at a region between the vehicle interior material 130 and the main structure 110, or a region between the vehicle interior material 130 and the exterior material 120. The one or more sound generating apparatuses 30-1, 30-2, and 30-3 or the sound apparatus 30 can be disposed at a region between the vehicle interior material 130 and the main structure 110, or a region between the vehicle interior material 130 and the exterior material 120, and can indirectly or directly vibrate one or more of the region between the vehicle interior material 130 and the main structure 110 or the region between the vehicle interior material 130 and the exterior material 120 to output sound.

With reference to FIG. 55 in conjunction with FIGS. 1, 2, and 47, the protection member 410 at at least one or more sound generating apparatuses 30-1, 30-2, and 30-3 according to an embodiment of the present disclosure can be disposed closer to at least one of the main structure 110 and the exterior material 120 than the vehicle interior material 130. For example, the protection member 410 in the at least one or more sound generating apparatuses 30-1, 30-2, and 30-3 can be spaced apart from each of the main structure 110 or the exterior material 120. For example, a space between the protection member 410 in the at least one or more sound generating apparatuses 30-1, 30-2, and 30-3 and the main structure 110 can be further included. For example, a space between the protection member 410 in the at least one or more sound generating apparatuses 30-1, 30-2, and 30-3 and the exterior material 120 can be further included. For example, a space between the protection member 410 in the at least one or more sound generating apparatuses 30-1, 30-2, and 30-3 and the main structure 110 and/or a space between the protection member 410 in the at least one or more sound generating apparatuses 30-1, 30-2, and 30-3 and the exterior material 120 can be further included. For example, the vehicular apparatus 10 according to an embodiment of the present disclosure can further include a space between the protection member 410 and one or more of the main structure 110 and the exterior material 120.

The vehicular apparatus 10 according to an embodiment of the present disclosure can include a first sound generating apparatus 30-1 which is configured to output a sound at the main structure 110, the exterior material 120, and a region between the main structure 110 and the vehicle interior material 130. For example, the first sound generating apparatus 30-1 can be disposed at at least one or more of between the main structure 110 and the exterior material 120 of the vehicular apparatus 10, between the main structure 110 and the vehicle interior material 130, the exterior material 120, the vehicle interior material 130, and between the exterior material 120 and the vehicle interior material 130 to output a sound. For example, the vehicle interior material 130 can output a sound based on a vibration of one or more first sound generating apparatuses 30-1. For example, the vehicle interior material 130 can be exposed at an interior space IS.

The first sound generating apparatus 30-1 can include at least one or more sound generating modules 31A to 31G which are disposed at at least one or more of the dashboard 130A, the pillar interior material 130B, the roof interior material 130C, the door interior material 130D, the seat interior material 130E, the handle interior material 130F, and the floor interior material 130G. For example, the first sound generating apparatus 30-1 can include at least one or more of the first to seventh sound generating modules 31A to 31G, and thus, can output sounds of one or more channels.

With reference to FIGS. 55 to 58, the first sound generating module 31A according to an embodiment of the present disclosure can be disposed between the dashboard 130A and a dash panel and can vibrate the dashboard 130A to output a sound based on a vibration of the dashboard 130A. For example, the first sound generating module 31A can be configured to directly vibrate the dashboard 130A to output a sound based on a vibration of the dashboard 130A.

For example, the first sound generating module 31A can include a sound generating module 330 or a sound apparatus 30 described above with reference to FIGS. 3 to 54, and thus, repeated descriptions are omitted. For example, the first sound generating module 31A can be a dashboard speaker.

According to an embodiment of the present disclosure, at least one or more of the dash panel and the dashboard 130A can include a first region corresponding to a driver seat DS, a second region corresponding to a passenger seat PS, and a third region (or a middle region) between the first region and the second region. At least one or more of the dash panel and the dashboard 130A can include a fourth region which is inclined to face the passenger seat PS. According to an embodiment of the present disclosure, the first sound generating module 31A can be disposed to vibrate at least one or more of the first to fourth regions of the dashboard 130A. For example, the first sound generating module 31A can be disposed at each of the first and second regions of the dashboard 130A, or can be disposed at each of the first to fourth regions of the dashboard 130A. For example, the first sound generating module 31A can be disposed at each of the first and second regions of the dashboard 130A, or can be disposed at at least one or more of the first to fourth regions of the dashboard 130A. For example, the first sound generating module 31A can be configured to output a sound of about 150 Hz to about 20 kHz. For example, the first sound generating module 31A configured to vibrate at least one or more of the first to fourth regions of the dashboard 130A can have a same sound output characteristic or different sound output characteristics. For example, the first sound generating module 31A configured to vibrate each of the first to fourth regions of the dashboard 130A can have a same sound output characteristic or different sound output characteristics.

The second sound generating module 31B according to an embodiment of the present disclosure can be disposed between the pillar interior material 130B and a pillar panel and can vibrate the pillar interior material 130B to output a sound based on a vibration of the pillar interior material 130B. For example, the second sound generating module 31B can directly vibrate the pillar interior material 130B to output a sound based on a vibration of the pillar interior material 130B. For example, the second sound generating module 31B can include a sound generating module 330 or a sound apparatus 30 described above with reference to FIGS. 3 to 54, and thus, repeated descriptions are omitted. For example, the second sound generating module 31B can be a pillar speaker or a tweeter speaker.

According to an embodiment of the present disclosure, the pillar panel can include a first pillar (or an A pillar) disposed at both sides of a front window, a second pillar (or a B pillar) disposed at both sides of a center of a vehicle body, and a third pillar (or a C pillar) disposed at both sides of a rear portion of the vehicle body. The pillar interior material 130B can include a first pillar interior material 130B1 covering the first pillar, a second pillar interior material 130B2 covering the second pillar, and a third pillar interior material 130B3 covering the third pillar. According to an embodiment of the present disclosure, the second sound generating module 31B can be disposed at at least one or more of a region between the first pillar and the first pillar interior material 130B1, a region between the second pillar and the second pillar interior material 130B2, and a region between the third pillar and the third pillar interior material 130B3, and thus, can vibrate at least one or more of the first to third pillar interior materials 130B1 to 130B3. For example, the second sound generating module 31B can be configured to output a sound at about 2 kHz to about 20 kHz, but embodiments of the present disclosure are not limited thereto. For example, the second sound generating module 31B can be configured to output a sound at about 150 Hz to about 20 kHz. For example, the second sound generating module 31B configured to vibrate at least one or more of the first to third pillar interior materials 130B1 to 130B3 can have a same sound output characteristic or different sound output characteristics. The various sound generating modules can be provided in a vehicle display 150, such as a speedometer 151 or a passenger display 170 such as a detachable tablet or other displays 171.

With reference to FIGS. 56 to 58, the third sound generating module 31C according to an embodiment of the present disclosure can be disposed between the roof interior material 130C and a roof frame (or a roof panel) and can vibrate the roof interior material 130C to output a sound based on a vibration of the roof interior material 130C. For example, the third sound generating module 31C can directly vibrate the roof interior material 130C to output a sound based on a vibration of the roof interior material 130C. For example, the third sound generating module 31C can include a sound generating module 330 or a sound apparatus 30 described above with reference to FIGS. 3 to 54, and thus, repeated descriptions are omitted. For example, the third sound generating module 31C can be a roof speaker.

With reference to FIG. 57, at least one or more the third sound generating modules 31C can be disposed at the roof interior material 130C. For example, at least six or more third sound generating modules 31C can be disposed at the roof interior material 130C, but embodiments of the present disclosure are not limited thereto.

According to an embodiment of the present disclosure, at least one or more of the roof frame and the roof interior material 130C covering the roof frame can include the first region corresponding to the driver seat DS, the second region corresponding to the passenger seat PS, a third region corresponding to a region between the driver seat DS and the passenger seat PS, a fourth region corresponding to a first rear seat BS1 behind the driver seat DS, a fifth region corresponding to a second rear seat BS2 behind the passenger seat PS, a sixth region corresponding to a region between the first rear seat BS1 and the second rear seat BS2, and a seventh region between the third region and the sixth region. For example, the third sound generating module 31C can be disposed to vibrate at least one or more among the first to seventh regions of the roof interior material 130C. For example, the third sound generating module 31C can be disposed to vibrate at least one or more of the first to seventh regions of the roof interior material 130C. For example, the third sound generating module 31C can be configured to output a sound of about 150 Hz to about 20 kHz. For example, the third sound generating module 31C configured to vibrate at least one or more of the first to seventh regions of the roof interior material 130C can have a same sound output characteristic or different sound output characteristics. For example, the third sound generating module 31C configured to vibrate each of the first to seventh regions of the roof interior material 130C can have a same sound output characteristic or different sound output characteristics. For example, at least one or more third sound generating modules 31C configured to vibrate at least one or more of the first to seventh regions of the roof interior material 130C can be configured to output a sound of about 2 kHz to about 20 kHz, and the other third sound generating modules 31C can be configured to output a sound of about 150 Hz to about 20 kHz. For example, at least one or more third sound generating modules 31C configured to vibrate each of the first to seventh regions of the roof interior material 130C can be configured to output a sound of about 2 kHz to about 20 kHz, and the other third sound generating modules 31C can be configured to output a sound of about 150 Hz to about 20 KHz.

With reference to FIGS. 55 and 56, the fourth sound generating module 31D according to an embodiment of the present disclosure can be disposed between the door frame and the door interior material 130D and can vibrate the door interior material 130D to output a sound based on a vibration of the door interior material 130D. For example, the fourth sound generating module 31D can directly vibrate the door interior material 130D to output a sound based on a vibration of the door interior material 130D. According to an embodiment of the present disclosure, the fourth sound generating module 31D can include a sound generating module 330 or a sound apparatus 30 described above with reference to FIGS. 3 to 54, and thus, repeated descriptions are omitted. For example, the fourth sound generating module 31D can be a door speaker.

According to an embodiment of the present disclosure, at least one or more of the door frame and the door interior material 130D can include an upper region, a middle region, and a lower region with respect to a height direction Z of the vehicular apparatus 10. For example, the fourth sound generating module 31D can be disposed at at least one or more of the upper region, the middle region, and the lower region between the door frame and the door interior material 130D, and thus, can vibrate at least one or more of the upper region, the middle region, and the lower region of the door interior material 130D.

According to an embodiment of the present disclosure, the upper region of the door interior material 130D can have a relatively small curvature radius. The fourth sound generating module 31D for vibrating the upper region of the door interior material 130D can include the sound apparatus having a flexible characteristic described above with reference to FIGS. 52 and 53.

According to an embodiment of the present disclosure, the door frame can include a first door frame (or a left front door frame), a second door frame (or a right front door frame), a third door frame (or a left rear door frame), and a fourth door frame (or a right rear door frame). According to an embodiment of the present disclosure, the door interior material 130D can include a first door interior material (or a left front door interior material) 130D1 covering the first door frame, a second door interior material (or a right front door interior material) 130D2 covering the second door frame, a third door interior material (or a left rear door interior material) 130D3 covering the third door frame, and a fourth door interior material (or a right rear door interior material) 130D4 covering the fourth door frame. For example, the fourth sound generating module 31D can be disposed at at least one or more of an upper region, a middle region, and a lower region between each of the first to fourth door frames and the first to fourth door interior materials 130D1 to 130D4 and can vibrate at least one or more of the upper region, the middle region, and the lower region of each of the first to fourth door interior materials 130D1 to 130D4.

According to an embodiment of the present disclosure, the fourth sound generating module 31D configured to vibrate the upper region of each of the first to fourth door interior materials 130D1 to 130D4 can be configured to output a sound of about 2 kHz to about 20 kHz, or can be configured to output a sound of about 150 Hz to about 20 kHz. For example, the fourth sound generating module 31D configured to vibrate the upper regions of at least one or more of the first to fourth door interior materials 130D1 to 130D4 can be configured to output a sound of about 2 kHz to about 20 kHz, or can be configured to output a sound of about 150 Hz to about 20 KHz.

According to an embodiment of the present disclosure, the fourth sound generating module 31D configured to vibrate the middle regions and the lower regions of at least one or more of the first to fourth door interior materials 130D1 to 130D4 can be configured to output a sound of about 150 Hz to about 20 kHz. The fourth sound generating module 31D configured to vibrate the middle region and the lower region of each of the first to fourth door interior materials 130D1 to 130D4 can be configured to output a sound of about 150 Hz to about 20 kHz. For example, the fourth sound generating module 31D configured to vibrate the middle regions and the lower regions of at least one or more of the first to fourth door interior materials 130D1 to 130D4 can be one or more of a woofer, a mid-woofer, and a sub-woofer. For example, the fourth sound generating module 31D configured to vibrate the middle region and the lower region of each of the first to fourth door interior materials 130D1 to 130D4 can be one or more of a woofer, a mid-woofer, and a sub-woofer.

Sounds, which are respectively output from the fourth sound generating module 31D disposed at the first door interior material 130D1 and the fourth sound generating module 31D disposed at the second door interior material 130D2, can be combined and output. For example, sounds, which are respectively output from at least one or more of the fourth sound generating modules 31D disposed at the first door interior material 130D1 and the fourth sound generating module 31D disposed at the second door interior material 130D2, can be combined and output. In addition, sounds, which are respectively output from the fourth sound generating module 31D disposed at the third door interior material 130D3 and the fourth sound generating module 31D disposed at the fourth door interior material 130D4 can be combined and output.

According to an embodiment of the present disclosure, the upper region of each of the first to fourth door interior materials 130D1 to 130D4 can include a first upper region adjacent to the dashboard 130A, a second upper region adjacent to the rear seats BS1, BS2, and BS3, and a third upper region between the first upper region and the second upper region. For example, the fourth sound generating module 31D can be disposed at one or more of the first to third upper regions of each of the first to fourth door interior materials 130D1 to 130D4. For example, the fourth sound generating module 31D can be disposed at the first upper region of each of the first and second door interior materials 130D1 and 130D2 and can be disposed at one or more of the second and third upper regions of each of the first and second door interior materials 130D1 and 130D2. For example, the fourth sound generating module 31D can be disposed at one or more among the first to third upper regions of one or more of the first to fourth door interior materials 130D1 to 130D4. For example, the fourth sound generating module 31D configured to vibrate the first upper regions of one or more of the first and second door interior materials 130D1 and 130D2 can be configured to output a sound of about 2 kHz to about 20 kHz, and the fourth sound generating module 31D configured to vibrate one or more among the second and third upper regions of each of the first and second door interior materials 130D1 and 130D2 can be configured to output a sound of about 2 kHz to about 20 kHz, or can be configured to output a sound of about 150 Hz to about 20 kHz. For example, the fourth sound generating module 31D configured to vibrate one or more among the second and third upper regions of at least one or more of the first and second door interior materials 130D1 and 130D2 can be configured to output a sound of about 2 kHz to about 20 kHz, or can be configured to output a sound of about 150 Hz to about 20 KHz.

With reference to FIGS. 55, 56, and 58, the fifth sound generating module 31E according to an embodiment of the present disclosure can be disposed between a seat frame and the seat interior material 130E and can vibrate the seat interior material 130E to output a sound based on a vibration of the seat interior material 130E. For example, the fifth sound generating module 31E can directly vibrate the seat interior material 130E to output a sound based on a vibration of the seat interior material 130E. According to an embodiment of the present disclosure, the fifth sound generating module 31E can include a sound generating module 330 or a sound apparatus 30 described above with reference to FIGS. 3 to 54, and thus, repeated descriptions are omitted. For example, the fifth sound generating module 31E can be a sheet speaker or a headrest speaker.

According to an embodiment of the present disclosure, the seat frame can include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the seat interior material 130E can include the first seat interior material surrounding the first seat frame, the second seat interior material surrounding the second seat frame, the third seat interior material surrounding the third seat frame, the fourth seat interior material surrounding the fourth seat frame, and the fifth seat interior material surrounding the fifth seat frame.

According to an embodiment of the present disclosure, at least one or more of the first to fifth seat frames can include a seat bottom frame, a seat back frame, and a headrest frame. The seat interior material 130E can include a seat bottom interior material 130E1 surrounding the seat bottom frame, a seat back interior material 130E2 surrounding the seat back frame, and a headrest interior material 130E3 surrounding the headrest frame. At least one or more of the seat bottom interior material 130E1, the seat back interior material 130E2, and the headrest interior material 130E3 can include an inner interior material and an outer interior material. For example, the inner interior material can include a foam layer. For example, as described above with reference to FIG. 2, the outer interior material can include an outer member including a fiber or leather. For example, the outer interior material can further include a base member including a plastic material which supports the outer member.

According to an embodiment of the present disclosure, the fifth sound generating module 31E can be disposed at at least one or more of a region between the seat back frame and the seat back interior material 130E2 and a region between the headrest frame and the headrest interior material 130E3, and thus, can vibrate at least one or more of the outer interior material of the seat back interior material 130E2 and the outer interior material of the headrest interior material 130E3.

According to an embodiment of the present disclosure, the fifth sound generating module 31E disposed at at least one or more of the driver seat DS and the passenger seat PS can be disposed at at least one or more of the region between the seat back frame and the seat back interior material 130E2 and the region between the headrest frame and the headrest interior material 130E3.

According to an embodiment of the present disclosure, the fifth sound generating module 31E disposed at at least one or more of the first to third rear seats BS1, BS2, and BS3 can be disposed between the headrest frame and the headrest interior material 130E3. For example, at least one or more of the first to third rear seats BS1, BS2, and BS3 can include at least one or more fifth sound generating modules 31E disposed between the headrest frame and the headrest interior material 130E3.

According to an embodiment of the present disclosure, the fifth sound generating module 31E vibrating the seat back interior materials 130E2 of at least one or more of the driver seat DS and the passenger seat PS can be configured to output a sound of about 150 Hz to about 20 KHz.

According to an embodiment of the present disclosure, the fifth sound generating module 31E vibrating the headrest interior materials 130E3 of at least one or more of the driver seat DS, the passenger seat PS, and the first to third rear seats BS1, BS2, and BS3 can be configured to output a sound of about 2 kHz to about 20 kHz, or can be configured to output a sound of about 150 Hz to about 20 kHz.

With reference to FIGS. 55 and 56, the sixth sound generating module 31F according to an embodiment of the present disclosure can be disposed between a handle frame and the handle interior material 130F and can vibrate the handle interior material 130F to output a sound based on a vibration of the handle interior material 130F. For example, the sixth sound generating module 31F can directly vibrate the handle interior material 130F to output a sound based on a vibration of the handle interior material 130F. According to an embodiment of the present disclosure, the sixth sound generating module 31F can include a sound generating module 330 or a sound apparatus 30 described above with reference to FIGS. 3 to 54, and thus, repeated descriptions are omitted. For example, the sixth sound generating module 31F can be a handle speaker or a steering speaker.

According to an embodiment of the present disclosure, the sixth sound generating module 31F can vibrate the handle interior material 130F to provide a driver with a sound based on a vibration of the handle interior material 130F. For example, the sixth sound generating module 31F can directly vibrate the handle interior material 130F to provide the driver with the sound based on the vibration of the handle interior material 130F. A sound output by the sixth sound generating module 31F can be a sound which is a same as or different from a sound output from each of the first to fifth sound generating modules 31A to 31E. For example, a sound output by the sixth sound generating module 31F can be a sound which is the same as or different from sounds output from at least one or more of the first to fifth sound generating modules 31A to 31E. As an embodiment of the present disclosure, the sixth sound generating module 31F can output a sound which is to be provided to only the driver. As another embodiment of the present disclosure, the sound output by the sixth sound generating module 31F and a sound output by each of the first to fifth sound generating modules 31A to 31E can be combined and output. For example, the sound output by the sixth sound generating module 31F and the sound output by at least one or more of the first to fifth sound generating modules 31A to 31E can be combined and output.

With reference to FIGS. 55 and 56, the seventh sound generating module 31G can be disposed between the floor panel and the floor interior material 130G and can vibrate the floor interior material 130G to output a sound based on a vibration of the floor interior material 130G. For example, the seventh sound generating module 31G can directly vibrate the floor interior material 130G to output the sound based on the vibration of the floor interior material 130G.

The seventh sound generating module 31G can be disposed between the floor panel and the floor interior material 130G disposed between the front seats DS and PS and the third rear seat BS3. For example, the seventh sound generating module 31G can include a sound generating module 330 or a sound apparatus 30 described above with reference to FIGS. 3 to 54, and thus, repeated descriptions are omitted. For example, the seventh sound generating module 31G can be configured to output a sound of about 150 Hz to about 20 kHz. For example, the seventh sound generating module 31G can be a floor speaker, a bottom speaker, or an under speaker.

With reference to FIGS. 55 to 57, the vehicular apparatus or the vehicle 10 according to an embodiment of the present disclosure can further include a second sound generating apparatus 30-2 which is disposed at the vehicle interior material 130 exposed at an interior space. For example, the vehicular apparatus or the vehicle 10 according to an embodiment of the present disclosure can include only the second sound generating apparatus 30-2 instead of the first sound generating apparatus 30-1, or can include all of the first sound generating apparatus 30-1 and the second sound generating apparatus 30-2.

According to an embodiment of the present disclosure, the vehicle interior material 130 can further include a rear view mirror 130H, an overhead console 130I, a rear package interior material 130J, a glove box 130K, and a sun visor 130L, or the like.

The second sound generating apparatus 30-2 can include at least one or more sound generating modules 31H to 31L which are disposed at at least one or more of the rear view mirror 130H, the overhead console 130I, the rear package interior material 130J, the glove box 130K, and the sun visor 130L. For example, the second sound generating apparatus 30-2 can include at least one or more of eighth to twelfth sound generating modules 31H to 31L, and thus, can output sounds of one or more channels.

With reference to FIGS. 55 to 57, the eighth sound generating module 31H can be disposed at the rear view mirror 130H and can vibrate the rear view mirror 130H to output a sound based on a vibration of the rear view mirror 130H. For example, the eighth sound generating module 31H can be configured to directly vibrate the rear view mirror 130H to output the sound based on the vibration of the rear view mirror 130H.

The eighth sound generating module 31H can be disposed between a mirror housing connected to a vehicle body structure and the rear view mirror 130H supported by the mirror housing. According to an embodiment of the present disclosure, the eighth sound generating module 31H can include a sound generating module 330 or a sound apparatus 30 described above with reference to FIGS. 3 to 54, and thus, repeated descriptions are omitted. For example, the eighth sound generating module 31H can be configured to output a sound of about 150 Hz to about 20 kHz. For example, the eighth sound generating module 31H can be a mirror speaker.

With reference to FIGS. 57 and 58, the ninth sound generating module 31I can be disposed at the overhead console 130I and can vibrate a console cover of the overhead console 130I to output a sound based on a vibration of an interior material (or the console cover) of the overhead console 130I. For example, the ninth sound generating module 31I can be configured to directly vibrate the console cover of the overhead console 130I to output the sound based on the vibration of the interior material (or the console cover) of the overhead console 130I.

According to an embodiment of the present disclosure, the overhead console 130I can include a console box buried (or embedded) into the roof panel, a lighting device disposed at the console box, and the console cover covering the lighting device and the console box.

The ninth sound generating module 31I can be disposed between the console cover and the console box of the overhead console 130I and can vibrate the console cover. For example, the ninth sound generating module 31I can be disposed between the console cover and the console box of the overhead console 130I and can directly vibrate the console cover. According to an embodiment of the present disclosure, the ninth sound generating module 31I can include a sound generating module 330 or a sound apparatus 30 described above with reference to FIGS. 3 to 54, and thus, repeated descriptions are omitted. For example, the ninth sound generating module 31I can be configured to output a sound of about 150 Hz to about 20 kHz. For example, the ninth sound generating module 31I can be a console speaker or a lighting speaker.

According to an embodiment of the present disclosure, the vehicular apparatus or the vehicle 10 can further include a center lighting box disposed at a center region of the roof interior material 130C, a center lighting device disposed at the center lighting box, and a center lighting cover covering the center lighting device. In this case, the ninth sound generating module 31I can be further disposed between a center lighting cover and a center lighting box of the center lighting device and can additionally vibrate the center lighting cover.

With reference to FIGS. 55 and 57, the tenth sound generating module 31J can be disposed at the rear package interior material 130J and can vibrate the rear package interior material 130J to output a sound based on a vibration of the rear package interior material 130J. For example, the ninth sound generating module 31I can be configured to directly vibrate the rear package interior material 130J to output the sound based on the vibration of the rear package interior material 130J.

The rear package interior material 130J can be disposed behind the first to third rear seats BS1, BS2, and BS3. For example, a portion of the rear package interior material 130J can be disposed under a rear window 230C.

The tenth sound generating module 31J can be disposed at a rear surface of the rear package interior material 130J and can vibrate the rear package interior material 130J. For example, the tenth sound generating module 31J can directly vibrate the rear package interior material 130J. According to an embodiment of the present disclosure, the tenth sound generating module 31J can include a sound generating module 330 or a sound apparatus 30 described above with reference to FIGS. 3 to 54, and thus, repeated descriptions are omitted. For example, the tenth sound generating module 31J can be a rear speaker.

According to an embodiment of the present disclosure, the rear package interior material 130J can include a first region corresponding to a rear portion of the first rear seat BS1, a second region corresponding to a rear portion of the second rear seat BS2, and a third region corresponding to a rear portion of the third passenger seat BS3. According to an embodiment of the present disclosure, the tenth sound generating module 31J can be disposed to vibrate at least one or more of the first to third regions of the rear package interior material 130J. For example, the tenth sound generating module 31J can be disposed at each of the first and second regions of the rear package interior material 130J, or can be disposed at each of the first to third regions of the rear package interior material 130J. For example, the tenth sound generating module 31J can be disposed at at least one or more of the first and second regions of the rear package interior material 130J, or can be disposed at at least one or more of the first to third regions of the rear package interior material 130J. For example, the tenth sound generating module 31J can be configured to output a sound of about 150 Hz to about 20 kHz. For example, the tenth sound generating module 31J configured to vibrate each of the first to third regions of the rear package interior material 130J can have a same sound output characteristic or different sound output characteristics. For example, the tenth sound generating module 31J configured to vibrate at least one or more of the first to third regions of the rear package interior material 130J can have a same sound output characteristic or different sound output characteristics.

With reference to FIGS. 55 and 57, the eleventh sound generating module 31K can be disposed at a glove box 130K and can vibrate the glove box 130K to output a sound based on a vibration of the glove box 130K. For example, the eleventh sound generating module 31K can directly vibrate the glove box 130K to output the sound based on the vibration of the glove box 130K.

The glove box 130K can be disposed at a dashboard 130A corresponding to a front portion of the passenger seat PS.

The eleventh sound generating module 31K can be disposed at an inner surface of the glove box 130K and can vibrate the glove box 130K. For example, the eleventh sound generating module 31K can directly vibrate the glove box 130K. According to an embodiment of the present disclosure, the eleventh sound generating module 31K can include a sound generating module 330 or a sound apparatus 30 described above with reference to FIGS. 3 to 54, and thus, repeated descriptions are omitted. For example, the eleventh sound generating module 31K can be configured to output a sound of about 150 Hz to about 20 kHz, or can be one or more of a woofer, a mid-woofer, and a sub-woofer. For example, the eleventh sound generating module 31K can be a glove box speaker.

With reference to FIG. 57, the twelfth sound generating module 31L can be disposed at the sun visor 130L and can vibrate the sun visor 130L to output a sound based on a vibration of the sun visor 130L. For example, the twelfth sound generating module 31L can directly vibrate the sun visor 130L to output the sound based on the vibration of the sun visor 130L.

The sun visor 130L can include a first sun visor 130L1 corresponding to the driver seat DS and a second sun visor 130L2 corresponding to the passenger seat PS.

The twelfth sound generating module 31L can be disposed at at least one or more of the first sun visor 130L1 and the second sun visor 130L2 and can vibrate at least one or more of the first sun visor 130L1 and the second sun visor 130L2. For example, the twelfth sound generating module 31L can directly vibrate at least one or more of the first sun visor 130L1 and the second sun visor 130L2. According to an embodiment of the present disclosure, the twelfth sound generating module 31L can include a sound generating module 330 or a sound apparatus 30 described above with reference to FIGS. 3 to 54, and thus, repeated descriptions are omitted. For example, the twelfth sound generating module 31L can be configured to output a sound of about 150 Hz to about 20 kHz. For example, the twelfth sound generating module 31L can be a sun visor speaker.

According to an embodiment of the present disclosure, at least one or more of the first sun visor 130L1 and the second sun visor 130L2 can further include a sun visor mirror. In this case, the twelfth sound generating module 31L can be configured to vibrate a sun visor mirror of at least one or more of the first sun visor 130L1 and the second sun visor 130L2. The twelfth sound generating module 31L can directly vibrate the sun visor mirror of at least one or more of the first sun visor 130L1 and the second sun visor 130L2. The twelfth sound generating module 31L vibrating the sun visor mirror can include a sound generating module 330 or a sound apparatus 30 described above with reference to FIGS. 3 to 54, and thus, repeated descriptions are omitted.

With reference to FIGS. 55 to 57, the vehicular apparatus or the vehicle 10 according to an embodiment of the present disclosure can further include a third sound generating apparatus 30-3 disposed at a vehicle window 230. For example, the vehicular apparatus or the vehicle 10 according to an embodiment of the present disclosure can include the third sound generating apparatus 30-3 instead of at least one or more of the first and second sound generating apparatuses 30-1 and 30-2, or can include all of the first to third sound generating apparatuses 30-1 to 30-3.

The third sound generating apparatus 30-3 can include at least one or more sound generating modules 31N to 31O disposed at the vehicle window 230. For example, the third sound generating apparatus 30-3 can include at least one or more of thirteenth and fourteenth sound generating modules 31N and 31O, and thus, can output sounds of one or more channels. For example, the third sound generating apparatus 30-3 can be a transparent sound generating apparatus.

The vehicle window 230 of the vehicular apparatus or the vehicle 10 can include at least one or more of a front window and a side glass window. The vehicle window 230 of the vehicular apparatus can further include at least one or more of a rear window and a roof window.

The vehicle window 230 according to an embodiment of the present disclosure can be configured to be entirely transparent. The vehicle window 230 according to another embodiment of the present disclosure can include a transparent portion and a semitransparent portion surrounding the transparent portion. The vehicle window 230 according to another embodiment of the present disclosure can include a transparent portion and an opaque portion surrounding the transparent portion.

The sound generating module 330 described above with reference to FIGS. 3 to 54 can be configured to be transparent or semitransparent. For example, when the vehicle window 230 is wholly transparent, the sound generating module 330 can be configured to be transparent and can be disposed at a middle region or a peripheral region of the vehicle window 230. When the vehicle window 230 includes the semitransparent portion or the opaque portion, the sound generating module 330 can be configured to be semitransparent or opaque and can be disposed at the semitransparent portion or the opaque portion of the vehicle window 230. For example, the sound generating module 330 can be a transparent sound generating module.

With reference to FIGS. 55 to 58 in conjunction with FIG. 1, the sound generating module 330 can be disposed at one surface (or an indoor surface) of the vehicle window 230 exposed at inside and/or an interior space IS of the vehicular apparatus or the vehicle 10. For example, a sound generating apparatus 30-1, 30-2, and 30-2 for vehicles can include at least one or more sound generating nodules 330 disposed at the vehicle window 230 or a plurality of sound generating modules 330 disposed at the vehicle window 230. As an embodiment of the present disclosure, the sound generating module 330 can be disposed at at least one or more of the front window and the side window and can be further disposed at at least one or more of the rear window and the roof window.

The at least one or more of the thirteenth and fourteenth sound generating modules 31N and 31O can include the transparent or semitransparent sound generating module 330. For example, when the at least one or more of the thirteenth and fourteenth sound generating modules 31N and 31O includes the sound generating module 330, the at least one or more of the thirteenth and fourteenth sound generating modules 31N and 31O can vibrate the vehicle window 230 to output a sound based on a vibration of the vehicle window 230. For example, the at least one or more of the thirteenth and fourteenth sound generating modules 31N and 31O can directly vibrate the vehicle window 230 to output a sound based on a vibration of the vehicle window 230.

According to an embodiment of the present disclosure, the vehicle window 230 can include the front window, the side window 230B, and the rear window. According to an embodiment of the present disclosure, the vehicle window 230 can further include the roof window 230D. For example, when the vehicular apparatus or the vehicle 10 includes the roof window 230D, a portion of a region of the roof frame and the roof interior material 130C can be replaced with the roof window 230D. For example, when the vehicular apparatus or the vehicle 10 includes the roof window 230D, the third sound generating module 31C can be configured to vibrate a periphery portion of the roof interior material 130C surrounding the roof window 230D.

With reference to FIGS. 56 to 58, the thirteenth sound generating module 31N according to an embodiment of the present disclosure can be disposed at the side window 230B and can be configured to output a sound by vibrating itself (or self-vibration thereof), or can be configured to indirectly or directly vibrate the side window 230B to output a sound based on a vibration of the side window 230B. For example, the thirteenth sound generating module 31N can directly vibrate the side window 230B to output a sound based on the vibration of the side window 230B.

According to an embodiment of the present disclosure, the side window 230B can include a first glass window (or a right front window) 230B2, a second side window (or a left rear window) 230B3, a third side window (or a right rear window) 230B4, and a fourth side window (or a left front window).

According to an embodiment of the present disclosure, the thirteenth sound generating module 31N can be disposed at at least one or more of the first to third side windows 230B2, 230B3, and 230B4. For example, at least one or more of the first to third side windows 230B2, 230B3, and 230B4 can include at least one or more thirteenth sound generating modules 31N.

According to an embodiment of the present disclosure, the thirteenth sound generating module 31N can be disposed at at least one or more of the first to third side windows 230B2, 230B3, and 230B4 and can output a sound by vibrating itself (or self-vibration thereof), or can vibrate a corresponding side windows 230B2, 230B3, and 230B4 to output a sound. For example, the thirteenth sound generating module 31N can directly vibrate the side windows 230B2, 230B3, and 230B4 to output the sound. For example, the thirteenth sound generating module 31N can be configured to output the sound of 150 Hz to 20 kHz. For example, the thirteenth sound generating module 31N disposed at at least one or more of the first to third side windows 230B2, 230B3, and 230B4 can have a same sound output characteristic or different sound output characteristics. For example, the thirteenth sound generating module 31N can be configured to output the sound of 150 Hz to 20 kHz. For example, the thirteenth sound generating module 31N can be a side window speaker.

With reference to FIG. 55, the fourteenth sound generating module 31O according to an embodiment of the present disclosure can be disposed at the rear window 230C and can output a sound by vibrating itself (or self-vibration thereof), or can vibrate the rear window 230C to output a sound based on a vibration of the rear window 230C. For example, the fourteenth sound generating module 31O can directly vibrate the rear window 230C to output the sound based on the vibration of the rear window 230C.

According to an embodiment of the present disclosure, the rear window 230C can include a first region corresponding to a rear portion of the first rear seat BS1, a second region corresponding to a rear portion of the second rear seat BS2, and a third region corresponding to a rear portion of the third rear seat BS3. According to an embodiment of the present disclosure, the fourteenth sound generating module 31O can be disposed at at least one or more of the first and second regions of the rear window 230C. For example, the fourteenth sound generating module 31O can be disposed at at least one or more of the first to third regions of the rear window 230C. For example, the fourteenth sound generating module 31O can be disposed at each of the first and second regions of the rear window 230C, or can be disposed at each of the first to third regions of the rear window 230C. For example, the fourteenth sound generating module 31O can be disposed at at least one or more of the first and second regions of the rear window 230C, or can be disposed at at least one or more of the first to third regions of the rear window 230C. For example, the fourteenth sound generating module 31O can be configured to output a sound of about 150 Hz to about 20 kHz. For example, the fourteenth sound generating module 31O disposed at at least one or more of the first to third regions of the rear window 230C can have a same sound output characteristic or different sound output characteristics. For example, the fourteenth sound generating module 31O disposed at at least one or more of the first to third regions of the rear window 230C can have a same sound output characteristic or different sound output characteristics. For example, the fourteenth sound generating module 31O disposed at at least one or more of the first and second regions of the rear window 230C can be configured to output a sound of about 150 Hz to about 20 kHz, or can be one or more of a woofer, a mid-woofer, and a sub-woofer. For example, the fourteenth sound generating module 31O can be a rear window speaker.

With reference to FIGS. 55 and 56, the vehicular apparatus or the vehicle 10 according to an embodiment of the present disclosure can further include a woofer speaker WS which is disposed at at least one or more of the dashboard 130A, the door frame 130B, and the rear package interior material 130J.

The woofer speaker WS according to an embodiment of the present disclosure can include at least one or more of a woofer, a mid-woofer, and a sub-woofer. For example, the woofer speaker WS can be a speaker which outputs a sound of about 60 Hz to about 150 Hz. Therefore, the woofer speaker WS can output a sound of about 60 Hz to about 150

Hz, and thus, can enhance a low-pitched sound band characteristic of a sound which is output to an interior space.

According to an embodiment of the present disclosure, the woofer speaker WS can be disposed at at least one or more of first and second regions of the dashboard 130A. According to an embodiment of the present disclosure, the woofer speaker WS can be disposed at each of first to fourth door frames of the door frame and can be exposed at a lower region of each of the first to fourth door interior materials 130D1 to 130D4 of the door interior material 130D. For example, the woofer speaker WS can be disposed at at least one or more of the first to fourth door frames of the door frame and can be exposed at the lower regions of at least one or more of the first to fourth door interior materials 130D1 to 130D4 of the door interior material 130D. According to an embodiment of the present disclosure, the woofer speaker WS can be disposed at at least one or more of the first and second regions of the rear package interior material 130J. For example, the fourth sound generating module 31D disposed at the lower region of at least one or more of the first to fourth door interior materials 130D1 to 130D4 can be replaced by the woofer speaker WS.

The vehicular apparatus 10 according to an embodiment of the present disclosure can further include a garnish member 130P which covers a portion of the vehicle interior material 130 exposed at the interior space, and a fourth sound generating apparatus 30-4. For example, the fourth sound generating apparatus 30-4 can be disposed at the garnish member 130P and the vehicle interior material 130 to output a sound. For example, at least one or more of the garnish member 130P and the vehicle interior material 130 can output a sound based on vibrations of fourth sound generating apparatus 30-4.

The garnish member 130P can be configured to cover a portion of the door interior material 130D exposed at the interior space, but embodiments of the present disclosure are not limited thereto. For example, the garnish member 130P can be configured to cover a portion of one or more of the dashboard 130A, the pillar interior material 130B, and the roof interior material 130C, which are exposed at the interior space.

The garnish member 130P according to an embodiment of the present disclosure can include a metal material or a nonmetal material (or a composite nonmetal material) having a material characteristic suitable for generating a sound based on a vibration. For example, a metal material of the garnish member 130P can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member 130P can include one or more of wood, plastic, glass, cloth, fiber, rubber, paper, carbon, and leather, but embodiments of the present disclosure are not limited thereto. For example, the garnish member 130P can include a metal material having a material characteristic suitable for generating a sound of a high-pitched sound band, but embodiments of the present disclosure are not limited thereto. For example, the high-pitched sound band can have a frequency of 1 kHz or more, 2 kHz or more, or 3 kHz or more, but embodiments of the present disclosure are not limited thereto.

The fourth sound generating apparatus 30-4 can be disposed between the garnish member 130P and the vehicle interior material 130. For example, the fourth sound generating apparatus 30-4 can be a garnish speaker or the like, but embodiments of the present disclosure are not limited thereto.

The fourth sound generating apparatus 30-4 according to an embodiment of the present disclosure can include one or more of the sound generating modules 330 described above with reference to FIGS. 3 to 54. The fourth sound generating apparatus 30-4 can be disposed at a main interior material or the vehicle interior material 130 and a garnish member 130P and can be connected or coupled to the garnish member 130P.

The fourth sound generating apparatus 30-4 according to an embodiment of the present disclosure can be configured to indirectly or directly vibrate the garnish member 130P to output a sound into the interior space of the vehicular apparatus 10. For example, the fourth sound generating apparatus 30-4 can be configured to output a sound of a high-pitched sound band, but embodiments of the present disclosure are not limited thereto.

The vehicular apparatus or the vehicle 10 according to an embodiment of the present disclosure can output a sound to the interior space IS through at least one or more of the first sound generating apparatus 30-1 disposed at the vehicle interior material 130, the second sound generating apparatus 30-2 disposed at the vehicle interior material 130 exposed at the interior space, the third sound generating apparatus 30-3 disposed at the vehicle window 230, and the fourth sound generating apparatus 30-4 disposed at the garnish member 130P, and thus, can output the sound by a vehicle interior material 130 as a vibration plate or a sound vibration plate, thereby outputting a multichannel surround stereo sound.

Figure 59:
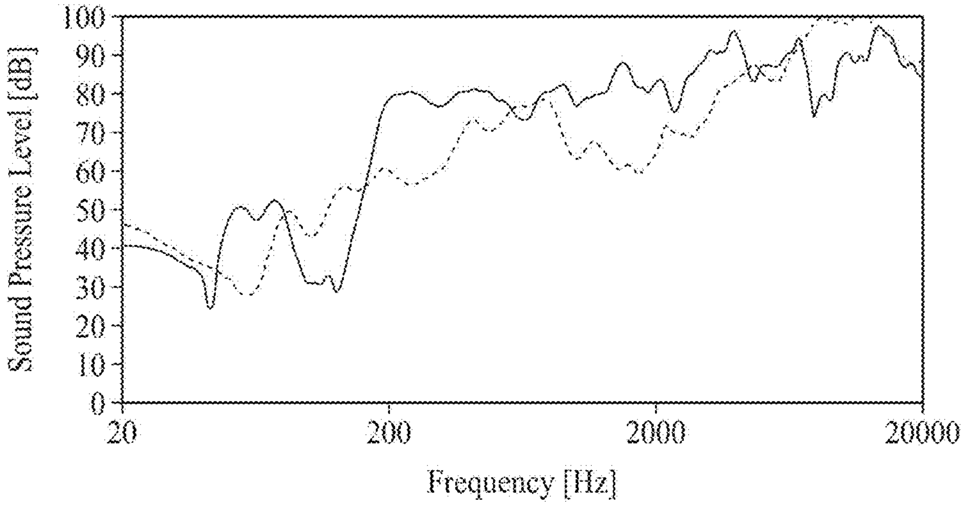
FIG. 59 illustrates a sound output characteristic of an apparatus according to an embodiment of the present disclosure and an experimental example.

FIG. 59 illustrates a sound output characteristic of an apparatus according to an embodiment of the present disclosure and an experimental example.

In FIG. 59, the abscissa axis represents a frequency in hertz (Hz), and the ordinate axis represents a sound pressure level (SPL) in decibels (dB). A solid line represents a sound output characteristic of an apparatus where the sound apparatus 30 of FIG. 11 is coupled to the vehicle interior material 130 with an opening part 3100. A dotted line represents a sound output characteristic of an apparatus where the sound apparatus 30 of FIG. 11 is coupled to the vehicle interior material 130 without an opening part 3100.

The sound output characteristic can be measured by sound analysis equipment. The sound analysis equipment can include a control PC, a sound card for transmitting and receiving sound, an amplifier for amplifying and transmitting the sound generated from the sound card to the sound apparatus, and a microphone for collecting the sound generated in the apparatus based on driving of the vibration apparatus. The sound collected by the microphone is input to the control PC through the sound card, and the sound is checked in a control program to analyze the sound of the apparatus.

The sound output characteristic has been measured in an anechoic chamber, which is closed in all directions. When measuring, an applied frequency signal is applied as a sine sweep within a range of 20 Hz to 20 kHz, and ⅙ octave smoothing has been performed on a measurement result. A separation distance between the apparatus and the microphone is adjusted to be 1 m. However, a measurement method of the sound output characteristic can be not limited thereto.

With reference to FIG. 59, comparing with the dotted line, in the solid line, it can be seen that a flatness characteristic of a sound pressure level is enhanced.

Comparing with the dotted line, in the solid line, it can be seen that a sound pressure level increases in a pitched sound band of 1 kHz or less, and it can be seen that a peak phenomenon and a dip phenomenon decrease in a pitched sound band of 1 kHz or less. Accordingly, in an apparatus including a sound apparatus according to an embodiment of the present disclosure, a sound characteristic and/or a sound pressure level characteristic of a low-pitched sound band can be enhanced, and a balance characteristic or a flatness characteristic of a sound pressure level can be enhanced.

Comparing with the dotted line, in the solid line, it can be seen that a sound pressure level increases in a pitched sound band of 2 kHz or less and an undesired sound pressure level decreases in a high-pitched sound band of 2 kHz or more, and thus, a balance characteristic of a sound pressure level or a flatness characteristic of a sound pressure level is enhanced in a full-range sound band. Accordingly, in an apparatus including a sound apparatus according to an embodiment of the present disclosure, a sound characteristic and/or a sound pressure level characteristic of a middle-pitched sound band of a middle-low-pitched sound band of 2 kHz or less can be enhanced, a sound characteristic and/or a sound pressure level characteristic of the high-pitched sound band of 2 kHz or more can be enhanced, and a balance characteristic or a flatness characteristic of a sound pressure level is enhanced in a full-range sound band.

Figure 60:
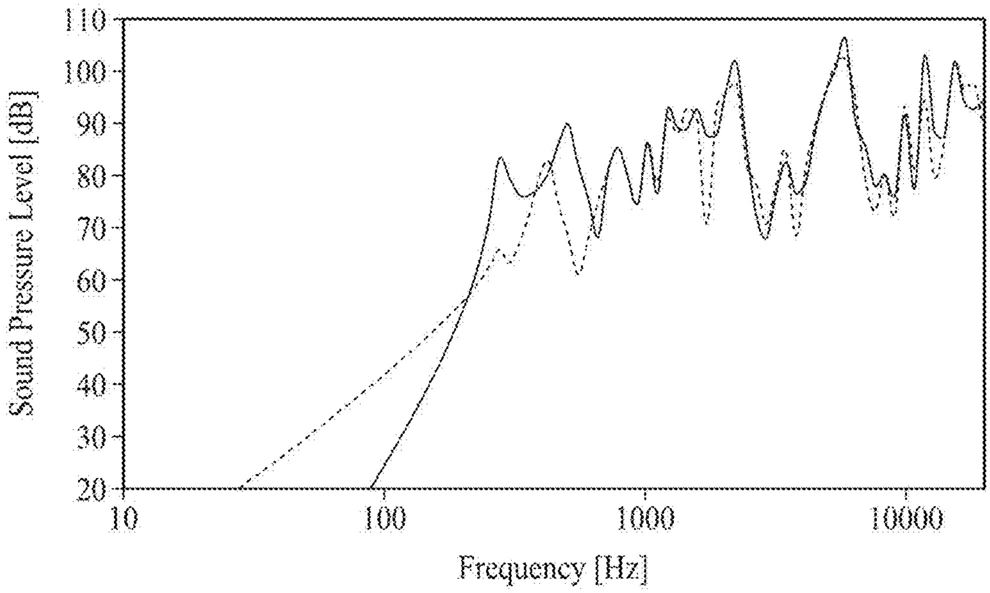
FIG. 60 illustrates a sound output characteristic of an apparatus according to an embodiment of the present disclosure.

FIG. 60 illustrates a sound output characteristic of an apparatus according to an embodiment of the present disclosure.

In FIG. 60, the abscissa axis represents a frequency in hertz (Hz), and the ordinate axis represents a sound pressure level (SPL) in decibels (dB). A solid represents a sound output characteristic of an apparatus coupled to the vehicle interior material 130 where the sound apparatus 30 of FIGS. 26 to 30 includes the at least one or more holes 331*o*. A dotted line represents a sound output characteristic of an apparatus coupled to the vehicle interior material 130 where the sound apparatus 30 does not include the at least one or more holes 331*o*. A measurement method of a sound output characteristic can be substantially the same as the above description of FIG. 59, and thus, repeated descriptions are omitted.

With reference to FIG. 60, comparing with a dotted line, in a solid line, it can be seen that a sound pressure level increases in a sound band of 400 Hz or less. Further, comparing with the dotted line, in the solid line, it can be seen that a sound pressure level increases in a sound band of 1 kHz or more. Accordingly, an apparatus according to an embodiment of the present disclosure can be configured with a sound apparatus where the vibration member 331 includes the at least one or more holes 331*o*, and thus, a sound characteristic and/or a sound pressure level characteristic in a low-pitched sound band and a middle-pitched sound band or more can be enhanced.

Figure 61A:
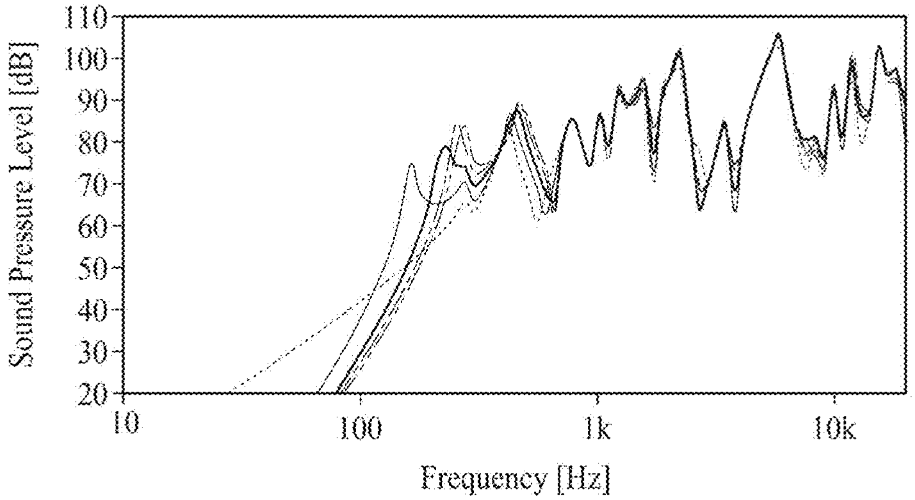
FIG. 61A illustrates a sound output characteristic of an apparatus according to an embodiment of the present disclosure.
Figure 61B:
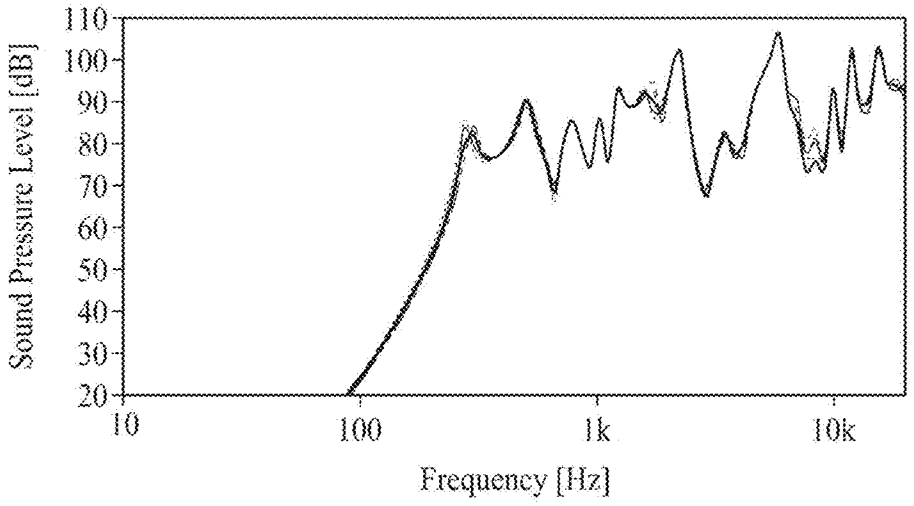
FIG. 61B illustrates a sound output characteristic of an apparatus according to an embodiment of the present disclosure.

FIGS. 61A and 61B illustrate a sound output characteristic of an apparatus according to an embodiment of the present disclosure.

In FIGS. 61A and 61B, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIGS. 61A and 61B illustrate a sound output characteristic based on a size (or diameter) of a hole.

In FIG. 61A, a dotted line represents a sound output characteristic of an apparatus without at least one or more holes 331*o*, and a solid line, a thick solid line, an alternate long and short dash line, and an alternate long and two short dashes line represent a sound output characteristic of an apparatus including the at least one or more holes 331*o*. The solid line represents a sound output characteristic where a size of the at least one or more holes 331*o* is 1 mm, and the thick solid line represents a sound output characteristic where a size of the at least one or more holes 331*o* is 2 mm. The alternate long and short dash line represents a sound output characteristic where a size of the at least one or more holes 331*o* is 3 mm, and the alternate long and two short dashes line represents a sound output characteristic where a size of the at least one or more holes 331*o* is 4 mm. The at least one or more holes 331*o* can be configured in, for example, a circular shape.

With reference to FIG. 61A, comparing with the dotted line, in the solid line, the thick solid line, the alternate long and short dash line, and the alternate long and two short dashes line, it can be seen that a sound pressure level increases in a sound band of 400 Hz or less and/or 800 Hz or more.

Comparing with a maximum sound pressure level in 300 Hz or less with reference to FIG. 61A, it has been measured that the dotted line is 65.0 dB, the solid line is 70.5 dB, the thick solid line is 74.5 dB, the alternate long and short dash line is 84.6 dB, and the alternate long and two short dashes line is 83.9 dB. Therefore, it can be seen that a sound pressure level increases in 300 Hz or less as a size of the at least one or more holes 331*o* increases. For example, when a size of the at least one or more holes 331*o* is 1 mm or more, it can be seen that a sound pressure level characteristic in 300 Hz or less is enhanced. Therefore, when a size of the at least one or more holes 331*o* is 1 mm or more, it can be seen that a sound pressure level characteristic of a low-pitched sound band increases. For example, the low-pitched sound band can be 300 Hz or less, 400 Hz or less, or 500 Hz or less, but embodiments of the present disclosure are not limited thereto.

In FIG. 61B, a dotted line represents a sound output characteristic where a size of the at least one or more holes 331*o* is 5 mm, a solid line represents a sound output characteristic where a size of the at least one or more holes 331*o* is 6 mm, and a thick solid line represents a sound output characteristic where a size of the at least one or more holes 331*o* is 7 mm. An alternate long and short dash line represents a sound output characteristic where a size of the at least one or more holes 331*o* is 8 mm, and an alternate long and two short dashes line represents a sound output characteristic where a size of the at least one or more holes 331*o* is 9 mm.

With reference to FIGS. 61A and 61B, comparing with the dotted line of FIG. 61A, in a dotted line, a solid line, a thick solid line, an alternate long and short dash line, and an alternate long and two short dashes line of FIG. 61B, it can be seen that a sound pressure level increases in a sound band of 400 Hz or less and/or 800 Hz or more. For example, a middle-pitched sound band can be 500 Hz or more, 600 Hz or more, 700 Hz or more, 800 Hz or more, 900 Hz or more, or 1 kHz or more, but embodiments of the present disclosure are not limited thereto.

Comparing with a maximum sound pressure level in 300 Hz or less with reference to FIG. 61B, it has been measured that the dotted line is 85.7 dB, the solid line is 83.2 dB, the thick solid line is 82.0 dB, the alternate long and short dash line is 83.0 dB, and the alternate long and two short dashes line is 84.3 dB. Therefore, it can be seen that a sound pressure level increases in 300 Hz or less as a size of the at least one or more holes 331*o* increases.

According to an embodiment of the present disclosure, because the at least one or more holes 331*o* is configured in the vibration member 331, it can be seen that a sound pressure level characteristic of a low-pitched sound band increases. Further, it can be seen that a sound pressure level increases in 300 Hz or less as a size of the at least one or more holes 331*o* increases. When a size of the at least one or more holes 331*o* is 1 mm or more, it can be seen that a sound pressure level characteristic of a low-pitched sound band and/or a middle-pitched sound band increases.

Figure 62A:
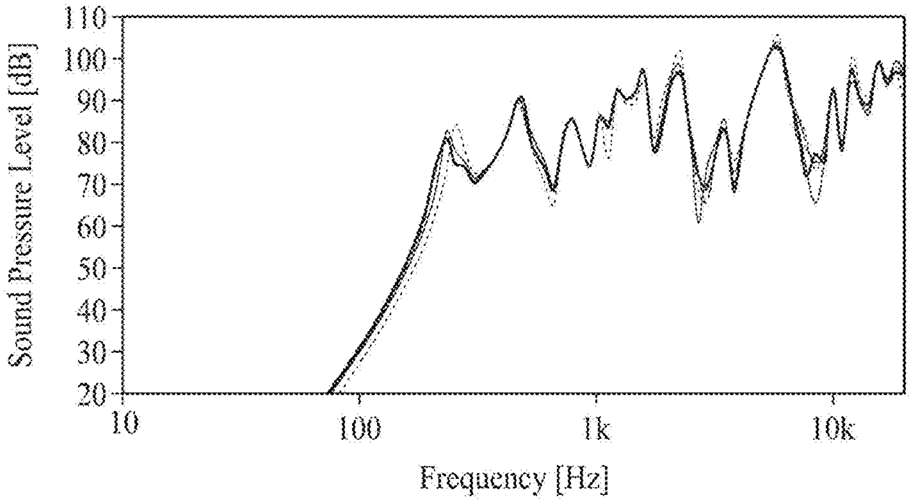
FIG. 62A illustrates a sound output characteristic of an apparatus according to an embodiment of the present disclosure.
Figure 62B:
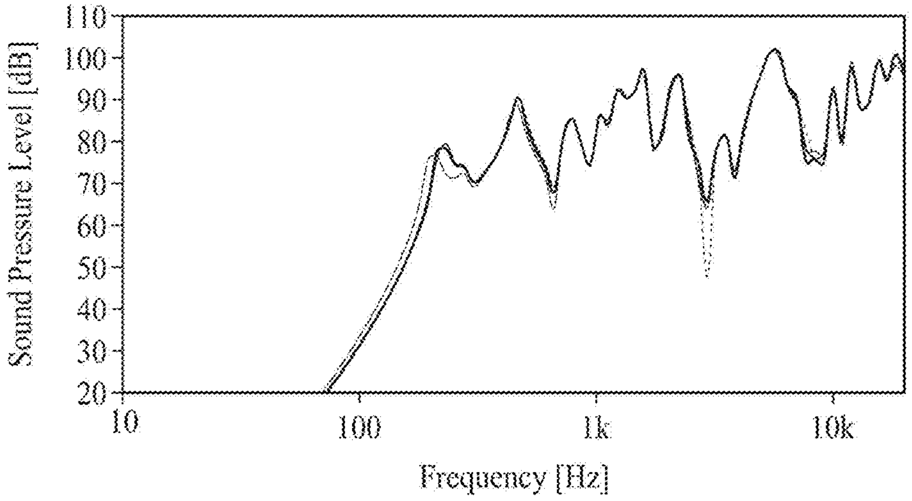
FIG. 62B illustrates a sound output characteristic of an apparatus according to an embodiment of the present disclosure.

FIGS. 62A and 62B illustrate a sound output characteristic of an apparatus according to an embodiment of the present disclosure.

In FIGS. 62A and 62B, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIGS. 62A and 62B illustrate a sound output characteristic based on a distance between a vibration apparatus and the at least one or more holes 331*o*. In FIGS. 62A and 62B, a size of the at least one or more holes 331*o* is set to 3 mm, and a sound output characteristic based on a distance between the vibration apparatus and the at least one or more holes 331*o* is illustrated. A size of the at least one or more holes 331*o* does not limit the details of the present disclosure. For example, in FIGS. 27 to 30, a distance of the at least one or more holes 331*o* can be a distance to the vibration apparatuses 333 and 335. For example, a distance between the at least one or more holes 331*o* and each of the vibration apparatuses 333 and 335 can be a distance (or shortest distance) to a short side of each of the vibration apparatuses 333 and 335.

In FIG. 62A, a dotted line represents a sound output characteristic where a distance between the at least one or more holes 331*o* and each of the vibration apparatuses 333 and 335 is 1.5 mm. A solid line represents a sound output characteristic where a distance between the at least one or more holes 331*o* and each of the vibration apparatuses 333 and 335 is 22.25 mm, a thick solid line represents a sound output characteristic where a distance between the at least one or more holes 331*o* and each of the vibration apparatuses 333 and 335 is 30 mm, an alternate long and short dash line represents a sound output characteristic where a distance between the at least one or more holes 331*o* and each of the vibration apparatuses 333 and 335 is 31 mm, and an alternate long and two short dashes line represents a sound output characteristic where a distance between the at least one or more holes 331*o* and each of the vibration apparatuses 333 and 335 is 32 mm. According to an embodiment of the present disclosure, when a distance between the at least one or more holes 331*o* and each of the vibration apparatuses 333 and 335 is 35 mm, a distance between the at least one or more holes 331*o* and each of the vibration apparatuses 333 and 335 can be 60% or less of a short-side length of each of the vibration apparatuses 333 and 335. Further, when a distance between the at least one or more holes 331*o* and each of the vibration apparatuses 333 and 335 is greater than 35 mm, a distance between the at least one or more holes 331*o* and each of the vibration apparatuses 333 and 335 can be greater than 60% of the short-side length of each of the vibration apparatuses 333 and 335.

Comparing with a maximum sound pressure level in 300 Hz or less with reference to FIG. 62A, it has been measured that the dotted line is 84.3 dB, the solid line is 82.5 dB, the thick solid line is 81.0 dB, the alternate long and short dash line is 80.7 dB, and the alternate long and two short dashes line is 79.5 dB.

In FIG. 62B, a dotted line represents a sound output characteristic where a distance between the at least one or more holes 331*o* and each of the vibration apparatuses 333 and 335 is 33 mm, a solid line represents a sound output characteristic where a distance between the at least one or more holes 331*o* and each of the vibration apparatuses 333 and 335 is 34 mm, a thick solid line represents a sound output characteristic where a distance between the at least one or more holes 331*o* and each of the vibration apparatuses 333 and 335 is 35 mm, and an alternate long and short dash line represents a sound output characteristic where a distance between the at least one or more holes 331*o* and each of the vibration apparatuses 333 and 335 is 43 mm.

Comparing with a maximum sound pressure level in 300 Hz or less with reference to FIG. 62B, it has been measured that the dotted line is 79.6 dB, the solid line is 79.5 dB, the thick solid line is 78.2 dB, and the alternate long and short dash line is 72.0 dB.

With reference to FIGS. 62A and 62B, when a distance between the at least one or more holes 331*o* and each of the vibration apparatuses 333 and 335 is configured in 35 mm, it can be seen that a sound pressure level in 300 Hz or less is 75 dB or more. According to an embodiment of the present disclosure, when a distance (or shortest distance) between the at least one or more holes 331*o* and each of the vibration apparatuses 333 and 335 is configured in 35 mm or less, an apparatus which has a sound pressure level of 75 dB or more and where a sound pressure level in 300 Hz or less is not reduced can be configured. For example, when a distance (or shortest distance) between the at least one or more holes 331*o* and each of the vibration apparatuses 333 and 335 is configured in 60% or less of a short-side length of each of the vibration apparatuses 333 and 335, an apparatus where a sound pressure level in 300 Hz or less is not reduced can be configured.

According to an embodiment of the present disclosure, when the at least one or more holes 331*o* is configured in the vibration member 331 and a distance between the at least one or more holes 331*o* and each of the vibration apparatuses 333 and 335 is configured in 60% or less of the short-side length of each of the vibration apparatuses 333 and 335, an apparatus where a sound pressure level in 300 Hz or less is not reduced can be configured. Accordingly, when the at least one or more holes 331*o* is configured in the vibration member 331 and the at least one or more holes 331*o* is disposed closer to the vibration apparatuses 333 and 335, it can be seen that a sound pressure level of a low-pitched sound band is enhanced.

Figure 63:
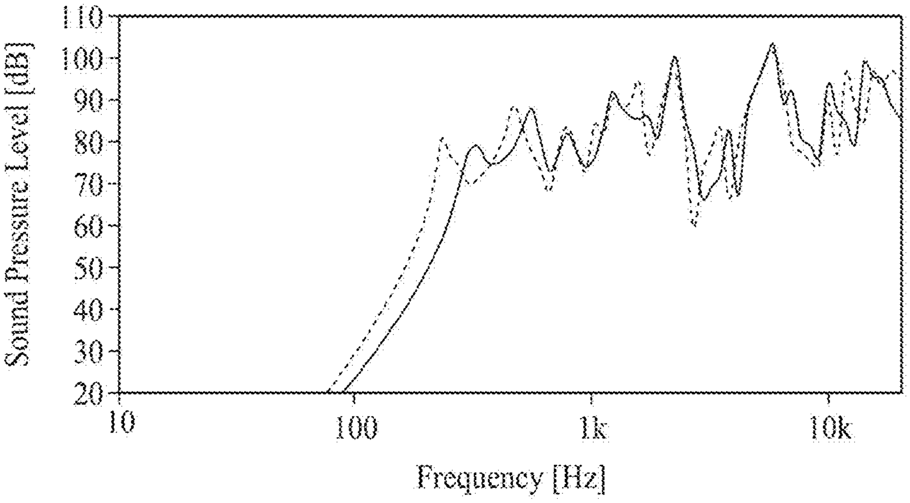
FIG. 63 illustrates a sound output characteristic of an apparatus according to an embodiment of the present disclosure.

FIG. 63 illustrates a sound output characteristic of an apparatus according to an embodiment of the present disclosure.

In FIG. 63, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIG. 63 illustrates a sound output characteristic based on a size of the at least one or more holes 331*o*. In FIG. 63, a dotted line represents a sound output characteristic where a size of the at least one or more holes 331*o* is 3 mm, and a solid line represents a sound output characteristic where a size of the at least one or more holes 331*o* is 44.5 mm. A size of 44.5 mm of the at least one or more holes 331*o* can be a size of a hole capable of being configured to be greatest in the sound apparatus according to an embodiment of the present disclosure, but embodiments of the present disclosure are not limited thereto.

With reference to FIG. 63, comparing with the solid line, in the dotted line, it can be seen that a sound pressure level in 300 Hz or less is enhanced. According to an embodiment of the present disclosure, when a size of the at least one or more holes 331*o* is 1 mm or more, it can be seen that a sound pressure level in 300 Hz or less is enhanced. For example, when a size of the at least one or more holes 331*o* is 1 mm to 10 mm, it can be seen that a sound pressure level in 300 Hz or less is enhanced.

Figure 64:
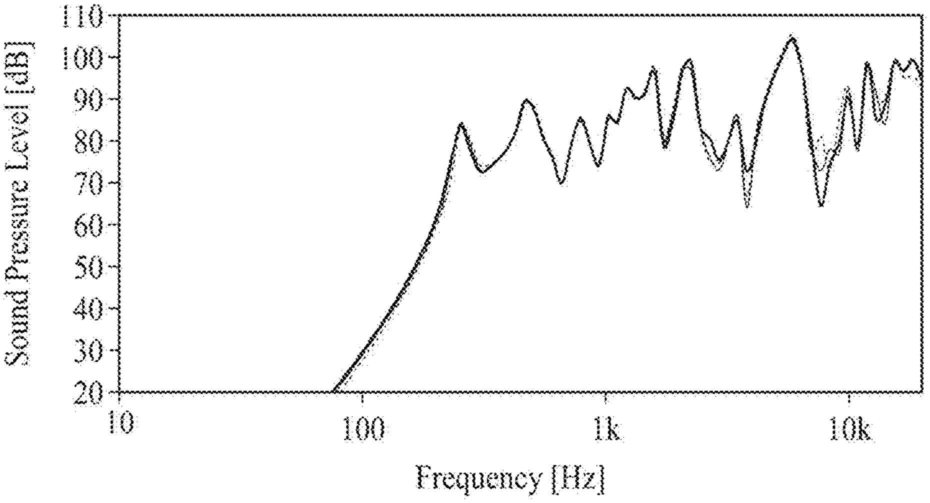
FIG. 64 illustrates a sound output characteristic of an apparatus according to an embodiment of the present disclosure.

FIG. 64 illustrates a sound output characteristic of an apparatus according to an embodiment of the present disclosure.

In FIG. 64, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIG. 64 illustrates a sound output characteristic based on a shape of the at least one or more holes 331*o*. In FIG. 64, a dotted line represents a sound output characteristic where two holes 331*o* having a circular shape are provided as in FIG. 29 and a size of each of the two holes 331*o* is 3 mm. A solid line represents a sound output characteristic where one hole 331*o* having a tetragonal shape is provided as in FIG. 30 and a size of the one hole 331*o* having a tetragonal shape is 3.76 mm. A thick solid line represents a sound output characteristic where one hole 331*o* having a circular shape is provided and a size of the one hole 331*o* is 4.24 mm.

With reference to FIG. 64, it can be seen that the dotted line, the solid line, and the thick solid line represent similar sound pressure level characteristics. According to an embodiment of the present disclosure, it can be seen that sound pressure level characteristics based on a shape of the at least one or more holes 331*o* and/or a size of the at least one or more holes 331*o* are similar to each other. According to an embodiment of the present disclosure, when the at least one or more holes 331*o* is configured in the vibration member 331, it can be seen that a sound pressure level of a low-pitched sound band is enhanced.

Figure 65:
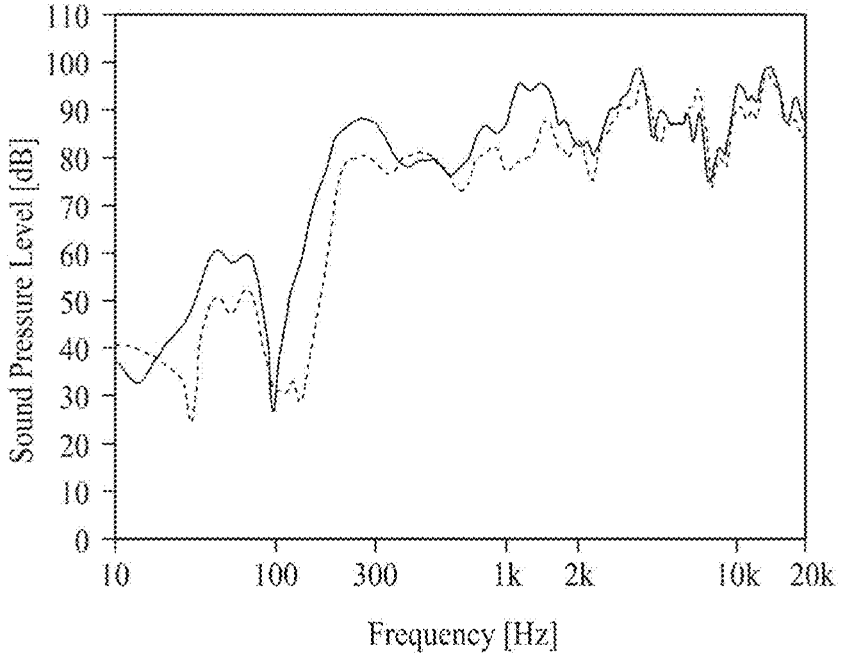
FIG. 65 illustrates a sound output characteristic of an apparatus according to an embodiment of the present disclosure.

FIG. 65 illustrates a sound output characteristic of an apparatus according to an embodiment of the present disclosure.

In FIG. 65, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

In FIG. 65, a solid line represents a sound output characteristic of the sound apparatus illustrated in FIG. 31, and a dotted line represents a sound output characteristic of the sound apparatus illustrated in FIG. 25A.

With reference to FIG. 65, comparing with the dotted line, in the solid line, it can be seen that a sound pressure level in 2 kHz or less is enhanced. For example, in a maximum sound pressure level in 2 kHz or less, it can be seen that the dotted line represents about 88 dB and the solid line represents about 96 dB. Comparing with the dotted line, in the solid line, it can be seen that a sound pressure level in a low-pitched sound band, for example, 300 Hz or less is enhanced. For example, in a maximum sound pressure level in 300 Hz or less, it can be seen that the dotted line represents about 80 dB and the solid line represents about 88 dB. Accordingly, comparing with the dotted line, in the solid line, it can be seen that a sound pressure level characteristic of each of a low-pitched sound band and a middle-pitched sound band is enhanced.

According to an embodiment of the present disclosure, because a first enclosure is provided, a sound characteristic and/or a sound pressure level characteristic of each of a low-pitched sound band and a middle-pitched sound band can be further enhanced, and a sound reproduction band can expand.

Figure 66:
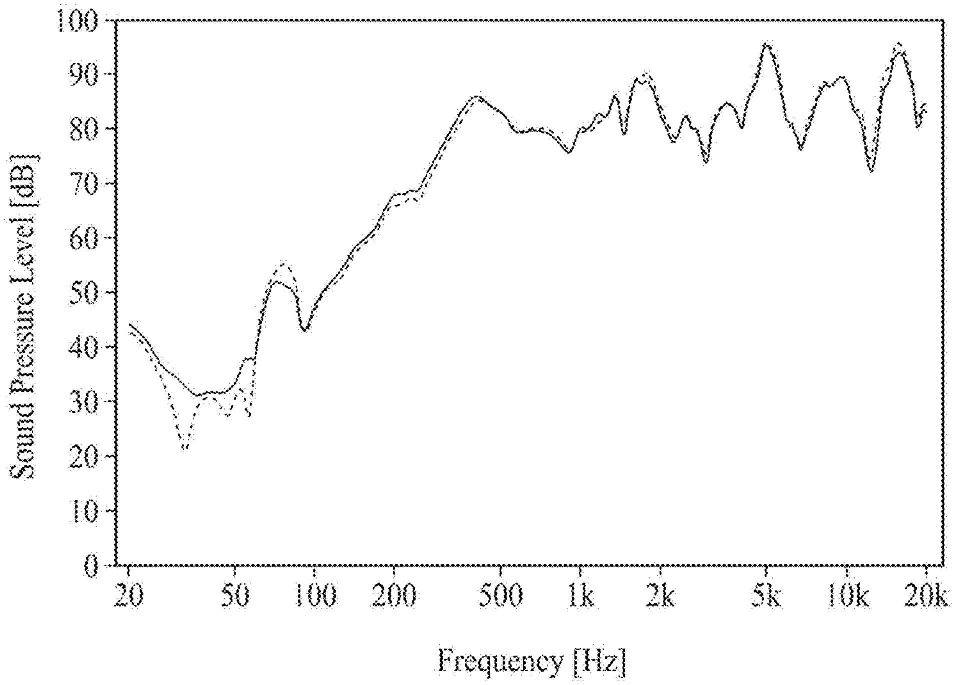
FIG. 66 illustrates a sound output characteristic of an apparatus according to an embodiment of the present disclosure.

FIG. 66 illustrates a sound output characteristic of an apparatus according to an embodiment of the present disclosure.

In FIG. 66, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

In FIG. 66, a dotted line represents a sound output characteristic of the sound apparatus illustrated in FIG. 31, and a solid line represents a sound output characteristic of the sound apparatus illustrated in FIG. 33.

With reference to FIG. 66, comparing with the dotted line, in the solid line, it can be seen that a sound pressure level in 500 Hz or less is enhanced. For example, in a maximum sound pressure level in 500 Hz or less, it can be seen that the dotted line represents about 84.0 dB and the solid line represents about 85.5 dB. Comparing with the dotted line, in the solid line, it can be seen that a sound pressure level increases by about 1.5 dB in 100 Hz to 500 Hz. Comparing with the dotted line, in the solid line, it can be seen that a sound pressure level is enhanced by about 1.5 dB in the low-pitched sound band and the middle-pitched sound band, for example, 100 Hz to 500 Hz. Accordingly, comparing with the dotted line, in the solid line, it can be seen that a sound pressure level characteristic of each of the low-pitched sound band and the middle-pitched sound band is enhanced.

According to an embodiment of the present disclosure, because a first enclosure and a protection member are provided, a sound characteristic and/or a sound pressure level characteristic of each of the low-pitched sound band and the middle-pitched sound band can be further enhanced, and a sound reproduction band can expand.

Figure 67:
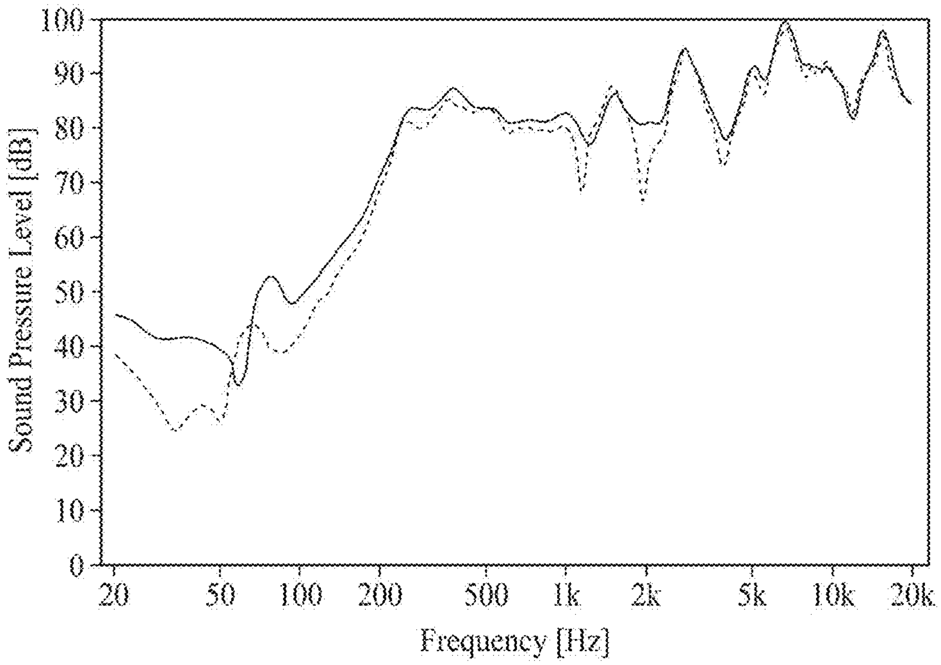
FIG. 67 illustrates a sound output characteristic of an apparatus according to an embodiment of the present disclosure.

FIG. 67 illustrates a sound output characteristic of an apparatus according to an embodiment of the present disclosure.

In FIG. 67, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIG. 67 illustrates a sound output characteristic of the sound apparatus illustrated in FIG. 31. A dotted line represents a sound output characteristic of a sound apparatus where a thickness of a connection member is 1 mm, and a solid line represents a sound output characteristic of a sound apparatus where a thickness of a connection member is 2 mm.

With reference to FIG. 67, comparing with the dotted line, in the solid line, it can be seen that a sound pressure level is enhanced in 500 Hz or less. For example, in a maximum sound pressure level in 500 Hz or less, it can be seen that the dotted line represents about 84.0 dB, and the solid line represent about 88.0 dB. For example, comparing with the dotted line, in the solid line, it can be seen that a sound pressure level increases by about 3.0 dB in 100 Hz to 500 Hz. Comparing with the dotted line, in the solid line, it can be seen that a sound pressure level is enhanced in a low-pitched sound band and a middle-pitched sound band, for example, 100 Hz to 500 Hz. Comparing with the dotted line, in the solid line, it can be seen that a peak and/or dip phenomenon are/is reduced in a pitched sound band of 3 kHz or less. Accordingly, comparing with the dotted line, in the solid line, it can be seen that a sound pressure level characteristic is enhanced in each of the low-pitched sound band, the middle-pitched sound band, and a high-pitched sound band.

According to an embodiment of the present disclosure, because a connection member is configured between an interior material and an enclosure, a sound characteristic and/or a sound pressure level characteristic can be further enhanced in each of the low-pitched sound band, the middle-pitched sound band, and the high-pitched sound band, and a sound reproduction band can further expand.

FIGS. 68A to 68D illustrate a sound output characteristic of an apparatus according to an embodiment of the present disclosure.

In FIGS. 68A to 68D, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIGS. 68A to 68D illustrate a sound output characteristic of a sound apparatus with respect to a curvature of the chamfer portion 503*a* of FIGS. 37A to 37E.

Figure 68A:
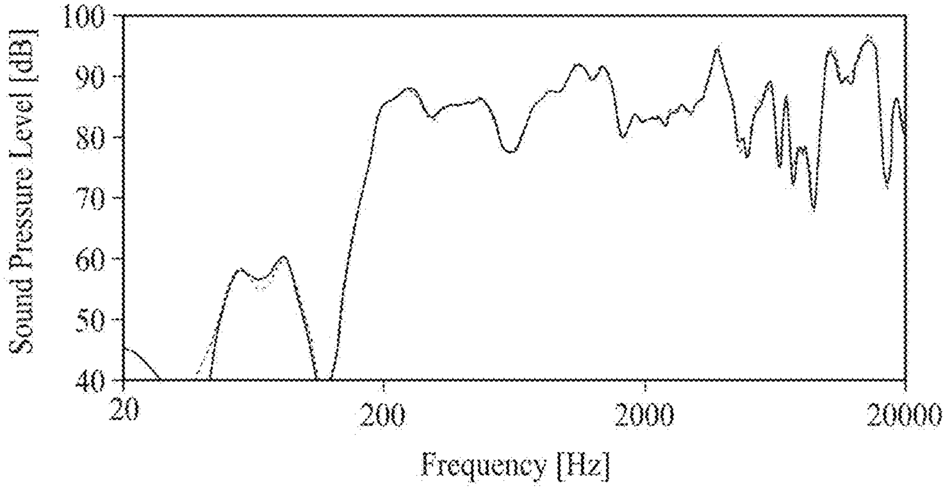
FIGS. 68A to 68D illustrate a sound output characteristic of an apparatus according to an embodiment of the present disclosure.

In FIG. 68A, a dotted line represents a sound output characteristic of FIG. 37A, and a solid line represents a sound output characteristic of FIG. 37B.

With reference to FIG. 68A, comparing with a dotted line where the chamfer portion 503*a* has a rectangular shape, in a solid line where the chamfer portion 503*a* has a non-rectangular shape, it can be seen that dip is improved by about 3 dB or more with respect to a frequency of 200 Hz or less. Comparing with the dotted line where the chamfer portion 503*a* has a rectangular shape, in the solid line where the chamfer portion 503*a* has a non-rectangular shape, it can be seen that dip is improved by about 3 dB or more with respect to a frequency of 1 kHz or more. For example, comparing with the dotted line where the chamfer portion 503*a* has a rectangular shape, in the solid line where the chamfer portion 503*a* has a non-rectangular shape, it can be seen that dip is improved by about 3 dB or more with respect to a frequency of 1 kHz or more (for example, a frequency of 2 kHz, 4.5 kHz, and 7 kHz to 9 kHz). For example, comparing with a case where the chamfer portion 503*a* has a rectangular shape, in a case where the chamfer portion 503*a* has a non-rectangular shape, it can be seen that peak and/or dip in a low-pitched sound band to a high-pitched sound band are/is improved, thereby enhancing a balance characteristic of a sound pressure level or a flatness characteristic of a sound pressure level.

Figure 68B:
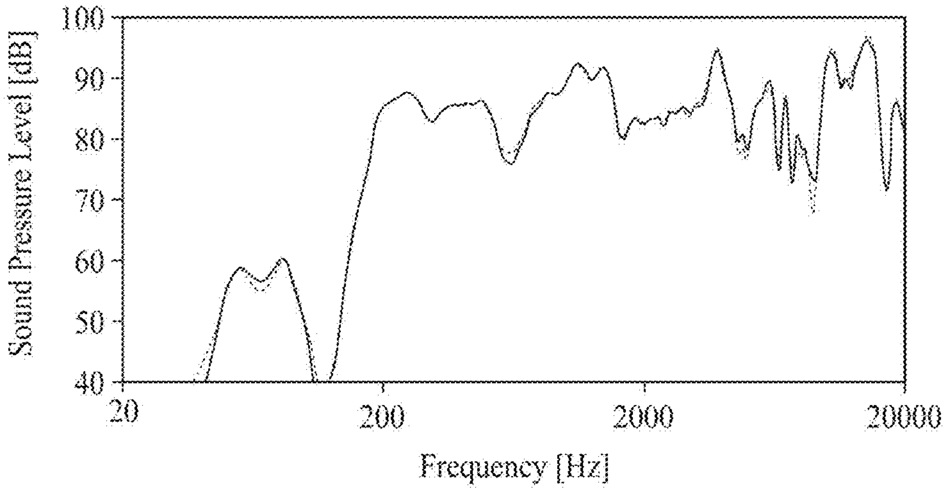

In FIG. 68B, a dotted line represents a sound output characteristic of FIG. 37A, and a solid line represents a sound output characteristic of FIG. 37C.

With reference to FIG. 68B, comparing with a dotted line where the chamfer portion 503*a* has a rectangular shape, in a solid line where the chamfer portion 503*a* has a non-rectangular shape, it can be seen that dip is improved by about 3 dB or more with respect to a frequency of 200 Hz or less. Comparing with the dotted line where the chamfer portion 503*a* has a rectangular shape, in the solid line where the chamfer portion 503*a* has a non-rectangular shape, it can be seen that dip is improved by about 4 dB or more with respect to a frequency of 1 kHz or more. For example, comparing with the dotted line where the chamfer portion 503*a* has a rectangular shape, in the solid line where the chamfer portion 503*a* has a non-rectangular shape, it can be seen that dip is improved by about 4 dB or more with respect to a frequency of 1 kHz or more (for example, a frequency of 2 kHz, 4.5 kHz, and 7 kHz to 9 kHz). For example, comparing with a case where the chamfer portion 503*a* has a rectangular shape, in a case where the chamfer portion 503*a* has a non-rectangular shape, it can be seen that peak and/or dip in a low-pitched sound band to a high-pitched sound band are/is improved, thereby enhancing a balance characteristic of a sound pressure level or a flatness characteristic of a sound pressure level. For example, comparing the solid line of FIG. 68A with a solid line of FIG. 68B, because dip is improved with respect to 2 kHz or more, a flatness characteristic of a sound pressure level can be further enhanced, and a sound pressure level characteristic can be further enhanced. Accordingly, as a curvature of the chamfer portion 503*a* increases, a flatness characteristic of a sound pressure level and/or a sound pressure level characteristic in a high-pitched sound band can be further enhanced.

Figure 68C:
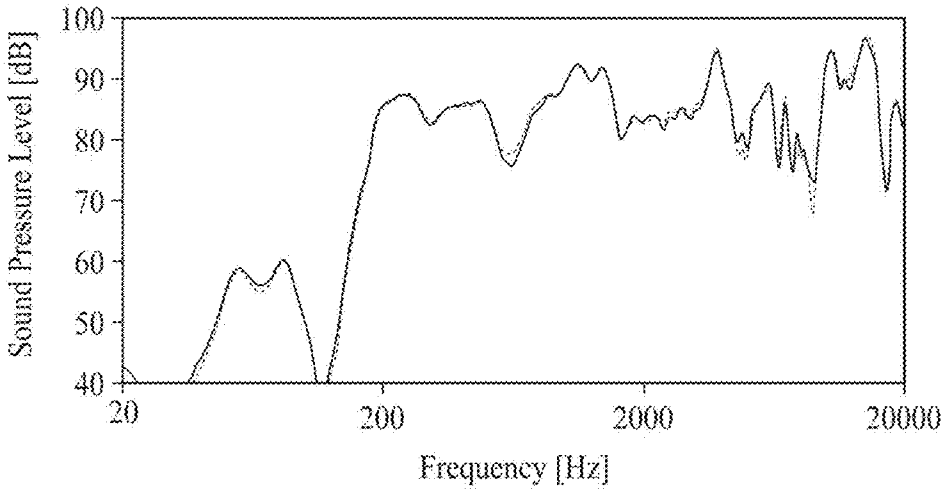

In FIG. 68C, a dotted line represents a sound output characteristic of FIG. 37A, and a solid line represents a sound output characteristic of FIG. 37D.

With reference to FIG. 68C, comparing with a dotted line where the chamfer portion 503*a* has a rectangular shape, in a solid line where the chamfer portion 503*a* has a non-rectangular shape, it can be seen that dip is improved by about 3 dB or more with respect to a frequency of 200 Hz or less. Comparing with the dotted line where the chamfer portion 503*a* has a rectangular shape, in the solid line where the chamfer portion 503*a* has a non-rectangular shape, it can be seen that dip is improved by about 4 dB or more with respect to a frequency of 1 kHz or more. For example, comparing with the dotted line where the chamfer portion 503*a* has a rectangular shape, in the solid line where the chamfer portion 503*a* has a non-rectangular shape, it can be seen that dip is improved by about 4 dB or more with respect to a frequency of 1 kHz or more (for example, a frequency of 2 kHz, 4.5 kHz, and 7 kHz to 9 kHz). For example, comparing with a case where the chamfer portion 503*a* has a rectangular shape, in a case where the chamfer portion 503*a* has a non-rectangular shape, it can be seen that peak and/or dip in a low-pitched sound band to a high-pitched sound band are/is improved, thereby enhancing a balance characteristic of a sound pressure level or a flatness characteristic of a sound pressure level. For example, comparing the solid line of FIG. 68A with a solid line of FIG. 68C, a sound pressure level can be further improved with respect to 1 kHz or more, and peak and/or dip can be improved with respect to 2 kHz or more, thereby further enhancing a flatness characteristic of a sound pressure level. For example, comparing the solid line of FIG. 68B with the solid line of FIG. 68C, with respect to 2 kHz or more, peak and/or dip can be improved, a flatness characteristic of a sound pressure level can be further enhanced, and a sound pressure level characteristic can be further enhanced. Accordingly, as a curvature of the chamfer portion 503*a* increases, a flatness characteristic of a sound pressure level and/or a sound pressure level characteristic in a high-pitched sound band can be further enhanced.

Figure 68D:
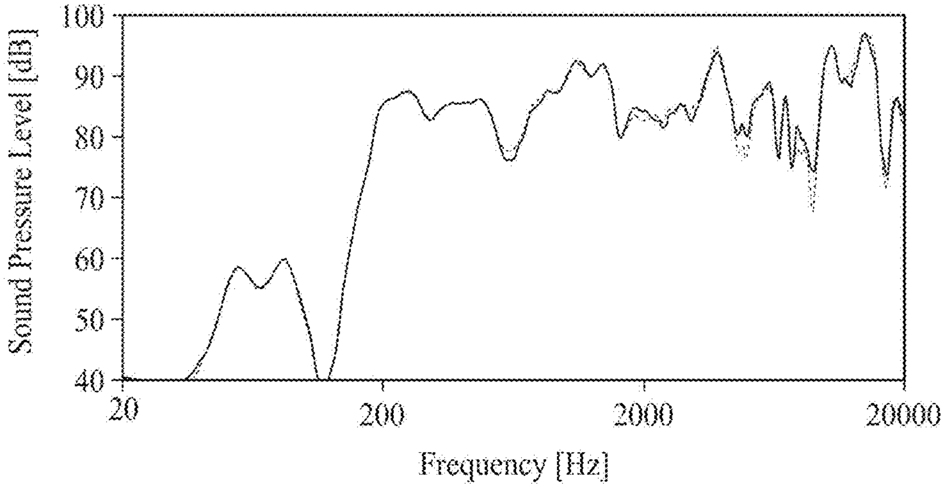

In FIG. 68D, a dotted line represents a sound output characteristic of FIG. 37A, and a solid line represents a sound output characteristic of FIG. 37E.

With reference to FIG. 68D, comparing with a dotted line where the chamfer portion 503*a* has a rectangular shape, in a solid line where the chamfer portion 503*a* has a non-rectangular shape, it can be seen that dip is improved by about 3 dB or more with respect to a frequency of 200 Hz or less. Comparing with the dotted line where the chamfer portion 503*a* has a rectangular shape, in the solid line where the chamfer portion 503*a* has a non-rectangular shape, it can be seen that dip is improved by about 6 dB or more with respect to a frequency of 1 kHz or more. For example, comparing with the dotted line where the chamfer portion 503*a* has a rectangular shape, in the solid line where the chamfer portion 503*a* has a non-rectangular shape, it can be seen that dip is improved by about 6 dB or more with respect to a frequency of 1 kHz or more (for example, a frequency of 2 kHz, 4.5 kHz, and 7 kHz to 9 kHz). For example, comparing with a case where the chamfer portion 503*a* has a rectangular shape, in a case where the chamfer portion 503*a* has a non-rectangular shape, it can be seen that peak and/or dip in a low-pitched sound band to a high-pitched sound band are/is improved, thereby enhancing a balance characteristic of a sound pressure level or a flatness characteristic of a sound pressure level. For example, comparing the solid line of FIG. 68A with a solid line of FIG. 68D, a sound pressure level can be further improved with respect to 1 kHz or more, and peak and/or dip can be improved with respect to 2 kHz or more, thereby further enhancing a flatness characteristic of a sound pressure level. For example, comparing the solid line of FIG. 68B with the solid line of FIG. 68D, with respect to 2 kHz or more, peak and/or dip can be further improved, a flatness characteristic of a sound pressure level can be further enhanced, and a sound pressure level characteristic can be further enhanced. For example, comparing the solid line of FIG. 68C with the solid line of FIG. 68D, with respect to 2 kHz or more, peak and/or dip can be further improved, a flatness characteristic of a sound pressure level can be further enhanced, and a sound pressure level characteristic can be further enhanced. Accordingly, as a curvature of the chamfer portion 503*a* increases, a flatness characteristic of a sound pressure level and/or a sound pressure level characteristic in a high-pitched sound band can be further enhanced.

According to an embodiment of the present disclosure, because the coupling part 500 is configured to have a round shape or a slope surface, a sound characteristic and/or a sound pressure level characteristic in a pitched sound band including a sound of a low-pitched sound band can be enhanced, and peak and/or dip in a high-pitched sound band can be improved, thereby enhancing a balance characteristic of a sound pressure level or a flatness characteristic of a sound pressure level.

FIGS. 69A to 69D illustrates a sound output characteristic of an apparatus according to an embodiment of the present disclosure.

In FIGS. 69A to 69D, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIGS. 69A to 69D illustrate a sound output characteristic of a sound apparatus with respect to a width W of the coupling part 500 of FIG. 35.

Figure 69A:
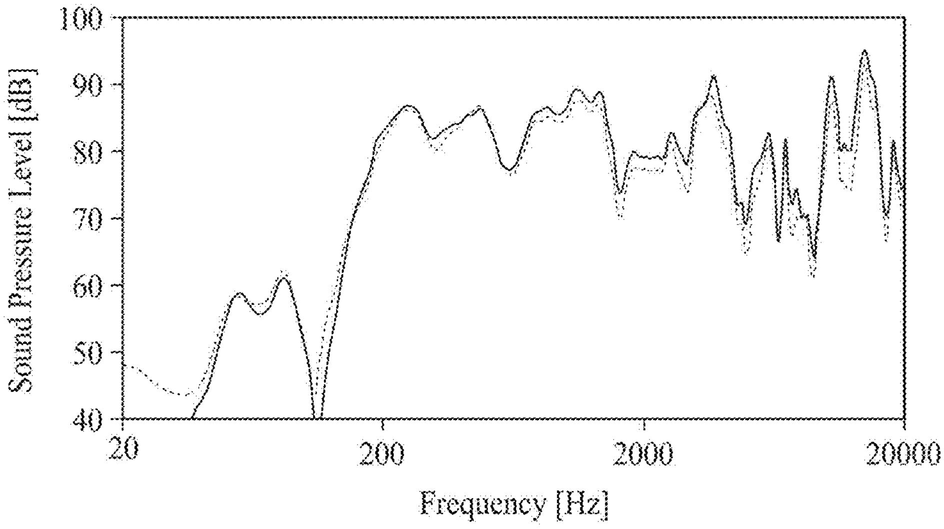
FIGS. 69A to 69D illustrate a sound output characteristic of an apparatus according to an embodiment of the present disclosure.

In FIG. 69A, a dotted line represents a sound output characteristic of a case where a width of the coupling part is 1 mm, and a solid line represents a sound output characteristic of a case where a width of the coupling part is 2 mm.

With reference to FIG. 69A, comparing the dotted line, in the solid line, it can be seen that a sound pressure level more increases. For example, comparing the dotted line, in the solid line, it can be seen that a sound pressure level in a high-pitched sound band more increases. For example, comparing the dotted line, in the solid line, it can be seen that a sound pressure level more increases with respect to 1 kHz or more. Comparing the dotted line, in the solid line, it can be seen that peak and/or dip in the high-pitched sound band are/is improved. Comparing the dotted line, in the solid line, it can be seen that peak and/or dip are/is improved by about 4 dB or more with respect to 1 kHz or more. For example, comparing the dotted line, in the solid line, it can be seen that peak and/or dip are/is improved with respect to 1 kHz or more, and thus, a flatness characteristic of a sound pressure level is enhanced.

Figure 69B:
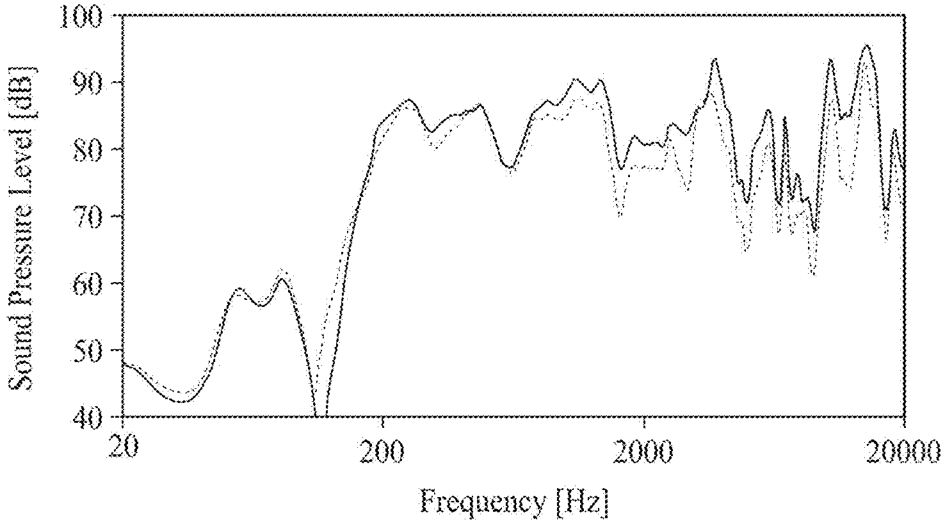

In FIG. 69B, a dotted line represents a sound output characteristic of a case where a width of the coupling part is 1 mm, and a solid line represents a sound output characteristic of a case where a width of the coupling part is 3 mm.

With reference to FIG. 69B, comparing the dotted line, in the solid line, it can be seen that a sound pressure level more increases. For example, comparing the dotted line, in the solid line, it can be seen that a sound pressure level in a low-pitched sound band to a high-pitched sound band more increases. For example, comparing the dotted line, in the solid line, it can be seen that a sound pressure level more increases with respect to 200 Hz to 20 kHz or more. Comparing the dotted line, in the solid line, it can be seen that peak and/or dip in a low-pitched sound band to a high-pitched sound band are/is improved. Comparing the dotted line, in the solid line, it can be seen that peak and/or dip are/is improved by about 4 dB or more with respect to 200 Hz or more. Comparing the dotted line, in the solid line, it can be seen that peak and/or dip are/is improved by about 7 dB or more with respect to 1 kHz or more. For example, comparing the dotted line, in the solid line, because peak and/or dip in the low-pitched sound band to the high-pitched sound band are/is improved, and thus, it can be seen that a flatness characteristic of a sound pressure level is enhanced. Comparing the solid line of FIG. 69A with the solid line of FIG. 69B, with respect to 1 kHz or more, peak and/or dip is further improved, a flatness characteristic of a sound pressure level can be enhanced. For example, it can be seen that a sound pressure level is enhanced as a width of the coupling part increases.

Figure 69C:
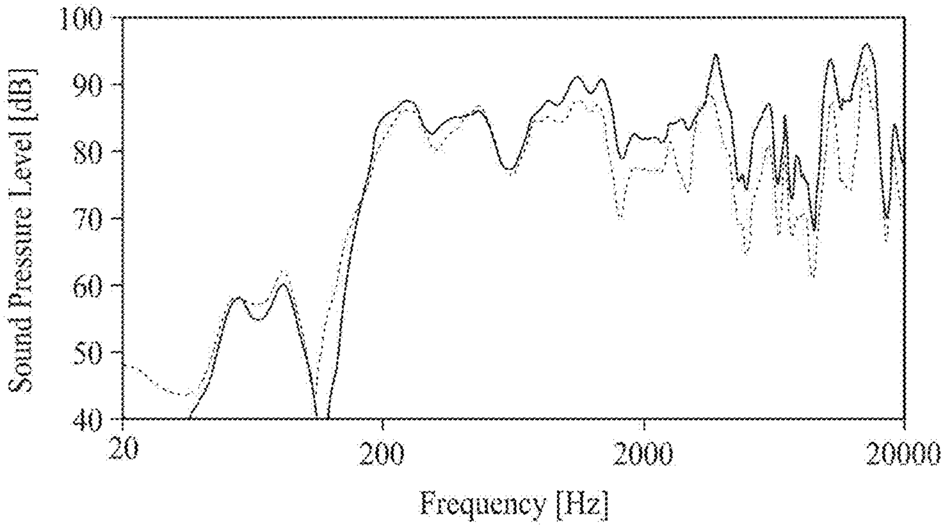

In FIG. 69C, a dotted line represents a sound output characteristic of a case where a width of the coupling part is 1 mm, and a solid line represents a sound output characteristic of a case where a width of the coupling part is 4 mm.

With reference to FIG. 69C, comparing the dotted line, in the solid line, it can be seen that a sound pressure level more increases. For example, comparing the dotted line, in the solid line, it can be seen that a sound pressure level in a low-pitched sound band to a high-pitched sound band more increases. For example, comparing the dotted line, in the solid line, it can be seen that a sound pressure level more increases with respect to 200 Hz to 20 kHz or more. Comparing the dotted line, in the solid line, it can be seen that peak and/or dip in a low-pitched sound band to a high-pitched sound band are/is improved. Comparing the dotted line, in the solid line, it can be seen that peak and/or dip are/is improved by about 4 dB or more with respect to 200 Hz or more. Comparing the dotted line, in the solid line, it can be seen that peak and/or dip are/is improved by about 7 dB or more with respect to 1 kHz or more. For example, comparing the dotted line, in the solid line, because peak and/or dip in the low-pitched sound band to the high-pitched sound band are/is improved, and thus, it can be seen that a flatness characteristic of a sound pressure level is enhanced. Comparing the solid line of FIG. 69A with the solid line of FIG. 69C, with respect to 1 kHz or more, peak and/or dip is further improved, a flatness characteristic of a sound pressure level can be enhanced. Comparing the solid line of FIG. 69B with the solid line of FIG. 69C, with respect to 1 kHz or more, peak and/or dip is further improved, a flatness characteristic of a sound pressure level can be enhanced. For example, it can be seen that a sound pressure level is enhanced as a width of the coupling part increases.

Figure 69D:
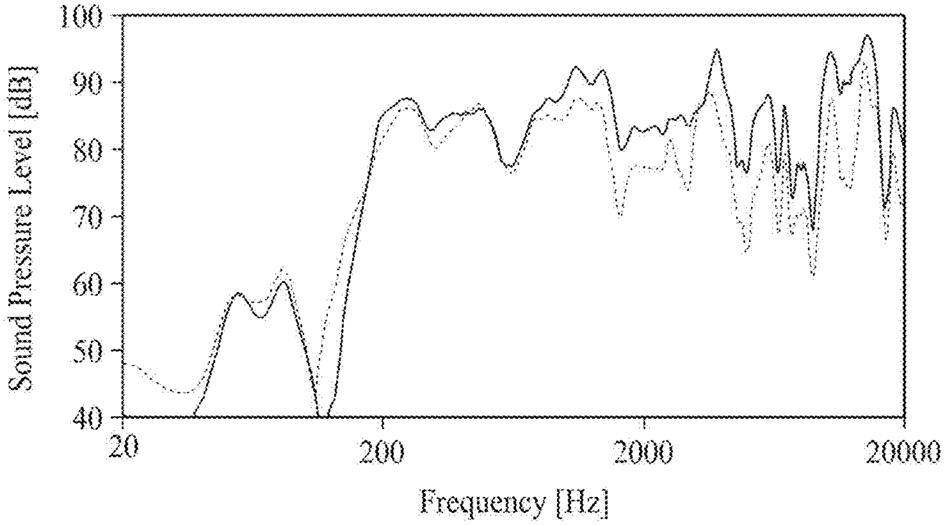

In FIG. 69D, a dotted line represents a sound output characteristic of a case where a width of the coupling part is 1 mm, and a solid line represents a sound output characteristic of a case where a width of the coupling part is 5 mm.

With reference to FIG. 69D, comparing the dotted line, in the solid line, it can be seen that a sound pressure level more increases. For example, comparing the dotted line, in the solid line, it can be seen that a sound pressure level in a low-pitched sound band to a high-pitched sound band more increases. For example, comparing the dotted line, in the solid line, it can be seen that a sound pressure level more increases with respect to 200 Hz to 20 kHz or more. Comparing the dotted line, in the solid line, it can be seen that peak and/or dip in a low-pitched sound band to a high-pitched sound band are/is improved. Comparing the dotted line, in the solid line, it can be seen that peak and/or dip are/is improved by about 4 dB or more with respect to 200 Hz or more. Comparing the dotted line, in the solid line, it can be seen that peak and/or dip are/is improved by about 7 dB or more with respect to 1 kHz or more. For example, comparing the dotted line, in the solid line, because peak and/or dip in the low-pitched sound band to the high-pitched sound band are/is improved, and thus, it can be seen that a flatness characteristic of a sound pressure level is enhanced. Comparing the solid line of FIG. 69A with the solid line of FIG. 69D, with respect to 1 kHz or more, peak and/or dip is further improved, a flatness characteristic of a sound pressure level can be enhanced. Comparing the solid line of FIG. 69B with the solid line of FIG. 69D, with respect to 1 kHz or more, peak and/or dip is further improved, a flatness characteristic of a sound pressure level can be enhanced. Comparing the solid line of FIG. 69C with the solid line of FIG. 69D, with respect to 1 kHz or more, peak and/or dip is further improved, a flatness characteristic of a sound pressure level can be enhanced. For example, it can be seen that a sound pressure level is enhanced as a width of the coupling part increases.

According to an embodiment of the present disclosure, as a width of the coupling part increases, a sound pressure level can be enhanced, and dust or particles flowing in from the outside can be reduced or minimized. According to an embodiment of the present disclosure, a width of the coupling part can be 1 mm or more, but embodiments of the present disclosure are not limited thereto. Further, a width of the coupling part can be 1 mm to 5 mm, but embodiments of the present disclosure are not limited thereto.

According to an embodiment of the present disclosure, because a width of the coupling part is configured to 1 mm or more, a sound characteristic and/or a sound pressure level characteristic can be enhanced in a pitched sound band including a sound of a low-pitched sound band, and peak and/or dip in a high-pitched sound band can be improved, thereby enhancing a balance characteristic of a sound pressure level and/or a flatness characteristic of a sound pressure level. According to an embodiment of the present disclosure, because the width of the coupling part is configured to 1 mm or more, dust or particles flowing in from the outside can be reduced or minimized.

FIGS. 70A to 70D illustrate a sound output characteristic of an apparatus according to an embodiment of the present disclosure.

In FIGS. 70A to 70D, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

Particularly, FIGS. 70A to 70D illustrate a sound output characteristic of a sound apparatus with respect to the length L of the coupling part 500 of FIG. 35.

Figure 70A:
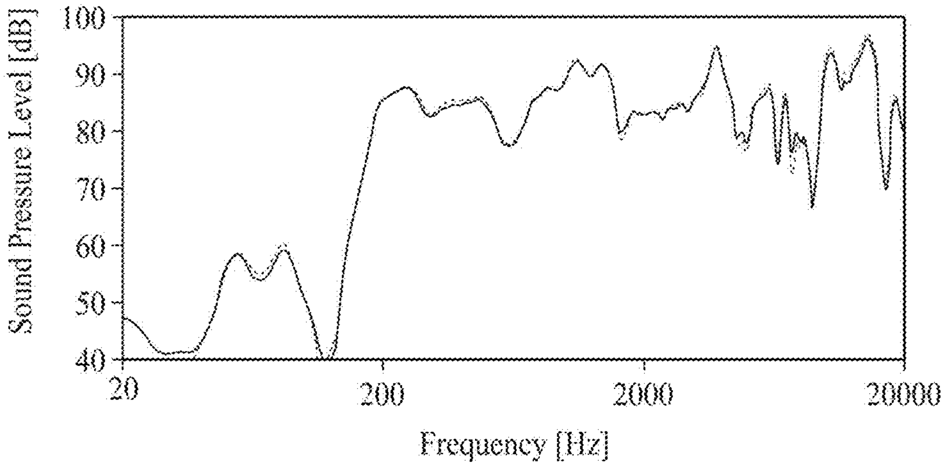
FIGS. 70A to 70D illustrate a sound output characteristic of an apparatus according to an embodiment of the present disclosure.

In FIG. 70A, a dotted line represents a sound output characteristic of a case where a length of the coupling part is 19 mm, and a solid line represents a sound output characteristic of a case where a length of the coupling part is 16 mm.

With reference to FIG. 70A, comparing the dotted line, in the solid line, it can be seen that a sound pressure level increases. Comparing the dotted line, in the solid line, it can be seen that peak and/or dip in a high-pitched sound band are/is improved. For example, comparing the dotted line, in the solid line, it can be seen that peak and/or dip are/is improved with respect to 1 kHz or more. For example, comparing the dotted line, in the solid line, it can be seen that peak and/or dip are/is improved with respect to 3.8 kHz or more. For example, comparing the dotted line, in the solid line, it can be seen that peak and/or dip are/is improved with respect to 4.5 kHz and 7 kHz to 9 kHz or more, and thus, a flatness characteristic of a sound pressure level is enhanced.

Figure 70B:
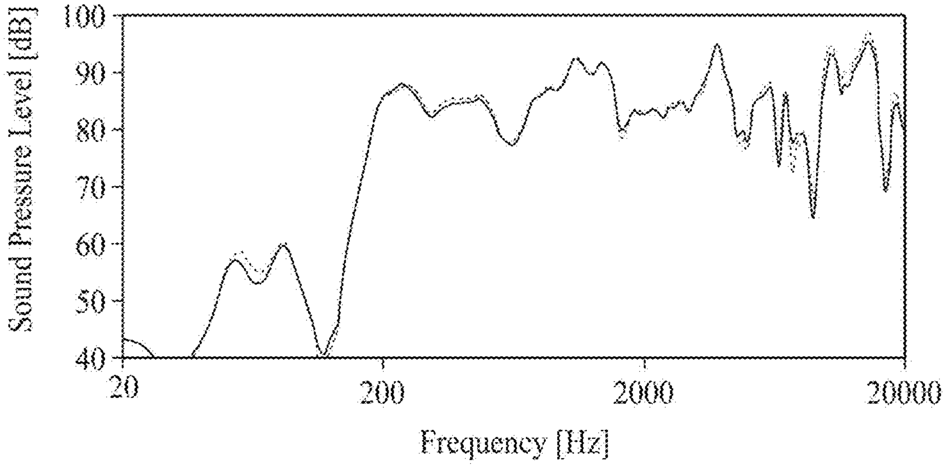

In FIG. 70B, a dotted line represents a sound output characteristic of a case where a length of the coupling part is 19 mm, and a solid line represents a sound output characteristic of a case where a length of the coupling part is 14 mm.

With reference to FIG. 70B, comparing the dotted line, in the solid line, it can be seen that a sound pressure level increases. Comparing the dotted line, in the solid line, it can be seen that peak and/or dip in a high-pitched sound band are/is improved. For example, comparing the dotted line, in the solid line, it can be seen that peak and/or dip are/is improved with respect to 1 kHz or more. For example, comparing the dotted line, in the solid line, it can be seen that peak and/or dip are/is improved with respect to 3.8 kHz or more. For example, comparing the dotted line, in the solid line, it can be seen that peak and/or dip are/is improved with respect to 4.5 kHz and 7 kHz to 9 kHz or more, and thus, a flatness characteristic of a sound pressure level is enhanced. Comparing the solid line of FIG. 70A with a solid line of FIG. 70B, it can be seen that peak and/or dip are/is improved with respect to 1 kHz or more.

Figure 70C:
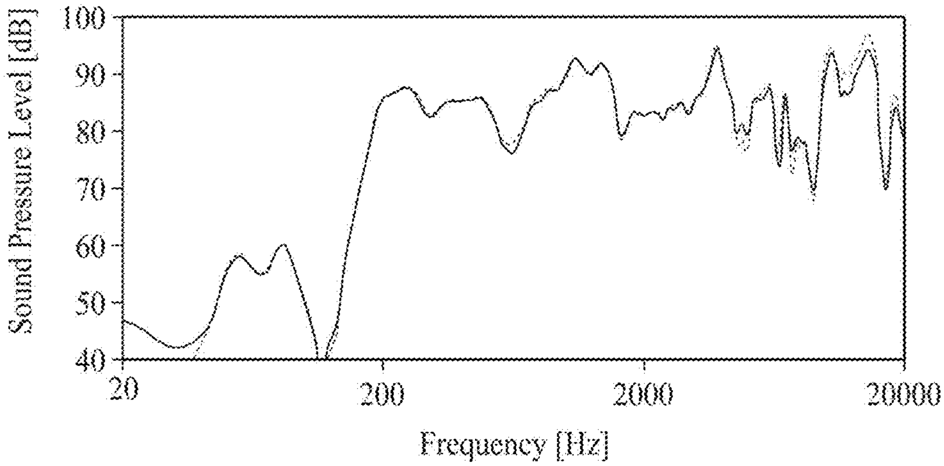

In FIG. 70C, a dotted line represents a sound output characteristic of a case where a length of the coupling part is 19 mm, and a solid line represents a sound output characteristic of a case where a length of the coupling part is 12 mm.

With reference to FIG. 70C, comparing the dotted line, in the solid line, it can be seen that a sound pressure level increases. Comparing the dotted line, in the solid line, it can be seen that peak and/or dip in a high-pitched sound band are/is improved. For example, comparing the dotted line, in the solid line, it can be seen that peak and/or dip are/is improved with respect to 1 kHz or more. For example, comparing the dotted line, in the solid line, it can be seen that peak and/or dip are/is improved with respect to 3.8 kHz or more. For example, comparing the dotted line, in the solid line, it can be seen that peak and/or dip are/is improved with respect to 4.5 kHz and 7 kHz to 9 kHz or more, and thus, a flatness characteristic of a sound pressure level is enhanced. Comparing the solid line of FIG. 70A with a solid line of FIG. 70C, it can be seen that peak and/or dip are/is improved with respect to 1 kHz or more. Comparing the solid line of FIG. 70B with a solid line of FIG. 70C, it can be seen that peak and/or dip are/is improved with respect to 1 kHz or more.

Figure 70D:
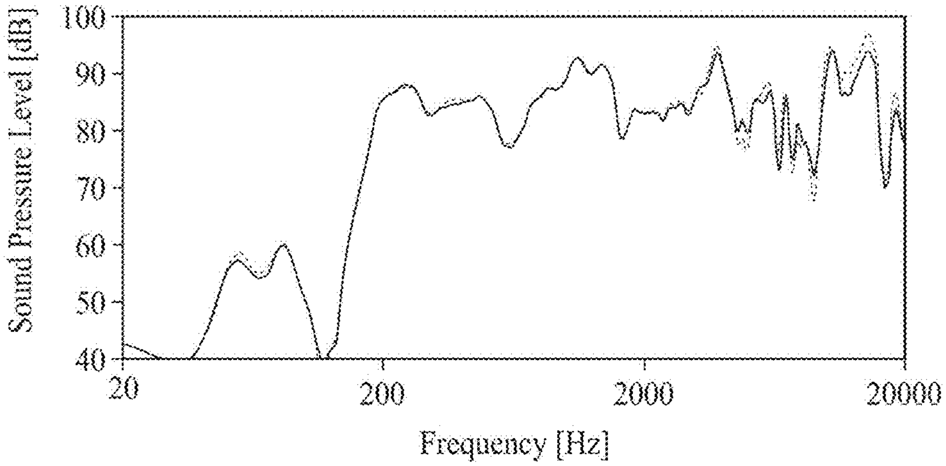

In FIG. 70D, a dotted line represents a sound output characteristic of a case where a length of the coupling part is 19 mm, and a solid line represents a sound output characteristic of a case where a length of the coupling part is 10 mm.

With reference to FIG. 70D, comparing the dotted line, in the solid line, it can be seen that a sound pressure level increases. Comparing the dotted line, in the solid line, it can be seen that peak and/or dip in a high-pitched sound band are/is improved. For example, comparing the dotted line, in the solid line, it can be seen that peak and/or dip are/is improved with respect to 1 kHz or more. For example, comparing the dotted line, in the solid line, it can be seen that peak and/or dip are/is improved with respect to 3.8 kHz or more. For example, comparing the dotted line, in the solid line, it can be seen that peak and/or dip are/is improved with respect to 4.5 kHz and 7 kHz to 9 kHz or more, and thus, a flatness characteristic of a sound pressure level is enhanced. Comparing the solid line of FIG. 70A with a solid line of FIG. 70D, it can be seen that peak and/or dip are/is improved with respect to 1 kHz or more. Comparing the solid line of FIG. 70B with a solid line of FIG. 70D, it can be seen that peak and/or dip are/is improved with respect to 1 kHz or more. Comparing the solid line of FIG. 70C with a solid line of FIG. 70D, it can be seen that peak and/or dip are/is improved with respect to 1 kHz or more.

According to an embodiment of the present disclosure, as a length of the coupling part decreases, a sound pressure level characteristic can be enhanced. According to an embodiment of the present disclosure, a length of the coupling part can be 10 mm or more, but embodiments of the present disclosure are not limited thereto. For example, a length of the coupling part can be 10 mm or more and less than 19 mm, but embodiments of the present disclosure are not limited thereto. For example, when a length of the coupling part is smaller than 10 mm, the dip and/or peak of a sound can be improved, but there can be a problem where it is difficult to equip a sound apparatus in a roof trim of a vehicular apparatus. According to an embodiment of the present disclosure, because a length of the coupling part is configured to 10 mm or more and less than 19 mm, a sound characteristic and/or a sound pressure level characteristic can be enhanced in a pitched sound band including a sound of a low-pitched sound band, and peak and/or dip in a high-pitched sound band can be improved, thereby enhancing a balance characteristic of a sound pressure level or a flatness characteristic of a sound pressure level.

Figure 71:
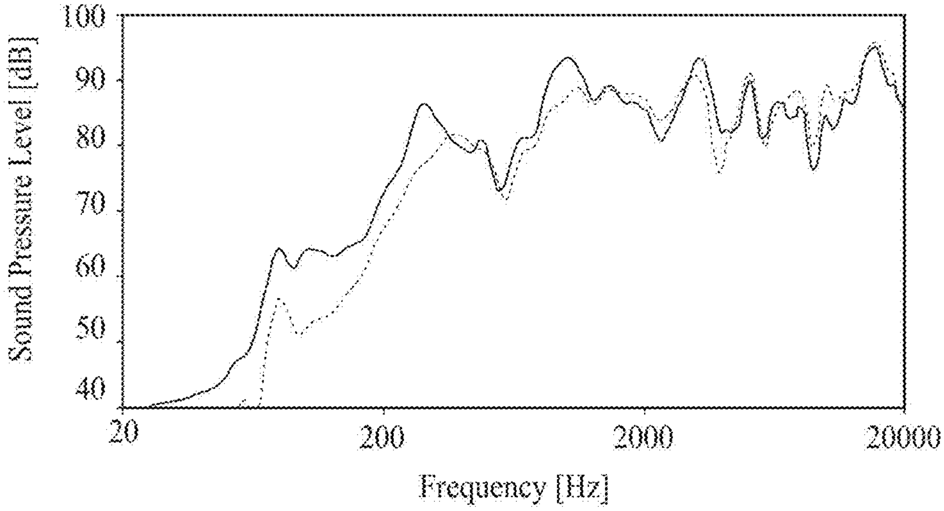
FIG. 71 illustrates a sound output characteristic of an apparatus according to an embodiment of the present disclosure.

FIG. 71 illustrates a sound output characteristic of an apparatus according to an embodiment of the present disclosure.

In FIG. 71, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

In FIG. 71, a dotted line represents a sound output characteristic of the sound apparatus illustrated in FIG. 31, and a solid line represents a sound output characteristic of the sound apparatus illustrated in FIG. 43. The vibration member 331 can be configured with ABS.

With reference to FIG. 71, comparing with a dotted line, in a solid line, it can be seen that a sound pressure level is enhanced with respect to 300 Hz or less. For example, comparing with the dotted line, in the solid line, it can be seen that a sound pressure level is enhanced by about 5 dB with respect to 300 Hz or less. Comparing with the dotted line, in the solid line, it can be seen that a sound pressure level is enhanced with respect to a low-pitched sound band (for example, 300 Hz or less). Comparing with the dotted line, in the solid line, it can be seen that a sound pressure level is enhanced with respect to 1 kHz or more.

According to an embodiment of the present disclosure, because a second connection member is configured at a periphery of an enclosure, a sound characteristic and/or a sound pressure level characteristic in a pitched sound band including the low-pitched sound band can be further improved, and a sound reproduction band can expand.

Figure 72:
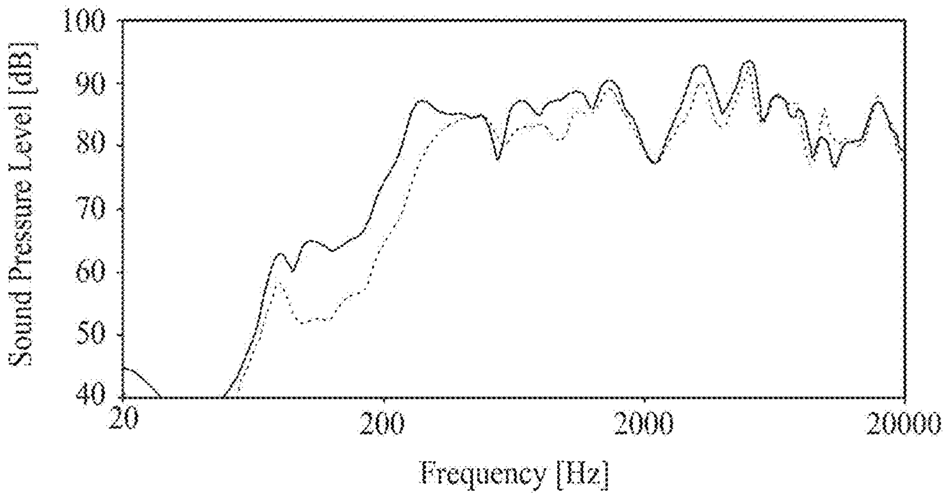
FIG. 72 illustrates a sound output characteristic of an apparatus according to an embodiment of the present disclosure.

FIG. 72 illustrates a sound output characteristic of an apparatus according to an embodiment of the present disclosure.

In FIG. 72, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

In FIG. 72, a dotted line represents a sound output characteristic of the sound apparatus illustrated in FIG. 31, and a solid line represents a sound output characteristic of the sound apparatus illustrated in FIG. 43. The vibration member 331 can be configured with aluminum (Al).

With reference to FIG. 72, comparing with a dotted line, in a solid line, it can be seen that a sound pressure level is enhanced with respect to 300 Hz or less. For example, comparing with the dotted line, in the solid line, it can be seen that a sound pressure level is enhanced by about 5 dB with respect to 300 Hz or less. Comparing with the dotted line, in the solid line, it can be seen that a sound pressure level is enhanced with respect to a low-pitched sound band (for example, 300 Hz or less). Comparing with the dotted line, in the solid line, it can be seen that a sound pressure level is enhanced with respect to 1 kHz or more.

According to an embodiment of the present disclosure, because a second connection member is configured at a periphery of an enclosure, a sound characteristic and/or a sound pressure level characteristic in a pitched sound band including the low-pitched sound band can be further improved, and a sound reproduction band can expand.

Figure 73:
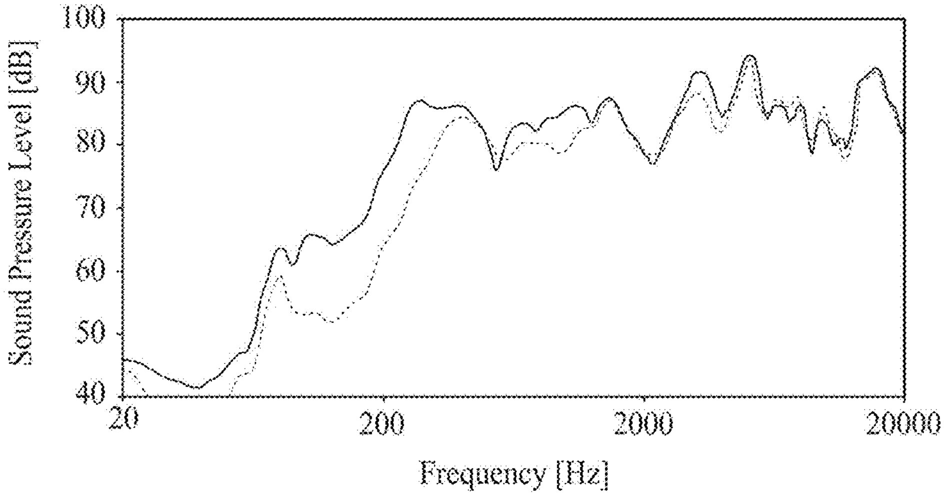
FIG. 73 illustrates a sound output characteristic of an apparatus according to an embodiment of the present disclosure.

FIG. 73 illustrates a sound output characteristic of an apparatus according to an embodiment of the present disclosure.

In FIG. 73, the abscissa axis represents a frequency in hertz (Hz), and the ordinate axis represents a sound pressure level (SPL) in decibels (dB). A measurement method of a sound output characteristic can be substantially the same as the above description of FIG. 59, and thus, repeated descriptions are omitted.

In FIG. 73, a dotted line represents a sound output characteristic of the sound apparatus illustrated in FIG. 31, and a solid line represents a sound output characteristic of the sound apparatus illustrated in FIG. 43. The vibration member 331 can be configured with carbon fiber reinforced plastic (CFRP).

With reference to FIG. 73, comparing with a dotted line, in a solid line, it can be seen that a sound pressure level is enhanced with respect to 300 Hz or less. For example, comparing with the dotted line, in the solid line, it can be seen that a sound pressure level is enhanced by about 10 dB with respect to 300 Hz or less. Comparing with the dotted line, in the solid line, it can be seen that a sound pressure level is enhanced with respect to a low-pitched sound band (for example, 300 Hz or less). Comparing with the dotted line, in the solid line, it can be seen that a sound pressure level is enhanced with respect to 1 kHz or more.

According to an embodiment of the present disclosure, because a second connection member is configured at a periphery of an enclosure, a sound characteristic and/or a sound pressure level characteristic in a pitched sound band including the low-pitched sound band can be further improved, and a sound reproduction band can expand.

With reference to FIGS. 71 to 73, according to an embodiment of the present disclosure, because a second connection member is configured at a periphery of an enclosure, a sound characteristic and/or a sound pressure level characteristic in a pitched sound band including the low-pitched sound band can be further improved, and a sound reproduction band can be improved.

A sound apparatus and a vehicular apparatus including the same according to one or more embodiments of the present disclosure are described below.

A sound apparatus according to one or more embodiments of the present disclosure can comprise a sound generating module including a vibration member and a vibration apparatus configured at the vibration member, an enclosure connected to the vibration member with an internal space therebetween, and a connection member connected to the enclosure. The connection member can comprise a first portion and a second portion. The first and second portions of the connection member may have different thicknesses from each other.

According to one or more embodiments of the present disclosure, the thickness of the second portion of the connection member can be thicker than the thickness of the first portion of the connection member.

According to one or more embodiments of the present disclosure, the second portion of the connection member can be at a periphery portion of the enclosure. The first portion of the connection member can be at another portion, except the periphery portion, of the enclosure.

According to one or more embodiments of the present disclosure, the enclosure can comprise a first region corresponding to a center portion of the enclosure, a second region corresponding to a periphery portion, surrounding the center portion, of the enclosure, and a third region between the first region and the second region. The first portion of the connection member can be at the first region and the third region. The second portion of the connection member can be at the second region.

According to one or more embodiments of the present disclosure, a width of the second portion of the connection member can be smaller than a width of the first portion of the connection member.

According to one or more embodiments of the present disclosure, the connection member can comprise a first connection member connected to the enclosure, and a second connection member connected to a portion of the first connection member. The first portion can comprise only the first connection member of the first connection member and the second connection member. The second portion can comprise all of the first connection member and the second connection member.

According to one or more embodiments of the present disclosure, the second connection member can be stacked on the first connection member at the second portion.

According to one or more embodiments of the present disclosure, the second connection member can be at a periphery of the first connection member.

According to one or more embodiments of the present disclosure, the first connection member can comprise a same material as a material of the second connection member.

According to one or more embodiments of the present disclosure, the sound apparatus can further comprise a coupling member between the enclosure and the vibration member. The connection member can comprise a material different from a material of the coupling member.

According to one or more embodiments of the present disclosure, a width of the second portion of the connection member can be greater than a width of the coupling member and can be smaller than a width of the first portion of the connection member.

According to one or more embodiments of the present disclosure, the sound apparatus can further comprise a coupling member between the enclosure and the vibration member. At least one of the first connection member and the second connection member can comprise a material having elasticity higher than elasticity of the coupling member.

According to one or more embodiments of the present disclosure, at least one of the first connection member and the second connection member can comprise a rubber material, or can comprise ethylene propylene diene monomer, ethylene propylene rubber, or urethane rubber.

According to one or more embodiments of the present disclosure, the enclosure can comprise a first region corresponding to a center portion of the enclosure, a second region corresponding to a periphery portion, surrounding the center portion, of the enclosure, and a third region between the first region and the second region. The first portion of the connection member can be at the first region. The second portion of the connection member can be spaced apart from the first portion and can be at the second region.

According to one or more embodiments of the present disclosure, the first portion of the connection member can be at a center portion of the enclosure. The second portion of the connection member can be spaced apart from the first portion and can be at a periphery portion of the enclosure.

According to one or more embodiments of the present disclosure, a width of the second portion can be smaller than a width of the first portion.

According to one or more embodiments of the present disclosure, the connection member can comprise a first connection member at the first portion and connected to a center portion of the enclosure, and a second connection member at the second portion and connected to a periphery portion of the enclosure.

According to one or more embodiments of the present disclosure, at least one of the first connection member and the second connection member can comprise a rubber material, or can comprise ethylene propylene diene monomer, ethylene propylene rubber, or urethane rubber.

According to one or more embodiments of the present disclosure, the vibration member can comprise a metal material, or can comprise a single nonmetal material or a composite nonmetal material of one or more of wood, rubber, plastic, carbon, glass, fiber, cloth, paper, mirror, and leather.

According to one or more embodiments of the present disclosure, the vibration apparatus can comprise one or more vibration generators. The one or more vibration generators can comprise a vibration part, a first electrode part at a first surface of the vibration part, and a second electrode part at a second surface different from the first surface of the vibration part.

According to one or more embodiments of the present disclosure, the vibration part can comprise a piezoelectric material.

According to one or more embodiments of the present disclosure, the vibration part can comprise a plurality of inorganic material portions having the piezoelectric material, and an organic material portion between the plurality of inorganic material portions.

According to one or more embodiments of the present disclosure, the one or more vibration generators can further comprise a first cover member at the first electrode part, and a second cover member at the second electrode part.

According to one or more embodiments of the present disclosure, the one or more vibration generators can further comprise a signal supply member electrically connected to the first electrode part and the second electrode part. A portion of the signal supply member can be accommodated between the first cover member and the second cover member.

According to one or more embodiments of the present disclosure, the vibration apparatus can comprise a first vibration generator and a second vibration generator stacked on each other. Each of the first vibration generator and the second vibration generator can comprise a vibration part, a first electrode part at a first surface of the vibration part, and a second electrode part at a second surface different from the first surface of the vibration part.

According to one or more embodiments of the present disclosure, the vibration apparatus can further comprise an intermediate member connected between the first vibration generator and the second vibration generator. The first vibration generator and the second vibration generator can be displaced in a same direction.

According to one or more embodiments of the present disclosure, the vibration apparatus can comprise a first vibration apparatus configured at a first surface of the vibration member, and a second vibration apparatus configured at a second surface different from the first surface of the vibration member.

According to one or more embodiments of the present disclosure, the enclosure can be connected to the first surface of the vibration member and can comprise an inner surface facing the vibration member and an outer surface opposite to the inner surface. The connection member can be connected to the outer surface of the enclosure.

According to one or more embodiments of the present disclosure, the enclosure can comprise an opening part connected to the internal space.

According to one or more embodiments of the present disclosure, the opening part can be disposed to correspond to a center portion of the vibration apparatus.

According to one or more embodiments of the present disclosure, the enclosure can comprise a first enclosure including the opening part, and a second enclosure connected to the first enclosure. The sound generating module can be configured at the internal space between the first enclosure and the second enclosure.

According to one or more embodiments of the present disclosure, the first enclosure can comprise an inner surface facing the vibration member and an outer surface opposite to the inner surface. The connection member can be connected to a periphery of the opening part of the outer surface of the first enclosure.

According to one or more embodiments of the present disclosure, the internal space can be between a first surface of the sound generating module and the first enclosure and connected to the opening part. The enclosure can further comprise a second space between the second enclosure and a second surface opposite to the first surface of the sound generating module.

According to one or more embodiments of the present disclosure, the vibration member can comprise at least one or more holes at a periphery of the vibration apparatus. The internal space and the second space can be connected to each other through the at least one or more holes.

According to one or more embodiments of the present disclosure, the vibration member can be configured between the first enclosure and the second enclosure. The vibration apparatus can comprise a first vibration apparatus connected to a first surface of the vibration member, and a second vibration apparatus connected to a second surface different from the first surface of the vibration member, or connected to the first vibration apparatus.

According to one or more embodiments of the present disclosure, the vibration member can be configured to cover the internal space of the enclosure. The enclosure can be coupled to a periphery portion of the vibration member and can comprise an opening part connected to the internal space.

According to one or more embodiments of the present disclosure, the vibration apparatus can comprise a first vibration apparatus connected to a first surface of the vibration member, and a second vibration apparatus connected to a second surface different from the first surface of the vibration member, or connected to the first vibration apparatus.

According to one or more embodiments of the present disclosure, the enclosure can comprise an inner surface facing the vibration member and an outer surface opposite to the inner surface. The connection member can be connected to a periphery of the opening part of the outer surface of the enclosure.

According to one or more embodiments of the present disclosure, the vibration member can comprise at least one or more holes at a periphery of the vibration apparatus.

According to one or more embodiments of the present disclosure, the sound apparatus can further comprise a protection member at the second vibration apparatus. The protection member can comprise a material different from a material of the connection member.

According to one or more embodiments of the present disclosure, the protection member can be configured to contact the second vibration apparatus and the second surface of the vibration member, or is configured to cover the second vibration apparatus and the second surface of the vibration member.

According to one or more embodiments of the present disclosure, the vibration member can comprise at least one or more holes at a periphery of the vibration apparatus. The protection member can comprise at least one or more connection holes connected to the at least one or more holes.

A vehicular apparatus according to one or more embodiments of the present disclosure can comprise an interior material exposed at an interior space, and at least one or more sound generating apparatuses disposed at the interior material to output a sound to the interior space. The at least one or more sound generating apparatuses can comprise a sound generating module including a vibration member and a vibration apparatus configured at the vibration member, an enclosure connected to the vibration member with an internal space therebetween, and a connection member connected to the enclosure. The connection member can comprise a first portion and a second portion. The first and a second portions of the connection member can have different thicknesses from each other.

According to one or more embodiments of the present disclosure, the interior material can comprise one or more opening holes connected to the internal space of the enclosure in the at least one or more sound generating apparatuses.

According to one or more embodiments of the present disclosure, the connection member in the at least one or more sound generating apparatuses can be between the interior material and the enclosure.

According to one or more embodiments of the present disclosure, the vehicular apparatus can further comprise an air gap at a region between the first portion of the connection member and the interior material or at a region between the first portion of the connection member and the second portion of the connection member.

According to one or more embodiments of the present disclosure, the first portion of the connection member in the at least one or more sound generating apparatuses can comprise an opening hole connected to the internal space of the enclosure.

According to one or more embodiments of the present disclosure, the interior material can comprise at least one or more curved portions contacting one or more of the first portion and the second portion of the connection member.

According to one or more embodiments of the present disclosure, the enclosure in the at least one or more sound generating apparatuses can comprise an opening part connected to the internal space.

According to one or more embodiments of the present disclosure, the opening part can be disposed to correspond to a center portion of the vibration apparatus in the at least one or more sound generating apparatuses.

According to one or more embodiments of the present disclosure, the enclosure can comprise a first enclosure including the opening part, and a second enclosure connected to the first enclosure. The sound generating module can be configured at the internal space between the first enclosure and the second enclosure.

According to one or more embodiments of the present disclosure, the first enclosure can comprise an inner surface facing the vibration member and an outer surface opposite to the inner surface. The connection member can be connected between a periphery of the opening part of the outer surface of the first enclosure and the interior material.

According to one or more embodiments of the present disclosure, the internal space can be between a first surface of the sound generating module and the first enclosure and connected to the opening part. The enclosure can comprise a second space between the second enclosure and a second surface opposite to the first surface of the sound generating module.

According to one or more embodiments of the present disclosure, the vibration member can comprise at least one or more holes at a periphery of the vibration apparatus. The internal space and the second space can be connected to each other through the at least one or more holes of the vibration member.

According to one or more embodiments of the present disclosure, the vibration member can be configured between the first enclosure and the second enclosure. The vibration apparatus can comprise a first vibration apparatus connected to a first surface of the vibration member, and a second vibration apparatus connected to a second surface different from the first surface of the vibration member, or connected to the first vibration apparatus.

According to one or more embodiments of the present disclosure, the vibration member in the at least one or more sound generating apparatuses can be configured to cover the internal space of the enclosure. The enclosure in the at least one or more sound generating apparatuses can be coupled to a periphery portion of the vibration member and can comprise an opening part connected to the internal space.

According to one or more embodiments of the present disclosure, the vibration apparatus in the at least one or more sound generating apparatuses can comprise a first vibration apparatus connected to a first surface of the vibration member, and a second vibration apparatus connected to a second surface different from the first surface of the vibration member, or connected to the first vibration apparatus.

According to one or more embodiments of the present disclosure, the enclosure can comprise an inner surface facing the vibration member and an outer surface opposite to the inner surface. The connection member can be connected to a periphery of the opening part of the outer surface of the enclosure and the interior material.

According to one or more embodiments of the present disclosure, the vibration member can comprise at least one or more holes at a periphery of the vibration apparatus.

According to one or more embodiments of the present disclosure, the vehicular apparatus can further comprise a protection member at the second vibration apparatus. The protection member can comprise a material different from a material of the connection member.

According to one or more embodiments of the present disclosure, the protection member can be configured to contact the second vibration apparatus and the second surface of the vibration member, or configured to cover the second vibration apparatus and the second surface of the vibration member.

According to one or more embodiments of the present disclosure, the vibration member can comprise at least one or more holes at a periphery of the vibration apparatus. The protection member can comprise at least one or more connection holes connected to the at least one or more holes.

According to one or more embodiments of the present disclosure, the vehicular apparatus can further comprise a coupling part configured to couple the enclosure to the interior material. The coupling part can comprise a hollow part connected to the internal space through the opening part of the enclosure.

According to one or more embodiments of the present disclosure, the interior material can comprise an opening hole connected to the opening part of the enclosure. The coupling part can be configured to be coupled to the enclosure through the opening hole of the interior material, the connection member, and the opening part of the enclosure.

According to one or more embodiments of the present disclosure, the coupling part can comprise a hollow member accommodated into the opening part through the opening hole of the interior material and the connection member, the hollow member including the hollow part; a hook member connected to a first side of the hollow member and coupled to an inner surface of the enclosure; and a latch member connected to a second side of the hollow member and coupled to one surface of the interior material exposed at the interior space.

According to one or more embodiments of the present disclosure, the interior material can comprise an opening hole connected to the opening part of the enclosure. The enclosure can further comprise a protrusion part protruding from the enclosure to surround the opening part and accommodated into the opening hole through the connection member. The coupling part can be configured to be coupled to the enclosure at the internal space of the enclosure through the protrusion part and the opening part.

According to one or more embodiments of the present disclosure, the protrusion part can comprise a hollow hole connected to the opening part. The coupling part can comprise a hollow member accommodated into the hollow hole through the opening hole of the interior material, the hollow member including the hollow part; a hook member connected to a first side of the hollow member and coupled to an inner surface of the enclosure at the internal space of the enclosure; and a latch member connected to a second side of the hollow member and configured to be coupled to one surface of the interior material exposed at the interior space.

According to one or more embodiments of the present disclosure, the interior material can comprise an opening hole connected to the opening part. The enclosure can further comprise a protrusion part protruding from the enclosure to surround the opening part and configured to be accommodated into the opening hole. The coupling part can be accommodated into and coupled to the protrusion part and configured to be coupled to one surface of the interior material exposed at the interior space.

According to one or more embodiments of the present disclosure, the protrusion part can comprise a hollow hole connected to the opening part. The coupling part can comprise a hollow member accommodated into and coupled to the hollow hole, the hollow member including the hollow part; and a latch member connected to the hollow member. The latch member can be configured to be coupled to one surface of the interior material exposed at the interior space.

According to one or more embodiments of the present disclosure, the latch member can comprise a flexible material.

According to one or more embodiments of the present disclosure, the interior material can comprise one or more materials of metal, wood, rubber, plastic, carbon, glass, fiber, cloth, paper, a mirror, and leather.

According to one or more embodiments of the present disclosure, the interior material can comprise at least one or more of a dashboard, a pillar interior material, a roof interior material, a door interior material, a seat interior material, a handle interior material, a floor interior material, a rear package interior material, an overhead console, a rear view mirror, a glove box, and a sun visor. The at least one or more sound generating apparatuses can be configured to vibrate at least one or more of the dashboard, the pillar interior material, the roof interior material, the door interior material, the seat interior material, the handle interior material, the floor interior material, the rear package interior material, the overhead console, the rear view mirror, the glove box, and the sun visor, to generate a sound.

A vehicular apparatus according to one or more embodiments of the present disclosure can comprise an interior material exposed at an interior space, and at least one or more sound apparatuses as described above, disposed at the interior material to output a sound to the interior space.

According to one or more embodiments of the present disclosure, the interior material can comprise one or more opening holes connected to the internal space of the enclosure in the at least one or more sound apparatuses as described above.

According to one or more embodiments of the present disclosure, the connection member in the at least one or more sound apparatuses as described above can be between the interior material and the enclosure.

It will be apparent to those skilled in the art that various modifications and variations can be made in the present disclosure without departing from the scope of the disclosures. Thus, it is intended that the present disclosure covers the modifications and variations of this disclosure that come within the scope of the appended claims and their equivalents.

What is claimed is:

1. A sound apparatus, comprising:

a sound generating module including a vibration member and a vibration apparatus configured at the vibration member;

an enclosure connected to the vibration member with an internal space therebetween;

a connection member connected to the enclosure; and a hallow part extending through the connection member and connected to the internal space, wherein the connection member comprises a first portion and a second portion, and the first and second portions of the connection member have different thicknesses from each other.

2. The sound apparatus of claim 1, wherein the thickness of the second portion of the connection member is thicker than the thickness of the first portion of the connection member.

3. The sound apparatus of claim 2, wherein the second portion of the connection member is disposed at a periphery portion of the enclosure, and wherein the first portion of the connection member is disposed at another portion, except the periphery portion, of the enclosure.

4. The sound apparatus of claim 2, wherein the enclosure comprises:

a first region corresponding to a center portion of the enclosure;

a second region corresponding to a periphery portion, surrounding the center portion, of the enclosure; and a third region between the first region and the second region, wherein the first portion of the connection member is disposed at the first region and the third region, and wherein the second portion of the connection member is disposed at the second region.

5. The sound apparatus of claim 2,
wherein the enclosure comprises:
a first region corresponding to a center portion of the enclosure;
a second region corresponding to a periphery portion, surrounding the center portion, of the enclosure; and
a third region between the first region and the second region,
wherein the first portion of the connection member is disposed at the first region, and
wherein the second portion of the connection member is spaced apart from the first portion and is disposed at the second region.

6. The sound apparatus of claim 2,
wherein the first portion of the connection member is disposed at a center portion of the enclosure, and
wherein the second portion of the connection member is spaced apart from the first portion and is disposed at a periphery portion of the enclosure.

7. The sound apparatus of claim 6, wherein a width of the second portion is smaller than a width of the first portion.

8. The sound apparatus of claim 6, wherein the connection member comprises:
a first connection member disposed at the first portion and connected to the center portion of the enclosure; and
a second connection member disposed at the second portion and connected to the periphery portion of the enclosure.

9. The sound apparatus of claim 8, wherein at least one of the first connection member and the second connection member comprises a rubber material, or comprises ethylene propylene diene monomer, ethylene propylene rubber, or urethane rubber.

10. The sound apparatus of claim 1, wherein a width of the second portion of the connection member is smaller than a width of the first portion of the connection member.

11. The sound apparatus of claim 1,
wherein the connection member comprises:
a first connection member connected to the enclosure; and
a second connection member connected to a portion of the first connection member,
wherein the first portion comprises only the first connection member of the first connection member and the second connection member, and
wherein the second portion comprises all of the first connection member and the second connection member.

12. The sound apparatus of claim 11, wherein the second connection member is stacked on the first connection member at the second portion.

13. The sound apparatus of claim 11, wherein the second connection member is disposed at a periphery of the first connection member.

14. The sound apparatus of claim 11, wherein the first connection member comprises a same material as a material of the second connection member.

15. The sound apparatus of claim 11, further comprising a coupling member between the enclosure and the vibration member,
wherein at least one of the first connection member and the second connection member comprises a material having elasticity higher than elasticity of the coupling member.

16. The sound apparatus of claim 11, wherein at least one of the first connection member and the second connection member comprises a rubber material, or comprises ethylene propylene diene monomer, ethylene propylene rubber, or urethane rubber.

17. The sound apparatus of claim 1, further comprising a coupling member between the enclosure and the vibration member,
wherein the connection member comprises a material different from a material of the coupling member.

18. The sound apparatus of claim 17, wherein a width of the second portion of the connection member is greater than a width of the coupling member and is smaller than a width of the first portion of the connection member.

19. The sound apparatus of claim 1, wherein the vibration apparatus comprises one or more vibration generators, and
wherein the one or more vibration generators comprise:
a vibration part including a piezoelectric material;
a first electrode part disposed at a first surface of the vibration part; and
a second electrode part disposed at a second surface different from the first surface of the vibration part.

20. The sound apparatus of claim 19, wherein the one or more vibration generators further comprise:
a first cover member disposed at the first electrode part;
a second cover member disposed at the second electrode part; and
a signal supply member electrically connected to the first electrode part and the second electrode part, and
wherein a portion of the signal supply member is accommodated between the first cover member and the second cover member.

21. The sound apparatus of claim 1, wherein the vibration apparatus comprises:
a first vibration apparatus configured at a first surface of the vibration member; and
a second vibration apparatus configured at a second surface different from the first surface of the vibration member.

22. The sound apparatus of claim 21,
wherein the enclosure is connected to the first surface of the vibration member and comprises an inner surface facing the vibration member and an outer surface opposite to the inner surface, and
wherein the connection member is connected to the outer surface of the enclosure.

23. The sound apparatus of claim 1, wherein the enclosure comprises an opening part connected to the internal space.

24. The sound apparatus of claim 23,
wherein the enclosure comprises:
a first enclosure including the opening part; and
a second enclosure connected to the first enclosure, and
wherein the sound generating module is configured at the internal space between the first enclosure and the second enclosure.

25. The sound apparatus of claim 24,
wherein the first enclosure comprises an inner surface facing the vibration member and an outer surface opposite to the inner surface, and
wherein the connection member is connected to a periphery of the opening part of the outer surface of the first enclosure.

26. The sound apparatus of claim 24,
wherein the vibration member is configured between the first enclosure and the second enclosure, and
wherein the vibration apparatus comprises:
a first vibration apparatus connected to a first surface of the vibration member; and a second vibration apparatus connected to a second surface different from the first surface of the vibration member, or connected to the first vibration apparatus.

27. The sound apparatus of claim 1, wherein the vibration member is configured to cover the internal space of the enclosure, and wherein the enclosure is coupled to a periphery portion of the vibration member and comprises an opening part connected to the internal space.

28. The sound apparatus of claim 27, wherein the vibration apparatus comprises:

a first vibration apparatus connected to a first surface of the vibration member; and a second vibration apparatus connected to a second surface different from the first surface of the vibration member, or connected to the first vibration apparatus.

29. The sound apparatus of claim 28, further comprising a protection member at the second vibration apparatus, wherein the protection member comprises a material different from a material of the connection member.

30. The sound apparatus of claim 29, wherein the vibration member comprises at least one or more holes disposed at a periphery of the vibration apparatus, and wherein the protection member comprises at least one or more connection holes connected to the at least one or more holes.

31. The sound apparatus of claim 27, wherein the vibration member comprises at least one or more holes at a periphery of the vibration apparatus.

32. The sound apparatus of claim 1, further comprising an air gap interposed between the enclosure and the connection member, wherein a distance between the enclosure and the connection member in the air gap varies between a periphery portion of the enclosure and the hollow part.

33. A vehicular apparatus, comprising:

an interior material exposed at an interior space; and at least one or more sound generating apparatuses disposed at the interior material to output a sound to the interior space, wherein the at least one or more sound generating apparatuses comprise the sound apparatus of claim 1.

34. The vehicular apparatus of claim 33, wherein the connection member in the at least one or more sound generating apparatuses is disposed between the interior material and the enclosure.

35. The vehicular apparatus of claim 34, further comprising an air gap disposed at a region between the first portion of the connection member and the interior material or at a region between the first portion of the connection member and the second portion of the connection member.

* * * * *